US008306810B2

(12) United States Patent
Li

(10) Patent No.: US 8,306,810 B2
(45) Date of Patent: Nov. 6, 2012

(54) SYSTEMS AND METHODS TO ENABLE INTERACTIVITY AMONG A PLURALITY OF DEVICES

(75) Inventor: Lehmann Li, Studio City, CA (US)

(73) Assignee: ezsav Inc., Darien, CT (US)

( * ) Notice: Subject to any disclaimer, the term of this patent is extended or adjusted under 35 U.S.C. 154(b) by 741 days.

(21) Appl. No.: 12/370,536

(22) Filed: Feb. 12, 2009

(65) Prior Publication Data

US 2009/0265163 A1    Oct. 22, 2009

Related U.S. Application Data

(60) Provisional application No. 61/028,167, filed on Feb. 12, 2008, provisional application No. 61/036,980, filed on Mar. 16, 2008.

(51) Int. Cl.
*G06F 17/21* (2006.01)
*G10L 15/06* (2006.01)
*G10L 15/04* (2006.01)
*G10L 15/18* (2006.01)

(52) U.S. Cl. ........... 704/10; 704/243; 704/251; 704/257

(58) Field of Classification Search .......... None
See application file for complete search history.

(56) References Cited

U.S. PATENT DOCUMENTS

| | | | |
|---|---|---|---|
| 6,389,394 B1* | 5/2002 | Fanty | 704/249 |
| 7,389,228 B2* | 6/2008 | Rajput et al. | 704/236 |
| 7,505,903 B2* | 3/2009 | Yamamoto | 704/235 |
| 7,983,902 B2* | 7/2011 | Wu et al. | 704/10 |
| 2004/0214555 A1 | 10/2004 | Kumar et al. | |
| 2005/0033582 A1 | 2/2005 | Gadd et al. | |
| 2006/0206381 A1* | 9/2006 | Frayman | 705/14 |
| 2006/0212287 A1* | 9/2006 | Bigalet | 704/10 |
| 2007/0005371 A1 | 1/2007 | Nakagawa et al. | |
| 2007/0118357 A1 | 5/2007 | Kasravi et al. | |
| 2007/0192294 A1 | 8/2007 | Ramer et al. | |
| 2008/0243834 A1* | 10/2008 | Rieman et al. | 707/5 |

OTHER PUBLICATIONS

Ramabhadran, B.; Bahl, L.R.; deSouza, P.V.; Padmanabhan, M.; "Acoustics-only based automatic phonetic baseform generation," Acoustics, Speech and Signal Processing, 1998. Proceedings of the 1998 IEEE International Conference on Issue Date: May 12-15, 1998, On pp. 309-312 vol. 1.*

Yuqing Gao; Ramabhadran, B.; Chen, J.; Erdogan, H.; Picheny, M.; "Innovative approaches for large vocabulary name recognition," Acoustics, Speech, and Signal Processing, 2001. Proceedings. (ICASSP '01). 2001 IEEE International Conference on, Issue Date: 2001, On pp. 53-56 vol. 1.*

International Search Report/Written Opinion received for PCT Application No. PCT/US09/33948, mailed on Apr. 7, 2009, 13 pages.

\* cited by examiner

*Primary Examiner* — Matthew Sked

(74) *Attorney, Agent, or Firm* — Locke Lord LLP

(57) ABSTRACT

Methods and systems to exchange and display data among a plurality of devices in response to one or more of user input and context-based information. User input may include one or more of motion, speech, text, pointing, and touch-selecting. Context-based information may include one or more of user location, which may be relative to one or more devices, background audio, information related to one or more products and/or services, and user-based context information. User context-based information may correspond one or more of prior transactions, prior activities, prior content exposure, and demographic information. Also disclosed herein are methods and systems to correlate user speech to one or more of commands and data objects, with respect to context-based information. Methods and systems to recognize speech may be implemented in combination with methods and systems to exchange and/or display of data among a plurality of devices, and in other environments.

19 Claims, 71 Drawing Sheets

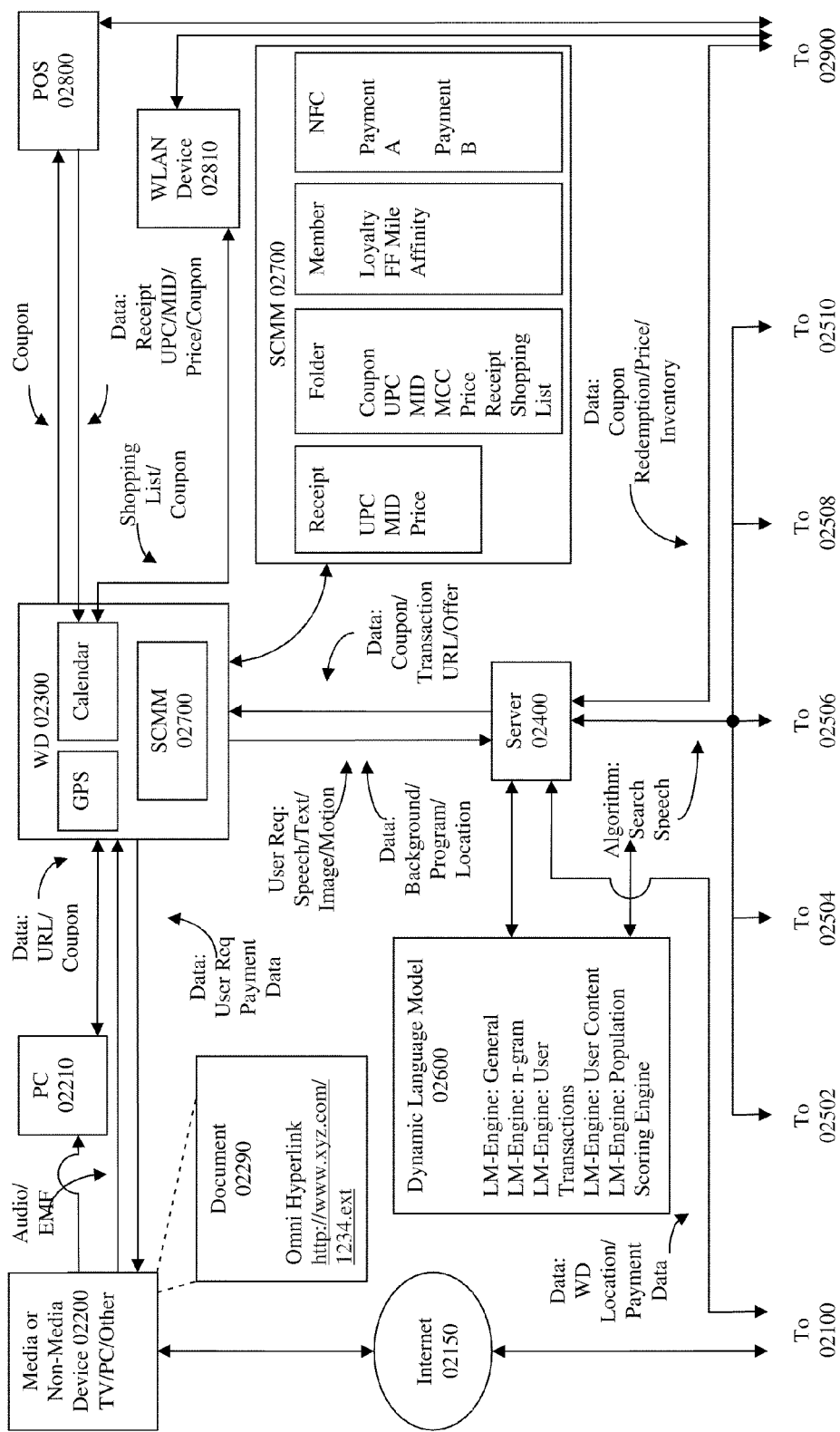
FIG. 2B1

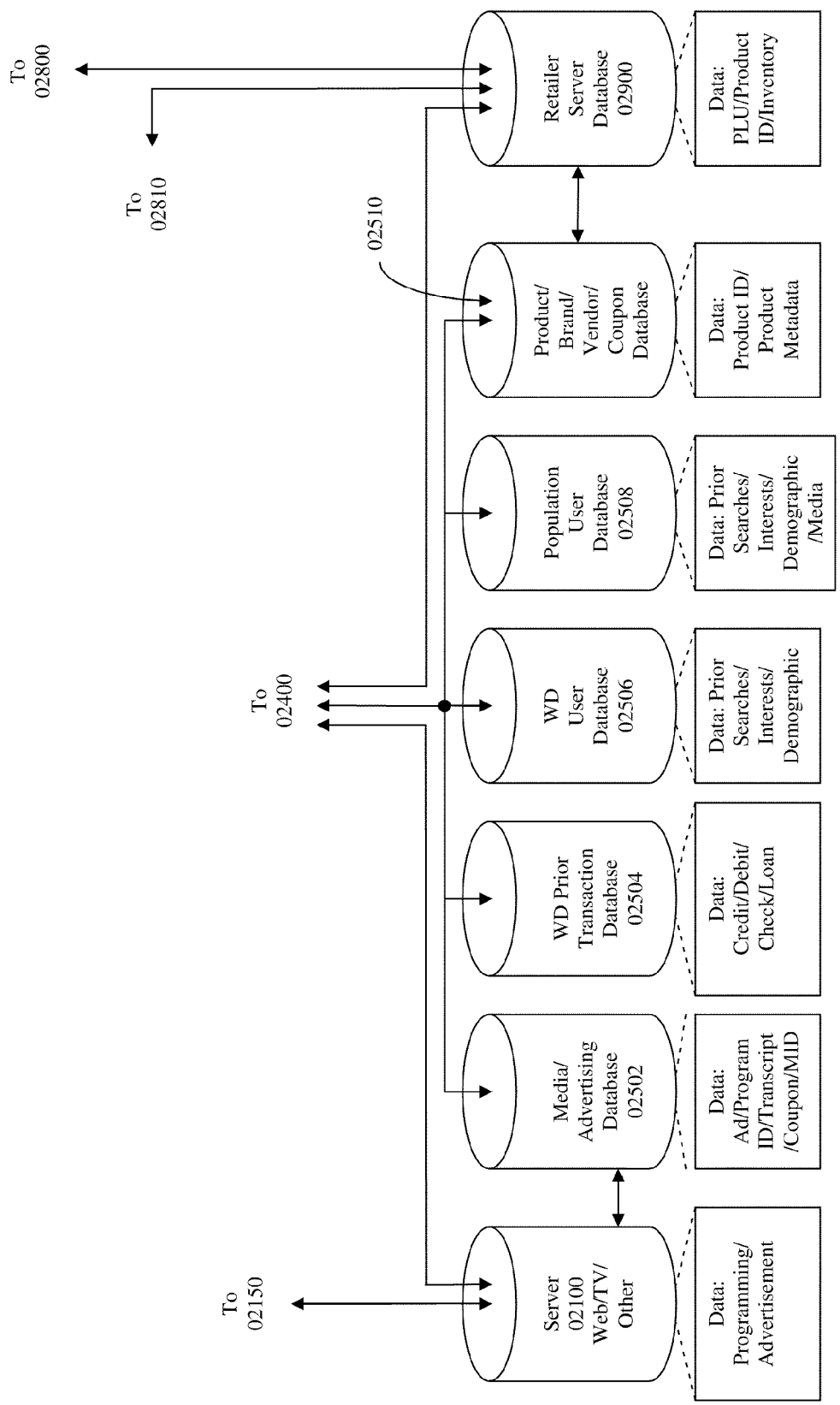
FIG. 2B2

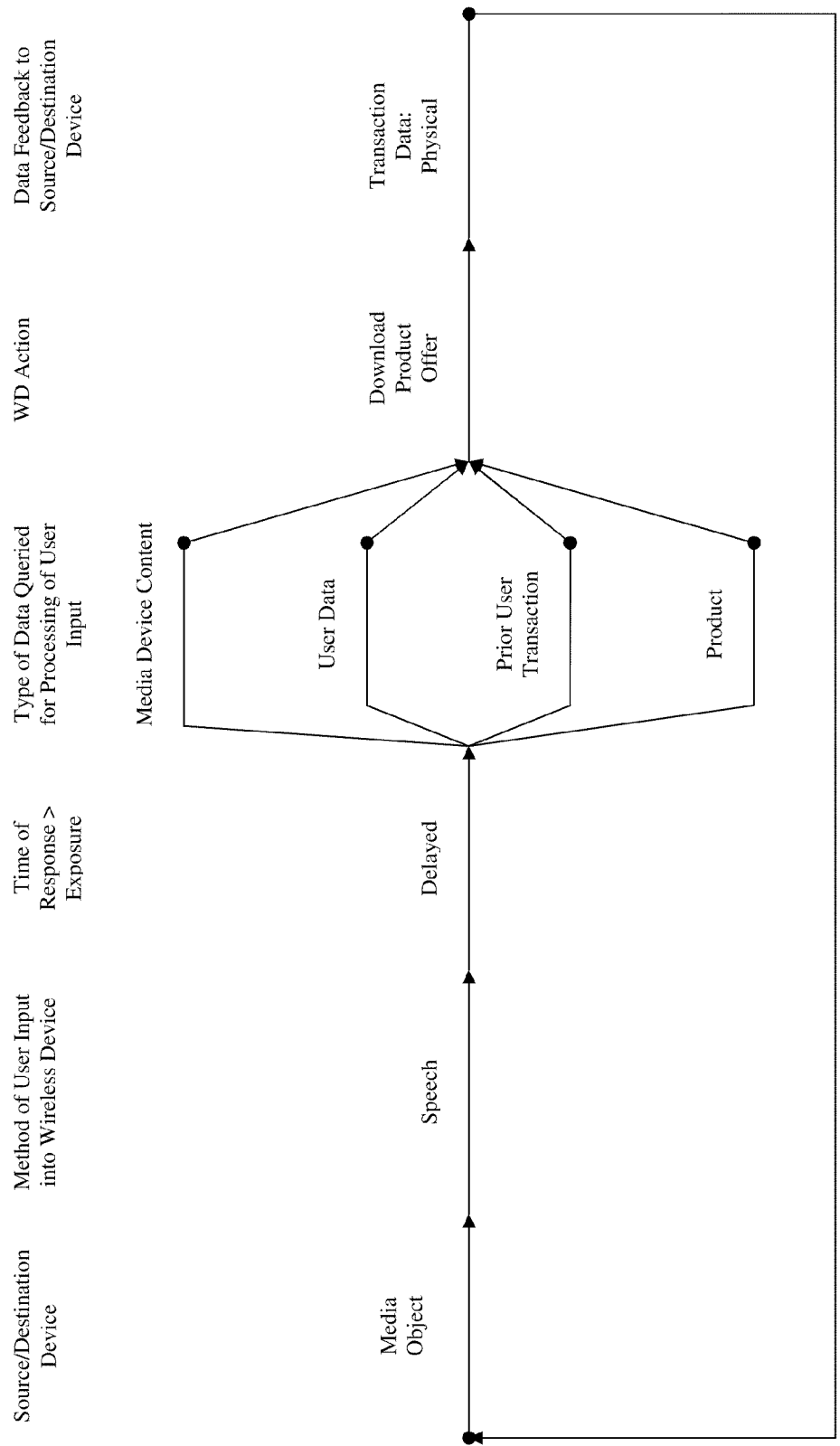

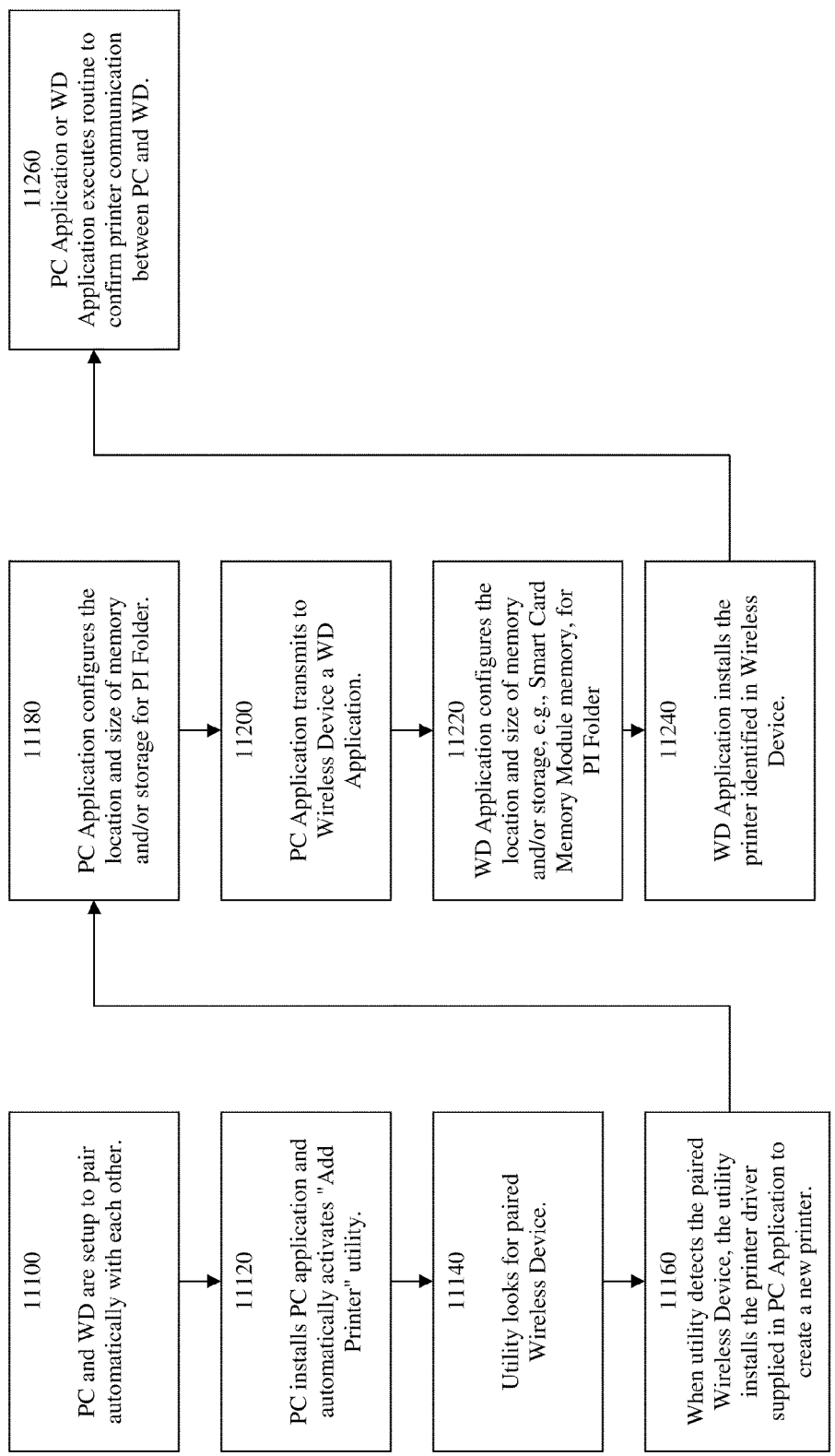

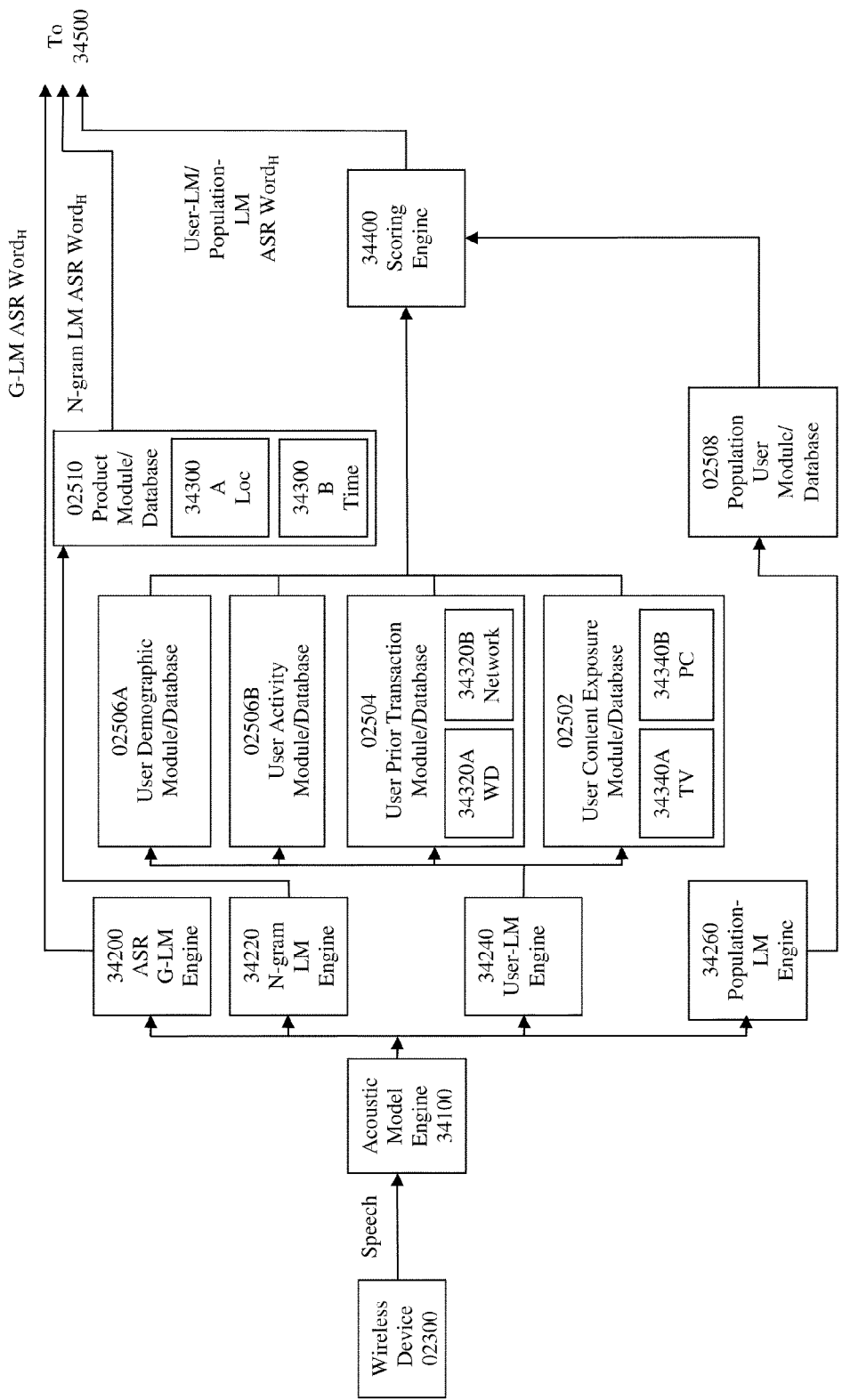
FIG. 34A1

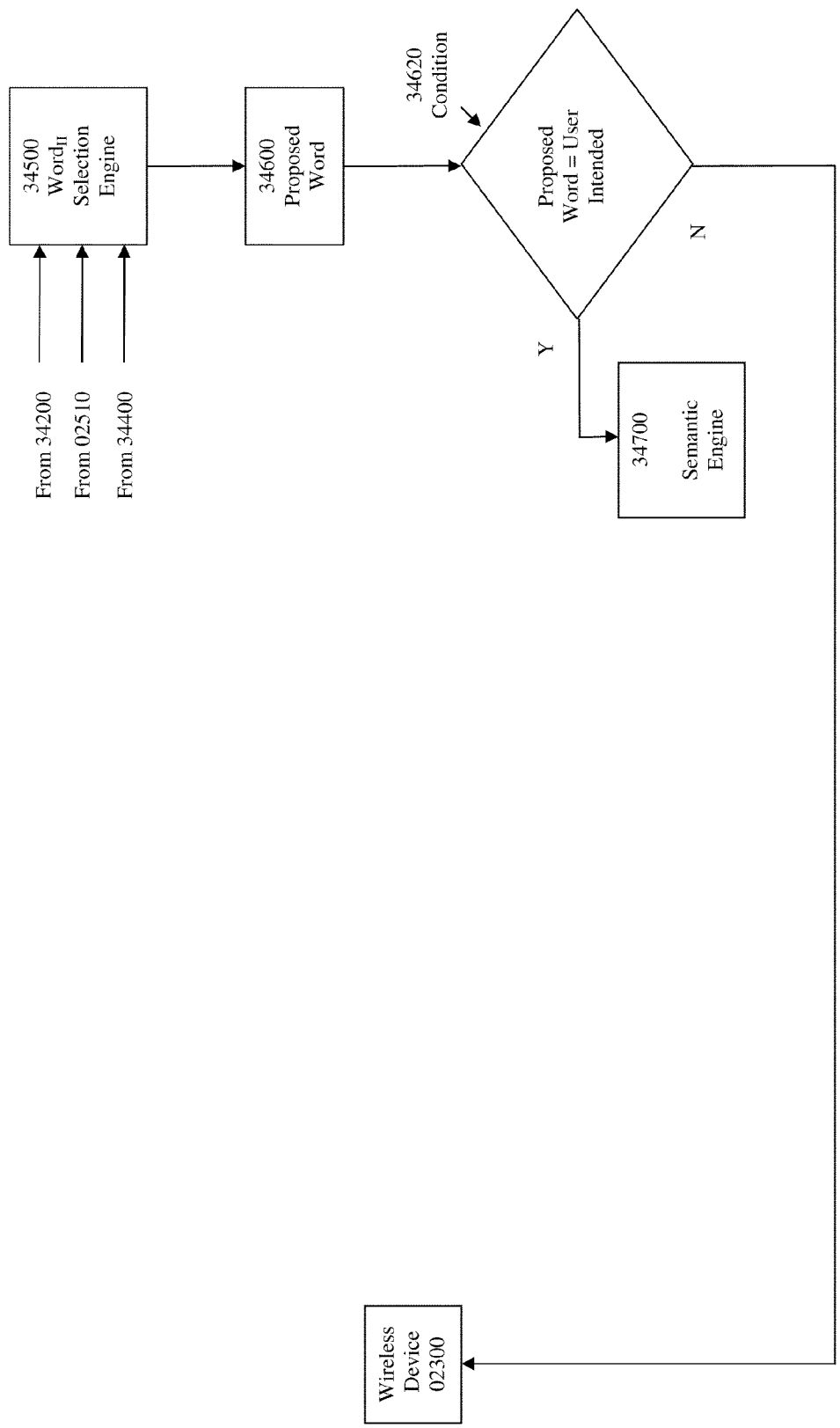
FIG. 34A2

SYSTEMS AND METHODS TO ENABLE INTERACTIVITY AMONG A PLURALITY OF DEVICES

CROSS REFERENCE TO RELATED APPLICATIONS

The present application claims benefit of U.S. Provisional Patent Application No. 61/028,167, entitled "Systems and methods for improving speech recognition," filed on Feb. 12, 2008, and U.S. Provisional Patent Application No. 61/036,980, entitled "Systems, methods, and computer program products enabling automatic processing of purchase incentives," filed on Mar. 16, 2008, both of which are incorporated by reference in their entireties.

BACKGROUND

Viewers of content displayed on conventional media devices, e.g., a television, have limited means of interacting with such content.

Viewers of content displayed on a first media device, e.g., a personal computer, cannot through simple commands transfer data to one or more other media devices, e.g., a television or a wireless device, and/or non-media devices, e.g., a kitchen appliance.

Viewers of content displayed on a first media device, e.g., a personal computer or a wireless device, cannot through simple commands distribute the display of the content on one or more other media devices and/or non-media devices.

Viewers of content displayed on a first media device, e.g., a television, cannot through simple commands interact with data related to the displayed content on one or more other media devices, e.g., a personal computer and/or a wireless device. In particular, the content displayed on a first media device cannot not be easily synchronized or customized with content displayed on one or more other media devices.

Data describing content displayed on a media device or products purchased in retailers is typically not structured and/or cannot be accessed in a manner to enable efficient recognition of speech, search of databases, and/or display of advertisements.

Current speech recognition technology face limits in accurately recognizing speech in the absence of training data. A general language model or even topic-specific language models can still generate large vocabulary sizes. These limits make it difficult to enable viewers of content displayed on a media device to interact with such content through speech inputs. These limits make it difficult to enable consumers to generate a shopping list by speaking one or more words describing a product.

Current methods of offering purchase incentives, e.g., coupons, deliver the incentives in a manner which is not customized to the most likely user or at a time most likely to influence the decision to buy the product.

SUMMARY OF THE INVENTION

The present application discloses an invention which can enable the exchange and/or display of data among a plurality of devices through an input to a first device by one or more methods, e.g., speech, and producing one or more outputs executed and/or displayed on the first device and/or one or more other devices. The embodiments described herein can be implemented individually, implemented in various combinations of each other, and/or distributed as desired.

In one embodiment, a computer-implemented method comprises: a first device determining a command for enabling on one or more other devices the execution of instructions and/or display of data where the instructions and/or data are related to instructions executed and/or data displayed on a second device; the first device executing the command; the one or more other devices receiving instructions and/or data enabling the execution of instructions and/or display of data related to instructions executed and/or data displayed on the second device; and the one or more other devices executing the instructions and/or displaying the data In another embodiment, a computer-implemented method comprises: a first device determining a command for enabling on a second device the execution of instructions and/or display of data related to instructions executed and/or data displayed on the first device; the first device executing the command; the second device receiving instructions and/or data enabling the execution of instructions and/or display of data related to instructions executed and/or data displayed on the first device; and the second device executing the instructions and/or displaying the data.

In one embodiment, a computer-implemented method comprises: a first device displaying a hyperlink whose selection can output the execution of instructions and/or display of data on one or more other devices; the first device selecting the hyperlink; the first device transmitting to one or more servers of the selection and addresses of one or more other devices; the one or more servers transmitting instructions and/or data to the addresses of one or more other devices; and the one or more other devices executing instructions and/or displaying data.

In one embodiment, a computer-implemented method comprises: a first device displaying content; one or more other devices receiving from the first device periodically and/or at specified times data enabling the identification of the content displayed on the first device; the one or more other devices transmitting to one or more servers the data enabling the content identification and addresses of the one or more other devices; the one or more servers transmitting to the one or more other devices content related to the content displayed on the first device; and the one or more other devices executing the instructions and/or displaying data.

In one embodiment, a computer-implemented method comprises: a context-based language model querying one or more databases to generate a vocabulary of candidate words and/or word sequences related to: (1) names of products, vendors, and/or product categories, (2) characteristics of the user speaking, (3) activities of the user speaking, (4) prior transactions of the user speaking, (5) content displayed on one or more media devices in the vicinity of the device communicating the user speech, and/or (6) characteristics, activities, transactions, and/or content viewed by a population similar to the user; scoring the candidate word sequences based on a variety of factors related to vocabularies (1)-(6), e.g., time, location, frequency, magnitude, and/or recency; ranking the candidate word sequences; selecting one or more high-ranking candidate word sequences satisfying a threshold; applying one or more heuristics to determine the meaning of the one or more candidate word sequences; selecting a word sequence; and looking up data and/or instructions associated with the selected word sequence.

In one embodiment, a computer-implemented method comprises: a wireless device receiving input in the form of speech describing one or more products to be included in a list; the wireless device applying to the speech input a context-based language model or transmitting the speech to a server applying a context-based language model; selecting a word sequence; and generating a list of products.

BRIEF DESCRIPTION OF THE DRAWINGS

The accompanying drawings, which are incorporated herein and form a part of the specification, illustrate the disclosed invention and, together with the description, further serve to explain the principles of the invention and to enable any person with ordinary skill in the art to make and use the invention.

FIG. 2B depicts a block diagram of an exemplary system enabling any device, e.g., a wireless device and/or a wireline device, to exchange with one or more other devices any data related to content displayed on another media device, according to some embodiments.

FIG. 4B depicts an exemplary series of inputs, actions, conditions, and outputs at each step enabling the identification and processing of a request by an user of a first device related to content displayed on one or more other devices, according to some embodiments.

FIGS. 11A and 11B depict a flowchart of an exemplary method enabling the transfer of data between a first device, e.g., a personal computer, and a second device, e.g., a wireless device, through selecting one or more commands executed in an active window displayed in the first device, according to some embodiments.

FIG. 34A depicts an exemplary method enabling the adaptation of a language model, according to some embodiments.

DETAILED DESCRIPTION OF THE INVENTION

1. Data Processing System

Figure 1:
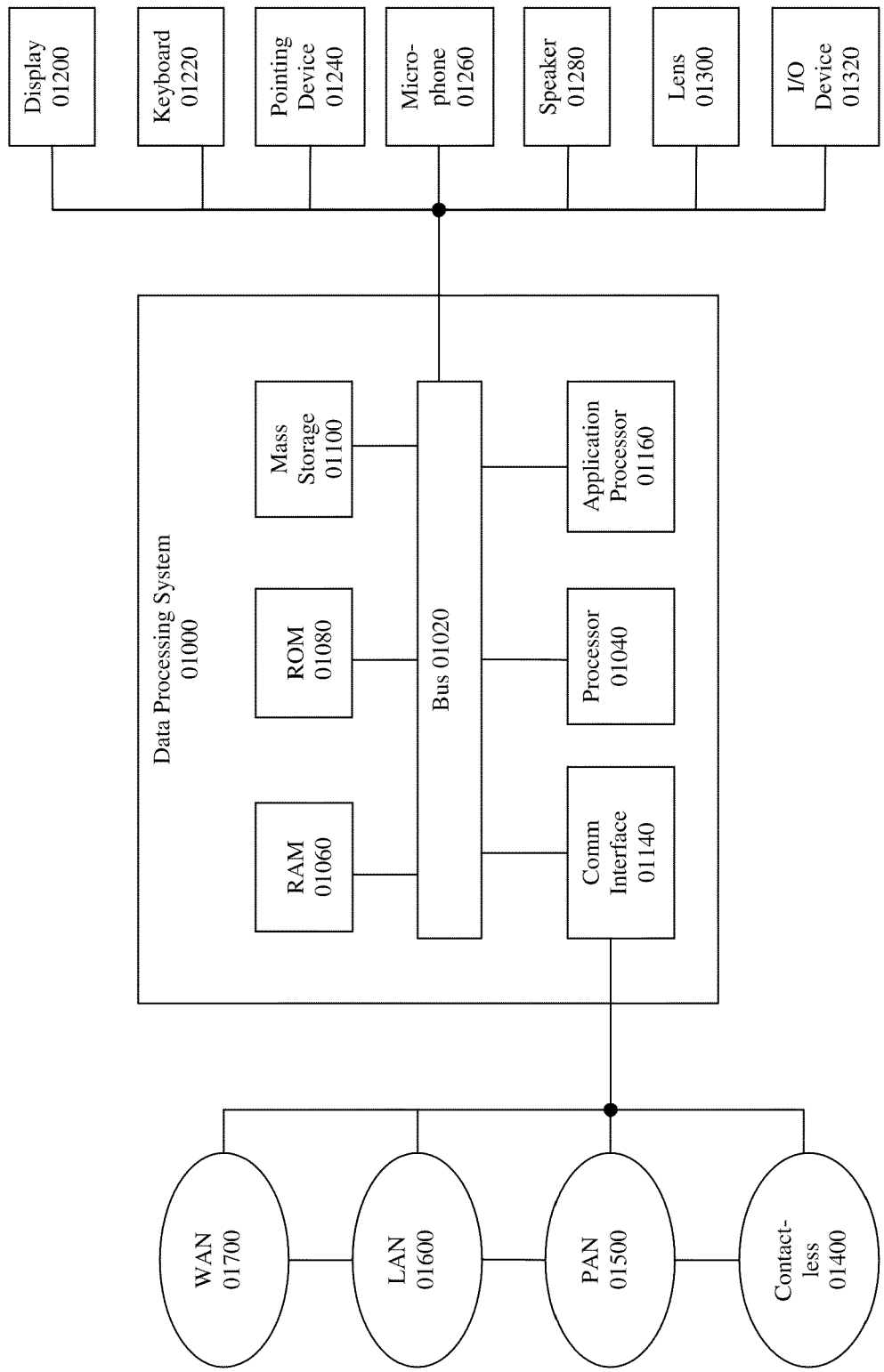
FIG. 1 depicts a block diagram of an exemplary data processing unit that can be used to implement the entities described herein.

FIG. 1 depicts a block diagram of an exemplary Data Processing System 01000 that can be used to implement the entities described herein. Any number of data processing systems can implement the entities described herein and the configuration actually used depends on the specific implementation.

Data Processing System 01000 can represent any type of device which can process data, including, but not limited to: a personal computer, a set-top box (STB), a portable computer, a hand-held computer, a personal digital assistant, a portable media device, a videogame player, a wireless device, a "smart card," a server, a workstation, and/or a mainframe computer. The type of data processing system used to implement the entities described herein depends on the specific implementation. Any of these devices can communicate with one or more other devices utilizing any protocol over any network, including, but not limited to: HyperText Transport Protocol (HTTP), file transport protocol (FTP), simple mail transport protocol (SMTP), post office protocol (POP), and/or Internet mail access protocol (IMAP) over a network, e.g., the Internet 02150.

Data Processing System 01000 can comprise one or more components, including, but not limited to: any communications medium, wired and/or wireless (e.g., a Bus 01020), or any other means of transmitting and/or receiving data among components; a general- or special-purpose Processor 01040 or any other means of processing data; a random access memory (RAM) Device 01060 coupled to Bus 01020 capable of storing data and/or instructions executed by Processor 01040, temporary variables, and/or other intermediate data during the execution of instructions by Processor 01040; a read-only memory (ROM) Device 01080 coupled to Bus 01020 capable of storing data and/or instructions executed by Processor 01040; a Mass Storage Device 01100 (which can be a non-removable device, e.g., a hard disk drive, or a removable device, e.g., a floppy disk drive, a compact disc drive, a tape drive, a magneto-optical disc drive, or a chip, e.g., a chip as part of a subscriber identity module (SIM) card) coupled to Bus 01020 or Data Processing System 01000 capable of storing data and/or instructions executed by Processor 01040; a Display Device 01200 (which can detect one or more finger contacts, determine a command, and process the command) coupled to Bus 01020 or Data Processing System 01000 capable of displaying data to an user; a Keyboard or Keypad Device 01220 coupled to Bus 01020 or Data Processing System 01000 capable of communicating data and/or enabling command selection to Processor 01040; a Pointing Device 01240 coupled to Bus 01020 or Data Processing System 01000 capable of communicating data and/or direction information and/or enabling command selection to Processor 01040; a Microphone 01260 coupled to Bus 01020 or Data Processing System 01000 capable of communicating data and/or direction information and/or enabling command selection to Processor 01040; a Speaker 01280 coupled to Bus 01020 or Data Processing System 01000 capable of receiving data from Processor 01040 and/or transmitting audio signals; a Lens 01300 coupled to Bus 01020 or Data Processing System 01000 capable of transmitting data and/or direction information and/or enabling command selection to Processor 01040; an I/O Device 01320 (which can enable any other type of input and/or output) coupled to Bus 01020 or Data Processing System 01000 capable of communicating data and/or direction information and/or enabling command selection to Processor 01040; and/or a Communications Interface 01140 coupled to Bus 01020 or Data Processing System 01000 capable of transmitting data to and/or receiving data from other Data Processing Systems through any type of network, including, but not limited to, contactless network (01400), a personal area network (PAN) 01500, a local area network (LAN) 01600, a metropolitan area network (MAN) (not pictured), and/or a wide area network (WAN) 01700, e.g., the Internet 02150. Processor 01040 can reside at a single physical location or be distributed across a multiple physical locations, e.g., on one client and one server. The following components can include any device coupled to Bus 01020 capable of storing data and/or instructions executed by Processor 01040, including, but not limited to: RAM Device 01060, ROM Device 01080, Mass Storage Device 01100, a data cache, a data object, and/or any other type of short-, medium-, or long-term storage device ("Data Storage Device"). A Data Storage Device can reside at a single physical location or be distributed across multiple physical locations.

Communications Interface 01140 can include a modem, a network interface card, and/or any other device capable of coupling Data Processing System 01000 to any Contactless 01400, PAN 01500, LAN 01600, and/or WAN 01700. Communications Interface 01140 can include an antenna enabling wireless communication utilizing any wireless protocol with Contactless 01400, PAN 01500, LAN 01600 and/or WAN 01700. The present application defines an Antenna to include any of the components necessary to transmit and/or receive an electromagnetic signal, e.g., a radio signal. Such components can include not only a physical material capable of conducting such a signal, but also any component which can perform any function needed to process such signal, including, but not limited to: modulation, demodulation, spreading, despreading, analog-to-digital conversion (ADC), digital-to-analog conversion (DAC), compression, decompression, upconversion, and/or downconversion. Contactless 01400, PAN 01500, LAN 01600 and/or WAN 01700 can enable communication through a wired, wireless, or combination of wired and wireless signals. Keyboard 01220 can include any device enabling an user of Data Processing System 01000 to input any alphanumeric character, including, but not limited to, a Keyboard connected to a personal computer, and/or a Keypad connected to or integrated with a wireless device. An I/O Device is any device attached to and/or integrated with a Data Processing System 01000 which can enable such system to transmit data to and/or receive data from another device.

Data Processing System 01000 can implement any or all of the steps of the methods described herein through programmable logic, hard-wired logic, any combination of programmable and hard-wired logic, or any other type of logic. Control logic or software may be stored in a Data Storage Device and/or computer program products. In one embodiment, Data Processing System 01000 can have one or more Processors 01040 execute one or more instructions stored in RAM 01060. RAM 01060 can retrieve the instructions from any other Computer/Machine Readable/Accessible Medium, e.g., Mass Storage 01100. In another embodiment, Data Processing System 01000 can have one or more Processors 01040 execute one or more instructions that are predefined or hard-wired. In another embodiment, Data Processing System 01000 can have one or more Processors 01040 execute one or more instructions utilizing a combination of programmable and hard-wired logic.

The instructions can include code from any computer-programming language and/or scripts, including, but not limited to: C, C++, Basic, Java, JavaScript, Pascal, Perl, Smalltalk, Structured Query Language (SQL), VBScript, and/or Visual Basic.

In one embodiment, the steps in any of the present methods can be embodied in machine-executable instructions. The methods can process instructions using one or more techniques, including, but not limited to: utilizing one or more general- or special-purpose processors programmed with the instructions to execute the steps in any of the present methods, equivalent or related steps, other or additional steps, or any subset thereof; utilizing one or more hardware components that contain hardwired logic to execute the steps in any of the present methods, equivalent or related steps, other or additional steps, or any subset thereof; or utilizing any combination of programmed processors and/or hardware components to execute the steps in any of the present methods, equivalent or related steps, other or additional steps, or any subset thereof. The software can execute on any type of hardware located at or distributed among one or more entities, including, but not limited to: an advertiser, a media buyer, a media operator, a program operator, a media device, a wireless device, a wireline device, a retailer, or any third party.

In general, a "computer program product" comprises any of the functions enabling the execution of the methods described herein. When loaded in a Data Processing System 01000, in general, or a Computer/Machine Readable/Accessible Medium, in particular, a computer program product can execute the functions described herein and cause a computer, general- or special-purpose processor, and/or other hardware to execute any of the steps described herein.

The computer- or machine-readable or -accessible medium can include, but is not limited to: floppy disks, magnetic disks, optical disks, magneto-optical disks, CD-ROMs, ROM, RAM, programmable read-only memory (PROM), erasable programmable read-only memory (EPROM), electrically erasable programmable read-only memory (EEPROM), magnetic or optical cards, or any other type of media or computer- or machine-readable or -accessible media capable of storing instructions ("Computer/Machine Readable/Accessible Medium").

The functionality described herein can be distributed and/or downloaded as a computer program product. Methods described herein can be distributed from a remote computer, e.g., a server, to another computer, e.g., a client, through any wired and/or wireless channel over a network, e.g., the Internet 02150.

2. System Architecture

Figure 2A:
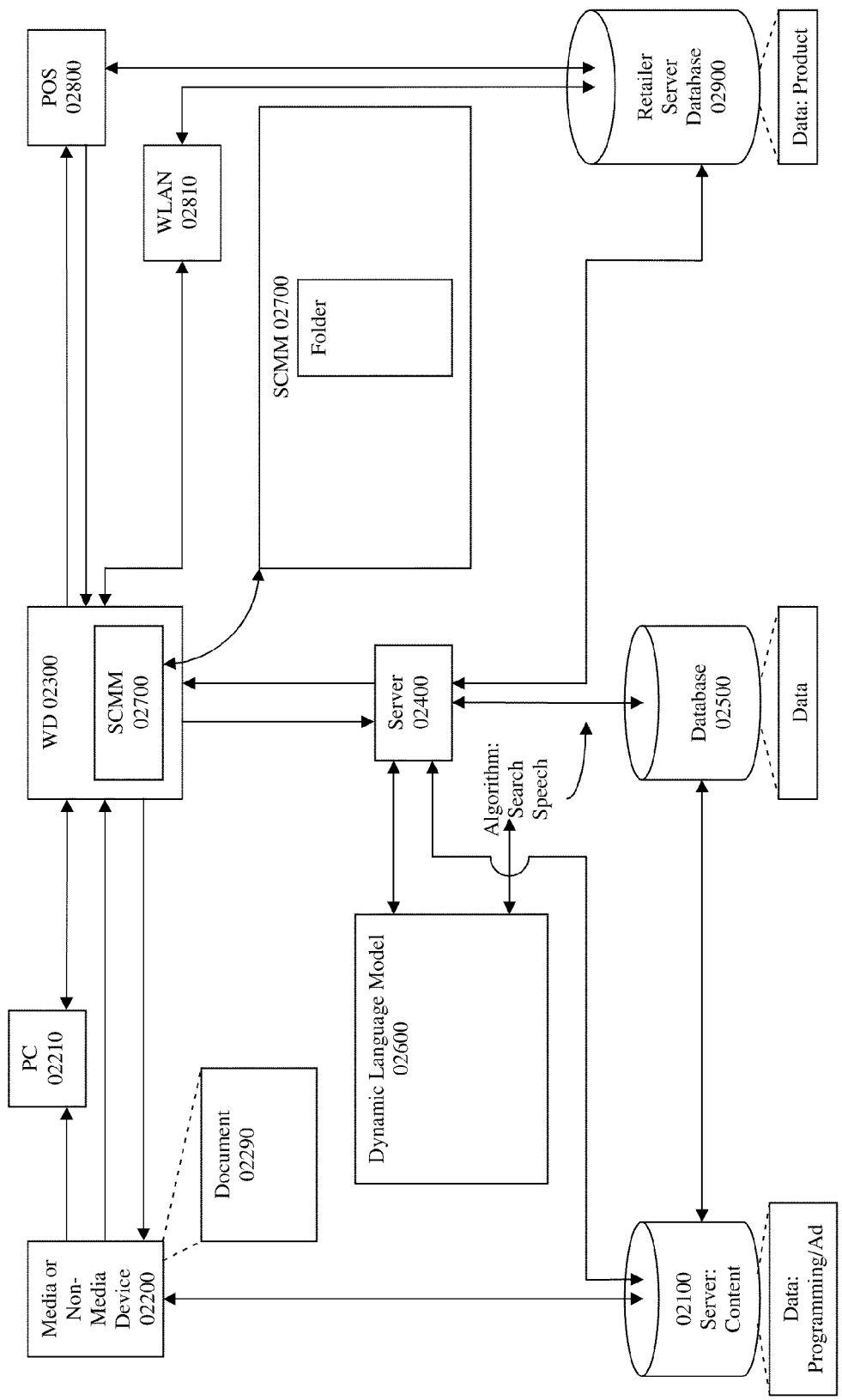
FIG. 2A depicts a high-level block diagram of an exemplary system enabling any device, e.g., a wireless device and/or a wireline device, to exchange with one or more other devices any data related to content displayed on another media device, according to some embodiments.
Figure 3:
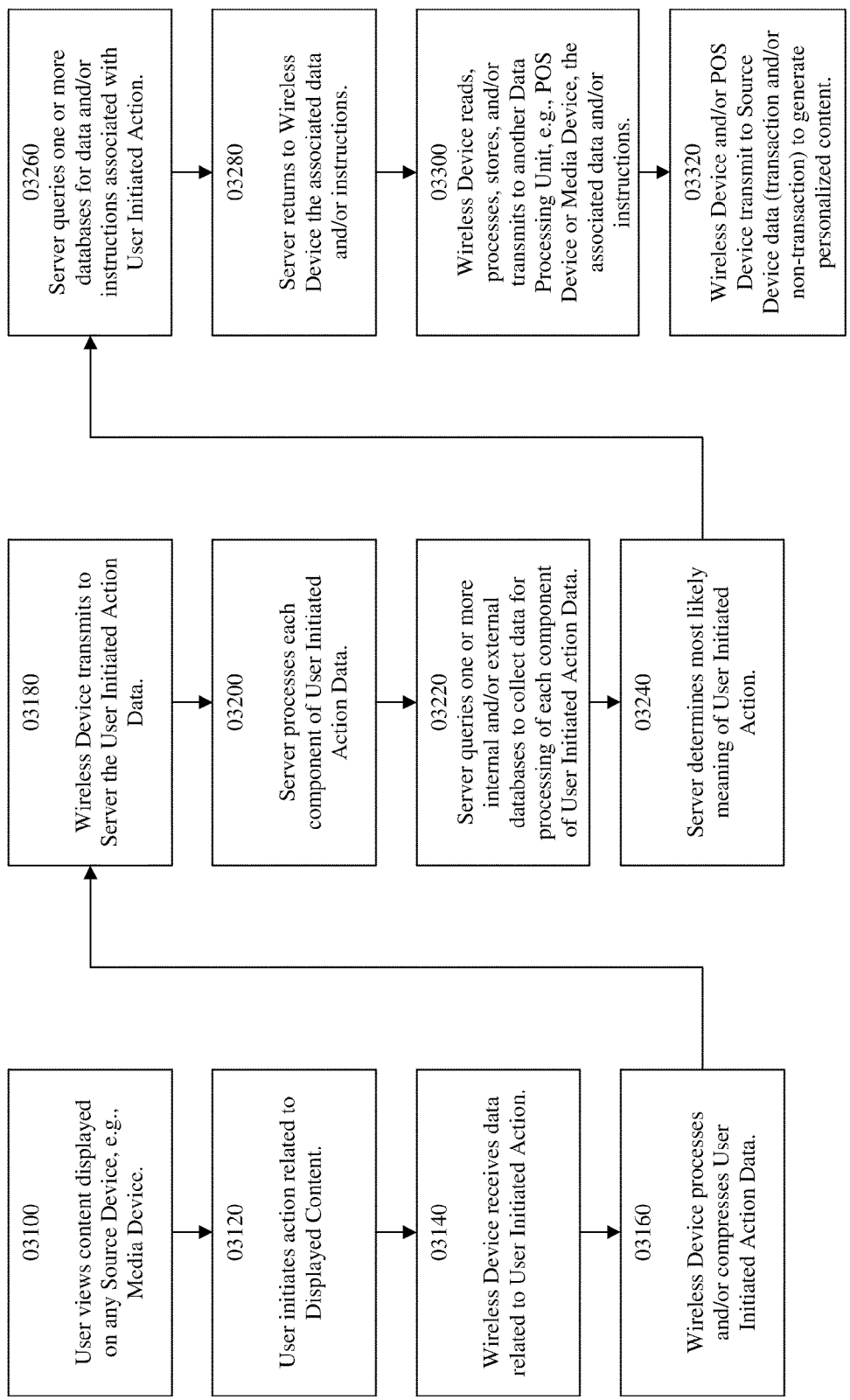
FIG. 3 depicts a flowchart of an exemplary method enabling the identification and processing of a request by an user of a first device related to content displayed on one or more other devices, according to some embodiments.
Figure 4A:
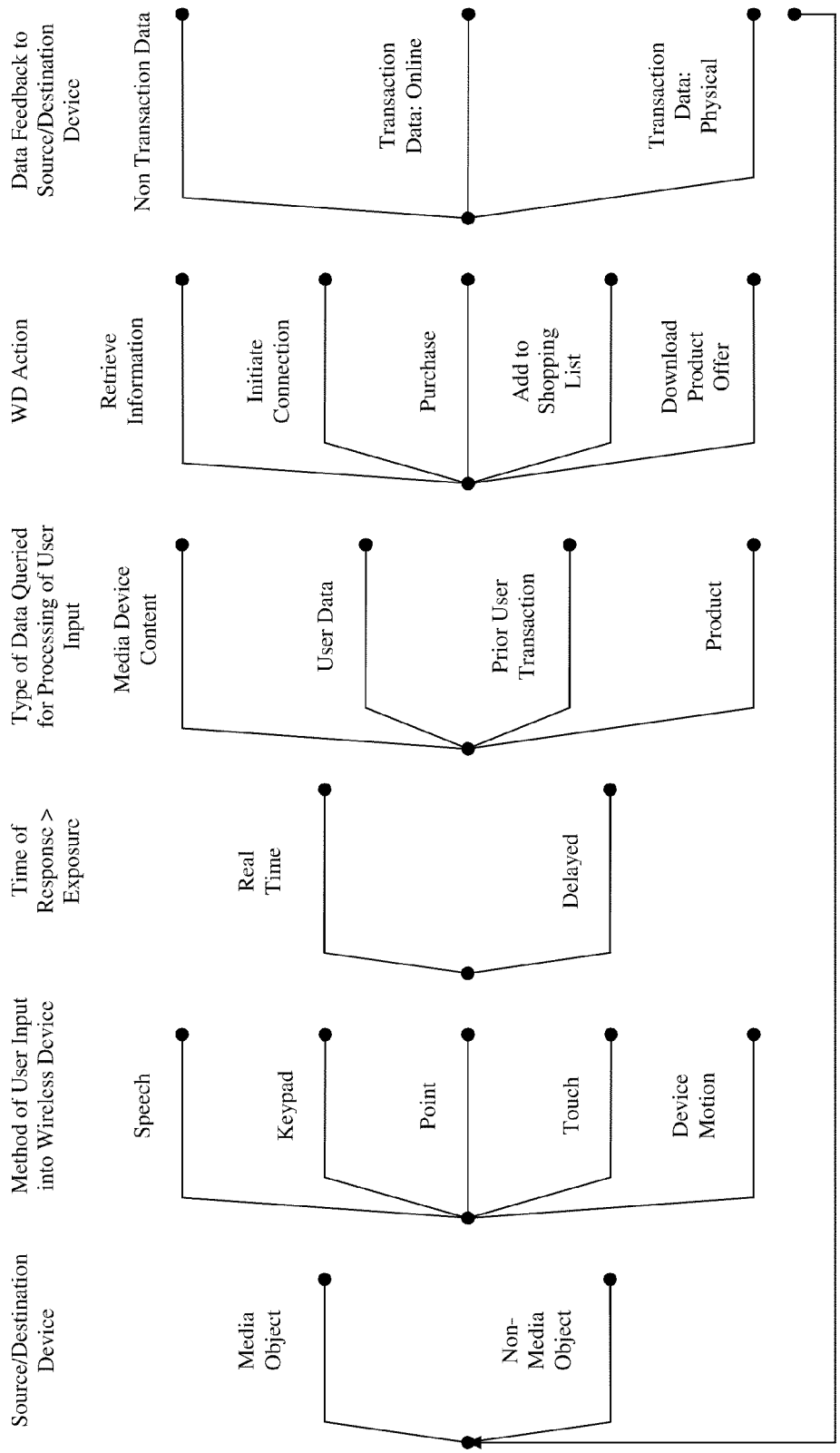
FIG. 4A depicts a series of possible inputs, actions, conditions, and outputs at each step enabling the identification and processing of a request by an user of a first device related to content displayed on one or more other devices, according to some embodiments.

FIG. 2A depicts a high-level block diagram of an exemplary system enabling any media device, e.g., a wireless device and/or a wireline device, to exchange with one or more other devices any data related to content displayed on another media device, according to some embodiments. The present system can implement the entities described herein by utilizing a subset of the following components, or additional, related, alternative, and/or equivalent components. The present system can include, but is not limited to, the following components.

Content Server 02100 is a Data Processing System which can transmit and/or receive Content to and/or from other devices. Content Server 02100 can include, but is not limited to: a Data Processing System which can produce, store, process, transmit, and/or receive content displayed on a television; a Data Processing System which can produce, store, process, transmit, and/or receive content displayed on a computer; and/or any other Data Processing System which can produce, store, process, transmit, and/or receive content displayed on any other media device.

Content Server 02100 can include a variety of components enabling the exchange of data with any other Data Processing System, including, but not limited to: a web server which can exchange data with any Media Device, Wireless Device 02300, and/or Wireline Device 02302; and/or a Call Center which can communicate with one or more users of a Wireless Device 02300 and/or a Wireline Device 02302 through a voice and/or data communication.

Content is any data and/or instructions, including, but not limited to: Programming; data describing the Programming and/or any qualities associated with the Programming, e.g., its location and/or time of display ("Programming Metadata File"); instructions related to Programming; Advertisement; data describing the Advertisement and/or any qualities associated with the Advertisement, e.g., its location and/or time of display, ("Ad Metadata File"); and/or instructions related to Advertisement.

A Promoted Object is any product, brand, person, company, retailer, industry, product category, or anything else promoted in an Advertisement. For example, Content Server 02100 can transmit to Television 02220 an Advertisement, for which an Ad Metadata File can contain data including, but not limited to: data describing the content of the Advertisement; the Programming during which the Advertisement will be transmitted; and/or the date and time the Advertisement will be transmitted. In another example, Content Server 02100 can transmit to an out-of-home (OOH) Device, e.g., a billboard, an Advertisement, whose Ad Metadata File can contain data including, but not limited to: data describing the content of the Advertisement; the location, e.g., the address, of the specific billboard; and/or the date and time the Advertisement will be displayed on the specific billboard. OOH Device (not illustrated) can include, but is not limited to: a billboard, a poster, and/or a media device capable of receiving Programming and/or Advertisements outside of a home, e.g., an elevator or outdoors.

Programming is any signal transmitted in any form which can include information in one or more forms, including, but not limited to, audio, image, video, text, and/or any combination thereof, and which does not promote one or more products, brands, companies, industries, and/or product category.

Advertisement is any signal transmitted in any form which can include information in one or more forms, including, but not limited to: audio, image, video, text, and/or any combination thereof, and which can promote one or more products, brands, companies, industries, and/or product category.

Internet 02150 is an exemplary WAN which can utilize any protocol, e.g., IP.

Media Device 02200 is any Data Processing System which can receive, store, process, transmit, and/or display Content. Media Device 02200 can include, but is not limited to, the following Data Processing Systems:

Personal Computer 02210 is a Data Processing System which can store and/or process data and transmit and/or receive data to and/or from other devices wirelessly and/or through a wireline.

Personal Computer 02210 can include a Microphone 01260 capable of receiving audio signals, including speech uttered by an user of Personal Computer 02210 and/or an user of any other Media Device 02200, Wireless Device 02300, and/or Wireline Device 02302.

Television 02220 is a Data Processing System which can transmit and/or receive data to and/or from other devices and can comprise a variety of components, including, but not limited to: a set-top box (STB); a digital video disc (DVD) player; a digital video recorder (DVR); and/or a display, e.g., a television screen. Television 02220 can perform a variety of functions, including, but not limited to: displaying Programming and/or an Advertisement; and/or transmitting and/or receiving data to and/or from another device, including a headend in the case of a cable television operator; a satellite in the case of a direct broadcast satellite television operator; an antenna in the case of a terrestrial television broadcaster; and/or a server in the case of an Internet television operator.

Television 02220 can include a Microphone 01260 capable of receiving audio signals, including speech uttered by a viewer of Television 02220 and/or an user of any other Media Device 02200, Wireless Device 02300, and/or Wireline Device 02302.

While the present application discloses systems and methods exchanging data between a Wireless Device 02300 or Wireline Device 02302 and Server 02400 through a network, e.g., the Internet, they are not limited to those embodiments. In any system, method, apparatus, and/or computer program product, a viewer of a Television 02220 or any other Media Device can speak one or more words, whose audio signal is received by Microphone 01260 and where data is exchanged between the Television 02220 and Server 02400 through any network.

While the present application discloses systems and methods utilizing a Television 02220 and/or Programming and/or Advertisements displayed on a Television 02220, they are not limited to those embodiments. Any system, method, apparatus, and/or computer program product can utilize any Media Device. For example, a game show, any other Programming, or an Advertisement can be displayed on a radio, Personal Computer 02210, Wireless Device 02300, or any other Media Device.

Wireless Device 02300 is a Data Processing System which can transmit and/or receive voice and/or data wirelessly to and/or from other devices and which an user can take with him or her when the user changes geographical location. Exemplary Wireless Devices 02300 include, but are not limited to: a wireless phone, a portable computer, a personal digital assistant, an email device, a camera, a portable game player, a watch, a pager, or any device that combines one or more of these functions. Wireless Device 02300 can include one or more I/O Devices attached to or integrated with it that are capable of transmitting and/or receiving data. Wireless Device 02300 can exchange data wirelessly with any other device through any type of network, including, but not limited to: a wireless PAN; a wireless LAN, a wireless MAN, and/or a wireless WAN. Wireless Device 02300 can exchange data wirelessly with any other device utilizing any protocol, including, but not limited to: 802.11; 802.15.3a or ultra wideband (UWB); 802.16; high performance radio metropolitan area network (HIPERMAN); wireless broadband (WiBro); 802.20; advance mobile phone system (AMPS); Bluetooth; short-range contactless standard; code division multiple access (CDMA); CDMA2000; any extensions of CDMA2000; wideband CDMA (WCDMA); any extensions of WCDMA; digital video broadcasting-handheld (DVB-H); enhanced data rates for global evolution (EDGE); general packet radio service (GRPS); global system for mobile communications (GSM); high speed downlink packet access (HS-DPA); HomeRF; infrared data association (IrDA); satellite digital multimedia broadcasting (S-DMB); terrestrial digital multimedia broadcasting (T-DMB); terrestrial integrated services digital broadcasting (ISDB-T); time division multiple access (TDMA); wireless IEEE 1394; wireless USB; and/or any equivalent or successor standards.

Wireless Device 02300 can include any device which the user can attach to another device which may or may not have one or more of the functions of a Data Processing System. For example, Wireless Device 02300 can include one or more components enabling the exchange of data wireless with any other device and which can be attached to another device without the capability of exchanging data. In the present example, an user can connect a Wireless Device 02300 to a Television 02220, a video game player, a refrigerator, or any other device to enable the device to exchange data wirelessly.

Wireless Device 02300 can exchange data with Server 02400 through any network capable of transmitting and/or receiving any signal over any protocol. The present system can include any data which the methods described herein can utilize to recognize the speech input of the user of Wireless Device 02300. The data can include, but are not limited to: (1) Location Data, which can include any data identifying the geographical location of Wireless Device 02300; and/or (2) Time Stamp Data, which can include any data identifying the date and time of any event executed by Wireless Device 02300 and/or the user of Wireless Device 02300.

While the methods described herein can utilize data generated by and/or collected from a Wireless Device 02300, they are not limited to that embodiment. The methods can utilize data generated by, collected by, and/or received from a Wireline Device 02302.

Wireline Device 02302 is a Data Processing System which can transmit and/or receive voice and/or data through a wireline to and/or from other devices. Exemplary Wireline Devices 02302 include, but are not limited to: a wireline phone, a cordless phone, or any other device which includes at least a microphone and a speaker. Wireline Device 02302 can exchange data with any other device through any type of network, including, but not limited to: a LAN, a WAN, e.g., a public switched telephone network, integrated services digital network, or Internet 02150.

Server 02400 is a Data Processing System which can perform a variety of functions, including, but not limited to: (1) receiving from Content Server 02100 any Ad Metadata File, Programming Metadata File, and/or any other data enabling Server 02400 to identify Programming and/or an Advertisement of interest to a Wireless Device 02300 user and/or a Wireline Device 02302 user; (2) storing any Ad Metadata File and/or Programming Metadata File in one or more databases; (3) updating any Ad Metadata File and/or Programming Metadata File to reflect in real-time the description, availability, price, or any other data related to any product identified in an Ad Metadata File and/or Programming Metadata File; (4) receiving from one or more Wireless Devices 02300 and/or Wireline Devices 02302 a request for data and/or instructions from one or more Ad Metadata Files and/or Programming Metadata Files; (5) processing the request for data and/or instructions from one or more Ad Metadata Files and/or Programming Metadata Files; (6) transmitting to one or more Wireless Devices 02300 and/or Wireline Devices 02302 data and/or instructions from one or more Ad Metadata Files and/or Programming Metadata Files; (7) receiving from one or more Wireless Devices 02300 and/or Wireline Devices 02302 a record of the action taken by the Wireless Device 02300 and/or Wireline Device 02302 in response to the reception of data in the Ad Metadata File and/or Programming Metadata File ("Wireless Device User Response" or "Wireline Device User Response," respectively); (8) storing data about Wireless Device User Response and/or Wireline Device User Response in a database; (9) analyzing the click-through rate (CTR) to enable Content Server 02100 to compare the CTR across different media; and/or (10) transmitting reports analyzing the effectiveness of any given advertising channel.

Utilizing any method, Server 02400 can act as a proxy server capable of performing as an intermediary between a client, e.g., a Wireless Device 02300, and another server ("Destination Server"), which can include, but is not limited to: Content Server 02100; and/or any third-party server. One or more Wireless Devices 02300 can establish connections to Server 02400, which can transmit to the Wireless Devices 02300 any data received from the Destination Server and/or data stored locally at Server 02400. Server 02400 can transmit to one of more Destination Servers any data received from one or more Wireless Devices 02300 and/or data stored locally at Server 02400.

Utilizing any method, Server 02400 can convert data: (1) received from one or more Wireless Devices 02300 in any messaging format or protocol, e.g., short messaging service (SMS), into data in another format or protocol, e.g., TCP/IP, which can be processed by one or more Destination Servers, e.g., a web server; and/or (2) received from one or more Destination Servers, e.g., a web server in any format or protocol, e.g., TCP/IP, into another format or protocol, e.g., SMS, which can be processed by one or more Wireless Devices 02300.

Server 02400 can be operated by any single party or plurality of parties, including, but not limited to: one or more advertisers; one or more media buyers; one or more programmers; and/or one or more third parties. The functions of Server 02400 can be executed on one Data Processing System or distributed across a plurality of Data Processing Systems.

Database 02500 is one or more data structures enabling the storage of data.

Dynamic Language Model 02600 is a method of determining a probability of the occurrence of any given word sequence, where the probability can vary depending on the values of one or more independent variables.

Smart Card Memory Module (SCMM) 02700 is memory which can store and retrieve data in a portable manner. While the methods described herein teach how one or more applications can exchange data with a SCMM 02700, they are not limited to that embodiment. The methods described herein can enable one or more applications to exchange data with any type of memory the type of data which can be stored in a SCMM 02700.

Point-of-Sale Device 02800 is a Data Processing System which can perform a variety of functions, including, but not limited to: (1) exchanging data with one or more retailer server databases; (2) receiving from a Wireless Device 02300 any data related to a product, Purchase Incentive, and/or transaction; and/or (3) transmitting to a Wireless Device 02300 any data related to a product, a Purchase Incentive, and/or transaction.

WLAN Device 02810 is a Data Processing System located at a retailer which can perform a variety of functions, including, but not limited to: (1) exchanging data with one or more retailer server databases; (2) receiving from a Wireless Device 02300 any data related to a product, Purchase Incentive, and/or transaction; and/or (3) transmitting to a Wireless Device 02300 any data related to a product, a Purchase Incentive, and/or transaction.

Retailer Server Database 02900 is one or more data structures which can include, but is not limited to, the following data: (1) product; (2) Purchase Incentive; (3) transaction; and/or (4) customer.

FIG. 2B depicts a block diagram of an exemplary system enabling any device, e.g., a wireless device and/or a wireline device, to exchange with one or more other devices any data related to content displayed on another media device, according to some embodiments. The present system can implement the entities described herein by utilizing a subset of the following components, or additional, related, alternative, and/or equivalent components. The present system can include, but is not limited to, the following components not disclosed earlier.

Document 02290 is any set of data which can be displayed on a Media Device 02200. The set of data can include, but is not limited to: (1) a web page; (2) a file; and/or (3) Content.

Media/Advertising Database 02502 is one or more data structures which can include, but is not limited to, the following data: (1) any data related to Programming displayed on a Media Device 02200 in the vicinity of an user of a Wireless Device 02300 and/or Wireline Device 02302; and/or (2) any data related to Advertisement displayed on a Media Device 02200 in the vicinity of an user of a Wireless Device 02300.

Wireless Device Prior Transaction Database 02504 is one or more data structures which can include, but is not limited to, the following: any data related to purchases of one or more products by the user of a Wireless Device 02300 and/or Wireline Device 02302. The data structure can include data related to purchases paid through any type of payment, including, but not limited to: credit card, debit card, check, and/or loan.

Wireless Device User Database 02506 is one or more data structures which can include, but is not limited to, the following: any data related to the user of a Wireless Device 02300 and/or Wireline Device 02302. The data structure can include data related to a variety of factors related to the user, including, but not limited to: demographic, interests, and activities.

Population User Database 02508 is one or more data structures which can include, but is not limited to, the following: any data related to a group of users comparable to the user of a Wireless Device 02300 and/or Wireline Device 02302. The data structure can include the type of data stored in Databases 02502, 02504, 02506, 02508, and/or 02510.

Product/Brand/Vendor/Coupon Database 02510 is one or more data structures which can include, but is not limited to, the following: any data related to a Promoted Object, Purchase Incentive, and/or retailer.

Server 02400 can exchange data with Databases 02502, 02504, 02506, 02508, and 02510 through any network. The databases, e.g., WD Prior Transaction Database 02504 can be operated by any entity, e.g., one or more financial institutions serving as an Issuer 40100.

3.1 Overall Methods

Figure 5:
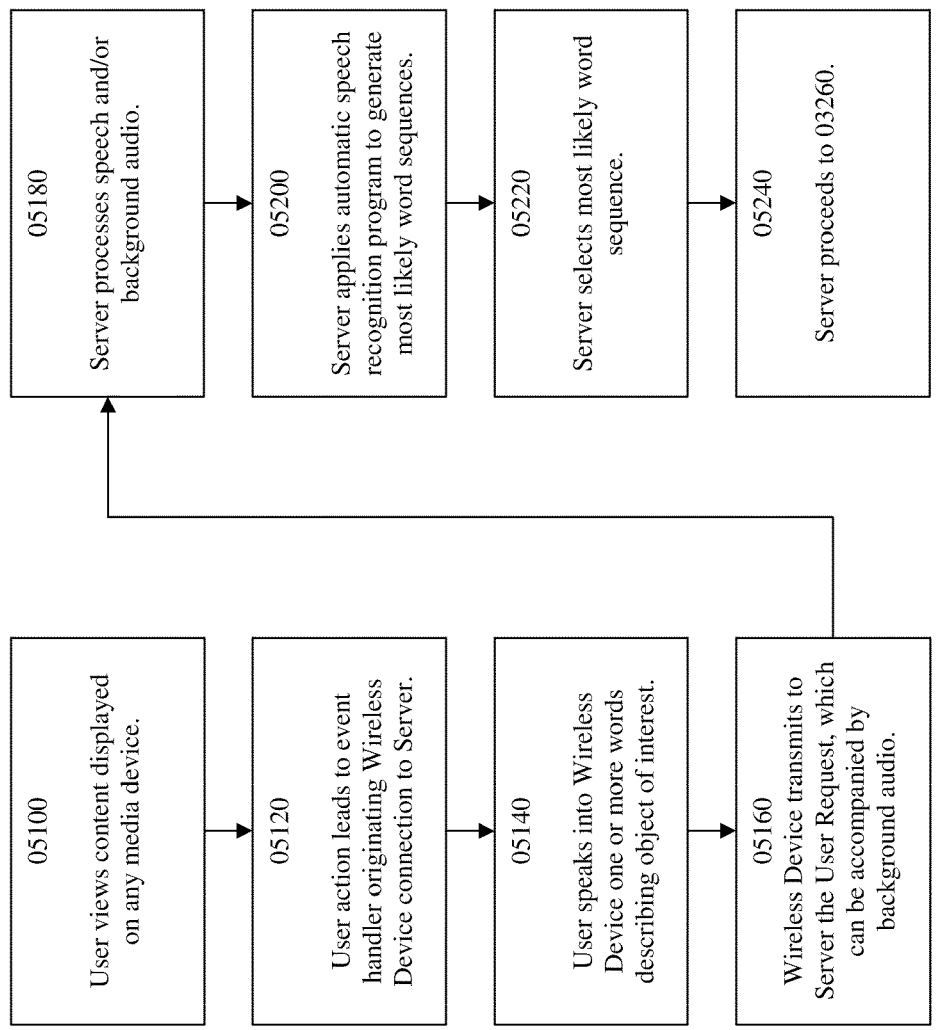
FIG. 5 depicts a flowchart of an exemplary method enabling the recognition of one or more words inputted by an user of a wireless device, according to some embodiments.

FIG. 5 depicts a flowchart of an exemplary Method 05000 enabling the recognition of one or more words inputted by an user of a wireless device, according to some embodiments. The flowchart refers to the system and structures depicted in FIG. 2A and FIG. 2B. However, the method is not limited to those embodiments. The method can implement the steps described herein by utilizing a subset of the components, or additional, related, alternative, and/or equivalent components depicted in FIG. 2A and FIG. 2B. The method can execute a subset of the steps, the steps in different order, and/or other or additional related or equivalent steps.

At 05100, an user of Wireless Device 02300 views Content displayed on any Media Device 02200.

At 05120, an action by the user of Wireless Device 02300, e.g., moving Wireless Device 02300 in one or more predetermined directions, selecting a key in Keypad 01220, contacting an image on a touch screen Display 01200, or speaking into Microphone 01260 a command recognized by an automatic speech recognition module in Wireless Device 02300, can cause an event handler to process a call origination to a predetermined address.

At 05140, user speaks into Microphone 01260 a word sequence describing an object of interest, e.g., a Command and a Promoted Object. A word sequence, $W_{SEQ}$, is any combination of words constituting an User Request. For purposes of the present application, a word sequence can include a single word At 05160, Wireless Device 02300 can transmit to Server 02400 an User Request which can include a word sequence comprising a Promoted Object and can include a Command. Wireless Device 02300 can transmit to Server 02400 background audio as well.

At 05180, Server 02400 can utilizing the methods described herein process the User Request and/or background audio.

At 05200, Server 02400 can apply an automatic speech recognition program to generate the most likely word sequences.

At 05200, Server 02400 can select the most likely word sequence.

At 05240, Server 02400 can proceed to 03260.

3.2 Data Transfer Among a Plurality of Devices

Figure 6A:
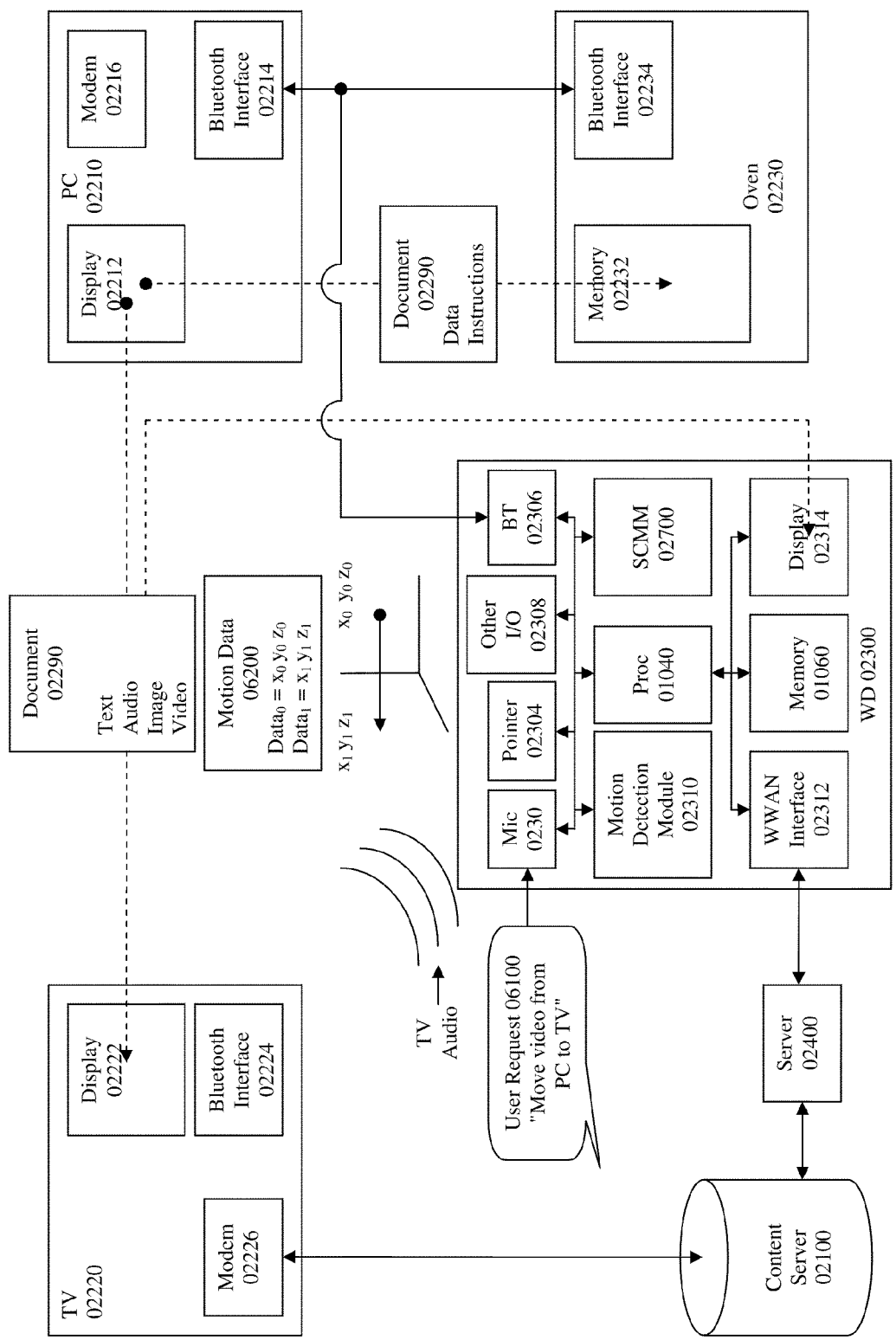
FIG. 6A depicts an exemplary system enabling the transfer of data among a plurality of devices through one or more types of command, according to some embodiments.
Figure 6B:
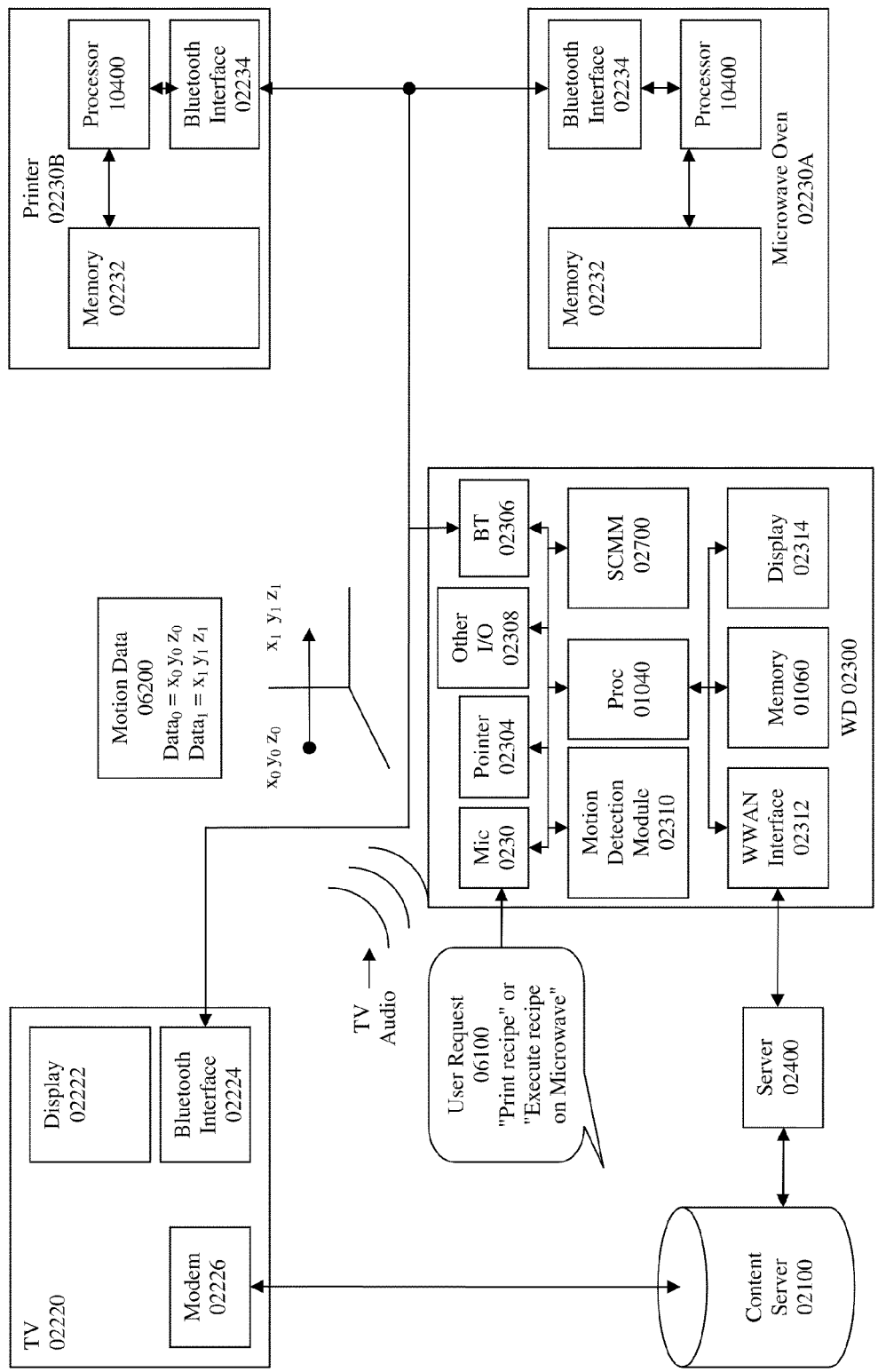
FIG. 6B depicts an exemplary system enabling the output of data and/or execution of instructions on a second device which were displayed on a first device through one or more types of command, according to some embodiments.
Figure 6C:
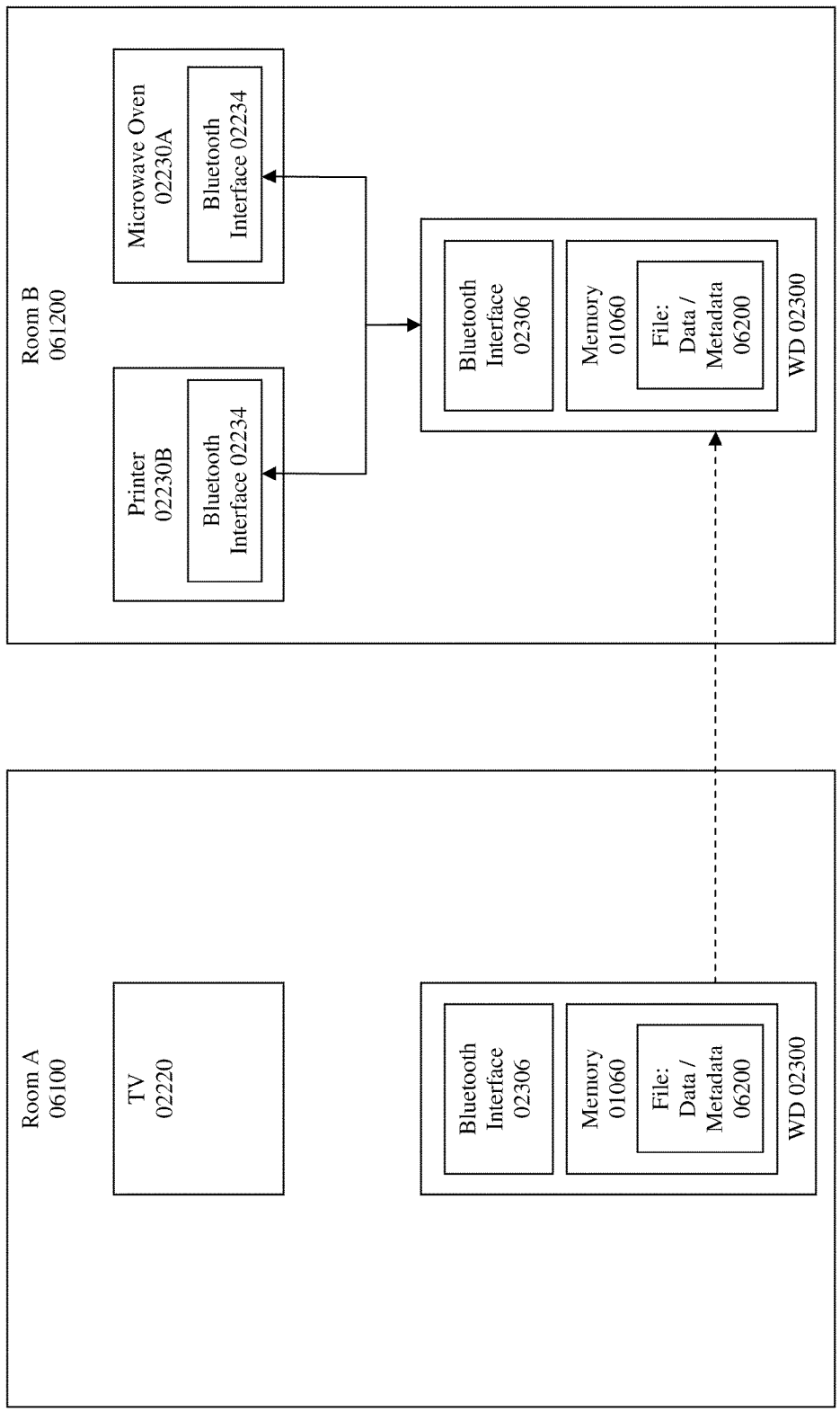
FIG. 6C depicts an exemplary system enabling the output of data and/or execution of instructions on a second device located in a different room than a first device through one or more types of command, according to some embodiments.
Figure 7A:
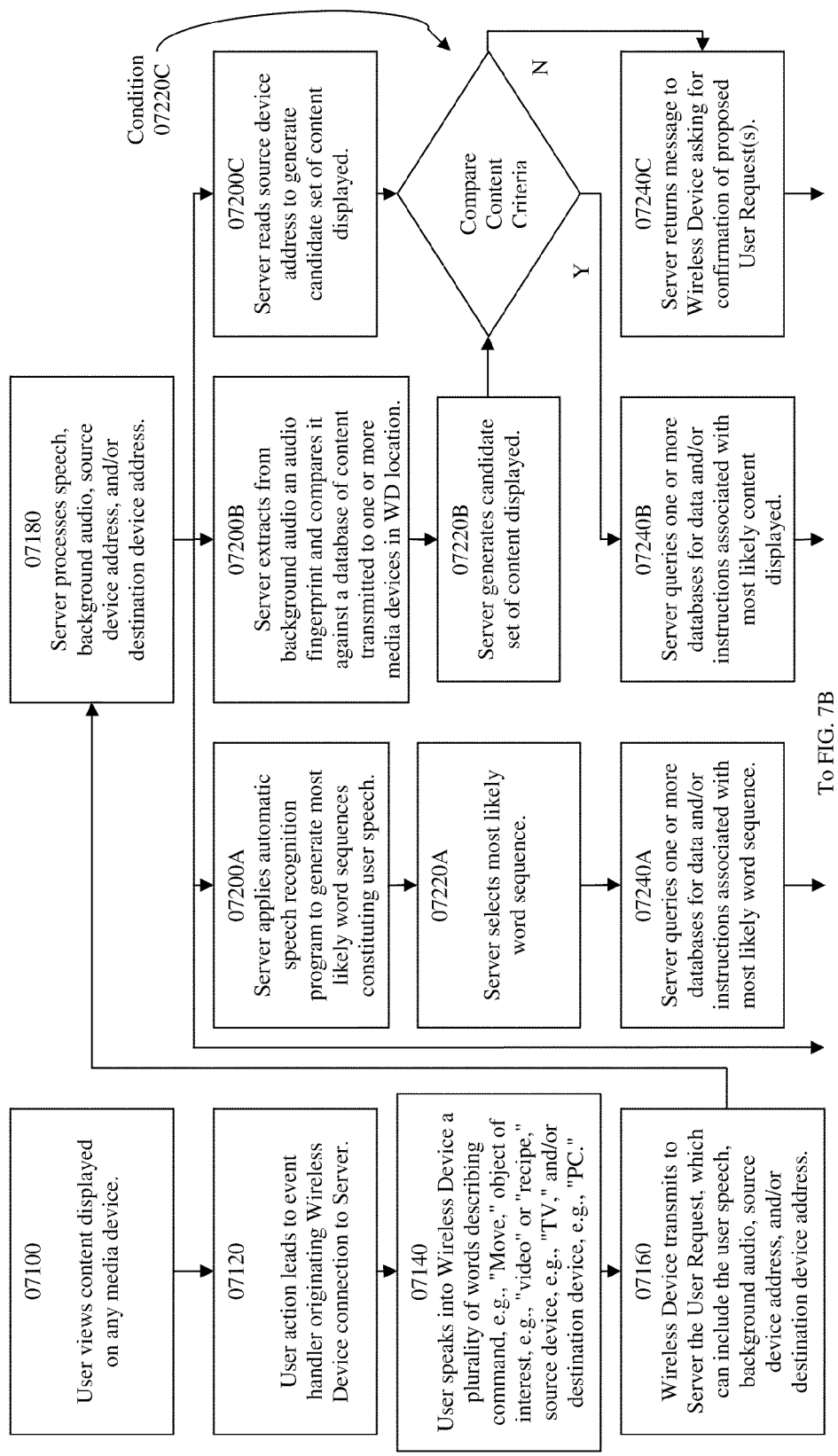
FIGS. 7A and 7B depict a flowchart of an exemplary method enabling the transfer of data among a plurality of devices through a command input by speech, according to some embodiments.
Figure 7B:
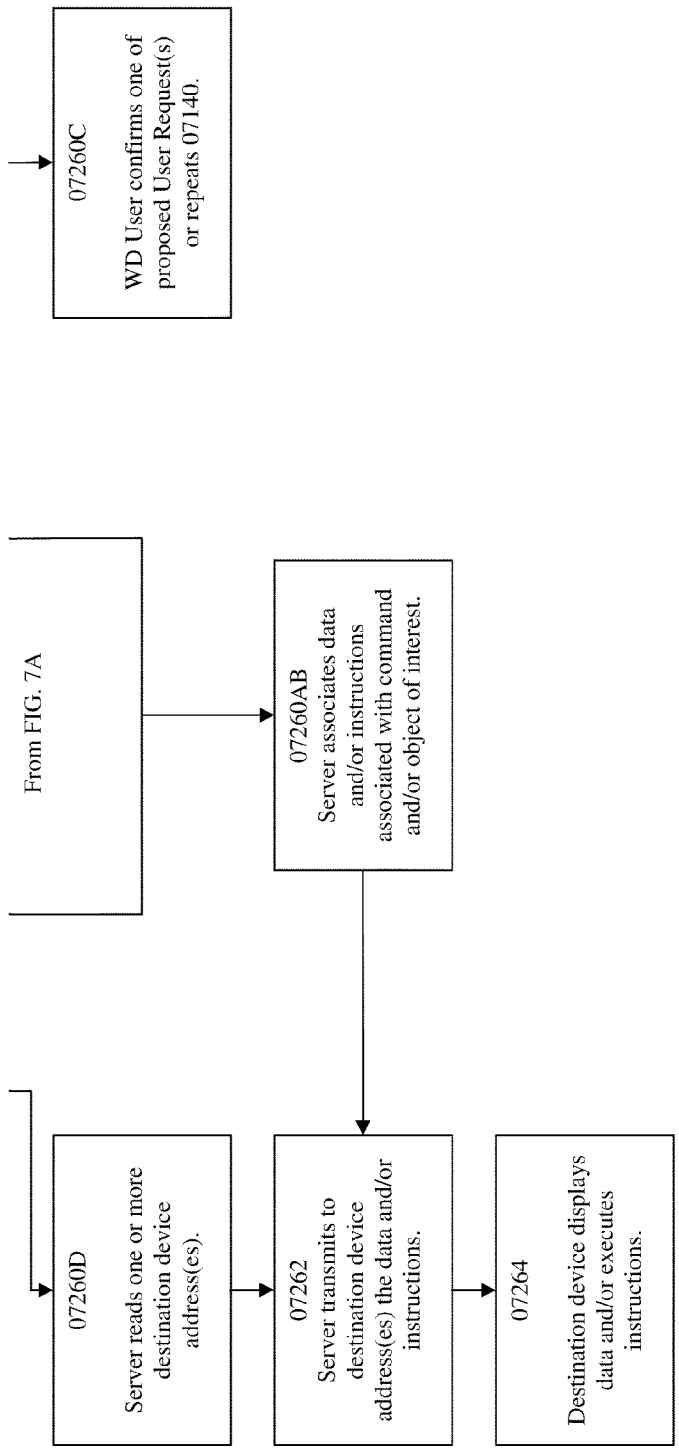

FIG. 6A depicts an exemplary system enabling the transfer of data among a plurality of devices through one or more types of command, according to some embodiments. The present system can implement the entities described herein by utilizing a subset of the following components, or additional, related, alternative, and/or equivalent components. The present system can include, but is not limited to, the following components not disclosed earlier.

Bluetooth Interface 02214, 02224, 02234, and 02306 are a type of Communications Interface 01140 capable of exchanging data through a PAN 01500 utilizing a Bluetooth communications protocol.

Motion Data 06200 is a set of data specifying the magnitude of movement of Wireless Device 02300 along x, y, and z-axes over any time period.

Motion Detection Module 02310 is a component capable of detecting Motion Data 06200. Motion Detection Module 02310 can set one or more thresholds for different magnitudes of movement along different axes over different time periods. Motion Detection Module 02310 can be set to detect motion only upon a specific event, e.g., a selection or continued selection of a key on Keypad 01220 or contact of an image on a touch screen Display 01200.

Figure 9A:
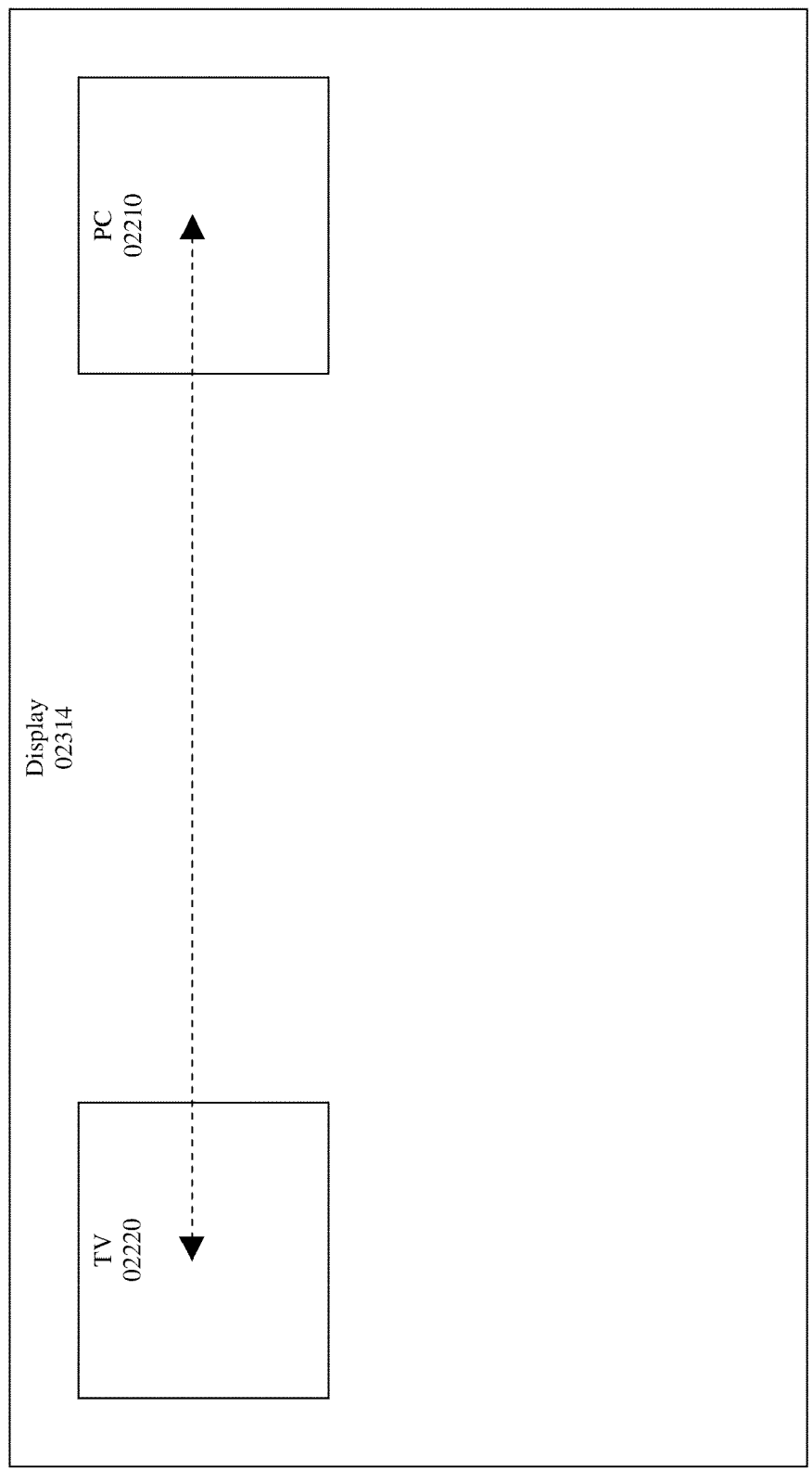
FIG. 9A depicts an exemplary user interface for transferring data between a first device, e.g., a personal computer, and a second device, e.g., a television through a command input to a third device, e.g., a wireless device, by touch, according to some embodiments.
Figure 9B:
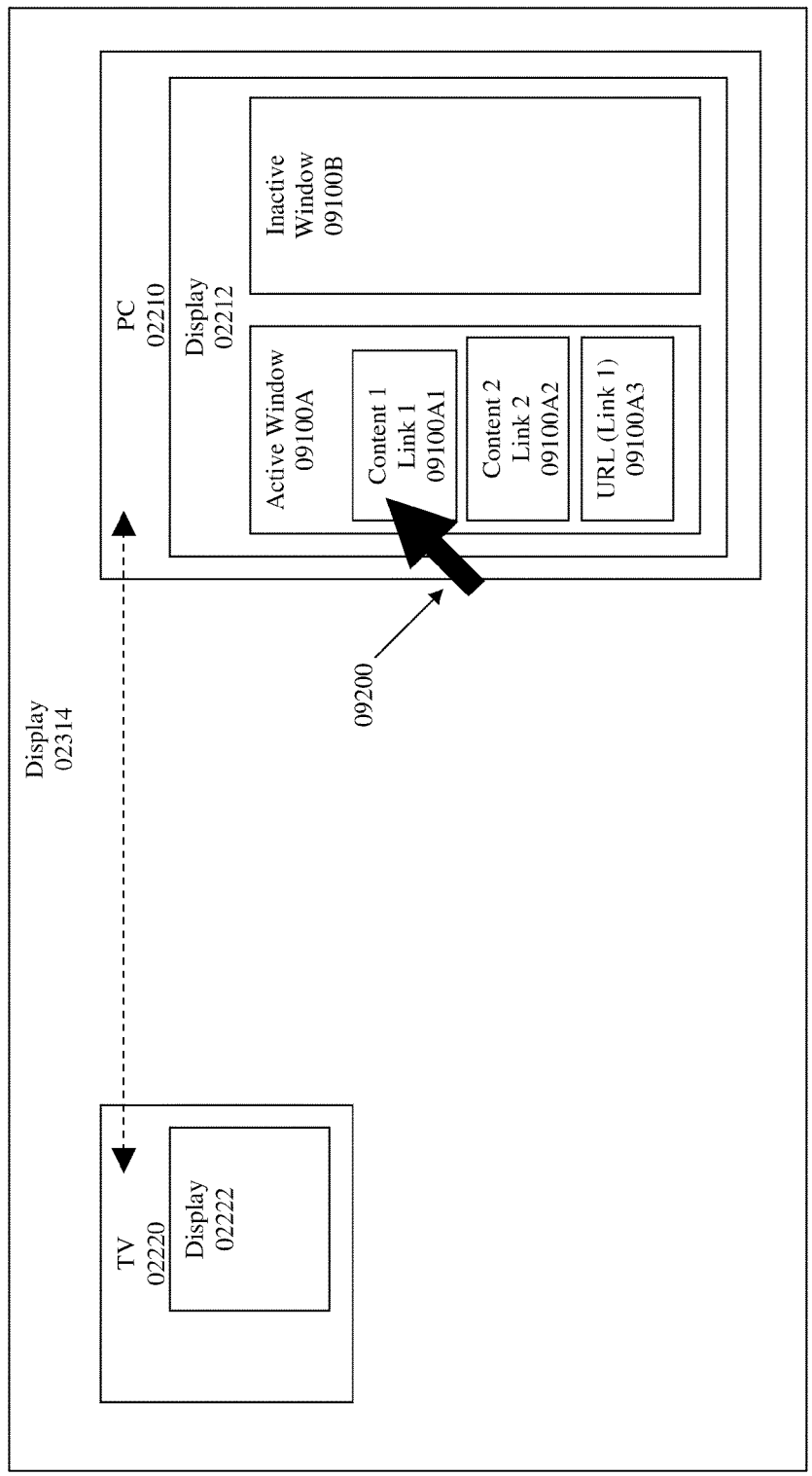
FIG. 9B depicts an exemplary user interface for transferring data specified by a pointer on a first device, e.g., a personal computer, to a second device, e.g., a television through a command input to a third device, e.g., a wireless device, by touch, according to some embodiments.

FIG. 9B depicts an exemplary user interface for transferring data specified by a pointer on a first device, e.g., a personal computer, to a second device, e.g., a television through a command input to a third device, e.g., a wireless device, by touch, according to some embodiments. The present user interface can utilize a subset of the following components, or additional, related, alternative, and/or equivalent components. The present user interface can include, but is not limited to, the following components not disclosed earlier.

Active Window 09100A is an open document capable of being displayed in any Display 01200, e.g., Display 02212. Active Window 09100A is the currently active window or the topmost window in a list of open documents if no others are active. Active Window 09100A is the window in which a signal input to a Data Processing System 01000 can be processed and/or displayed. For example, moving a mouse over a link in an Active Window 09100A can cause the display of the URL associated with the link. Only one window can be active at any given time.

Content Link 1 09100A1 is the Content associated with Link 1.

Content Link 2 09100A2 is the Content associated with Link 2.

URL Link 1 09100A3 is a link similar to Link 14120.

Inactive Window 09100B is an open document which is not the currently active window.

Pointer 09200 is a symbol representing the x-y coordinates of the position of a mouse or other type of I/O Device 01320 within a Display 02212.

Figure 9C:
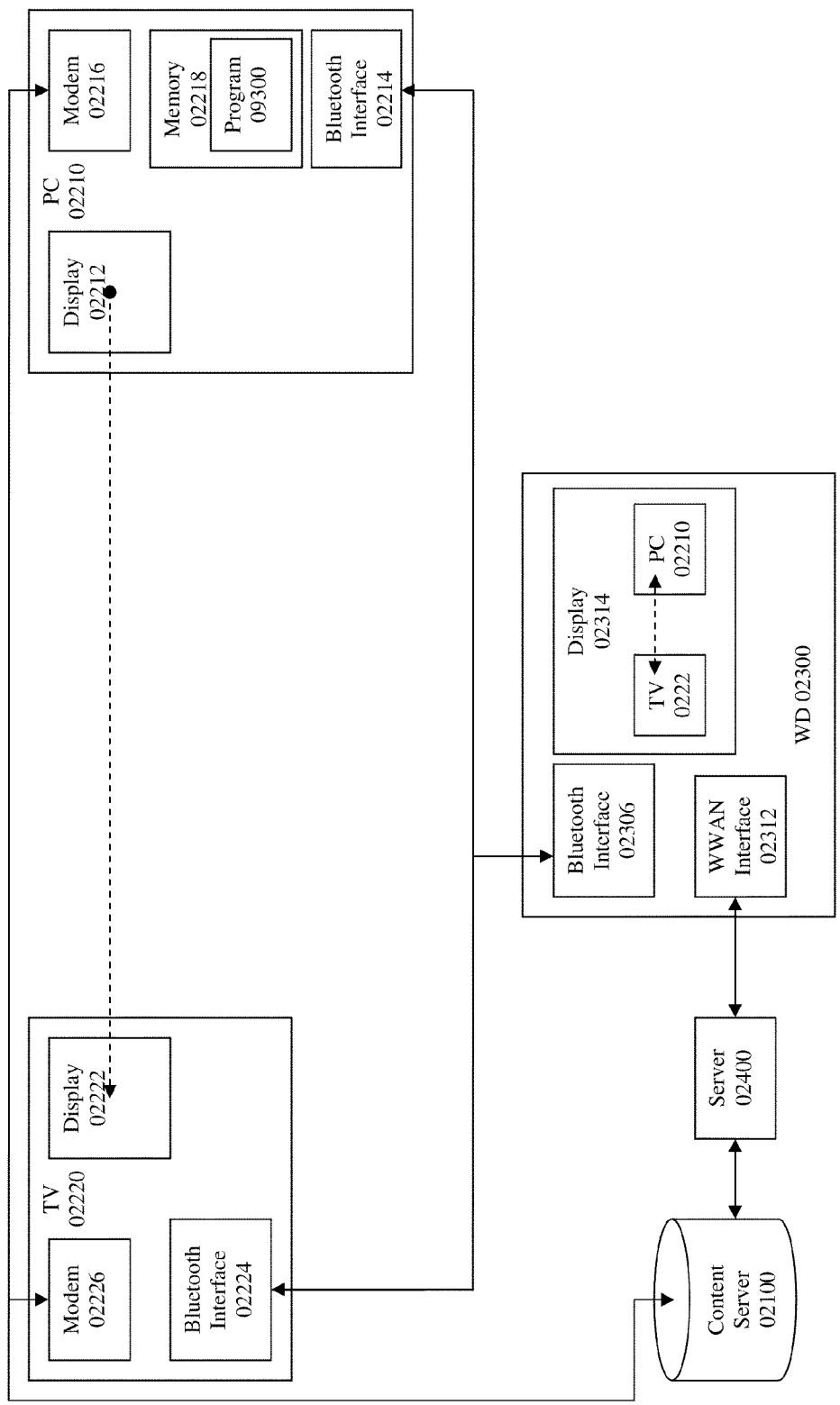
FIG. 9C depicts an exemplary system enabling the transfer of data among a plurality of devices through a command input to a device, e.g., a wireless device, by touch, according to some embodiments.

FIG. 9C depicts an exemplary system enabling the transfer of data among a plurality of devices through a command input to a device, e.g., a wireless device, by touch, according to some embodiments. The present system can implement the entities described herein by utilizing a subset of the illustrated components, or additional, related, alternative, and/or equivalent components.

Figure 9D:
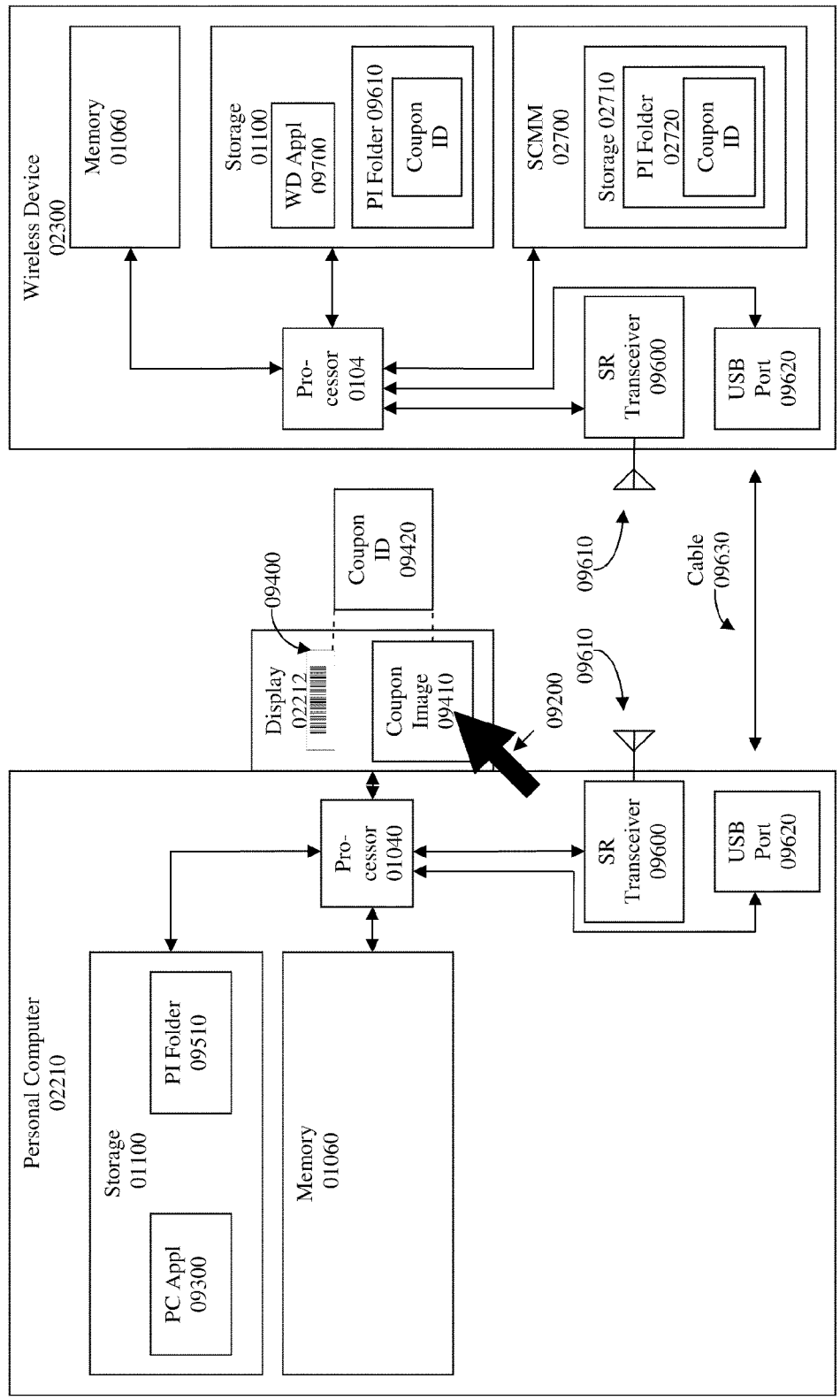
FIG. 9D depicts an exemplary system enabling the transfer of data between a first device, e.g., a personal computer, and a second device, e.g., a wireless device, through one or more commands executed in an active window displayed in the first device, according to some embodiments.

FIG. 9D depicts an exemplary system enabling the transfer of data between a first device, e.g., a personal computer, and a second device, e.g., a wireless device, through one or more commands executed in an active window displayed in the first device, according to some embodiments. The present system can implement the entities described herein by utilizing a subset of the following components, or additional, related, alternative, and/or equivalent components. The present system can include, but is not limited to, the following components not disclosed earlier.

Coupon Image 09410 is any type of file format which can display a Purchase Incentive.

Coupon ID 09420 is any code uniquely identifying a Purchase Incentive. In one embodiment, Coupon ID 09420 can be code in a standard format, e.g., GS1-128, as illustrated in 28300 in FIG. 28. Coupon ID 09420 can be displayed in any form, which can include, but is not limited to: (1) an image of a barcode, e.g., Barcode 09400; (2) an image of a symbol containing data in two dimensions, e.g., a QR Code; (3) a symbol containing data in more than two dimensions; and/or (4) an alphanumeric character string, e.g., a basic UCC Coupon Code, and/or GS1-128.

Barcode 09400 is a machine-readable representation of any data. In one embodiment, Barcode 09400 represents data specifying Coupon ID 09420.

PC Application 09300 is a computer program product stored in Personal Computer 02210 which can perform a variety of functions, including, but not limited to: (1) pairing automatically with one or more devices in the vicinity of Personal Computer 02210 over any communications protocol, e.g., Bluetooth; (2) generating a message querying the address of one or more devices in the vicinity of Personal Computer 02210; (3) receiving the address of the one or more devices; (4) identifying an Active Window 09100A displayed in Display 02212; (5) reading the URL of a hyperlink highlighted or selected by the user of Personal Computer 02210; (6) transmitting the URL to one or more other devices through any I/O Device 01320; and/or (7) receiving the URL of a hyperlink highlighted or selected by the user of another Media Device 02200.

PI Folder 09510 is a data structure which can include any data related to one or more Coupon IDs 09420.

Short-Range Transceiver 09600 is a type of Communications Interface 01140 capable of exchanging data with one or more devices over any short-range network, e.g., Contactless 01400, PAN 01500, and/or LAN 01600.

USB Port 09620 is a type of Communications Interface 01140 capable of exchanging data with one or more devices over any medium, e.g., a cable 09630.

Wireless Device Application 09700 is a computer program product stored in Wireless Device 02300 which can perform a variety of functions, including, but not limited to: (1) pairing automatically with one or more devices in the vicinity of Wireless Device 02300 over any communications protocol, e.g., Bluetooth; (2) generating a message querying the address of one or more devices in the vicinity of Wireless Device 02300; (3) receiving the address of the one or more devices; (4) identifying an Active Window 09100A displayed in Display 02212; (5) reading the URL of a hyperlink highlighted or selected by the user of Wireless Device 02300; (6)

transmitting the URL to one or more other devices through any I/O Device 01320; and/or (7) receiving the URL of a hyperlink highlighted or selected by the user of another Media Device 02200.

Figure 11B:
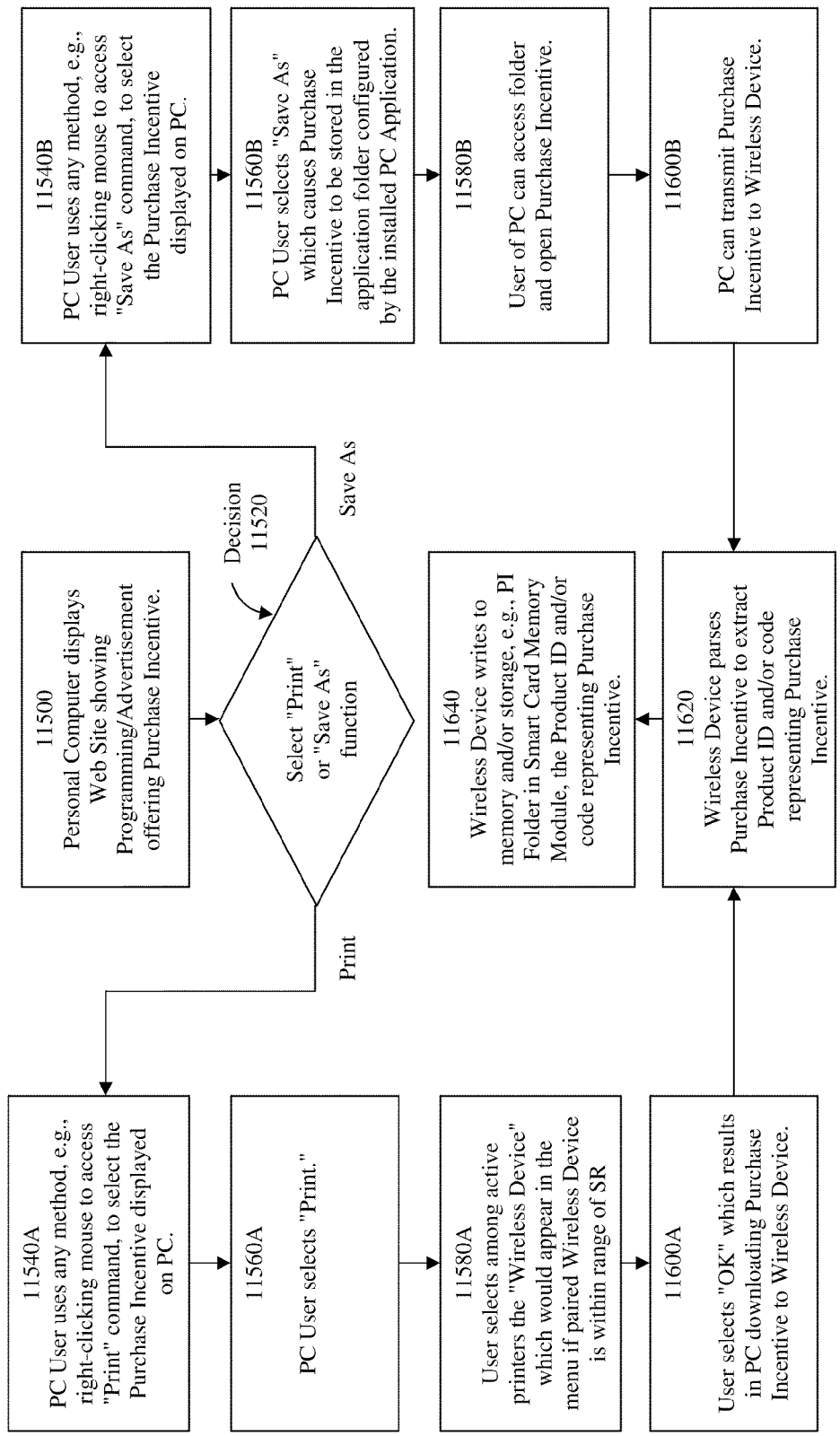

FIGS. 11A and 11B depict a flowchart of an exemplary Method 11000 enabling the transfer of data, e.g., a Purchase Incentive, between a first device, e.g., a personal computer, and a second device, e.g., a wireless device, through selecting one or more commands executed in an active window displayed in the first device, according to some embodiments. The flowchart refers to the systems and structures depicted in FIG. 9. However, the method is not limited to those embodiments. The method can implement the steps described herein utilizing a subset of the components, or additional, related, alternative, and/or equivalent components depicted in FIG. 9. The method can execute a subset of the steps, the steps in different order, and/or other or additional related or equivalent steps.

In the first part of Method 11000, a Personal Computer 02210 and a Wireless Device 02300 can install and configure a computer program product in each of Personal Computer 02210 and Wireless Device 02300.

In the second part of Method 11000, the user of a Personal Computer 02210 can transmit in real-time a Purchase Incentive to Wireless Device 02300 by executing one or more functions, e.g., "Print" or "Save As."

At 11100, the user of Personal Computer 02210 and Wireless Device 02300 can manually or Personal Computer 02210 and Wireless Device 02300 can automatically configure both devices to exchange data automatically utilizing any wired protocol and/or short-range wireless protocol. In one embodiment, the user of Personal Computer 02210 and Wireless Device 02300 can setup the devices to pair automatically with each other utilizing the Bluetooth protocol using any well-known method enabling a Bluetooth device to enter into discoverable mode automatically without user intervention when its paired device list is empty. After setup, the present method can enable a Wireless Device 02300 to exchange data with Personal Computer 02210 when SR Transceiver 09600 in the former device is within range of SR Transceiver 09600 in the latter device.

At 11120, the user of Personal Computer 02210 can download and install PC Application 09500, which can automatically activate the "Add Printer" utility or any equivalent utility.

At 11140, the utility looks for the paired Wireless Device 02300.

At 11160, when the utility detects the paired Wireless Device 02300, the utility can install the printer driver supplied in PC Application 09500 to create a new printer.

At 11180, PC Application 09500 can configure the location, size, and any other parameter of Memory 01060, Storage 01100, or any other device in Personal Computer 02210 capable of storing PI Folder 09510.

At 11200, PC Application 09500 can utilize any wired protocol and/or short-range wireless protocol to transmit to Wireless Device 02300 a WD Application 09700. In one embodiment, if the user setup Personal Computer 02210 and Wireless Device 02300 to pair automatically, then Personal Computer 02210 can automatically transmit WD Application 09700 to Wireless Device 02300 utilizing the Bluetooth protocol.

At 11220, WD Application 09700 can configure the location, size, and any other parameter of Memory 01060, Storage 01100, or any other device in Wireless Device 02300 capable of storing PI Folder 09510. In the preferred embodiment, WD Application 09700 can configure for storing PI Folder 09510 the memory in SCMM 02700 or any other memory which POS Device 02800 or any other Data Processing System operated by Retailer Server 02900 will access.

At 11240, WD Application 09700 can install the printer identify in Wireless Device 02300.

At 11260, PC Application 09500 or WD Application 09700 can execute any routine to confirm the ability of Personal Computer 02210 to transmit data, e.g., a Purchase Incentive displayed in Display 01200.

At 11500, Personal Computer 02210 Display 01014 can display an HTML document showing Content offering a Coupon ID 09420. While the present method teaches the transmission of Coupon ID 09420 in the form of a subset of files of an HTML document, it can support the transmission of Coupon ID 09420 displayed in Display 01200 in the form of any type of Programming/Advertisement, which can include, but is not limited to: (1) an advertisement in the form of text, e.g., an advertisement appearing in a typical search advertisement; (2) an advertisement in the form of an image, e.g., an image file in any format; (3) an advertisement in the form of a video, e.g., an image including data representing a Purchase Incentive displayed in a video; (4) an advertisement in the form of audio, e.g., speech specifying data representing a Purchase Incentive; and/or (5) any combination thereof.

At 11520, the user of Personal Computer 02210 can decide to select the "Print", "Save As", or any other function to transmit Purchase Incentive to Wireless Device 02300.

At 11540A, the user of Personal Computer 02210 can use any method to select the Purchase Incentive displayed in Display 01200. For example, if Coupon ID 09420 is one image file appearing in the HTML document, the user of Personal Computer 02210 can right-click a Pointing Device 01240 to access the "Print" command. In another example, if Coupon ID 09420 is an alphanumeric character string, e.g., a n-digit number representing a basic UCC Coupon Code, the user of Personal Computer 02210 can select the n-digit number and right-click a Pointing Device 01240 to access the "Print" command. In another example, if Coupon ID 09420 is the entire HTML document, the user of Personal Computer 02210 can select the "File" menu and "Print" command.

At 11560A, the user of Personal Computer 02210 can select "Print."

At 11580A, the user of Personal Computer 02210 can select Wireless Device 02300 among the active printers appearing in the menu if the paired Wireless Device 02300 is within range of SR Transceiver 09600.

At 11600A, user of Personal Computer 02210 can select "OK" or any other command executing the printing of Coupon ID 09420, which results in Personal Computer 02210 downloading Coupon ID 09420 to Wireless Device 02300.

At 11620, WD Application 09700 can call a routine to parse Coupon ID 09420 to extract the code, e.g., a n-digit number representing a basic UCC Coupon Code.

3.3 Data Display Among a Plurality of Devices

Figure 13:
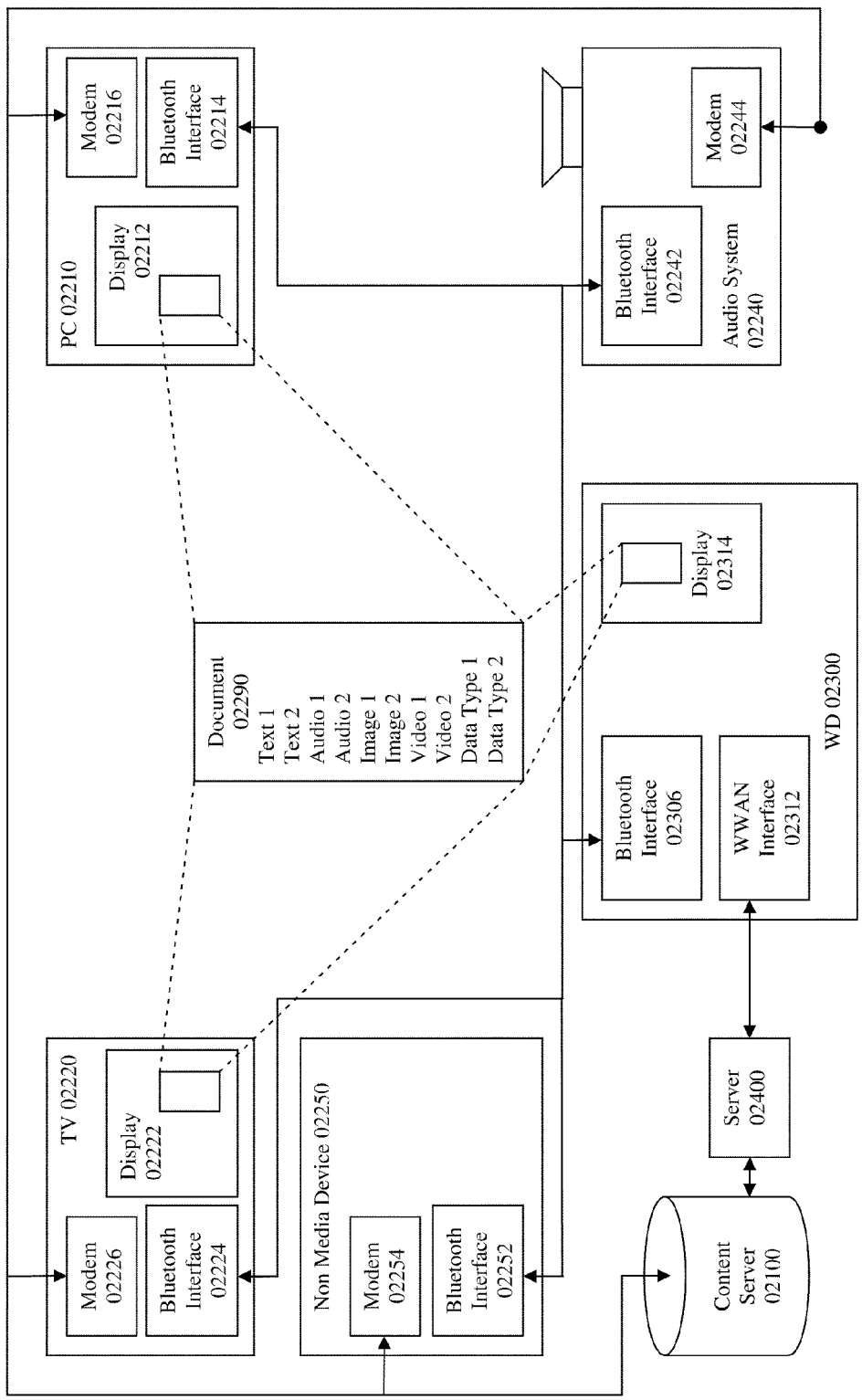
FIG. 13 depicts an exemplary system enabling the display of a plurality of related data on a plurality of devices, according to some embodiments.

FIG. 13 depicts an exemplary system enabling the display of a plurality of related data on a plurality of devices, according to some embodiments. The present system can implement the entities described herein by utilizing a subset of the illustrated components, or additional, related, alternative, and/or equivalent components.

Figure 14:
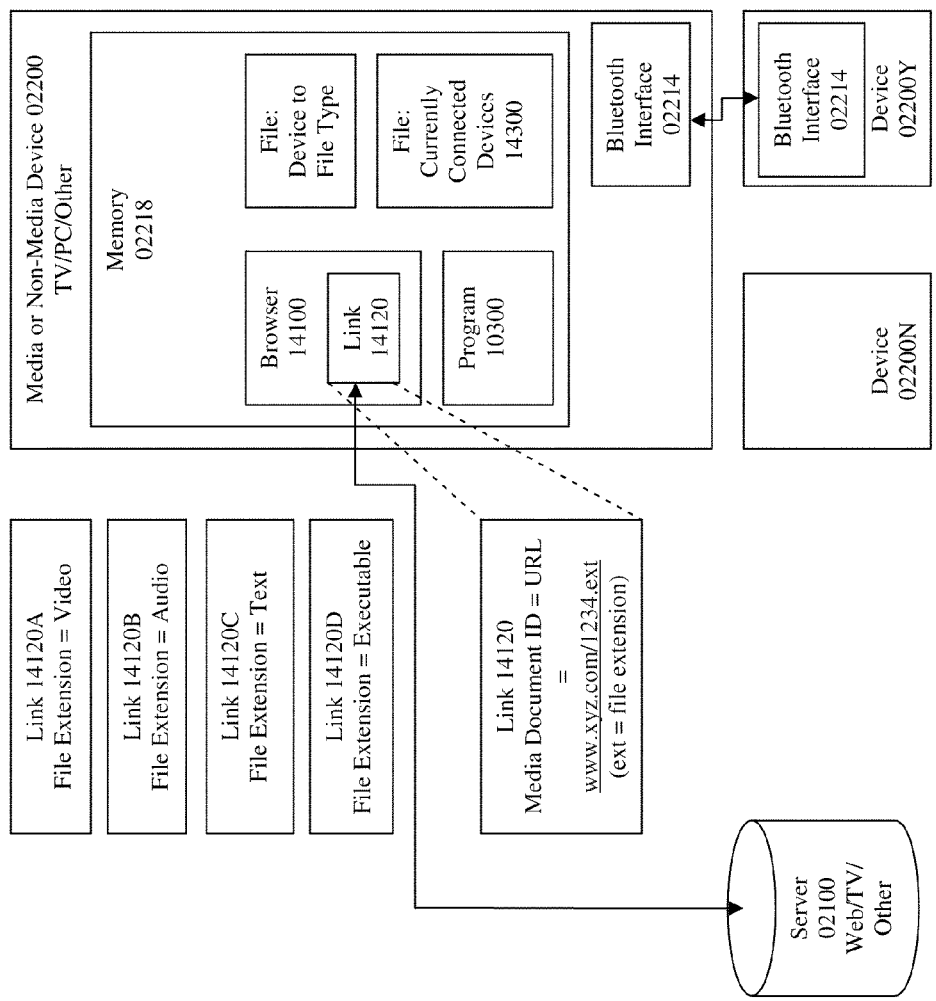
FIG. 14 depicts an exemplary system enabling the generation of data facilitating display distributed on a plurality of devices, according to some embodiments.

FIG. 14 depicts an exemplary system enabling the generation of data facilitating display distributed on a plurality of devices, according to some embodiments. The present system can implement the entities described herein by utilizing a subset of the following components, or additional, related, alternative, and/or equivalent components. The present system can include, but is not limited to, the following components not disclosed earlier.

Browser 14100 is a computer program product enabling the display of and interaction with data through selection of links to units of data in the same document or to one or more other documents.

Link 14120 is any reference to another unit of data in same document or to one or more other documents. Link 14120 can refer to any type of data, including, but not limited to: (1) Link 14120A, which is a reference to data in the form of video; (2) Link 14120B, which is a reference to data in the form of audio; (3) Link 14120C, which is a reference to data in the form of text; and/or (4) Link 14120D, which is a reference to data in the form of an executable program. Link 14120 can include any type of link, including, but not limited to: (1) a simple link creating a unidirectional connection from one unit of data to another unit of data; and/or (2) an extended link creating a unidirectional connection among multiple units of data, e.g., an extended link can connect every media resource to one unit of data. Selecting Link 14120 can connect to a target unit of data through any method, including, but not limited to: (1) invoking a target unit of data through an HTTP GET command; and/or (2) transmitting a message to one or more Content Servers 02100 to transfer the target unit of data to the current document.

File: Device to File Type 14200 is a file including data specifying the type of data any given Media Device 02200 or Non Media Device 02250 can execute and/or display. For example, Oven 02230 or Microwave Oven 02230A can receive, store, process, and/or transmit data in the form of a program which can execute instructions for heating any type of food. Audio System 02240 can receive, store, process, and or transmit data in the form of an audio signal.

File: Currently Connected Devices 14300 is a file including data specifying one or more other Media Devices 02200 and/or Non Media Devices 02250 with which Media or Non-Media Device 02200 can exchange data over any communications protocol, e.g., Bluetooth. FIG. 14 illustrates how Device 02200Y can exchange data with Device 02200 because both have a component Bluetooth Interface 02214, while Device 02200N cannot exchange data with Device 02200 because Device 02200N does not have any Communications Interface 01140 capable of exchanging data with Device 02200.

Figure 21:
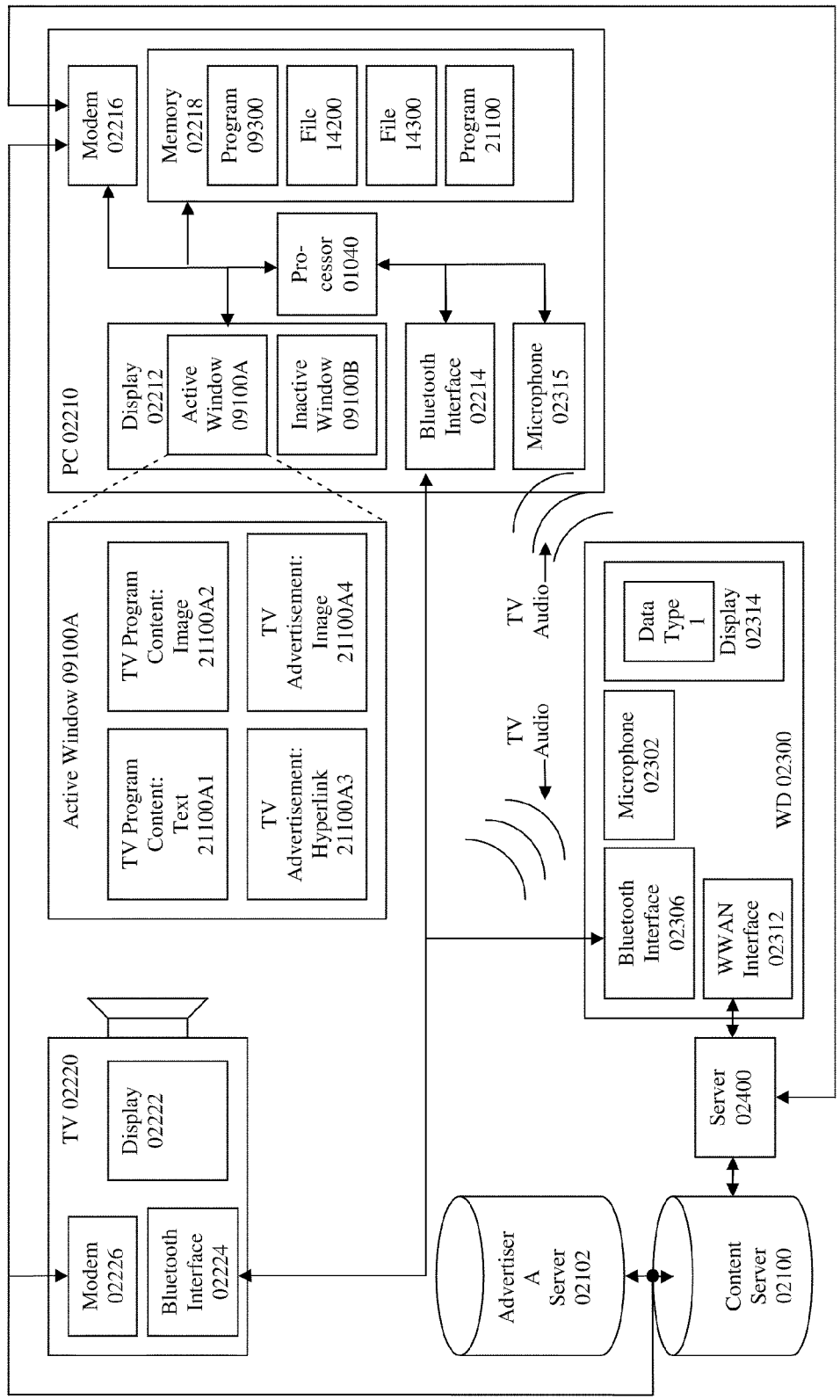
FIG. 21 depicts an exemplary system enabling the synchronized display of content on one or more other devices related to content displayed on a first device, e.g., a television, according to some embodiments.

FIG. 21 depicts an exemplary system enabling the synchronized display of content on one or more other devices related to content displayed on a first device, e.g., a television, according to some embodiments. The present system can implement the entities described herein by utilizing a subset of the following components, or additional, related, alternative, and/or equivalent components. The present system can include, but is not limited to, the following components not disclosed earlier.

TV Program Content: Text 21100A1 is Content in the form of text related to the Content displayed on the Display 02222 of TV 02220.

TV Program Content: Image 21100A2 is Content in the form of an image related to the Content displayed on the Display 02222 of TV 02220.

TV Advertisement: Hyperlink 21100A3 is a link referring to data related to the Content displayed on the Display 02222 of TV 02220.

TV Advertisement: Image 21100A4 is Content in the form of an image related to an Advertisement displayed on the Display 02222 of TV 02220.

Program 21100 is a computer program product which can perform a variety of functions, including, but not limited to: (1) synchronizing the display of Content on PC 02210 with the display of Content on TV 02220 by any method, including the method illustrated in FIGS. 24-26.

Figure 22A:
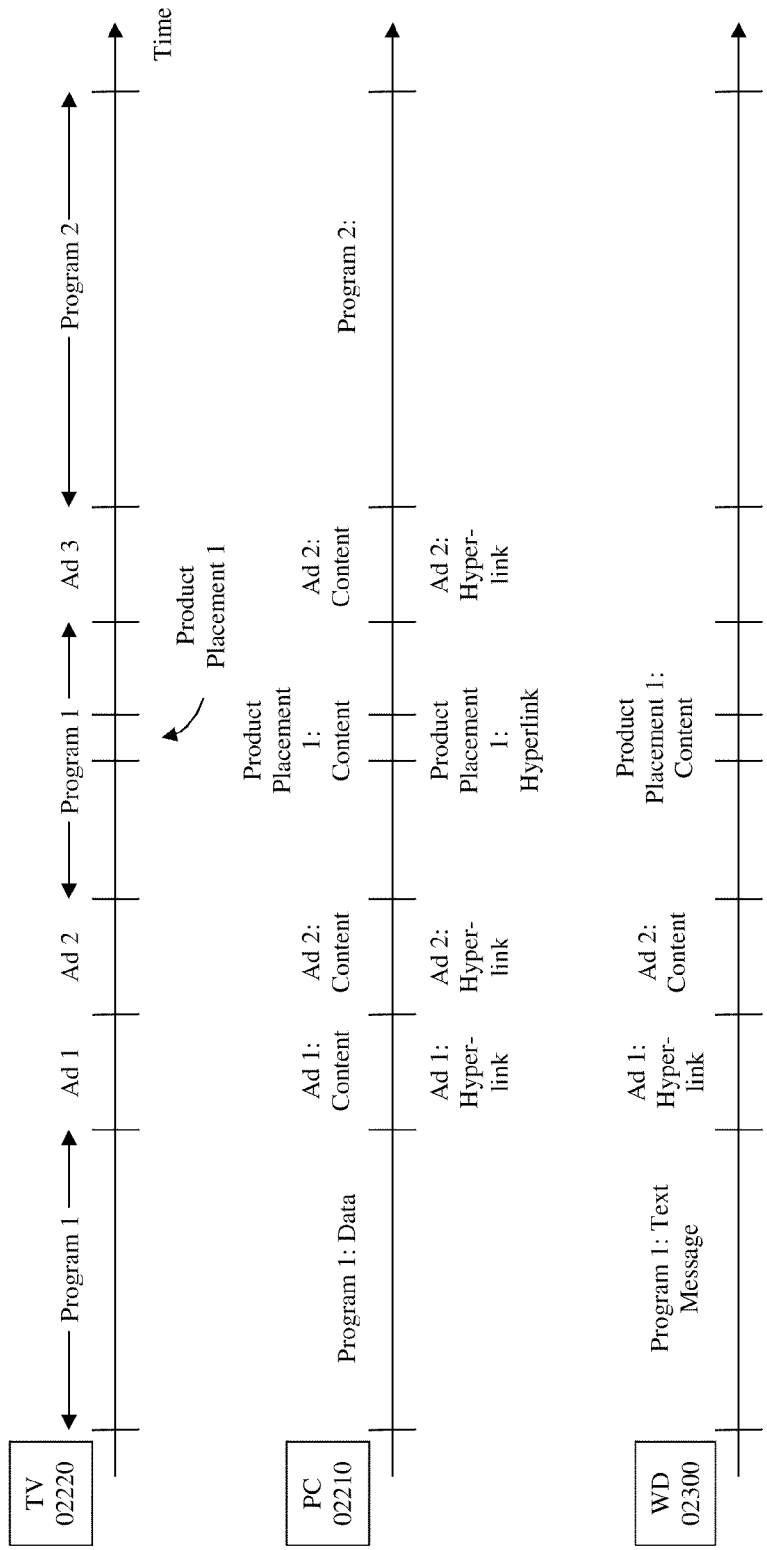
FIG. 22A depicts an exemplary timeline of the synchronized display of content on a plurality of devices, according to some embodiments.
Figure 22B:
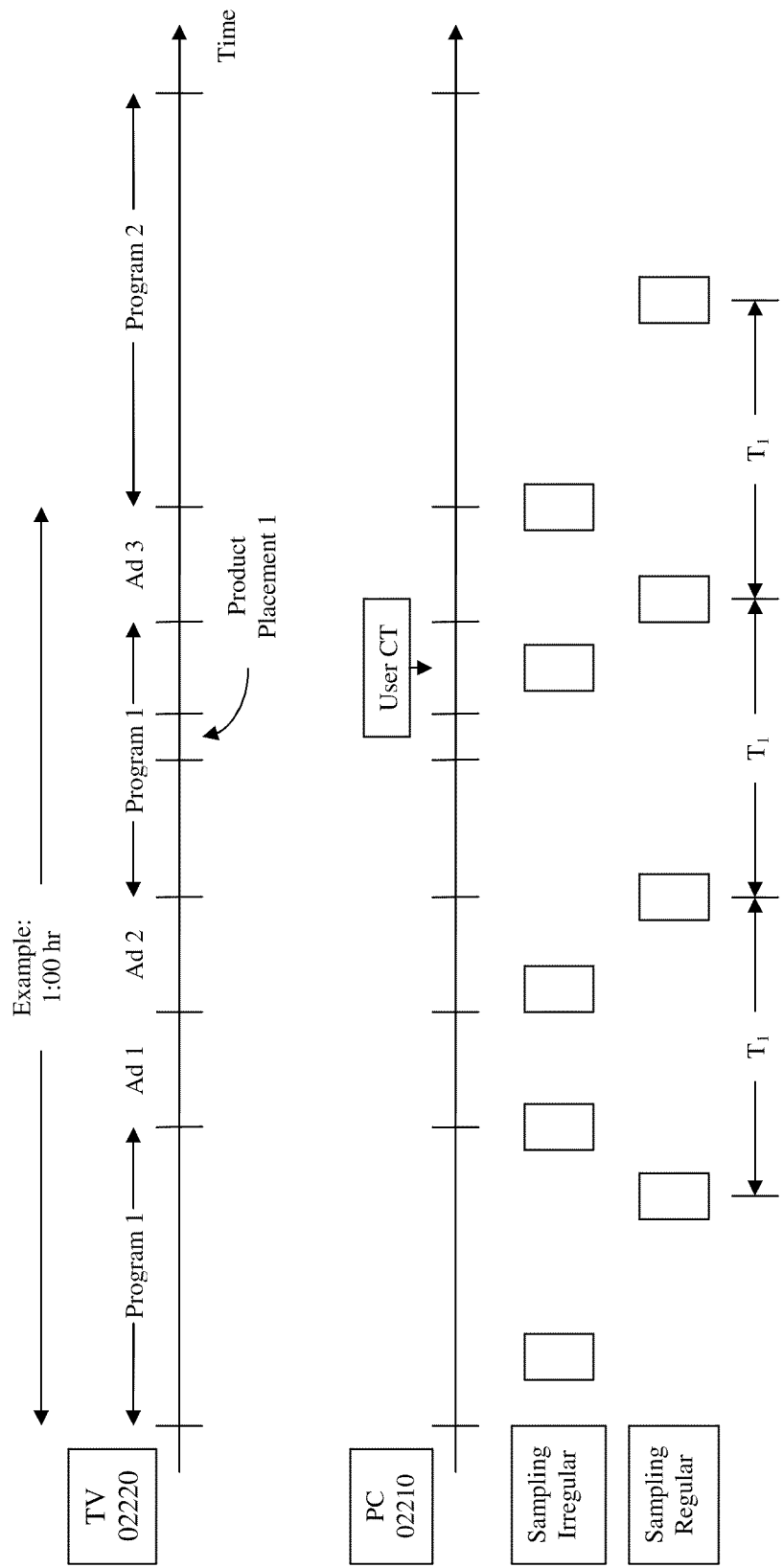
FIG. 22B depicts an exemplary method of synchronizing the display of content on one or more other devices related to content displayed on a first device, e.g., a television, according to some embodiments.
Figure 22C:
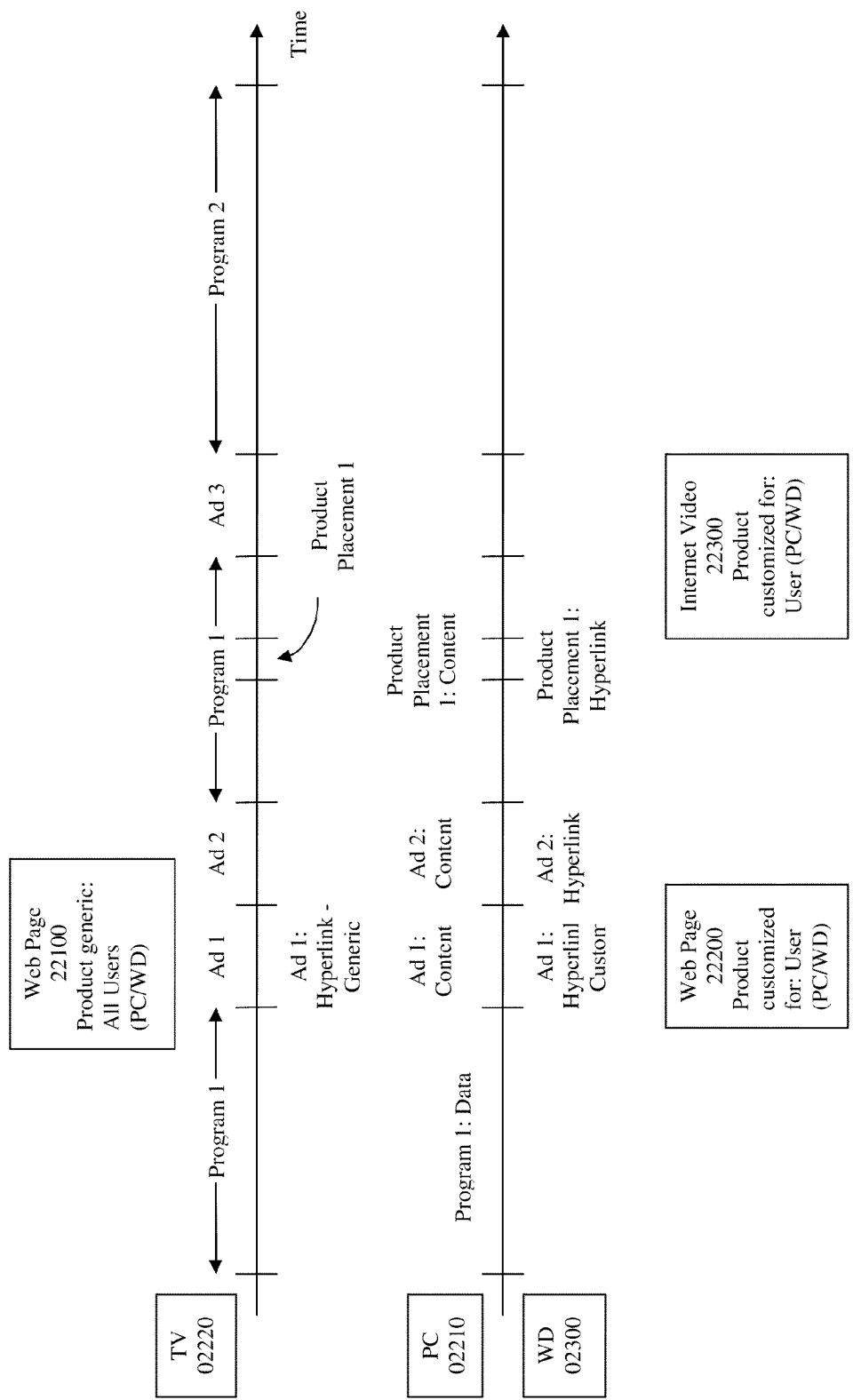
FIG. 22C depicts an exemplary method of generating the display of content customized for the user of one or more other devices related to content displayed on a first device, e.g., a television, according to some embodiments.
Figure 23:
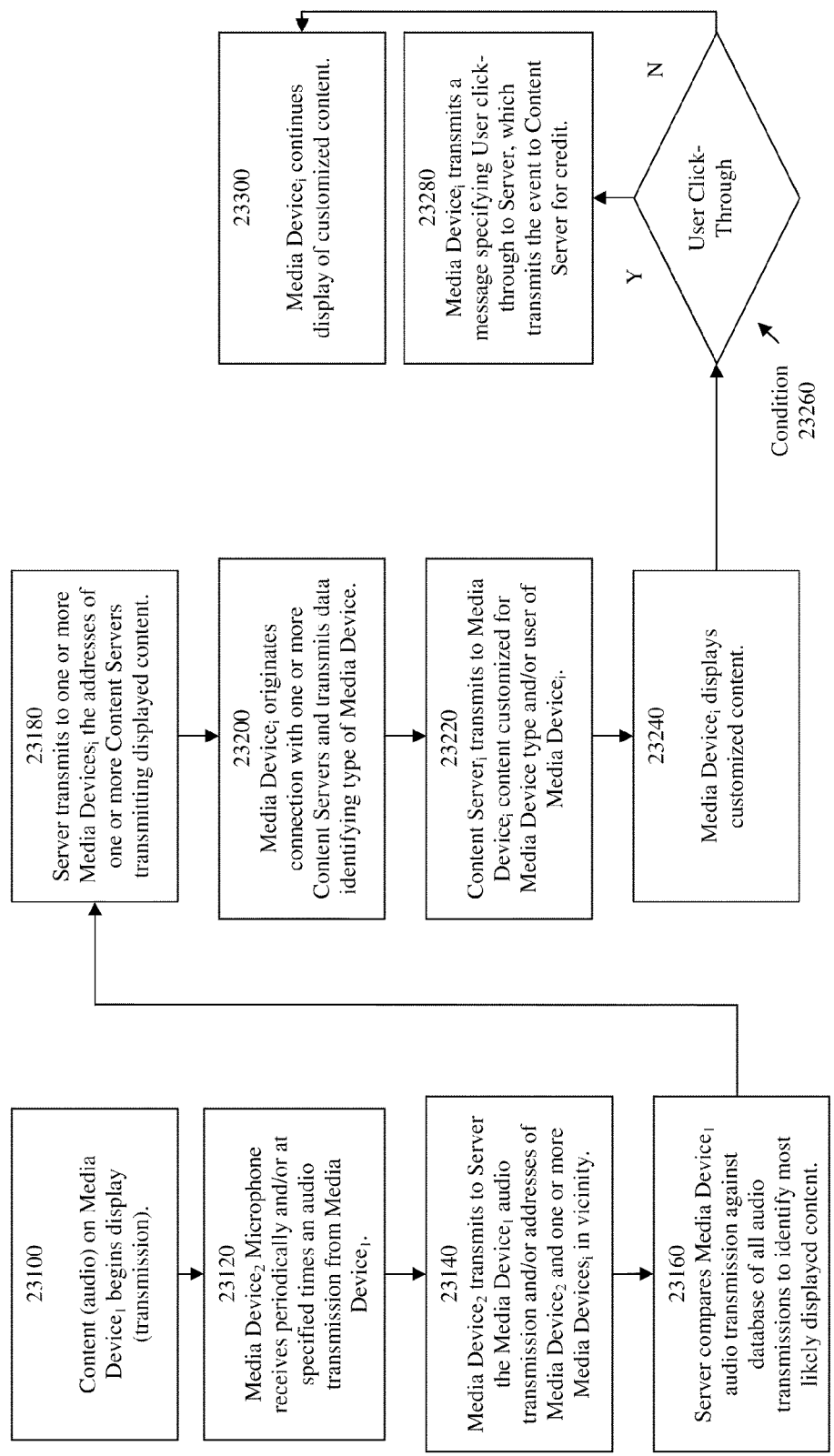
FIG. 23 depicts a flowchart of an exemplary method enabling the synchronized display of content on one or more other devices related to content displayed on a first device, e.g., a television, according to some embodiments.

FIG. 23 depicts a flowchart of an exemplary Method 23000 enabling the synchronized display of content on one or more other devices related to content displayed on a first device, e.g., a television, according to some embodiments. The flowchart refers to the system and structures depicted in FIG. 21 through FIG. 22C. However, the method is not limited to those embodiments. The method can implement the steps described herein by utilizing a subset of the components, or additional, related, alternative, and/or equivalent components depicted in FIG. 21 through FIG. 22C. The method can execute a subset of the steps, the steps in different order, and/or other or additional related or equivalent steps At 23100, Media Device$_1$, Television 02220, displays Content, e.g., Program 1 in FIG. 22C.

Figure 25:
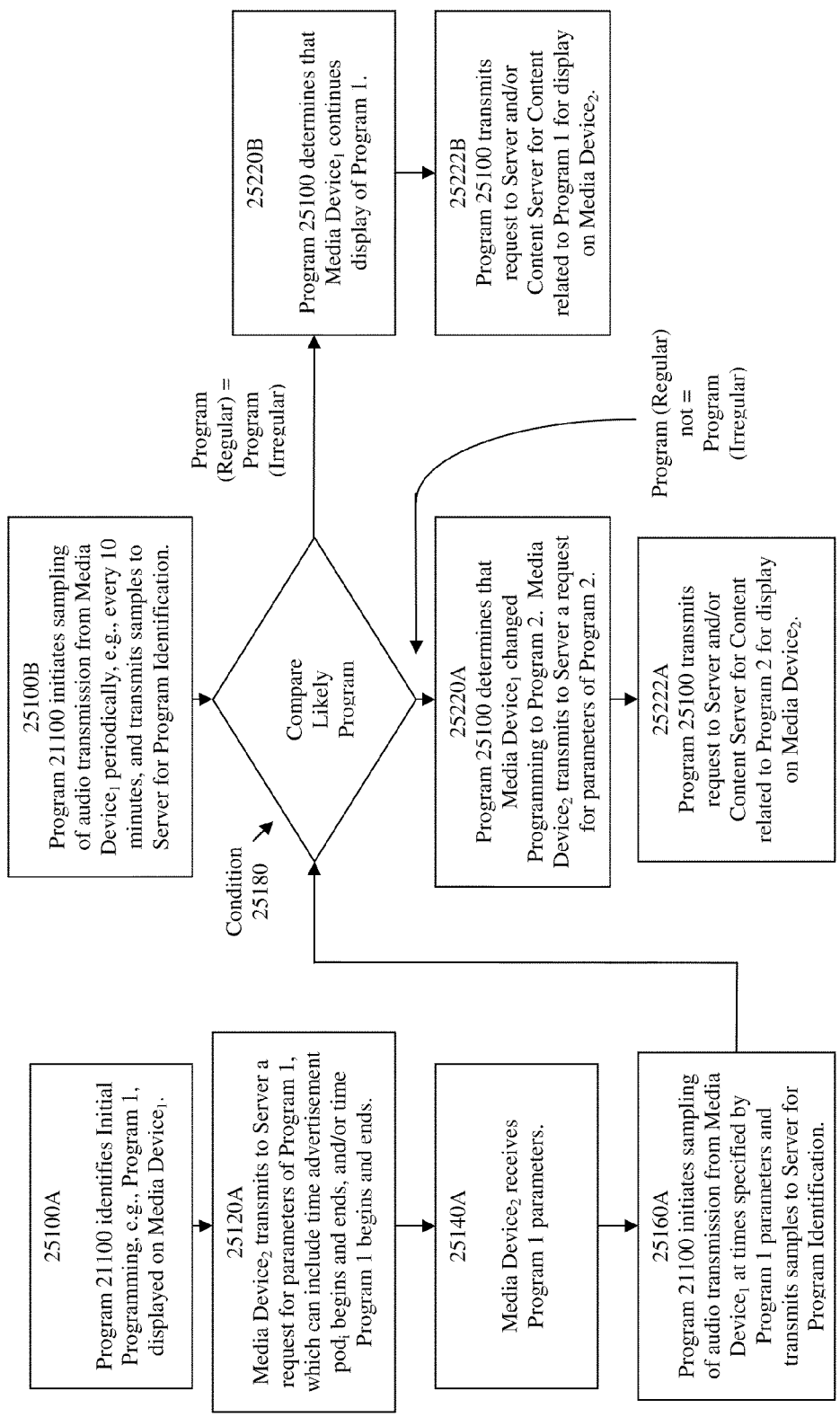
FIG. 25 depicts a flowchart of an exemplary method adaptively synchronizing the display of content on one or more other devices related to content displayed on a first device, e.g., a television, according to some embodiments.

At 23120, a Microphone 01260 attached to or integrated with Media Device$_2$, Personal Computer 02210, receives periodically and/or at times determined by an algorithm an audio transmission from Media Device$_1$. FIG. 25 illustrates one exemplary algorithm. Microphone 01260 relays audio transmission to one or more components in Personal Computer 02210 which can execute one or more of the following functions: (1) ADC; (2) downconversion; (3) compression; and/or (4) conversion to any type of audio file, e.g., a .wav file.

At 23140, Media Device$_2$ transmits to Server 02400 data, which can include, but is not limited to: (1) the audio file including the audio transmission from Media Device$_1$; (2) an address of Media Device$_2$, e.g., the IP address; and/or (3) the address(es) of one or more Media Devices$_1$ in the vicinity of Media Device$_2$ or any Media Devices$_1$ specified by the user of Media Device$_2$.

At 23160, Server 02400 utilizes any audio fingerprinting method to extract from the Media Device$_1$ audio transmission an audio fingerprint and compare it against a database of content transmitted to one or more Media Devices 02200 in the location of Media Device$_2$. The audio fingerprinting method identifies the most likely Content displayed on Media Device$_1$.

At 23180, Server 02400 transmits to Media Device$_2$ and one or more specified Media Devices 02200 the addresses of one or more Content Servers transmitting the displayed Content. For example, if the audio fingerprinting method identifies the most likely Content displayed on Media Device$_1$, e.g., Television 02220, is a Programming broadcast by a television network XYZ, Server 02400 can transmit to Media Device$_2$, e.g., Personal Computer 02210, and one or more specified Media Devices 02200, e.g., Wireless Device 02300, the addresses of one or more Content Servers transmitting Content related to the Programming displayed on Television 02220. That is, an user viewing Programming on Television 02220 can view synchronously on a Personal Computer 02210 and a Wireless Device 02300 Content related to the Programming displayed on Television 02220. In one example, the user can view video Programming on Television 02220 featuring a person presenting a diet plan, a web site on Personal Computer 02210 offering Content related to the diet plan discussed on Television 0220, and a Purchase Incentive on Wireless Device 02300 promoting one of the products included in the diet plan.

At 23200, Media Device$_i$ 02200 originates a connection with one or more Content Servers 02100 whose address(es) it received from Server 02400. Media Device$_i$ can transmit data identifying the type of Media Device to enable the Content Server 02100 to generate and/or transmit Content customized for the Media Device type. In another embodiment, the Content Server 02100 can detect the type of Media Device 02200 originating the connection and format the customized interface.

At 23220, Content Server$_i$ 02100 transmits to Media Device$_i$ 02200 Content customized for the type of Media Device 02200 and/or the user of Media Device$_i$.

At 23240, Media Device$_i$ 02200 displays the customized Content.

At Condition 23260, the user of Media Device$_i$ can click-through an advertisement, i.e., select one or more hyperlinks included with the Content displayed on Media Device$_i$ ("Event$_{CT}$").

At 23280, if the user of Media Device$_i$ selects a hyperlink, Media Device$_i$ can transmit a message specifying the Event$_{CT}$ to Server 02400, which can relay the Event$_{CT}$ to Content Server 02100. Identifying an Event$_{CT}$ can enable a Content Server 02100 to recognize a relationship between the viewing of Content on a first Media Device, e.g., Television 02220, and an event occurring on a second Media Device, e.g., Personal Computer 02210 or Wireless Device 02300.

The types of Content customized for the user of Media Device$_2$ can include, but are not limited to, the following.

First, the Content type can be data related to the location of Media Device$_2$, e.g., Personal Computer 02210. For example, if Programming displayed on Media Device$_1$, e.g., Television 02220, includes a scene located at an exercise gym, Server 02400 and/or Content Server 02100 can query a database to identify any franchise near the location of Media Device$_1$, generate a Purchase Incentive for a free workout session at the local exercise gym, and transmit to the Personal Computer 02210 the Purchase Incentive, the address of the local exercise gym, and directions from the location of the Personal Computer 02210 to the local exercise gym.

Second, the Content type can be data related to the type of Media Device 02200. For example, an image file displayed on a Personal Computer 02210 with a large display can be larger than an image file displayed on a Wireless Device 02300.

Third, the Content type can be data related to the demographic characteristics of the user of Media Device$_2$. For example, if Content displayed on Media Device$_1$, e.g., Television 02220, includes an advertisement featuring men and women apparel and the user of Media Device$_2$, e.g., Wireless Device 02300, speaks a word sequence whose source a speech recognition system identifies is probably a woman, then Server 02400 and/or Content Server 02100 can transmit to Media Device$_2$ a Purchase Incentive customized for women apparel.

3.4 Data Structures Enabling Data Display Among a Plurality of Devices

Figure 28A:
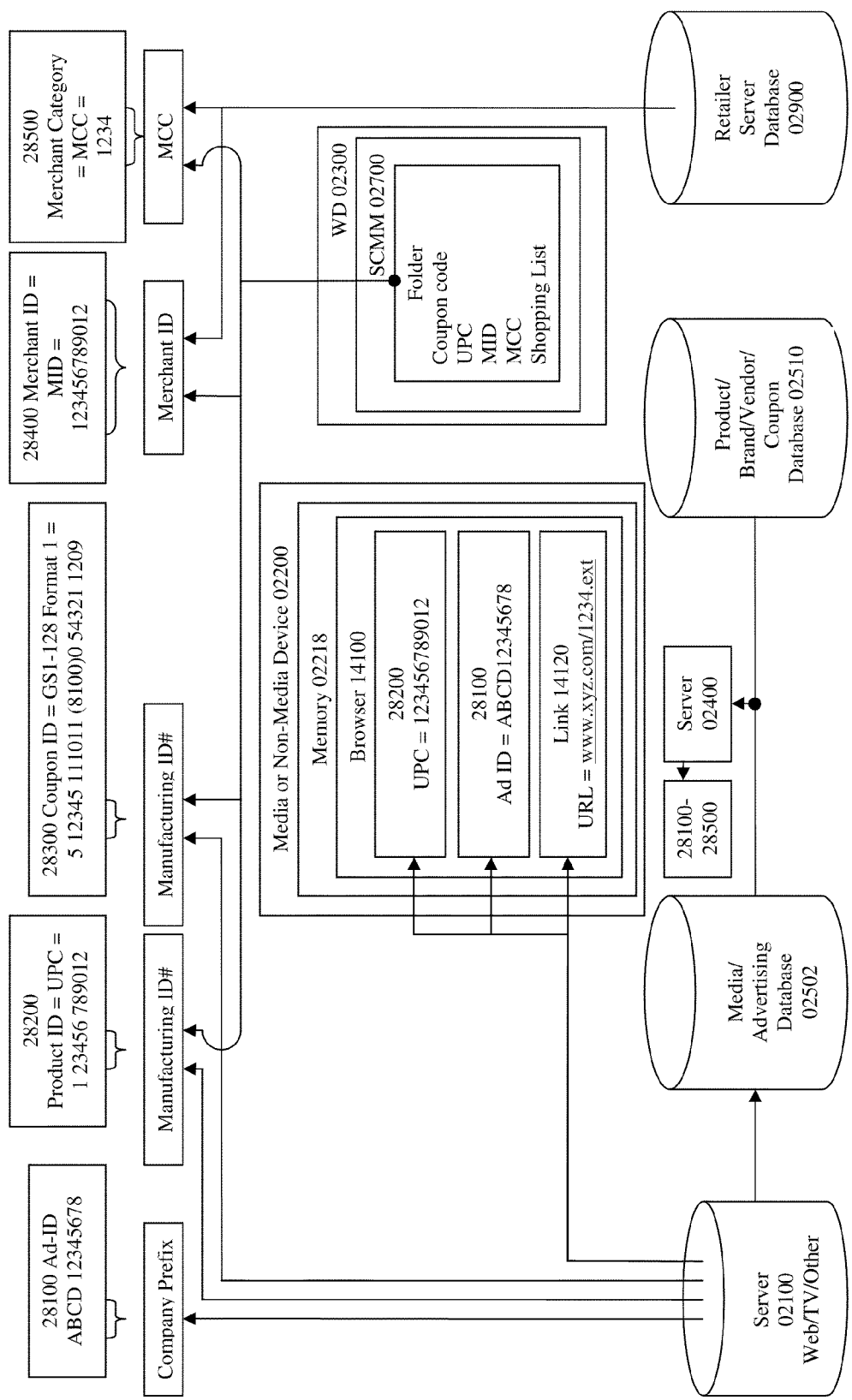
FIG. 28A depicts an exemplary system generating, parsing, and structuring data to enable more accurate search, more accurate speech recognition, and more relevant display of content, according to some embodiments.
Figure 28B:
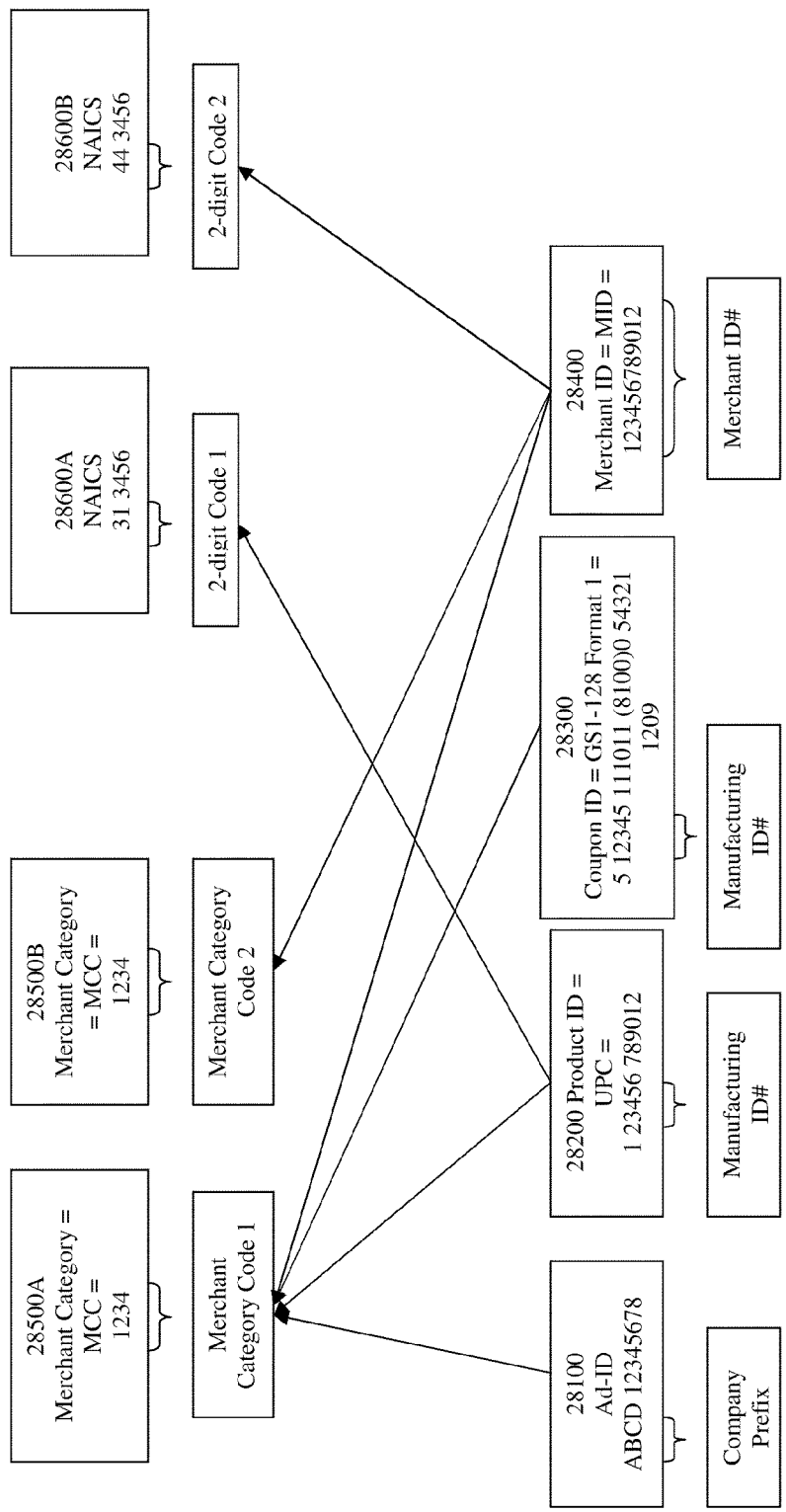
FIG. 28B depicts an exemplary method of classifying data to enable more accurate search, more accurate speech recognition, and more relevant display of content, according to some embodiments.
Figure 28C:
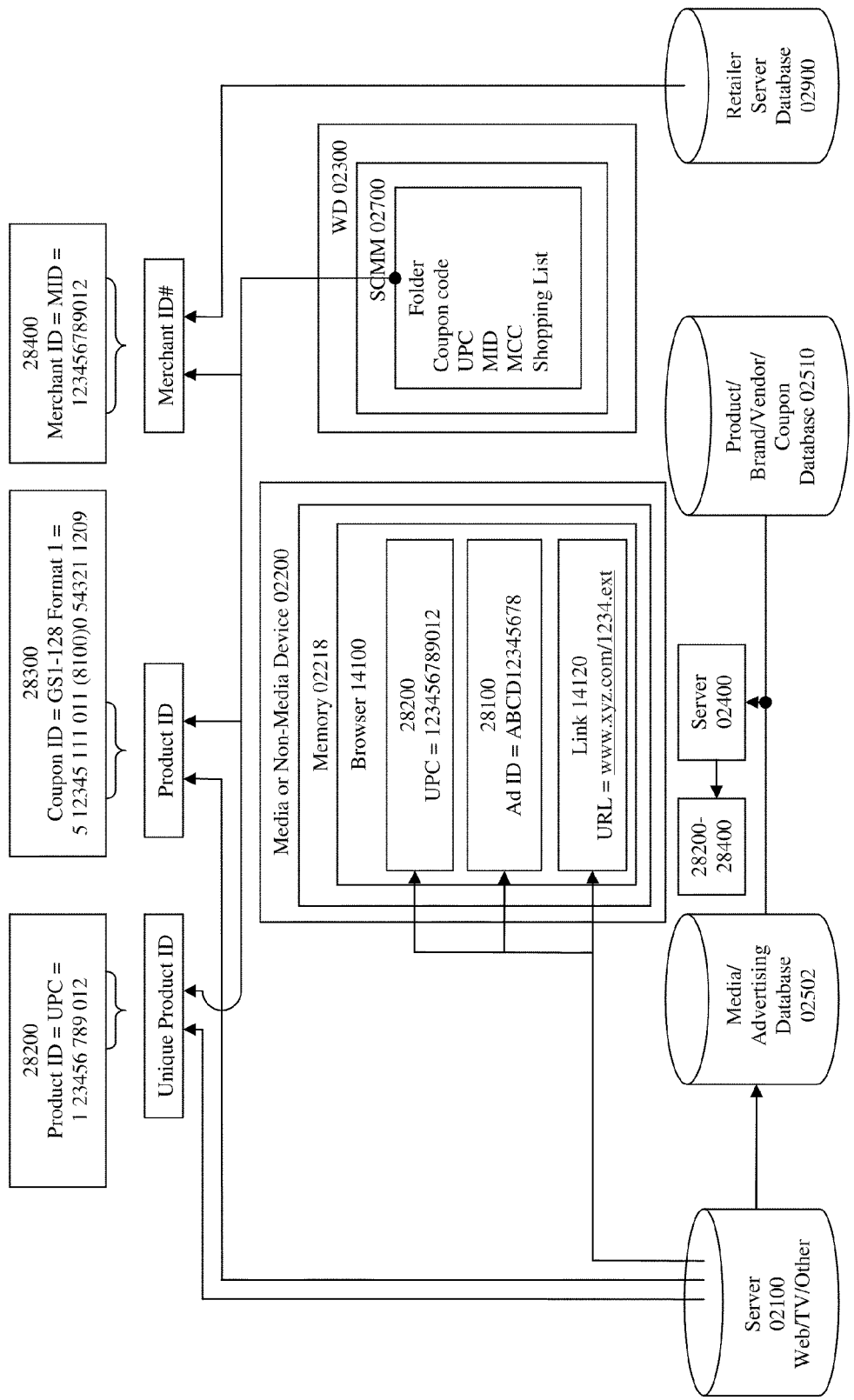
FIG. 28C depicts an exemplary system classifying data to enable more accurate search, more accurate speech recognition, and more relevant display of content, according to some embodiments.
Figure 32:
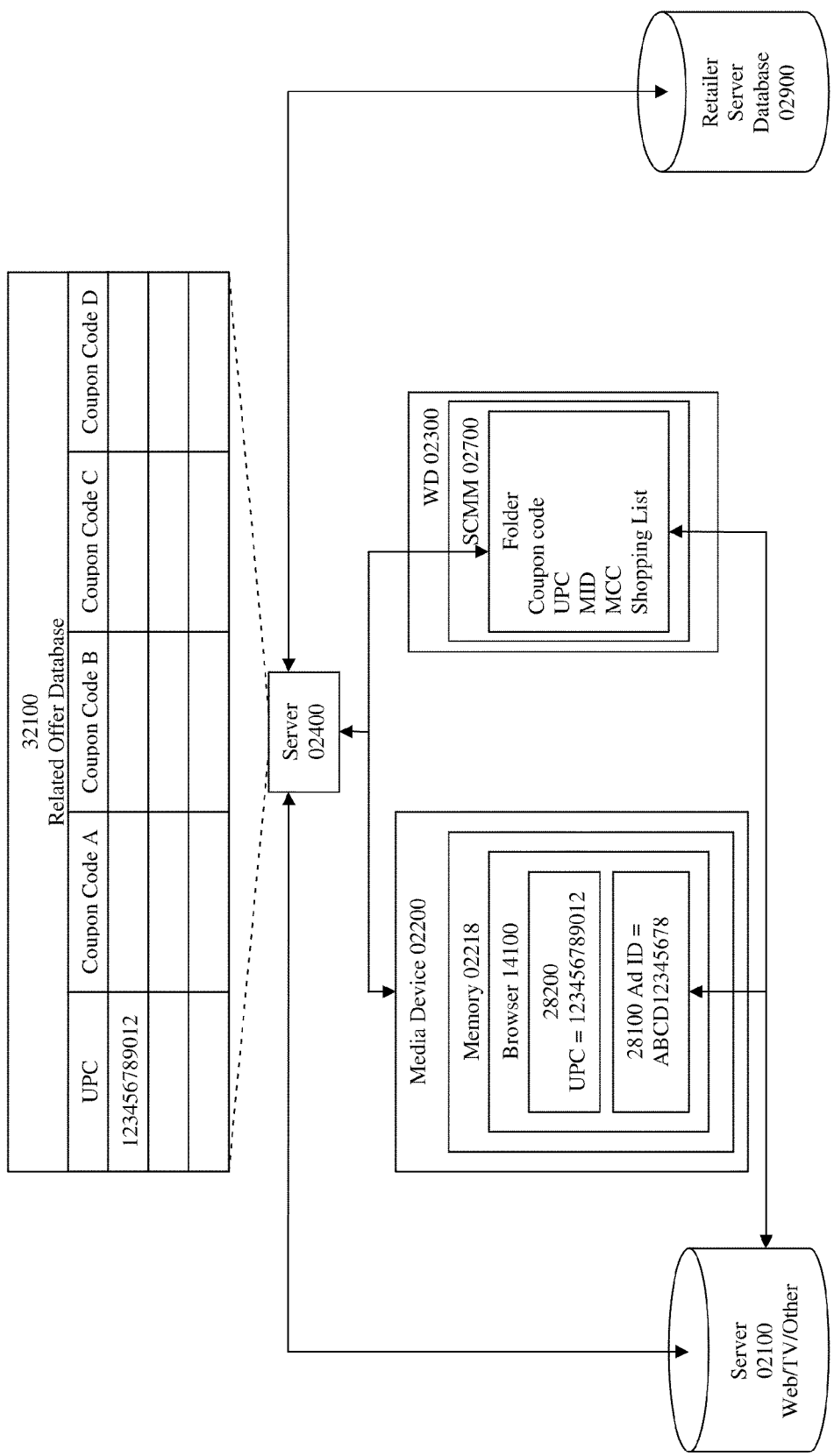
FIG. 32 depicts an exemplary system enabling the display of offers related to an offer of a given product, according to some embodiments.
Figure 33:
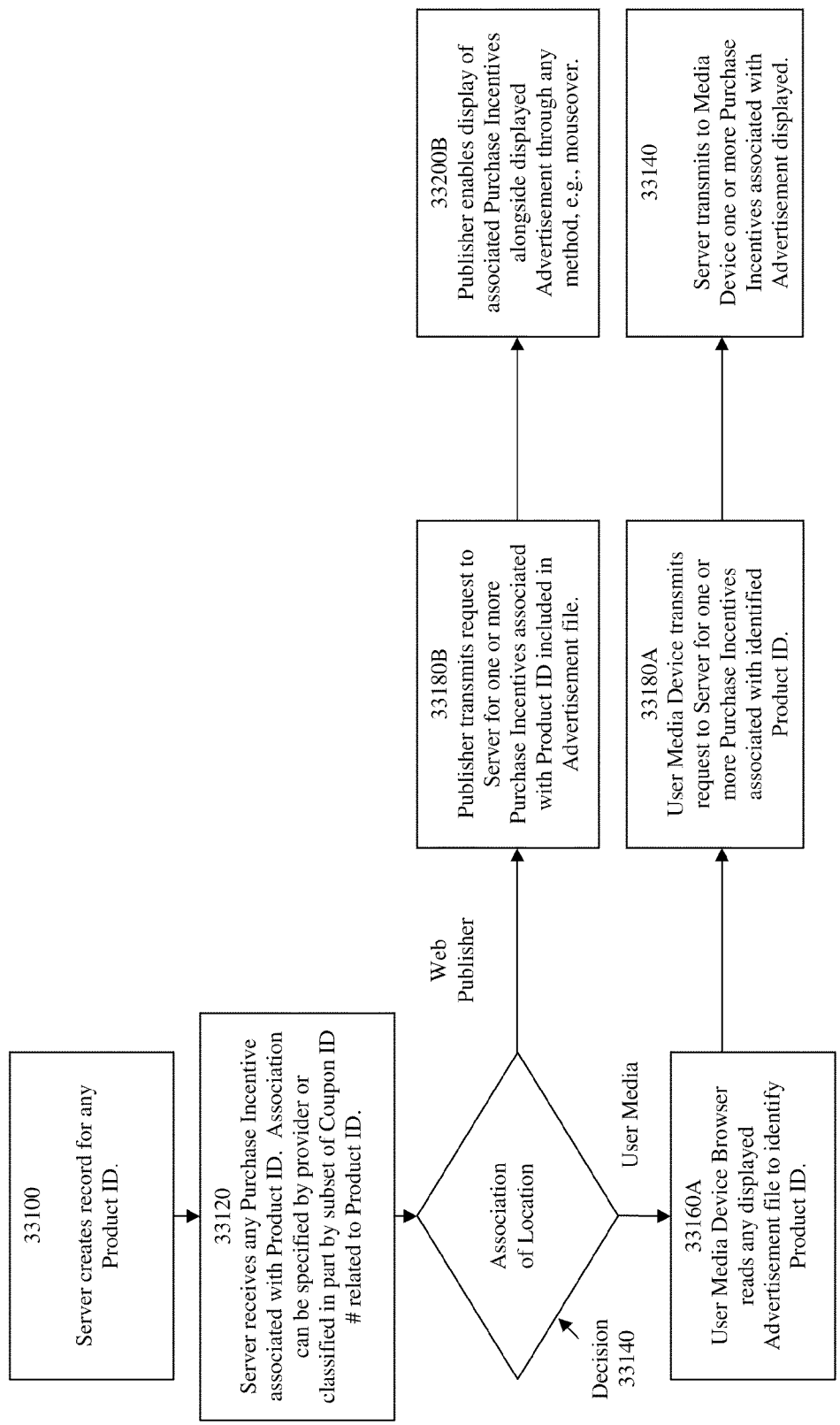
FIG. 33 depicts a flowchart of an exemplary method enabling the display of offers related to an offer of a given product, according to some embodiments.

FIG. 28A depicts an exemplary system generating, parsing, and structuring data to enable more accurate search, more accurate speech recognition, and more relevant display of content, according to some embodiments.

3.5 Speech Recognition

In a typical speech recognition system, the system aims to identify the most likely word W or word sequence $W_{SEQ}$ given an observed vector sequence $\mathbf{0}$. Using Bayes' rule, a system can search for the word W which maximizes the probability P(W|O) and the probability P(W):

$$arg_w\max P(W|O) = arg_w\max P(O|W)P(W) \quad \text{Equation 1}$$

where P(O|W) is the acoustic model and P(W) is the language model.

3.5.1 Language Model

There currently exist methods of adapting language models. There is a class of methods which take advantage of the correlation of words used in a document. This class of methods utilizes the frequent appearance of a word earlier in a document to predict the next word.

A speech recognition system aiming to recognize word sequences in an User Request or User Comment does not necessarily utilize a document of word sequences inputted by a given user of Wireless Device 02300 or Wireline Device 02302. However, the methods described herein can build a database of word sequences related to a given topic, e.g., a Programming, comprising word sequences inputted by a plurality of users of Wireless Device 02300 or Wireline Device 02302 related to the topic. The methods described herein can then apply methods to adapt a language model. For example, assume ten users of Wireless Device 02300 or Wireline Device 02302 transmit an User Comment related to a topic, e.g., the clothes worn by an actress performing in a given Programming. The methods described herein can collect word sequences from each of the ten users, build one or more documents including the word sequences, and utilize any method of assigning a word sequence to a topic, e.g., naive Bayes classifier or a N-gram language model.

3.5.1.1 User Specific Data

The present application discloses a novel language model which can utilize a variety of different types of data to increase the accuracy of identifying one or more word sequences.

The methods described herein assume that the probability of an user of Wireless Device 02300 or Wireline Device 02302 speaking one or more word sequences related to a Promoted Object can be related to the exposure of the user to one or more Programming and/or Advertisements referring to the Promoted Object. In a typical conversation, an user of Wireless Device 02300 or Wireline Device 02302 does not speak the name of a product, brand, or company. To the extent that an user thinks and/or speaks such a name, the methods described herein assume that the action is most likely related to a Programming or Advertisement which stimulated the user to think about and/or speak a word sequence specifying or describing the Promoted Object. For example, while a typical conversation may include word sequences identifying a product category, e.g., a "car" or "automobile," it is unlikely that the typical conversation would include one or more words identifying a specific brand, e.g., "Chevy Impala®." In another example, while a typical conversation may include words identifying a product category, e.g., "soup," it is unlikely that the typical conversation would include one or more words identifying a word sequence including the product category and an extension representing a brand name, e.g., "Campbell® soup."

A Product Category is any data uniquely identifying the category of a product included in an User Request, including, but not limited to: (1) an alphanumeric string describing a class of products; (2) a standard code, e.g., the North American Product Classification System (NAPCS); the North American Industry Classification System (NAICS); the European Classification of Products by Activity (CPA); the Central Product Classification (CPC); and/or the International Standard Industrial Classification of all Economic Activities (ISIC); and/or (3) a proprietary code utilized by a given advertiser, media buyer, and/or one or more producers of the product.

An user of Wireless Device 02300 or Wireline Device 02302 can transmit an User Request related to a Promoted Object. Because a Promoted Object is any product, brand, company, industry, Product Category or anything else promoted in an Advertisement or Programming, the user transmitting one or more word sequences describing a Promoted Object is transmitting word sequences whose prior probability in a limited language model is significantly higher than its prior probability in a generalized language model.

The present novel language model can collect and/or generate data related to a variety of variables, including, but not limited to: (1) one or more Programming and/or Advertisements to which an user of a Wireless Device 02300 or Wireline Device 02302 was actually or likely exposed; (2) actions the user of Wireless Device 02300 or Wireline Device 02302 executed; (3) characteristics of the user of Wireless Device 02300 or Wireline Device 02302; and/or (4) any other data which can increase the accuracy of recognizing a given word sequence. The present language model utilizes the data to generate a prior probability to help recognize any given word sequence, particularly a word sequence related to a Promoted Object and/or Product Category.

Figure 34B:
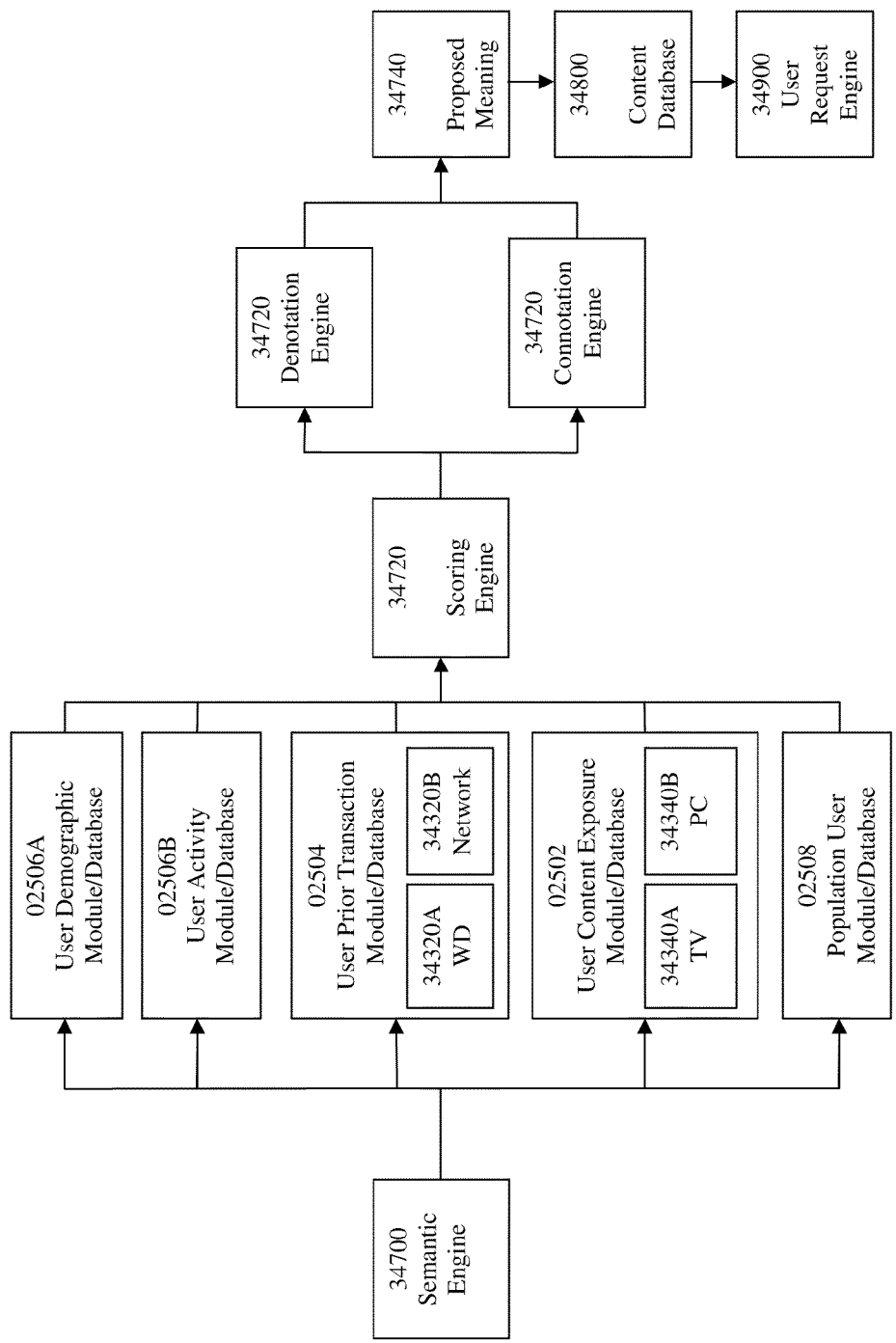
FIG. 34B depicts an exemplary method enabling the utilization of data to infer the meaning of a word sequence, according to some embodiments.
Figure 34C:
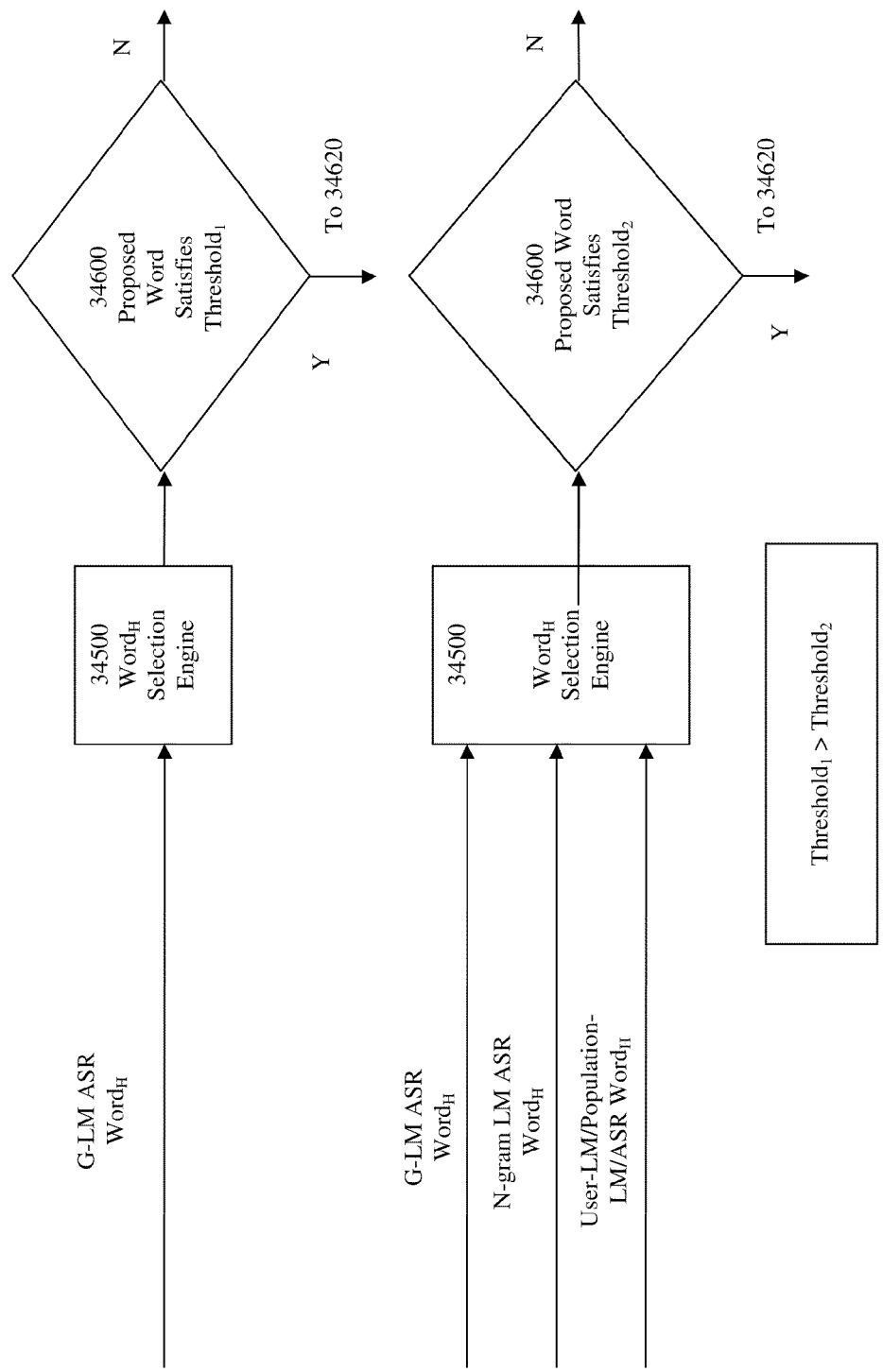
FIG. 34C depicts an example of how adapting a language model to reflect certain types of data about products, media, and/or users can enable more accurate speech recognition, according to some embodiments.

FIG. 34A depicts an exemplary Method 35000 enabling the adaptation of a language model, according to some embodiments. The method can execute a subset of the steps, the steps in different order, and/or other or additional related or equivalent steps.

While the methods described herein can utilize data generated by and/or collected from a Wireless Device 02300, they are not limited to that embodiment. The methods described herein can utilize data generated by, collected by, and/or received from any Media Device 02200, including, but not limited to: Wireline Device 02302; Personal Computer 02210; and/or Television 02220.

While the methods described herein teach how a speech recognition system can receive the speech input of an user of Wireless Device 02300, they are not limited to that embodiment. The methods described herein can enable a speech recognition system receiving the speech input of an user of any Media Device 02200, including, but not limited to: Wireline Device 023021 Personal Computer 02210; and/or Television 02220.

Wireless Device 02300 can transmit any audio signal, e.g., a speech input of the user of Wireless Device 02300, to Server 02400, which can include one or more computer program products capable of processing a speech input. The computer program products can include, but are not limited to: Acoustic Model Engine 34100; Automatic Speech Recognition: generalized language model (ASR: G-LM) 34200; N-gram Language Model Engine 34220; User-Specific Language Model Engine 34240; Population Language Model Engine 34260.

ASR: G-LM 34200 can generate one or more hypothesized word sequences given the speech input by applying a generalized language model that covers most or all topics utilizing any method.

N-gram Language Model Engine 34220 can generate one or more hypothesized word sequences given the speech input by generating a vocabulary drawn from a database of Promoted Objects. The methods described herein can adapt the N-gram Language Model Engine 34220 to reflect dynamic conditions.

User-Specific Language Model Engine 34240 can generate one or more hypothesized word sequences given the speech input by executing the following steps, including, but not limited to: (1) generating a vocabulary drawn from one or more modules, which can include, but are not limited to: (a) User Content Exposure 02502; (b) User Prior Transaction 02504; (c) User Activity 02506B; and/or (d) User Demographic 02506A; (2) utilizing a Scoring Engine 34400 to generate a matching score and/or combined matching score; and/or (3) generating one or more hypothesized word sequences. While the present system can include the present modules, it can include any other module capable of generating a vocabulary related to any factor associated with a given user of Wireless Device 02300 or Wireline Device 02302. The modules described herein, e.g., 02502, 02504, 02506A, 02506B, 02508, and 02510, can be modules which can perform a variety of functions and represent one or more data structures on which the modules can execute functions.

$Word_H$ Selection Engine 34500 is a computer program product capable of receiving any criteria for selecting a Proposed Word Sequence, receiving one or more hypothesized word sequences, and selecting in accordance with the criteria a proposed word from the hypothesized word sequences the Proposed Word Sequence.

Condition 34620 can be any condition comparing if the Proposed Word Sequence generated by the present method is equivalent to the word spoken by the user of Wireless Device 02300 or Wireline Device 02302. Method 35000 can select one or more high-ranking candidate word sequences satisfying any given probability threshold. The threshold can be predetermined or adjusted dynamically depending on the availability and reliability of different data. For example, User Content Exposure 02502 can include data showing that Wireless Device 02300 was in the vicinity of one or more Media Devices 02200 displaying multiple Advertisements of a Promoted Object, User Prior Transaction 02504 can include data showing that the user of Wireless Device 02300 recently purchased a product whose purchases are highly correlated with purchases of the Promoted Object, User Demographic 02506A can include data showing that the user of Wireless Device 02300 is a member of the demographic group for which the Promoted Object is designed, and Product Database 02510 can include data showing that the Promoted Object is available in physical retailers only in the location of Wireless Device 02300. If the data in 02502, 02200, 02504, 02506A, and 02510 meets a predetermined reliability threshold, the threshold for selecting a candidate word sequence can be lower than otherwise.

The present system can transmit to the user a query asking for confirmation of the Proposed Word Sequence.

If the user of Wireless Device 02300 or Wireline Device 02302 indicates through any method that the Proposed Word Sequence is not the word the user intended, the present system can repeat the steps specified.

If the user of Wireless Device 02300 or Wireline Device 02302 indicates through any method that the Proposed Word Sequence is the word the user intended, the present system can proceed to User Request Engine 34900, which is a computer program product capable of executing any action requested by the User Request.

Figure 35A:
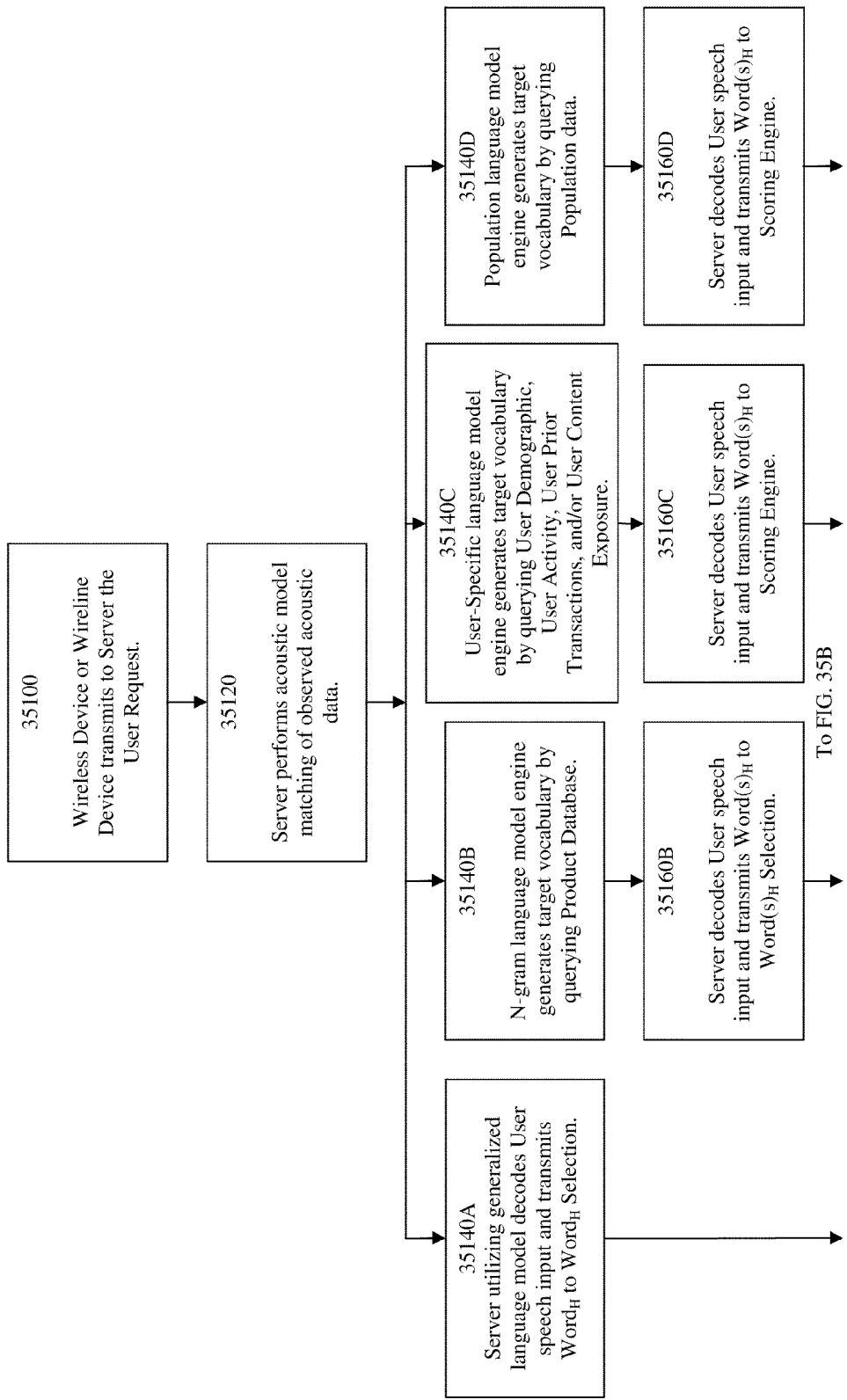
FIGS. 35A and 35B depict a flowchart of an exemplary method enabling the adaptation of a language model, according to some embodiments.
Figure 35B:
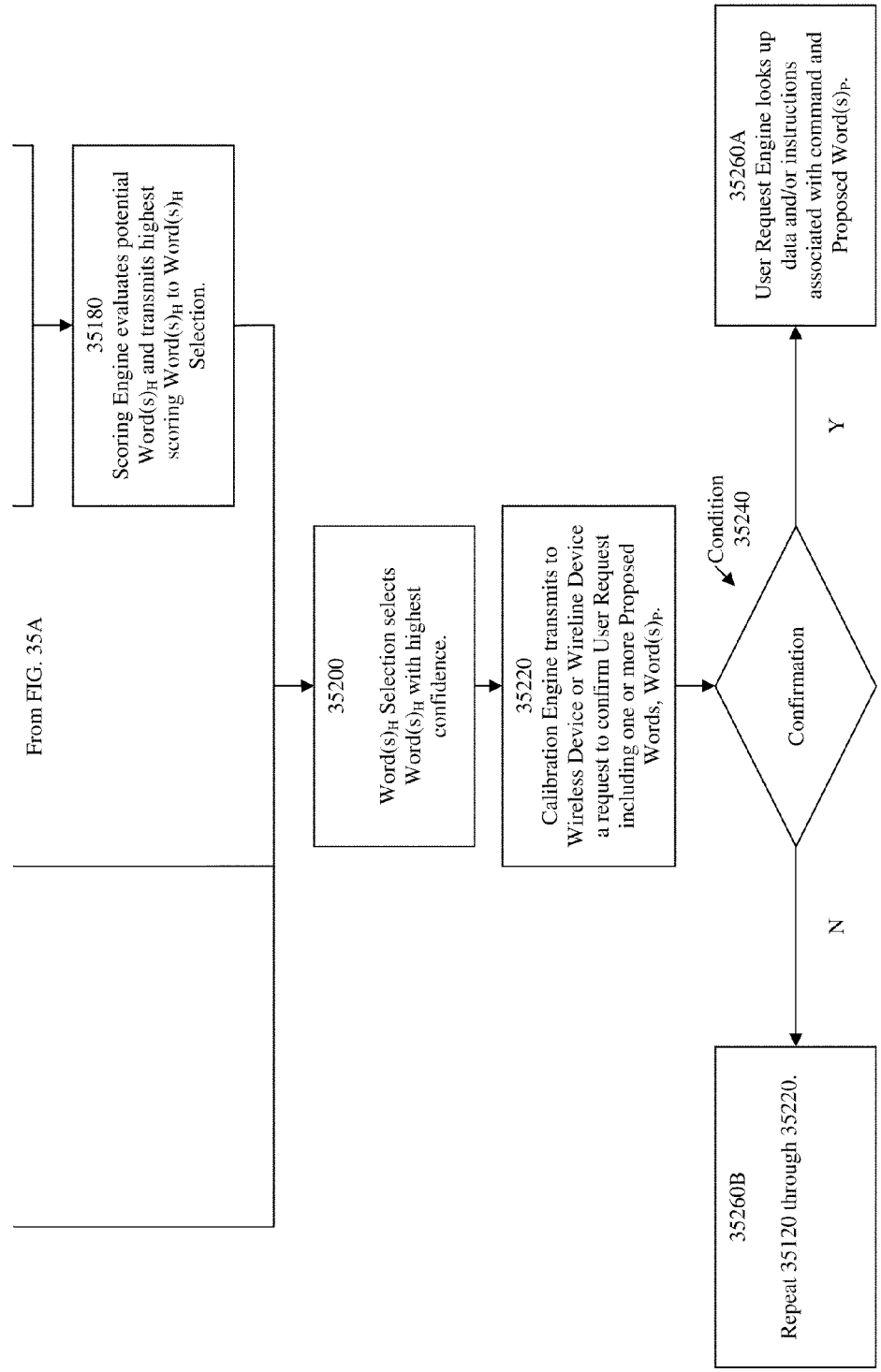
Figure 36:
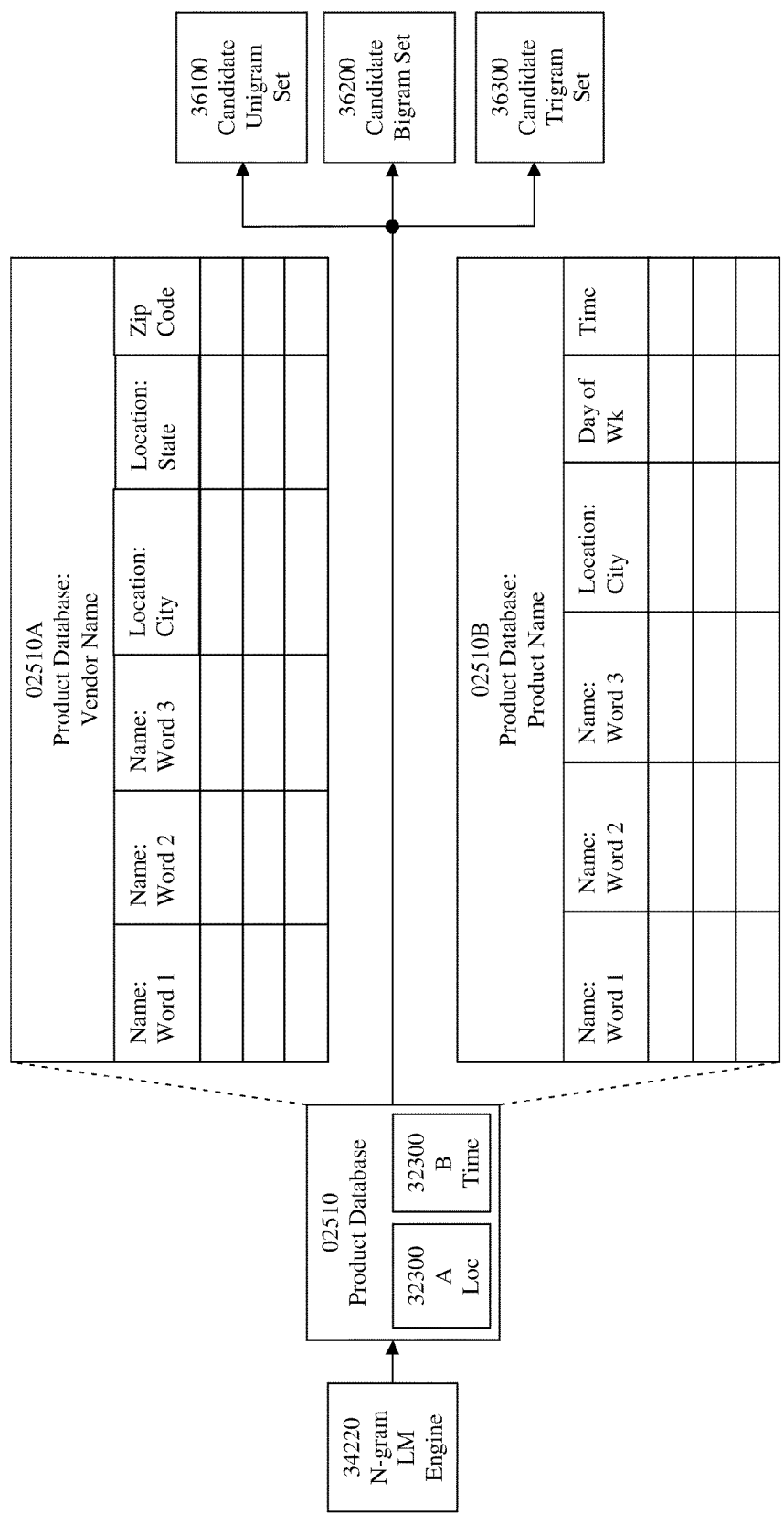
FIG. 36 depicts an exemplary method generating a vocabulary of candidate word sequences representing the name of the vendor, product, and/or product category of interest, according to some embodiments.
Figure 38:
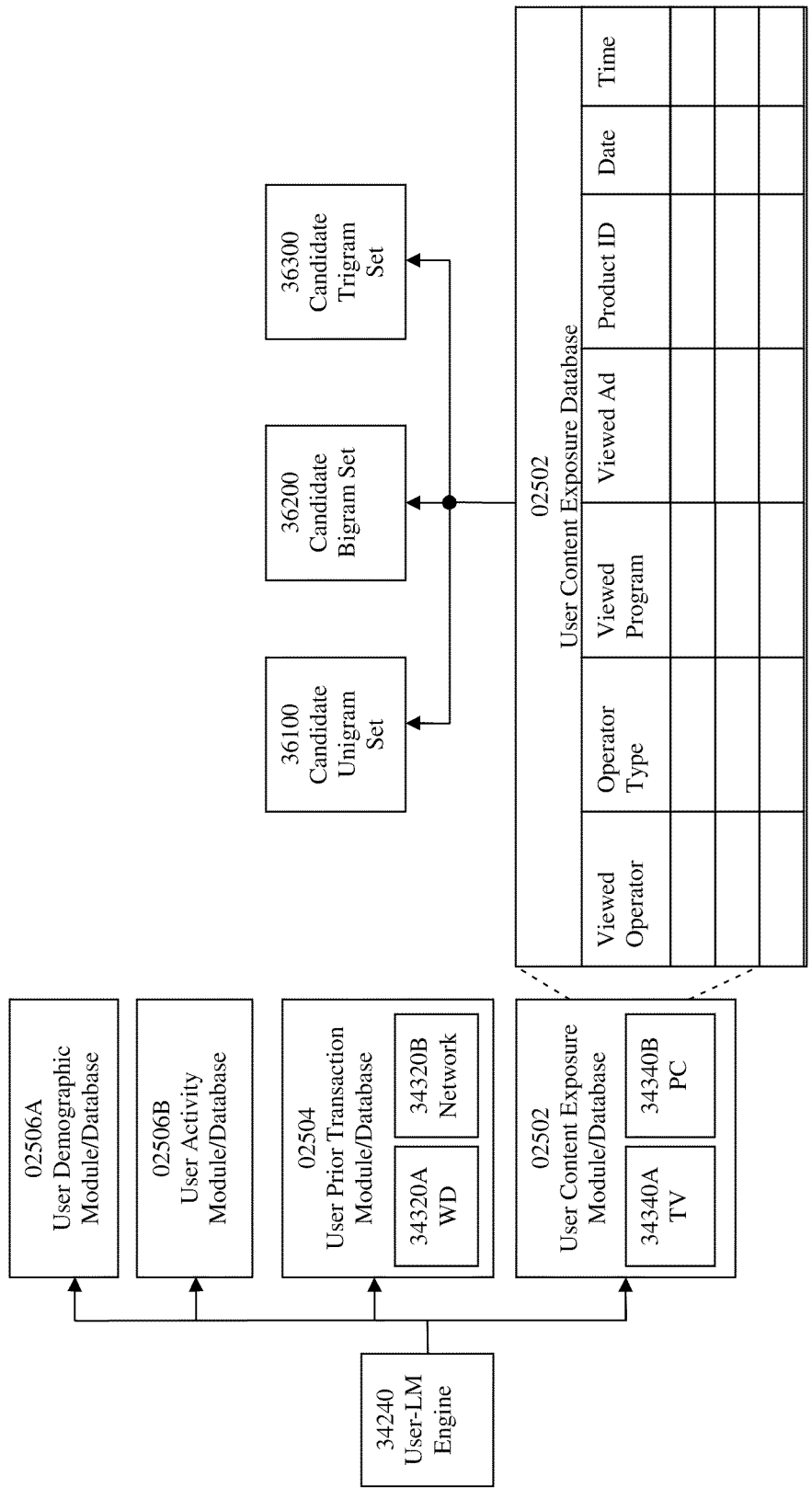
FIG. 38 depicts an exemplary method generating a vocabulary of candidate word sequences related to content actually and/or likely viewed by the user speaking, according to some embodiments.
Figure 40:
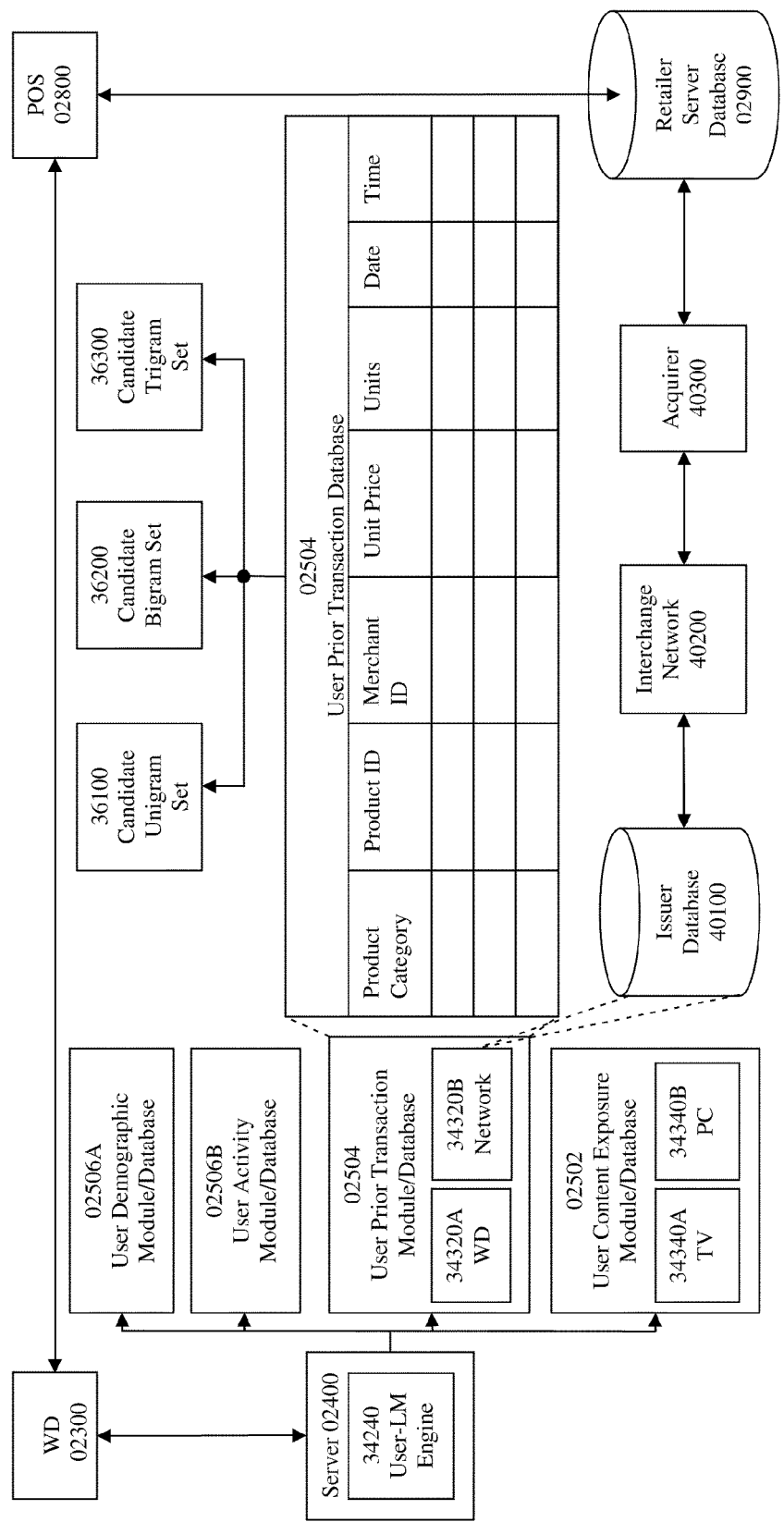
FIG. 40 depicts an exemplary method generating a vocabulary of candidate word sequences related to prior transactions executed by the user speaking, according to some embodiments.
Figure 42:
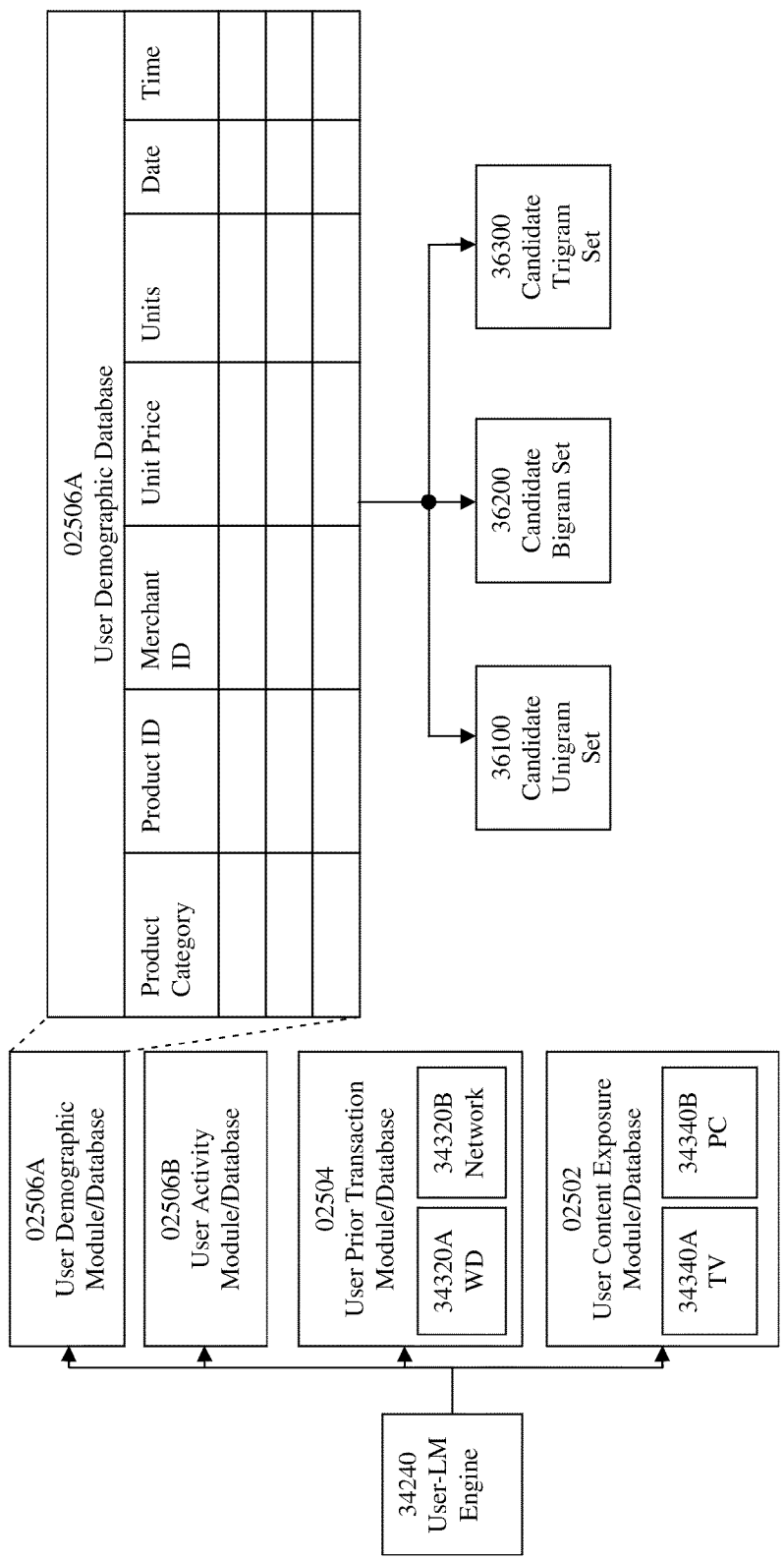
FIG. 42 depicts an exemplary method generating a vocabulary of candidate word sequences related to the actual and/or likely demographic characteristics of the user speaking, according to some embodiments.
Figure 44A:
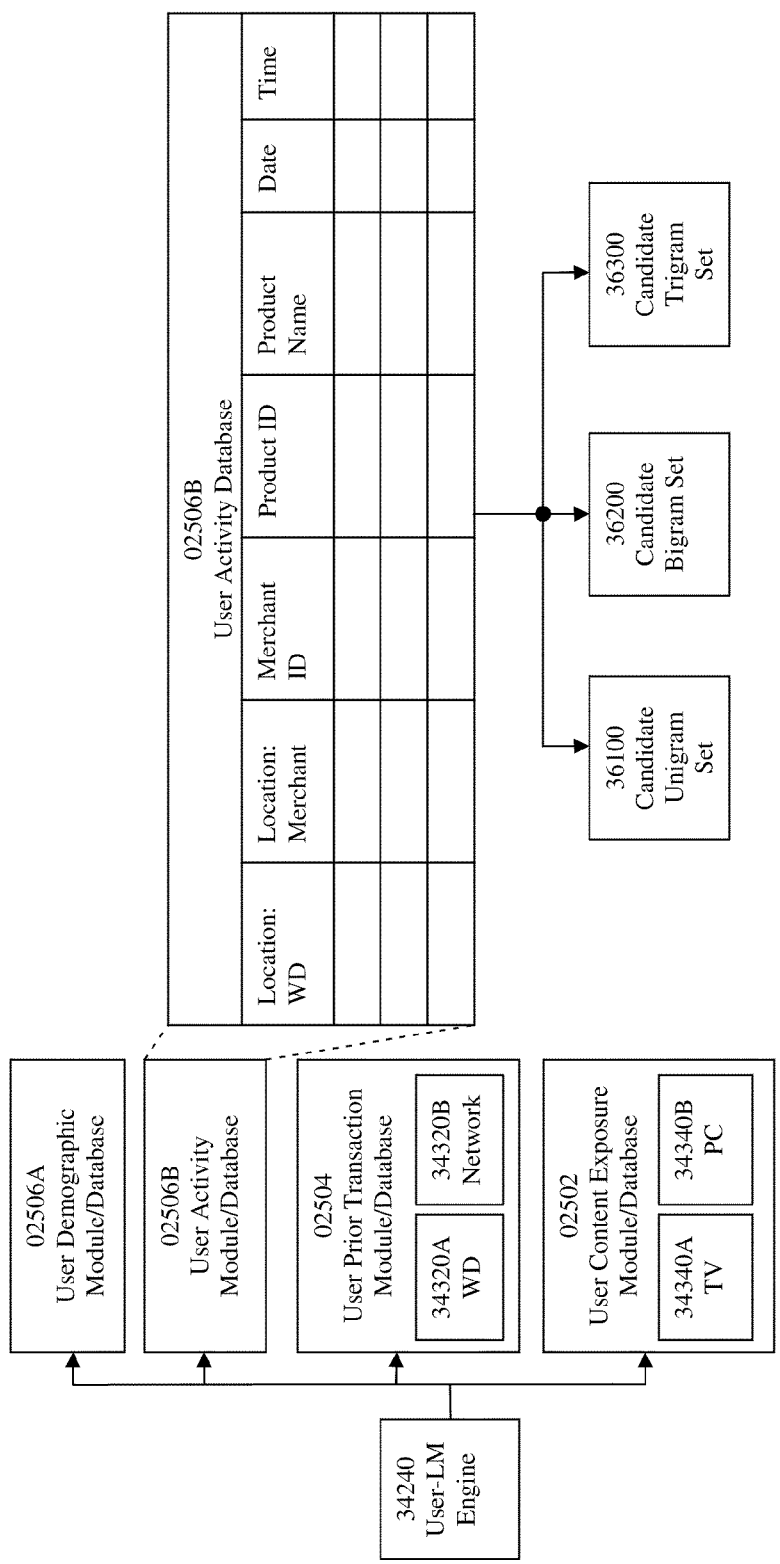
FIG. 44A depicts an exemplary method generating a vocabulary of candidate word sequences related to the actual and/or likely activities of the user speaking, according to some embodiments.
Figure 44B:
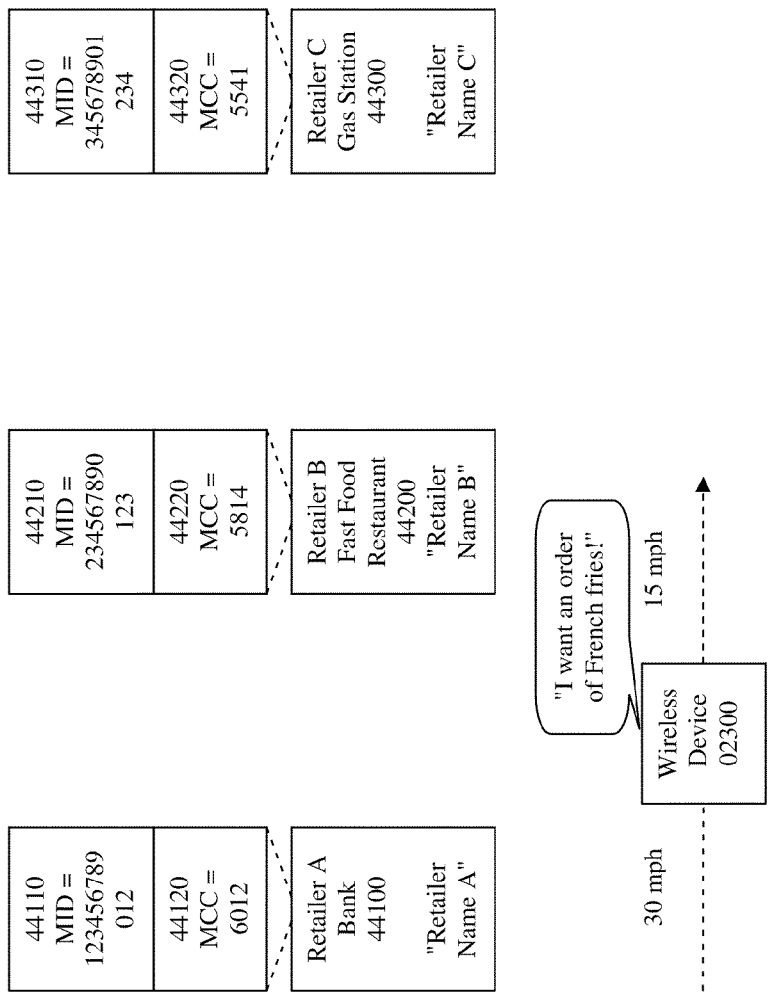
FIG. 44B depicts an example of user speech related to location of potential stimuli of the speech content, according to some embodiments.
Figure 46:
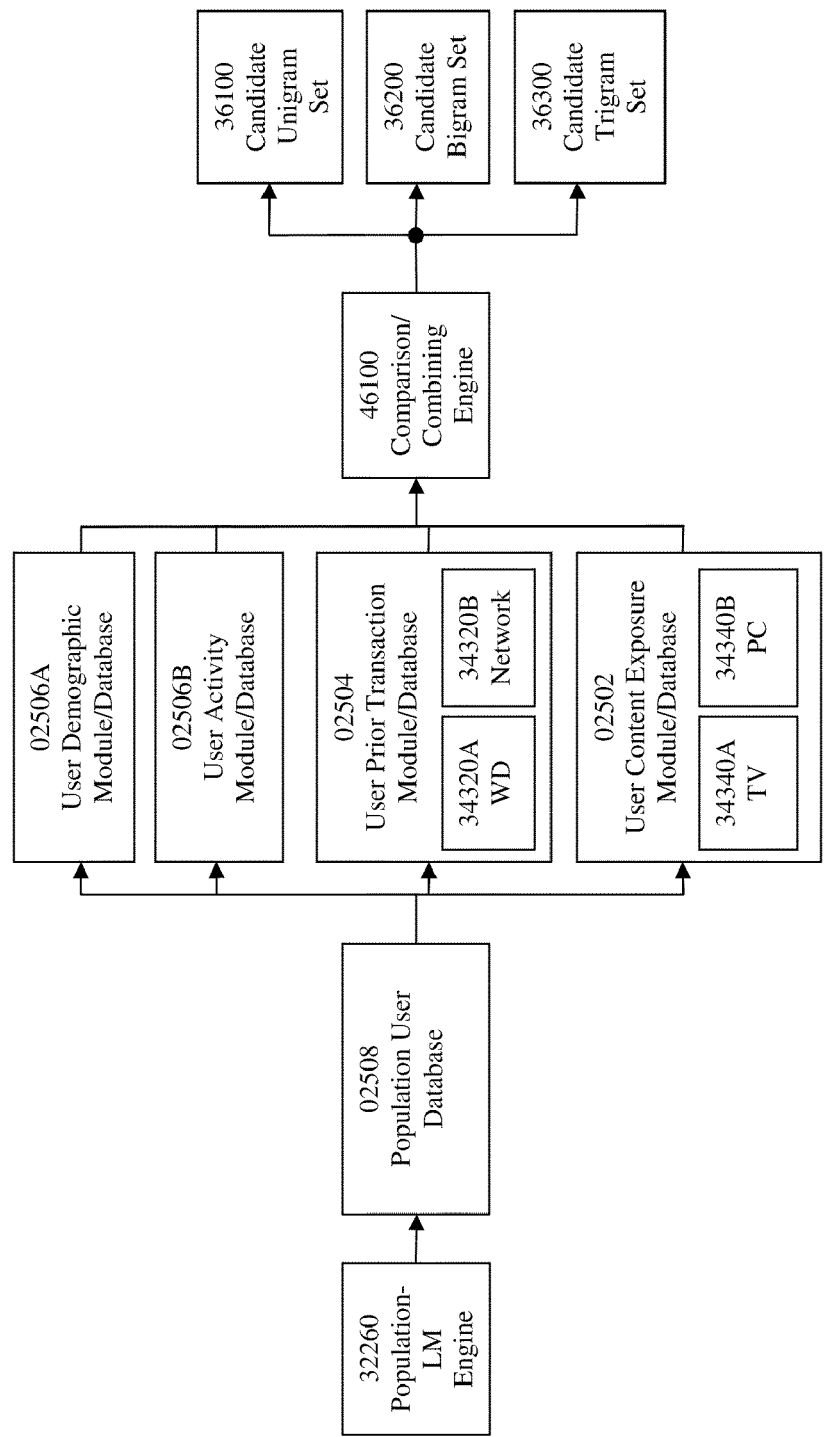
FIG. 46 depicts an exemplary method generating a vocabulary of candidate word sequences related to the actual and/or likely actions and/or characteristics of a population of users related to the user speaking, according to some embodiments.

FIGS. 35A and 35B depict a flowchart of an exemplary Method 35000 enabling the adaptation of a language model based on a variety of data related to one or more media devices and the user viewing the media device, according to some embodiments. The flowchart refers to the system and structures depicted in FIGS. 34A, 34B, and/or 34C. However, the method is not limited to those embodiments. The method can implement the steps described herein by utilizing a subset of the components, or additional, related, alternative, and/or equivalent components depicted in FIGS. 34A, 34B, and/or 34C. The method can execute a subset of the steps, the steps in different order, and/or other or additional related or equivalent steps.

At 35100, Wireless Device 02300 or Wireline Device 02302 can transmit a signal representing an User Request. In one embodiment, the User Request can include a Command and a Promoted Object. In another embodiment, the User Request can include one or more word sequences representing a Promoted Object. In another embodiment, the User Request can include one or more word sequences representing words other than a Command and/or a Promoted Object. While Method 35000 teaches how a Server 02400 can execute Method 35000, it is not limited to that embodiment. Any one or more Data Processing Systems 01000 can execute Method 35000.

At 35120, a computer program product and/or a device can transmit the audio signal to one or more computer program products which can perform acoustic model to generate representations of the observed acoustic data. After executing the acoustic model, Method 35000 can execute one or more language models. While Method 35000 teaches the serial processing of an acoustic model and a language model, it is not limited to that embodiment. Method 35000 can process a plurality of models in parallel.

At 35140A, ASR: G-LM 34200 can decode the speech input and generate one or more hypothesized word sequences G-LM ASR Word$_H$.

At 35140B, N-gram LM Engine 34220, which can decode the speech input and generate one or more hypothesized word sequences N-gram LM ASR Word$_H$.

At 35140C, the computer program product and/or a device can transmit the audio signal to User-Specific LM Engine 34240, which can decode the speech input and generate one or more hypothesized word sequences User-LM ASR Word$_H$ by executing the following steps, including, but not limited to: (1) generating a vocabulary drawn from one or more modules, which can include, but are not limited to: (a) User Content Exposure 02502; (b) User Prior Transaction 02504; (c) User Activity 02506B; and/or (d) User Demographic 02506A; (2) utilizing a Scoring Engine 34400 to generate a matching score and/or combined matching score; and/or (3) generating one or more hypothesized word sequences.

User Content Exposure 02502 module can: (1) identify actual and/or likely Programming and/or Advertisements displayed on any Media Device to which the user of Wireless Device 02300 or Wireline Device 02302 has been exposed over any given time period; and/or (2) generate a vocabulary of candidate word sequences associated with the Programming and/or Advertisement.

User Prior Transaction 02504 module can: (1) identify actual and/or likely products purchased by the user of Wireless Device 02300 or Wireline Device 02302 over any given time period; and/or (2) generate a vocabulary of candidate word sequences associated with the products purchased. The candidate word sequences can represent any data related to the products purchased, including, but not limited to: (1) the actual products purchased; (2) the products associated with the products purchased; and/or (3) any word sequences associated with the products purchased.

User Activity 02506B module can: (1) identify actual and/or likely actions related to word sequences likely to be included in an User Request of the user of Wireless Device 02300 or Wireline Device 02302 over any given time period; and/or (2) generate a vocabulary of candidate word sequences associated with the actions.

User Demographic 02506A module can: (1) identify actually and/or likely qualities related to word sequences likely to be included in an User Request of the user of Wireless Device 02300 or Wireline Device 02302 over any given time period; and/or (2) generate a vocabulary of candidate word sequences associated with the qualities.

At 35160C, User Specific LM Engine 34240 can decode the speech input and generate one or more hypothesized word sequences User-LM ASR Word$_H$.

At 35140D, the computer program product and/or a device can transmit the audio signal to Population Engine Language Model 34260, which can decode the speech input and generate one or more hypothesized word sequences Population-LM ASR Word$_H$.

At 35160D, Population LM Engine 34260 can decode the speech input and generate one or more hypothesized word sequences Population-LM ASR Word$_H$.

At 35180, Scoring Engine 34400 can generate: (1) one or more matching scores from each module; and/or (2) a combined matching score from a plurality of modules.

Scoring Engine 34400 can generate: (1) a matching score from User Content Exposure 02502 module by matching any speech input and/or representation of the speech input against the vocabulary and/or hypothesized word sequences generated by User Content Exposure 02502 module; (2) a matching score from User Prior Transaction 02504 module by matching any speech input and/or representation of the speech input against the vocabulary and/or hypothesized word sequences generated by User Prior Transaction 02504 module; (3) a matching score from User Activity 02506B module by matching any speech input and/or representation of the speech input against the vocabulary and/or hypothesized word sequences generated by User Activity 02506B module; (4) a matching score from User Demographic 02506A module by matching any speech input and/or representation of the speech input against the vocabulary and/or hypothesized word sequences generated by User Demographic 02506A module; and/or (5) a matching score from Population User 02508 module by matching any speech input and/or representation of the speech input against the vocabulary and/or hypothesized word sequences generated by Population User 02508 module.

For example, assume that an User of Wireless Device 02300 says, "Wii console." A typical ASR system can generate the following set of phonemes: "w iy k aa n s ow l." However, depending on a variety of factors, e.g., accent, the typical ASR system can instead generate: (1) the set of phonemes "w iy k ae n s eh l" which represents the word sequence "we can sell"; or (2) the set of phonemes "w iy k ae n s ow l" which represents the word sequence "we can soul".

Scoring Engine 34400 can match the phoneme set against the vocabularies generated by each User-Specific module to generate one or more hypothesized word sequences User-LM ASR Word$_H$. For example, User Content Exposure 02502 module can generate a vocabulary of word sequences associated in Advertisements or Programming to which the user of Wireless Device 02300 or Wireline Device 02302 was exposed and estimate the probability of "Wii console" or "we console" and contrast those probabilities against the probabilities of "we can sell" or "we can soul." If there is no product or brand with the name "we can sell" or "we can soul" and there is a product with the name "Wii console" and if the user was recently exposed to one or more Advertisements promoting "Wii console," Scoring Engine 34400 can attribute a higher probability to the word sequence "Wii console" than the word sequence "we can sell" or "we can soul."

In another example, User Prior Transaction 02504 module can generate a vocabulary of word sequences associated with transactions executed by the user of Wireless Device 02300 or Wireline Device 02302 over any given time period. If the user recently purchased a video game player, e.g., a Wii console, Scoring Engine 34400 can attribute a higher probability to the word sequence "Wii Fit" describing a video game application than the word sequence "we fit."

In another example, User Activity 02506B module can generate a vocabulary of word sequences associated with actions executed by the user of Wireless Device 02300 or Wireline Device 02302 over any given time period. If the user executed actions, e.g., searched for video game players or purchased a video game title, Scoring Engine 34400 can attribute a higher probability to the word sequence "Wii console" than the word sequence "we can sell" or "we can soul."

In another example, User Demographic 02506A module can generate a vocabulary of word sequences associated with qualities associated with the user of Wireless Device 02300 or Wireline Device 02302. If the user, e.g., is a male in an age group most likely to use or purchase a video game player, Scoring Engine 34400 can attribute a higher probability to the word sequence "Wii console" than the word sequence "we can sell" or "we can soul."

The benefits of the present system can include, but are not limited to, improving the accuracy of a speech recognition system over that utilizing a generalized language model. In a G-LM ASR 34200, the probability of the word "Wii" will be lower than the probability of the word "we." By utilizing data on any Programming or Advertisements to which an user of Wireless Device 02300 or Wireline Device 02302 can be exposed, any prior transactions executed by the user, any activities executed by the user, and/or any qualities associated with the user, a speech recognition system can attribute a higher probability to the word "Wii."

While the methods described herein teach a Scoring Engine 34400 capable of generating a matching score and/or combined matching score for one or more User-Specific LM modules, they can support a Scoring Engine 34400 capable of generating a matching score and/or combined matching score for any type of language model, including one or more language models specific to an user and/or one or more language models not specific to the user.

Scoring Engine 34400 can generate a combined matching score for any given speech input as follows:

$$\text{Score}_{COMB} = (\text{Score}_{USER\_AD} * w_1) + (\text{Score}_{USER\_TRANS} * w_2) + (\text{Score}_{USER\_ACT} * w_3) + (\text{Score}_{USER\_DEMO} * w_4) \qquad \text{Equation 2}$$

where: (1) $\text{Score}_{USER\_AD}$ is a score based on matching any representation of the speech input, e.g., a set of phonemes generated by a speech recognition system, with the closest one or more word sequences in a vocabulary generated by User Content Exposure 02502 module; (2) $\text{Score}_{USER\_TRANS}$ is a score based on matching any representation of the speech input with the closest one or more word sequences in a vocabulary generated by User Prior Transaction 02504 module; (3) $\text{Score}_{USER\_ACT}$ is a score based on matching any representation of the speech input with the closest one or more word sequences in a vocabulary generated by User Activity 02506B module; (4) $\text{Score}_{USER\_DEMO}$ is a score based on matching any representation of the speech input with the closest one or more word sequences in a vocabulary generated by User Demographic 02506A module; and (5) $w_1+w_2+w_3+w_4=1$.

The methods described herein can utilize any method to calculate distance between any representation of the speech input and any template in a language model.

The methods described herein can initialize the weights, $w_1$, $w_2$, $w_3$, and $w_4$ based on training data reflecting the importance of each variable in recognizing speech for a general population or any sub-population to which the methods described herein can assign an user of Wireless Device 02300 or Wireline Device 02302. As Server 02400 collects more data from the user and/or data reflecting the accuracy of prior attempts to recognize a given word sequence, the methods described herein can dynamically adjust the weights to place more or less emphasis on any given variable.

At 35200, $\text{Word}_H$ Selection Engine 34500 can utilizing any criteria for selecting a Proposed Word Sequence receive one or more hypothesized word sequences from one or more computer program products, e.g., ASR G-LM 34200, N-gram LM Engine 34220, User-Specific LM Engine 34240, and/or Population LM Engine 34260, and select in accordance with the criteria a Proposed Word Sequence with the highest confidence.

At 35220, a Calibration Engine can transmit to Wireless Device 02300 or Wireline Device 02302 a request to confirm an User Request including one or more of the Proposed Word Sequences. If at Condition 35240 the user indicates through any method that the Proposed Word Sequence is not the word sequence the user intended, the present system can repeat the steps specified. If the user indicates through any method that the Proposed Word Sequence is the word sequence the user intended, the present system can proceed to User Request Engine 34900, which is a computer program product capable of executing any action requested by the User Request.

3.5.1.2 Data: User Advertisement Exposure

The methods described herein can identify actual and/or likely Programming and/or Advertisements displayed on any Media Device in the vicinity of Wireless Device 02300 or Wireline Device 02302 and/or to which the user of Wireless Device 02300 or Wireline Device 02302 has been exposed over any given time period and, therefore, one or more word sequences associated with the actual and/or likely Programming and/or Advertisements displayed through one or more methods. These methods can include the following.

To identify one or more actual Programming and/or Advertisements displayed on any Media Device to which the user of Wireless Device 02300 or Wireline Device 02302 could have been exposed, the methods described herein can identify the Media Device in the vicinity of the Wireless Device 02300 or Wireline Device 02302 and the set of Programming and/or Advertisements displayed on the Media Device through a variety of methods, including, but not limited to, the following.

First, the methods described herein can identify the actual Programming and/or Advertisements displayed by a Media Device in the vicinity of Wireless Device 02300 or Wireline Device 02302 by recognizing the audio signal related to the Programming and/or Advertisements at a given time and comparing the audio signal against a database of Media Devices displaying the Programming and/or Advertisements at the time.

The present method can execute the following steps, including, but not limited to: (1) the Wireless Device 02300 or Wireline Device 02302 can utilize a Microphone 01260 to receive an audio signal transmitted by a Media Device 02200 ("Audio Sample$_{MD}$") at a given time; (2) the Wireless Device 02300 or Wireline Device 02302 can transmit over any network the Audio Sample$_{MD}$ to Server 02400 which can utilize any method to: (a) compare the audio fingerprint of the Audio Sample$_{MD}$ against a database of audio signals of Programming and/or Advertisements displayed on one or more Media Devices at the time and in the location of the Wireless Device 02300 or Wireline Device 02302; and/or (b) read the audio watermark of the Audio Sample$_{MD}$; (3) Server 02400 can generate a match identifying the most likely Programming and/or Advertisements displayed on the Media Device; (4) Server 02400 can compare the most likely Programming and/or Advertisements displayed against a database of Media Devices in the vicinity of Wireless Device 02300 or Wireline Device 02302 where the Media Device and/or any device in the network transmitting the Programming and/or Advertisements to the Media Device can write, store, and/or transmit the set of Programming and/or Advertisements displayed on the Media Device over any given time period ("Programming/Advertisement$_{MD}$"); (5) Server 02400 can lookup the database to identify the Programming/Advertisement$_{MD}$; and/or (6) Server 02400 can lookup a database to identify one or more word sequences, e.g., Promoted Objects, associated with the Programming/Advertisement$_{MD}$ and/or generate a vocabulary comprising the word sequences.

For example, Wireless Device 02300 can receive at time T$_1$ an audio signal, Programming$_1$, transmitted by Media Device$_1$, and transmit over a wireless network the Audio Sample$_{MD1}$ to Server 02400. Server 02400 can use any audio fingerprint method to identify the Audio Sample$_{MD1}$ as representing Programming$_1$, lookup a database of the Programming and/or Advertisements displayed on any given Media Device, and infer the specific Media Device$_1$ displaying the Programming$_1$. The present method can limit the query of Media Devices to those Media Devices in the vicinity of Wireless Device 02300, i.e., the area within which any method can identify the geographical location of Wireless Device 02300. If the present method can limit the number of Media Devices to a sufficiently small population of Media Devices, it can identify the Media Device$_1$. In one example, a method which can identify the geographical location of Wireless Device 02300 within 100 feet and where there are a small number of Media Devices located in the area, e.g., a suburban or rural area, can identify, e.g., three Media Devices. If one of the three Media Devices, e.g., Media Device$_1$, at time T$_1$ displayed Programming$_1$ the present method can infer that Wireless Device 02300 was in the vicinity of Media Device$_1$. Having identified Media Device$_1$, the present method can identify the actual Programming and/or Advertisements to which Wireless Device 02300 was exposed, Programming/Advertisement$_{MD1}$, during the period of time when Wireless Device 02300 was in the vicinity of Media Device$_1$. The present method can generate a vocabulary comprising one or more word sequences related to Programming/Advertisement$_{MD1}$.

Second, the methods described herein can identify the actual Programming and/or Advertisements displayed by a Media Device in the vicinity of Wireless Device 02300 or Wireline Device 02302 by identifying one or more Data Processing Systems through which a Wireless Device 02300 or Wireline Device 02302 is exchanging data with a telecom operator. In one example, a Wireless Device 02300 or Wireline Device 02302 can exchange data with a telecom operator through a modem which is connected to a modem through which a Television 02220 can receive and/or transmit signals. In the present example, the methods described herein can identify the Media Device and, therefore, the actual Programming and/or Advertisements displayed by the Media Device, in the vicinity of Wireless Device 02300 or Wireline Device 02302.

To identify one or more likely Programming and/or Advertisements displayed on any Media Device to which the user of Wireless Device 02300 or Wireline Device 02302 could have been exposed, the methods described herein can utilize a variety of methods, including, but not limited to, the following.

First, the methods described herein can identify the likely Programming and/or Advertisements displayed by a Media Device in the vicinity of Wireless Device 02300 or Wireline Device 02302 by identifying the location of Wireless Device 02300 or Wireline Device 02302 at a given time and identifying the Programming and/or Advertisements displayed on one or more Media Devices in the location.

The present method can execute the following steps, including, but not limited to: (1) any method can identify the geographical location of Wireless Device 02300 or Wireline Device 02302; (2) Server 02400 can lookup a database of Media Devices in the vicinity of Wireless Device 02300 or Wireline Device 02302; (3) Server 02400 can select the set of Media Devices within the vicinity; (4) Server 02400 can lookup the set of Programming and/or Advertisements displayed on the set of Media Devices over the time period when Wireless Device 02300 or Wireline Device 02302 was in the vicinity of the Media Devices ("Programming/Advertisement$_{MD\_SET}$"); (5) the present method can infer that the user of Wireless Device 02300 or Wireline Device 02302 was likely exposed to one or more of the Programming and/or Advertisements in Programming/Advertisements$_{MD\_SET}$; and/or (6) Server 02400 can lookup a database to identify one or more word sequences, e.g., Promoted Objects, associated with the Programming/Advertisement$_{MD\_SET}$.

Second, the methods described herein can identify the likely Programming and/or Advertisements displayed by a Media Device in the vicinity of Wireless Device 02300 or Wireline Device 02302 by recognizing the audio signal of the Programming and/or Advertisements received by a Microphone 01260 of Wireless Device 02300 or Wireline Device 02302 at a given time and inferring the Programming and/or Advertisement which stimulated the user of Wireless Device 02300 or Wireline Device to transmit an User Request.

The present method can execute the following steps, including, but not limited to: (1) the Wireless Device 02300 or Wireline Device 02302 can utilize a Microphone 01260 to receive from a nearby Media Device the Audio Sample$_{MD}$ at a given time; (2) the Wireless Device 02300 or Wireline Device 02302 can transmit over any network the Audio Sample$_{MD}$ to Server 02400 which can utilize any method to: (a) compare the audio fingerprint of the Audio Sample$_{MD}$ against a database of audio signals of Programming and/or Advertisements displayed on one or more Media Devices at the time and in the location of the Wireless Device 02300 or Wireline Device 02302; and/or (b) read the audio watermark of the Audio Sample$_{MD}$; (3) Server 02400 can generate a match identifying the most likely Programming and/or Advertisements displayed and, therefore, the Media Operator displaying the Programming and/or Advertisement, or Media Operator$_{T\_CURRENT}$, where a Media Operator is defined as the party operating the channel displaying a given Programming and/or Advertisement, which can include, but is not limited to: a cable television network; a television broadcast network; a television broadcast station; a radio broadcast network; a radio broadcast station; a satellite broadcast network; (4) Server 02400 can utilize the data identifying the Media Operator$_{T\_CURRENT}$ and applying any algorithm to infer one or more likely Media Operators$_{T\_PRIOR}$ to which the user of Wireless Device 02300 or Wireline Device 02302 was exposed; and/or (5) Server 02400 can lookup one or more Programming and/or Advertisements displayed on Media Operators$_{T\_PRIOR}$. ("Programming/Advertisement$_{T\_PRIOR}$") and generate a vocabulary comprising one or more word sequences related to one or more Programming/Advertisement$_{T\_PRIOR}$.

The present method can utilize any algorithm which can identify the set of likely Programming and/or Advertisements displayed on a given Media Device to generate a vocabulary for a speech recognition system. For example, U.S. patent application Ser. No. 12/107,649 discloses several methods which can infer the most likely Media Operators$_{T\_PRIOR}$ and/ or Programming/Advertisements$_{T\_PRIOR}$ which stimulated an user of Wireless Device 02300 or Wireline Device 02302 to transmit an User Request.

For example, when the user of Wireless Device 02300 transmits an User Request, e.g., a request to purchase tickets for a movie, "Movie XYZ," Wireless Device 02300 can receive at time $T_1$ an audio signal, Programming$_1$, transmitted by Media Device$_1$, and transmit over a wireless network the Audio Sample$_{MD1}$ to Server 02400. Server 02400 can use any audio fingerprint method to identify the Audio Sample$_{MD1}$ as representing Programming$_1$, lookup a database of the Programming and/or Advertisements displayed on any given Media Device, and infer the specific Media Operator$_{T\_CURRENT}$ displaying the Programming$_1$. Server 02400 can apply an algorithm to infer the set of most likely Programming and/or Advertisements viewed by the user of Wireless Device 02300 over any given time period, $T_{PRIOR}$. The algorithm can utilize a variety of data, including, but not limited to: (1) the word sequence in the User Request, i.e., "Movie XYZ"; (b) any data structure including data identifying the actual and/or likely Media Operator$_{T\_CURRENT}$ and/or Media Operators$_{T\_PRIOR}$; (c) any data structure including data identifying activities of the user of Wireless Device 02300 related to the Product Category "movie," e.g., any data structure utilized by User Activity 02506B module; and/or (d) any data structure including data identifying the demographic variables and/or other qualities of the user of Wireless Device 02300 related to the Product Category "movie," e.g., any data structure utilized by User Demographic 02506A module. The present method can generate a vocabulary comprising one or more word sequences related to Programming/Advertisement$_{T\_PRIOR}$.

The benefits of the present methods can include, but are not limited to, reducing the size of the vocabulary of candidate word sequences to the word sequences related to Programming/Advertisements$_{MD\_SET}$. While the present methods may or may not identify the specific Media Device in the vicinity of Wireless Device 02300 or Wireline Device 02302 when the user transmits an User Request and, therefore, the actual Programming and/or Advertisement displayed on the Media Device, the present method can reduce significantly the vocabulary size.

User Content Exposure 02502 module can include one or more data structures containing: (1) a key uniquely identifying a Programming and/or Advertisement to which the user of Wireless Device 02300 or Wireline Device 02302 was or could have been exposed; and/or (2) any data related to the Programming and/or Advertisement.

User Content Exposure 02502 module data can include, but are not limited to: (1) TV Advertisement Data, which can include data related to any Programming and/or Advertisement displayed on a Television 02220 to which the user of Wireless Device 02300 or Wireline Device 02302 was or could have been exposed; (2) PC Advertisement Data, which can include data related to any Programming and/or Advertisement displayed on a Personal Computer 02210 to which the user of Wireless Device 02300 or Wireline Device 02302 was or could have been exposed; and/or (3) Other Media Device Data, which can include data related to any Programming and/or Advertisement displayed on any Media Device 02200 other than a Television 02220 or Personal Computer 02210 to which the user of Wireless Device 02300 or Wireline Device 02302 was or could have been exposed.

User Content Exposure 02502 module data can include data related to any Programming and/or Advertisement displayed on a Media Device where the probability of the user of Wireless Device 02300 being in the vicinity of the Media Device can be a function of the location and/or change in location of Wireless Device 02300. User Location is defined as the geographical location of Wireless Device 02300 or Wireline Device 02302. The methods described herein can utilize any method to identify the geographical location. Moreover, the methods described herein can utilize a plurality of data on the User Location as a function of time to infer, inter alia, if the user of Wireless Device 02300 is traveling, the approximate velocity at which the user of Wireless Device 02300 is traveling, and/or the transportation mode utilized by the user of Wireless Device 02300. For example, if Location$_{WD}(T_1)$ is a distance from Location$_{WD}(T_2)$ greater than a given threshold, the methods described herein can infer that the user of Wireless Device 02300 is not stationary. If the distance is another threshold, the methods described herein can infer that the user of Wireless Device 02300 is probably walking or running. If the distance is yet another threshold, the methods described herein can infer that the user of Wireless Device 02300 is probably utilizing some form of transportation, which can include, but is not limited to: an automobile; a bus; a train, or a plane.

User Content Exposure 02502 module data can include, but are not limited to: (1) data related to any Programming and/or Advertisement displayed on a Media Device supplied by Content Server 02100 and/or any other Data Processing System, e.g., data supplied by an advertiser identifying one or more word sequences used in the Advertisement and/or one or more word sequences Content Server 02100 expects users of Wireless Device 02300 or Wireline Device 02302 to associate with the Promoted Object; (2) data generated or collected by Server 02400 and/or any other Data Processing System identifying one or more word sequences users of Wireless Device 02300 or Wireline Device 02302 associated with a Promoted Object, Programming, and/or Advertisement in prior User Requests and/or any other action the user takes related to the Promoted Object, Programming, and/or Advertisement; and/or (3) data retrieved from one or more databases of documents, including, but not limited to, any public database, e.g., the world wide web (WWW), and/or any nonpublic database, which can identify one or more word sequences users most commonly associated with a Promoted Object, Programming, and/or Advertisement. The methods described herein can utilize any method to identify the set of word sequences most commonly associated with a Promoted Object, Programming, and/or Advertisement.

The methods described herein can utilize the User Content Exposure 02502 module data which can be related to one or more word sequences likely to be included in an User Request of the user of Wireless Device 02300 or Wireline Device 02302 through a variety of methods, including, but not limited to, the following.

$$P(w \mid \text{u\_ad}) = \sum_{i=1}^{N} P(w \mid \text{u\_ad}_i) \qquad \text{Equation 3}$$

where the probability of a given word sequence w is a function of how frequently the word sequence w was observed in a given data structure u\_ad$_i$, where N is the number of data structures u\_ad$_i$, and where w$_i$ is the weight associated with any given data structure u\_ad$_i$.

The methods described herein can generate a set of one or more data structures u\_ad through a variety of methods.

First, the methods described herein can generate one or more data structures u_ad by including the word sequences contained in any User Ad Exposure data structure. For example, (1) a data structure u_ad$_1$ can include any word sequences related to a Programming and/or Advertisement and/or the Promoted Object promoted in an Advertisement supplied by Content Server 02100, and/or any other Data Processing System; (2) a data structure u_ad$_2$ can include any word sequences related to a Programming and/or Advertisement and/or the Promoted Object promoted in the Advertisement generated by Server 02400 and/or any other Data Processing System identifying one or more word sequences users of Wireless Device 02300 or Wireline Device 02302 associated with a Promoted Object, Programming, and/or Advertisement in prior User Requests and/or any other action the user takes related to the Promoted Object, Programming, and/or Advertisement; and/or (3) a data structure u_ad$_3$ can include any word sequences related to a Programming and/or Advertisement and/or the Promoted Object promoted in the Programming and/or Advertisement which a query of one or more databases of documents can identify users most commonly associated with a Promoted Object, Programming, and/or Advertisement.

The methods described herein can utilize a variation of Method 35000 disclosed herein to identify the word sequences in any data structure u_ad$_3$. Instead of utilizing Method 35000 to identify the word sequences one or more documents commonly associate with an advertiser, the methods described herein can utilize Method 35000 to identify the word sequences one or more documents commonly associate with a Promoted Object and/or Product Category promoted in a Programming and/or Advertisement.

The methods described herein can utilize any method to eliminate from any data structure u_ad one or more types of word sequences, e.g., common function words like "and" and "the."

Second, the methods described herein can generate one or more data structures u_tad by defining u_ad$_1$ as the set of word sequences related to Programming and/or Advertisements displayed on Media Device$_1$, e.g., Television 02220, u_ad$_2$ as the set of word sequences related to Programming and/or Advertisements displayed on Media Device$_2$, e.g., Personal Computer 02210, u_ad$_3$ as the set of word sequences related to Programming and/or Advertisements displayed on Media Device$_3$, e.g., Wireless Device 02300, u_ad$_i$ as the set of word sequences related to Programming and/or Advertisements displayed on one or more Media Devices$_i$ 02200 other than Television 02220, Personal Computer 02210, or Wireless Device 02300, and/or u_ady$_{PHY\_RETAILER}$ as the set of Candidate Words$_{PHY\_RETAILER}$, where Candidate Words$_{PHY\_RETAILER}$ is described herein. The methods described herein can utilize any method to adjust the weight w of each set of word sequences in Equation 3 to reflect the probability that the user of Wireless Device 02300 or Wireline Device 02302 was exposed to Programming and/or Advertisements displayed on any given Media Device.

Method 35000 can adjust one or more parameters through a variety of methods, including, but not limited to, the following.

Method 35000 can adjust the importance of User Ad Exposure data as a function of the Media Device displaying Programming and/or Advertisements. That is, the methods described herein can assume that the stimulus for a given User Request is more likely related to a Programming and/or Advertisement displayed on a Media Device to which the user of Wireless Device 02300 or Wireline Device 02302 is exposed at the time of the User Request, T$_{UR}$, than a Programming and/or Advertisement displayed on a Media Device to which the user is not exposed at time T$_{UR}$. For example, an user of Wireless Device 02300 can transmit an User Request related to a Promoted Object promoted in an Advertisement at time, T$_{UR}$, when the Wireless Device 02300 is in the vicinity of Television 02220, which the methods described herein can determine by comparing the audio fingerprint of an Audio Sample$_{TV}$ received by Wireless Device 02300 against a database of audio signals of Programming and/or Advertisements displayed on one or more Media Devices at the time, T$_{UR}$, and in the location of the Wireless Device 02300. Having identified the Television 02220 as the Media Device in the vicinity of Wireless Device 02300 at time T$_{UR}$, the methods described herein can utilize any method, e.g., any method disclosed in U.S. patent application Ser. No. 12/107,649, to infer the most likely Media Operators$_{T\_PRIOR}$ and/or Programming/Advertisements$_{T\_PRIOR}$ which stimulated an user of Wireless Device 02300 or Wireline Device 02302 to transmit an User Request.

Method 35000 can utilize data identifying the User Location and/or change in User Location to adjust the probability of an user of Wireless Device 02300 being in the vicinity of any given Media Device and, therefore: (1) the probability of the user exposed to Programming and/or Advertisements displayed on the Media Device; and/or (2) the probability of the user speaking in an User Request one or more word sequences related to the Programming and/or Advertisement displayed on the Media Device. The methods described herein can estimate the probability of a Wireless Device 02300 being in the vicinity of any given Media Device over any time period through a variety of methods, including, but not limited to, the following.

$$P(MD \mid u\_loc, \Delta u\_loc) = \qquad \text{Equation 4}$$
$$\left(w_1 * \sum_{i=1}^{N} P(MD \mid u\_loc_i, \Delta u\_loc = 0)\right) +$$
$$\left(w_2 * \sum_{i=1}^{N} P(MD \mid u\_loc_i, \Delta u\_loc = L)\right) +$$
$$\left(w_3 * \sum_{i=1}^{N} P(MD \mid u\_loc_i, \Delta u\_loc = H)\right)$$

where P(MD|u_loc$_i$, $\Delta$u_loc) is the probability of an user of Wireless Device 02300 being in the vicinity of a set of one or more Media Devices given the User Location and/or the change in User Location over the time periods from i=1 ... N, where u_loc$_i$ represents the User Locations of Wireless Device 02300 during the time period, T$_1$, where $\Delta$u_loc=0 represents the condition of Wireless Device 02300 being stationary or effectively stationary because the user of Wireless Device 02300 is not moving in any specific direction above a threshold over any given time period, where $\Delta$u_loc=L represents the condition of Wireless Device 02300 moving at a velocity below a threshold which the methods described herein can assume the user of Wireless Device 02300 is walking or running, where $\Delta$u_loc=H represents the condition of Wireless Device 02300 moving at a velocity above a threshold which the methods described herein can assume the user of Wireless Device 02300 is probably utilizing some form of mechanical transportation, where N is the number of time periods, and where $w_i$ is the weight associated with any given set of probable one or more Media Devices given the User Location during the time period, $T_i$, and/or change in User Location.

While Equation 4 refers to three sets of probabilities, it is not limited to that embodiment. Equation 4 can include a larger or smaller number of sets of probabilities and/or different sets of probabilities and/or conditional probabilities.

The methods described herein can assume that the probability of an user of Wireless Device 02300 speaking in an User Request one or more word sequences related to the Programming and/or Advertisement displayed on a Media Device is a function of the time period during which the user was exposed to the Media Device. For example, all other things being equal, an Advertisement displayed 15 minutes before an User Request including one or more word sequences related to a Promoted Object in the Advertisement probably had more impact stimulating the User Request than an Advertisement displayed 4 hours before the User Request, an Advertisement displayed in the same day of the User Request probably had more impact stimulating the User Request than an Advertisement displayed the day before the User Request, and so on.

The methods described herein can utilize any method to incorporate a time decay factor related to the probability that the user of Wireless Device 02300 speaks in an User Request one or more word sequences related to the Programming and/or Advertisement displayed on a Media Device in the vicinity of User Location. That is, the methods described herein can assume that the probability a Programming and/or Advertisement displayed on a Media Device in the vicinity of Wireless Device 02300 stimulates an User Request can decay as a function of time.

If Δu_loc=0, the methods described herein can assume that the set of Media Devices in the vicinity of Wireless Device 02300 is limited to Media Devices which cannot be easily moved, which can include, but are not limited to: a Television 02220 which can receive its signal from a cable and/or fixed antenna; a Personal Computer 02210 which can receive its signal from a cable and/or fixed antenna; and/or any other Media Device which cannot be easily moved. In addition, the present set of Media Devices can include devices which can be moved but can display Programming and/or Advertisements while the user of Wireless Device 02300 is stationary, which can include, but are not limited to: a Wireless Device 02300; a Radio; a Print Publication; an OOH Device; and/or a POS Device 02800, which can be paper-based or a Data Processing System located at the point-of-sale, which can include, but is not limited to, the location at which a physical product is offered for sale, e.g., an aisle in a Physical Retailer, i.e., a retailer from which the user can execute an order in person, and/or the location at which an user of Wireless Device 02300 can purchase a physical product.

If Δu_loc=L, the methods described herein can assume that the set of Media Devices in the vicinity of Wireless Device 02300 is limited to Media Devices which can display Programming and/or Advertisements an user of Wireless Device 02300 can view while the user is walking or running, which can include, but are not limited to: an OOH Device; a Wireless Device 02300; a Radio; and/or a Print Publication.

If Δu_loc=H, the methods described herein can assume that the set of Media Devices in the vicinity of Wireless Device 02300 is limited to Media Devices which can display Programming and/or Advertisements an user of Wireless Device 02300 can view while the user is probably utilizing some form of transportation, which can include, but are not limited to: a Television 02220 located in the form of transportation, e.g., a Television 02220 in an automobile which can receive its signal wirelessly; a Personal Computer 02210, e.g., a portable computer, which can receive its signal wirelessly; a Wireless Device 02300; a Radio, a Print Publication, and/or an OOH Device.

The methods described herein can utilize a variety of data related to User Location, including, but not limited to, u_loc$_i$ and/or Δu_loc, to generate a set of one or more data structures u_ad(u_loc$_i$, Δu_loc). After identifying the set of actual and/or probable Media Devices in the vicinity of Wireless Device 02300 and/or Wireline Device 02302, the methods described herein can generate the set of actual and/or probable Programming/Advertisements$_{MD}$ displayed on the Media Devices by utilizing any method, e.g., any method disclosed in U.S. patent application Ser. No. 12/107,649.

In one example, the methods described herein can infer that the user of Wireless Device 02300 is at an User Location equal to the residence of the user and Wireless Device 02300 is stationary. Method 35000 can execute the following steps, including, but not limited to: (1) assume the set of Media Devices 02200 in the vicinity of Wireless Device 02300 is equal to the Media Devices 02200 located at the user residence, e.g., one or more Televisions 02220, one or more Personal Computers 02210, one or more Radios, one or more Print Publications, one or more Wireline Devices 02302, and/or Wireless Device 02300; (2) assume the set of actual and/or probable Programming/Advertisements$_{MD}$ includes the Programming and/or Advertisements actually and/or probably viewed by the user of Wireless Device 02300 or Wireline Device 02302 on the Media Devices identified in the prior (1); and/or (3) generate a vocabulary of candidate word sequences associated with the set of actual and/or probable Programming/Advertisements$_{MD}$. For example, if Wireless Device 02300 is located at the user residence, the methods described herein can generate a vocabulary of candidate word sequences associated with the set of actual and/or probable Programming/Advertisements$_{MD}$ displayed on one or more Televisions 02220 and Personal Computers 02210 at the user residence.

In another example, the methods described herein can infer that the user of Wireless Device 02300 is at an User Location away from the residence of the user and Wireless Device 02300 is stationary. Method 35000 can execute the following steps, including, but not limited to: (1) assume the set of Media Devices in the vicinity of Wireless Device 02300 is equal to the Media Devices located at the User Location away from the user residence, e.g., one or more Print Publications, one or more OOH Devices at the User Location at any given time $T_{USER\_LOC}$, and/or Wireless Device 02300; (2) assume the set of actual and/or probable Programming/Advertisements$_{MD}$ includes the Programming and/or Advertisements actually and/or probably viewed by the user of Wireless Device 02300 on the Media Devices identified in the prior (1); and/or (3) generate a vocabulary of candidate word sequences associated with the set of actual and/or probable Programming/Advertisements$_{MD}$. For example, if Wireless Device 02300 is located in an urban neighborhood with one or more OOH Devices, e.g., billboards, the methods described herein can generate a vocabulary of candidate word sequences associated with the set of actual and/or probable Programming/Advertisements$_{MD}$ displayed on the billboards, one or more Print Publications, and/or Wireless Device 02300.

In another example, the methods described herein can infer that the user of Wireless Device 02300 is at an User Location away from the residence of the user and Wireless Device 02300 is running. The methods described herein can assume the same set of Media Devices, assume the same set of actual and/or probable Programming/Advertisements$_{MD}$, and generate the same vocabulary as those in the prior example, except the word sequences associated with any actual and/or probable Programming/Advertisements$_{MD}$ displayed in any Print Publications.

In another example, the methods described herein can infer that the user of Wireless Device 02300 is at an User Location away from the residence of the user and Wireless Device 02300 is probably utilizing a form of transportation, e.g., an automobile. Method 35000 can execute the following steps, including, but not limited to: (1) assume the set of Media Devices in the vicinity of Wireless Device 02300 is equal to the Media Devices located in the automobile, e.g., one or more Print Publications, one or more OOH Devices at the User Location at any given time T$_{USER\_LOC}$, and/or Wireless Device 02300; (2) assume the set of actual and/or probable Programming/Advertisements$_{MD}$ includes the Programming and/or Advertisements actually and/or probably viewed by the user of Wireless Device 02300 on the Media Devices identified in the prior (1); and/or (3) generate a vocabulary of candidate word sequences associated with the set of actual and/or probable Programming/Advertisements$_{MD}$. For example, if a Wireless Device 02300 is moving along a highway where a data structure accessed by Server 02400 shows that there are n number of OOH Devices, e.g., billboards, the methods described herein can generate a vocabulary of candidate word sequences associated with the set of actual and/or probable Programming/Advertisements$_{MD}$ displayed on one or more Print Publications, Wireless Device 02300, and the highway billboards.

Identifying the User Location and/or change in User Location can increase the probability of the user of Wireless Device 02300 speaking in an User Request one or more word sequences related to the displayed Programming and/or Advertisement. However, identifying the User Location and/or change in User Location does not necessarily cause the w$_i$ to equal 100% for the given User Location and change in User Location. An user of Wireless Device 02300 can be influenced by a plurality of Programming and/or Advertisements displayed on a plurality of Media Devices in deciding what word sequences to include in an User Request. For example, assume that Wireless Device 02300 is in an automobile on a highway passing a billboard promoting a restaurant at an upcoming exit. While the methods described herein can infer from the User Location and change in User Location that the Wireless Device 02300 was in the vicinity of the restaurant billboard, it is not limited to inferring that the restaurant billboard is the only Advertisement stimulating an User Request including one or more word sequences specifying the name of the restaurant. The methods described herein can account for the probability that the user of Wireless Device 02300 could have been exposed to an Advertisement for the same restaurant in an Advertisement displayed on another Media Device at an earlier time, e.g., a Print Publication promoting the restaurant, a Television 02220 Advertisement promoting the restaurant, and/or a Personal Computer 02210 Advertisement offering a coupon redeemable at the restaurant.

Method 35000 can also define P(MD|u_loc$_i$, Δu_loc) as the probability of an user of Wireless Device 02300 being in the vicinity of a set of Media Devices and Physical Retailers given the User Location and the change in User Location. In some embodiments, the probability of an user of Wireless Device 02300 or Wireline Device 02302 speaking one or more word sequences related to a Promoted Object is assumed to relate to the exposure of the user to one or more Programming and/or Advertisements promoting the Promoted Object. In some embodiments, the probability of an user of Wireless Device 02300 speaking one or more word sequences related to a Promoted Object can also be related to the exposure of the user to a store of a Physical Retailer. Most, if not all, Physical Retailers have signs depicting their names which are visible to consumers in the vicinity of a given store. When an user of Wireless Device 02300 is in the vicinity of a given store, the user can be stimulated to transmit an User Request which can include one or more word sequences related to the name of the Physical Retailer, one or more Promoted Objects offered for sale in the Physical Retailer, and/or one or more Product Categories offered for sale in the Physical Retailer ("Candidate Words$_{PHY\_RETAILER}$").

The methods described herein can utilize any method to map the location of a given store of a Physical Retailer to the User Location of the Wireless Device 02300 at any given time. If the Wireless Device 02300 is in the vicinity of a store of one or more Physical Retailers, the methods described herein can assume that the user of Wireless Device 02300 can transmit an User Request including one or more Candidate Words$_{PHY\_RETAILER}$. The methods described herein can generate a vocabulary of candidate word sequences associated with not only the set of actual and/or probable Programming/Advertisements$_{MD}$, but also the set of Candidate Words$_{PHY\_RETAILER}$.

The methods described herein can utilize any method to adjust the weight w$_1$ in Equation 2. Score$_{USER\_AD}$ can be more or less important in accurately recognizing one or more word sequences in an User Request based on a variety of variables. In one example, the probability of an user of Wireless Device 02300 or Wireline Device 02302 transmitting an User Request can be a function of the user having recently viewed a Programming and/or Advertisement for a given Promoted Object or a product in a given Product Category. The methods described herein can increase the weight w$_1$ of Score$_{USER\_AD}$ if the system can determine that the Wireless Device 02300 or Wireline Device 02302 was in the vicinity of a Media Device displaying the Programming and/or Advertisements. For example, if a Wireless Device 02300 was recently in the vicinity of Television 02220 which displayed an Advertisement promoting a printer, the methods described herein can increase the weight w$_1$ of Score$_{USER\_AD}$ to reflect the higher probability that an User Request can include the word "printer" or any related word sequences.

3.5.1.3 Data: User Activity

The methods described herein can utilize data about the activities of an user of Wireless Device 02300 or Wireline Device 02302 which can be related to one or more word sequences likely to be included in an User Request of the user of Wireless Device 02300 or Wireline Device 02302 over any given time period.

The activities of an user which can be related to potential word sequences included in an User Request ("User Activities") can include, but is not limited to, the following: (1) user queries; (2) user purchases; and/or (3) any other actions related to an User Request which are executed by the user. The User Activities can be actions executed by the user of Wireless Device 02300 or Wireline Device 02302 on: (1) the Wireless Device 02300 and/or Wireline Device 02302; and/or (2) any other Data Processing System which the methods described herein can associate with the user of Wireless Device 02300 or Wireline Device 02302, e.g., Television 02220 which the methods described herein can identify is in the vicinity of Wireless Device 02300 or Wireline Device 02302.

First, User Queries are those actions by an user of Wireless Device 02300 or Wireline Device 02302 which reflect interest in a Product Category and/or a Promoted Object. These actions can include, but are not limited to: one or more keywords inputted into a search engine; one or more requests transmitted to a human operator for information, a phone number, an address, or any other related data, e.g., a call to a party providing directory assistance; and/or any other action reflecting interest in a Product Category.

Second, User Purchases are those actions by an user of Wireless Device 02300 or Wireline Device 02302 which reflect the purchase of: (1) a product in a Product Category; and/or (2) a Promoted Object. The user can execute these purchases in any retailer, including, but not limited to: (1) a Physical Retailer; (2) an Online Retailer, i.e., a retailer from which the user can execute an order through the Internet; (3) a Mail-Order Retailer, i.e., a retailer from which the user can execute an order through the mail; and/or (4) a Phone Retailer, i.e., a retailer from which the user can execute an order through a voice channel.

The methods described herein can uniquely identify a given product specified in an User Request ("Product ID") by utilizing any system, including, but not limited to: a standard code, e.g., the universal product code (UPC), the European article numbering (EAN) system, and/or the global trade identification number (GTIN); and/or a proprietary code utilized by a given advertiser, media buyer, and/or any producer of the product.

User Purchase Data is any data structure containing data on the purchase of one or more products by an user of Wireless Device 02300 or Wireline Device 02302. The data structure can contain any data related to the purchase including at least the Product ID of the product purchased, e.g., the UPC identifying the product. User Purchase Data can be stored in any Data Processing System, including, but not limited to: (1) a POS device 02800; (2) a Data Processing System, e.g., Retailer Server 02900, operated by a retailer which can receive User Purchase Data from one or more POS Devices; (3) a Data Processing System enabling the user of Wireless Device 02300 or Wireline Device 02302 to pay for the purchase, e.g., an Acquirer 40300 processing the transaction for a retailer, a credit or debit card Interchange 40200, or an Issuer 40100 of a credit or debit card of the user; (4) an operator of a communications network, e.g., the operator of a network providing service to the user of Wireless Device 02300 which can bill the user for any purchase; and/or (5) any Data Processing System utilized by an user of Wireless Device 02300 or Wireline Device 02302, including, but not limited to, Wireless Device 02300, Wireline Device 02302, and/or Personal Computer 02210, where the Data Processing System can receive, store, process, and/or transmit User Purchase Data from any other Data Processing System, e.g., a POS Device 02800.

The methods described herein can generate, collect, receive, process, store, transmit, and/or execute any other action related to User Activities through a variety of methods, including, but not limited to, the following.

First, the methods described herein can collect keywords inputted into one or more search engines by an user of Wireless Device 02300 or Wireline Device 02302 through the search engine if the user authorizes the sharing of such data.

Second, the methods described herein can collect User Purchase Data from one or more Data Processing Systems storing the data if the user authorizes the sharing of such data. In one example, the user of Wireless Device 02300 can pay for the purchase of a product utilizing a credit or debit card and receive a receipt including at least the Product ID of any product purchased. The Wireless Device 02300 can receive the receipt from a POS Device through any method. In another example, the user of Wireless Device 02300 can authorize any party enabling the user to pay for a product, e.g., an Issuer 40100 of a credit or debit card, to provide Server 02400 to obtain access to the User Purchase Data for the purpose of generating a vocabulary of candidate word sequences based on products and/or Product Categories purchased by the user.

User Activity 02506B module data can include, but are not limited to: (1) Media Device Data, which can include data related to any action executed by the user of Wireless Device 02300 or Wireline Device 02302 on another Media Device, e.g., a Television 02220, Personal Computer 02210, or any other Media Device 02200; (2) Point of Sale (POS) Data, which can include data related to any action executed by the user of Wireless Device 02300 or Wireline Device 02302 on a POS Device 02800, e.g., data identifying the purchase of one or more products like a receipt; and/or (3) Other User Activity Data, which can include data related to any action executed by the user of Wireless Device 02300 or Wireline Device 02302 on any Data Processing System other than a Media Device or a POS Device.

The methods described herein can utilize the User Activity 02506B module data which can be related to one or more word sequences likely to be included in an User Request of the user of Wireless Device 02300 or Wireline Device 02302 through a variety of methods, including, but not limited to, the following.

$$P(w|ua) = \sum_{i=1}^{N} P(w|ua_i) \quad \text{Equation 5}$$

where the probability of a given word sequence w is a function of how frequently the word sequence w was observed in a given data structure $ua_i$, where N is the number of data structures $ua_i$, and where $w_i$ is the weight associated with any given data structure $ua_i$.

The methods described herein can generate a set of one or more data structures ua through a variety of methods.

First, the methods described herein can generate one or more data structures ua by including the word sequences contained in any User Activity data structure. For example, a data structure $ua_1$ can include any keywords inputted into one or more search engines by the user of Wireless Device 02300 or Wireline Device 02302 and/or a data structure $ua_2$ can include any names of products in text form purchased by the user of Wireless Device 02300 or Wireline Device 02302 which the methods described herein can generate by converting the UPC included in an User Purchase Data to text form.

The methods described herein can utilize a variation of Method 35000 disclosed herein to identify the word sequences contained in any data structure ua. Instead of utilizing Method 35000 to identify the word sequences one or more documents commonly associate with an advertiser, the methods described herein can utilize Method 35000 to identify the word sequences one or more documents commonly associate with any User Activity, e.g., a keyword inputted into a search engine or a Promoted Object and/or Product Category purchased by users of Wireless Device 02300 or Wireline Device 02302.

The methods described herein can utilize any method to eliminate from any data structure ua one or more types of word sequences, e.g., common function words like "and" and "the."

Method 35000 can adjust one or more parameters through a variety of methods, including, but not limited to, the following methods.

Method 35000 can adjust the importance of actions executed by the user of Wireless Device 02300 or Wireline Device 02302 as a function of time. That is, Method 35000 can assume that a recent purchase by the user of a given product which can be related to a word sequence likely to be included in an User Request will be more important than a purchase of the same product at an earlier time. For example, an user purchase of a Television 02220 at a time closer to the time of an User Request should be more likely to influence an User Request for any products related to Television 02220 than an user purchase of a Television 02220 at a much earlier time. The methods described herein can utilize any method to incorporate a time decay factor related to any product, Product Category, or any other variable related to an User Activity.

Equation 5 can adjust the importance of actions executed by the user of Wireless Device 02300 or Wireline Device 02302 as a function of the Product Category. That is, the methods described herein can assume that the purchase by the user of a product which can be related to a word sequence likely to be included in an User Request can depend on the Product Category. In one example, a Product Category with a high unit price, e.g., a house or an automobile, can have a greater importance on the probability of an User Request related to the Product Category than a Product Category with a low unit price, e.g., a can of soup. An user is more likely to conduct extensive research on a house or automobile than a can of soup and, therefore, is more likely to transmit an User Request for more information about a Product Category like a house or automobile.

Equation 5 can adjust the importance of actions executed by the user of Wireless Device 02300 or Wireline Device 02302 as a function of prior purchases of a Promoted Object and/or products in the Product Category. That is, the methods described herein can assume that an user of Wireless Device 02300 or Wireline Device 02302 is more likely to transmit an User Request related to a Promoted Object or Product Category if the user previously purchased the Promoted Object or a product in the Product Category. For example, an user who purchased a Promoted Object can be interested in products improving or extending the Promoted Object, an user who purchased a product in the Product Category can be interested in products produced by competitors. The methods described herein can identify a prior purchase of a Promoted Object and/or products in the Product Category by querying a data structure, e.g., POS Data 1534, and generate a vocabulary of candidate word sequences related to the Promoted Object and/or Product Category.

The methods described herein can utilize any method to adjust the importance of any given data structure ua in Equation 5. For example, if empirical data shows that a vocabulary based on User Purchase Data is more important than a vocabulary based on User Query Data in accurately recognizing one or more word sequences in an User Request, then the methods described herein can increase the weight w of an ua based on User Purchase Data.

The methods described herein can utilize any method to adjust the weight $w_2$ in Equation 2. $Score_{USER\_ACT}$ can be more or less important in accurately recognizing one or more word sequences in an User Request based on a variety of variables. In one example, the probability of an user of Wireless Device 02300 or Wireline Device 02302 transmitting an User Request can be a function of the user having recently transmitted an User Query related to or recently purchased a Promoted Object or a product in a given Product Category.

The methods described herein can increase the weight $w_2$ of $Score_{USER\_ACT}$ if the system can determine that the user executed the recent activities. For example, if an user of Wireless Device 02300 recently executed a number of searches for a Product Category, e.g., a printer, or recently purchased a Personal Computer 02210, the methods described herein can increase the weight $w_2$ of $Score_{USER\_ACT}$ to reflect the higher probability that an User Request can include the word "printer" or any related word sequences.

3.5.1.4 Data: User Demographic

The methods described herein can utilize data about the demographic variables of an user of Wireless Device 02300 or Wireline Device 02302 which can be related to one or more word sequences likely to be included in an User Request of the user of Wireless Device 02300 or Wireline Device 02302.

The demographic variables of an user which can be related to potential word sequences included in an User Request ("User Demographic") can include, but are not limited to, the following: (1) age; (2) gender; (3) income; (4) education; (5) ethnicity; (6) language; (7) location of residence; (8) home ownership; (9) marital status; (10) age of children in family; and/or (11) any other variable related to the demographic of an user of Wireless Device 02300 or Wireline Device 02302.

The methods described herein can utilize the User Demographic 02506A module data which can be related to one or more word sequences likely to be included in an User Request of the user of Wireless Device 02300 or Wireline Device 02302 through a variety of methods, including, but not limited to, the following.

$$P(w \mid u\_demo) = \sum_{i=1}^{N} P(w \mid u\_demo_i) \quad \text{Equation 6}$$

where the probability of a given word sequence w is a function of how frequently the word sequence w was observed in a given data structure $u\_demo_i$, where N is the number of data structures $u\_demo_i$, and where $w_i$ is the weight associated with any given data structure $u\_demo_i$.

The methods described herein can generate a set of one or more data structures u_demo through a variety of methods.

First, the methods described herein can generate one or more data structures u_demo by including one or more word sequences most commonly associated with any given User Demographic variable. That is, the methods described herein can assume that an user of Wireless Device 02300 or Wireline Device 02302 is more likely to utilize any given word sequence if the methods described herein can assign to the user to one value of the User Demographic variable over another value. The methods described herein can utilize any method of assigning a given user to category of a demographic variable, including, but not limited to: (1) the categories typically utilized by a government statistical agency, e.g., the Census Bureau; (2) the de jure categories typically utilized by an industry standards body; and/or (3) the de facto categories typically utilized in an industry, e.g., the advertising business classification of age groups like 12-24 or 18-34.

The methods described herein can utilize any method of generating a list of one or more Promoted Objects and/or Product Categories typically utilized and/or purchased by a given category of a demographic variable ("$Product_{DEMOG}$"). User Demographic 02506A module data can generate, collect, receive, process, store, and/or transmit the $Product_{DEMOG}$ data through a variety of methods, including, limited to: (1) data supplied by Content Server 02100 and/or any other Data Processing System, e.g., data supplied by Content Server 02100 identifying one or more demographic categories targeted by a given Advertisement like parents of young children for a baby product; (2) data generated or collected by Server 02400 and/or any other Data Processing System identifying one or more Products$_{DEMOG}$ observed in prior User Requests, User Activities, User Purchases, and/or any other index of user interest; (3) data retrieved from one or more databases of documents, including, but not limited to, any public database, e.g., the WWW, and/or any nonpublic database, which can identify one or more Products$_{DEMOG}$ most commonly associated with a given category of a demographic variable.

The methods described herein can utilize a variation of Method 35000 disclosed herein to identify the word sequences contained in any data structure u_demo. Instead of utilizing Method 35000 to identify the word sequences one or more documents commonly associate with an advertiser, the methods described herein can utilize Method 35000 to identify the word sequences one or more documents commonly associate with any User Demographic variable, e.g., the Product Categories typically purchased by an User Demographic variable, e.g., males 18-34.

In one embodiment, Method 35000 can execute the following steps, including, but not limited to: (1) utilize any method to identify an user of Wireless Device 02300 or Wireline Device 02302 as a parent of a child in the age category 0-1; (2) utilize any method discussed in the prior paragraph to identify one or more Products$_{DEMOG}$ typically utilized and/or purchased by users in the demographic category, parents of children of age 0-1, e.g., baby food, diapers, baby shampoo, etc.; and/or (3) generate a vocabulary of candidate word sequences associated with the Products$_{DEMOG}$, which can include, but are not limited to, Promoted Objects in the baby food Product Category, the baby food Product Category, and/or any other word sequences related to baby food, e.g., apple sauce.

The methods described herein can utilize any method to adjust the weight $w_3$ in Equation 2. Score$_{USER\_DEMO}$ can be more or less important in accurately recognizing one or more word sequences in an User Request based on a variety of variables. In one example, the probability of an user of Wireless Device 02300 or Wireline Device 02302 transmitting an User Request can be a function of the user being a member of a given demographic category. The methods described herein can increase the weight $w_3$ of Score$_{USER\_DEMO}$ if the system can determine that the user is a member of demographic category more likely to transmit a given User Request. For example, if an user of Wireless Device 02300 is a young male and the demographic category most likely to purchase a video game player is males 12-24, the methods described herein can increase the weight $w_3$ of Score$_{USER\_DEMO}$ to reflect the higher probability that an User Request can include the word sequence "video game" or any related word sequences.

3.5.1.5 N-Gram Language Model

There currently exist methods of estimating the probability of any given N-gram. For example, to estimate a tri-gram model where n=3, existing methods can use a training corpus as follows:

$$f_3(w_3|w_1,w_2)=c_{123}/c_{12}$$

where $c_{123}$ equals the frequency of the word sequence ($w_1$, $w_2$, $w_3$) and $c_{12}$ equals the frequency of the word sequence ($w_1$, $w_2$) in a given text-based training corpus.

The present application discloses a novel language model which can generate an a-priori probability of a given word sequence, $W_{SEQ}$, in an User Request. Because an User Request can include one or more word sequences related to a Promoted Object, which can include any product, brand, person, company, industry, product category, or anything else promoted in an Advertisement or Programming, a word sequence, $W_{SEQ}$, in an User Request will probably occur more frequently in a vocabulary including word sequences related to products, brands, people, companies, industries, and/or Product Categories, than in a vocabulary generated by a G-LM.

As discussed earlier, an user of Wireless Device 02300 or Wireline Device 02302 typically does not speak the name of a product, brand, commonly-known person, or company in a conversation. To the extent that an user thinks and/or speaks such a name, the methods described herein assume that the action is stimulated by exposure to a Programming and/or Advertisement referring to a Promoted Object.

Method 35000 can include a N-gram LM Engine 34220 which can generate one or more hypothesized word sequences given the speech input by generating a vocabulary drawn from a database of Promoted Objects, Product Database 02510, which is a data structure including one or more records containing actual and/or likely Promoted Objects. Method 35000 can generate likely Promoted Objects for a variety of reasons, including, but not limited to: (1) an user of Wireless Device 02300 or Wireline Device 02302 may not recall the exact Promoted Object; and/or (2) an advertiser can plan to offer a new product which is not yet the subject of an Advertisement.

The methods described herein can utilize any method to represent the probability of a given $W_{SEQ}$, including, but not limited to: (1) log probabilities; and/or (2) word sequence counts.

While the methods described herein teach the generation of a Product Database 02510 which can include a specific type of N-gram, e.g., a word pair or bi-gram, they can support the generation of a Product Database 02510 which can include uni-grams, word triples or tri-grams, or any other type of N-gram.

In addition, an User Request can include a Promoted Object which contains only one word or uni-gram for a variety of reasons, including, but not limited to: (1) an user of Wireless Device 02300 or Wireline Device 02302 may recall only a one-word brand name, but not recall the name of the product; and/or (2) a Promoted Object can be described completely by one word sequence, e.g., a Promoted Object which has the same brand name and product name. Because of the potential variance in the number of grams in a given $W_{SEQ}$ included in an User Request, the methods described herein can support the generation of a Product Database 02510 which can include a combination of uni-grams, bi-grams, tri-grams, and/or N-grams. However, to simplify the discussion, the following discussion assumes that a Product Database 02510 includes only bi-grams.

The methods described herein can utilize the data included in Product Database 02510 which can be related to one or more word sequences likely to be included in an User Request of the user of Wireless Device 02300 or Wireline Device 02302 through a variety of methods, including, but not limited to, the following.

Method 35000 can estimate the probability of a word which depends exclusively on the prior n−1 word. Method 35000 can estimate these probabilities from the observed occurrence in a text corpus or corpora:

$$P(w_n|w_{n-1})=C(w_{n-1},w_n)/C(w_{n-1}) \qquad \text{Equation 8}$$

where $C(w_{n-1},w_n)$ represents the number of times the word sequence ($w_{n-1},w_n$) appeared in a given corpus.

Method 35000 can generate a text corpus or corpora from Product Database 02510. Method 35000 can generate Word Sequences, $W_{SEQ}$, in Product Database 02510 through a variety of methods, including, but not limited to, the following.

First, Method 35000 can import into Product Database 02510 one or more W and/or $W_{SEQ}$ included in any list of Promoted Objects which it can draw from any public and/or nonpublic database. In one example, a Yellow Pages directory can include businesses which pay the directory a fee for a listing. Method 35000 can import into Product Database 02510 the names of one or more businesses in the directory.

Second, Method 35000 can import into Product Database 02510 one or more W and/or $W_{SEQ}$ generated from any query of one or more databases of documents, including, but not limited to, any public database, e.g., the WWW, and/or any nonpublic database, where the query identifies one or more names of products or brands associated with any given web site specified in the database.

Third, Method 35000 can include in Product Database 02510 one or more W and/or $W_{SEQ}$ generated by one or more of the following methods.

Method 35000 can generate one or more $W_{SEQ}$ by concatenating the following classes of W and/or $W_{SEQ}$, including, but not limited to:

(1) a Promoted Object and a noun, e.g., a brand name like "Campbell®" and a noun like "soup" or "sandwich."

(2) a Promoted Object and an adjective, e.g., a brand name like "Campbell®" and an adjective like "new," "improved," "better," and/or "deluxe."

(3) a Promoted Object and an adverb, e.g., a brand name like "Fast XYZ Delivery" and an adverb like "very."

(4) a Product Category and a $Term_{LOC}$ where is defined as any word associated with a location, including, but not limited to: (a) the name of a continent, "Europe"; (b) the name of a country; (c) the name of a region; (d) the name of a province; (e) the name of a county; (f) the name of a city or town; (g) the name of a neighborhood; and/or (h) the name of a street. For example, a $W_{SEQ}$ can be a concatenation of a Product Category, e.g., "bank," and any $Term_{LOC}$, e.g., "America," "New York," "Manhattan," or "Park Avenue" to generate the $W_{SEQ}$ "Bank of America," "Bank of New York," or "Bank of Manhattan," or "Bank of Park Avenue."

The methods described herein can concatenate a plurality of $W_{SEQ}$ in any order, e.g., "Bank of New York" or "New York Bank."

The methods described herein can utilize any method to recognize any $W_{SEQ}$ which can include one or more types of word sequences other than a Promoted Object, Product Category, noun, adjective, and/or adverb, e.g., common function words like "the" and "of."

The methods described herein can utilize any method to classify nouns, adjectives, adverbs, and/or any other type of word into topics which the methods described herein can associate with a given Promoted Object and/or Product Category. The methods described herein can reduce the size of a vocabulary by selecting only those word classes an user of Wireless Device 02300 or Wireline Device 02302 is most likely to include in an User Request related to a Promoted Object and/or Product Category. In one example, an user is more likely to include in an User Request related to a company like Campbell® a class of nouns related to food than a class of nouns related to automobiles. An user is more likely to use words like "soup" or "sandwich" in an User Request related to Campbell® than words like "tire" or "gasoline." In another example, an user is more likely to include in an User Request related to a Product Category adjectives with a positive connotation like "new" or "improved" than words with a negative connotation like "old" or "worse."

The methods described herein can utilize any method to generate topic models, including, but not limited to: Latent Semantic Analysis (LSA); Probabilistic Latent Semantic Analysis (PLSA); and/or Hidden Markov Model (HMM) with Latent Dirichlet Allocation (LDA), the combination of which is HMM-LDA.

In one embodiment, the methods described herein can include Method 35000, which can generate for any given Promoted Object and/or Product Category a set of noun classes an user of Wireless Device 02300 or Wireline Device 02302 is most likely to include in an User Request related to the Promoted Object and/or Product Category. Method 35000 can execute the following steps, including, but not limited to: (1) associate with a Promoted Object one or more set of public and/or nonpublic documents, which can include, but are not limited to: (a) the URL of the home page and/or other web pages of Content Server 02100; (b) the results of web pages related to an advertiser generated by a search of web pages; and/or (c) the results of nonpublic documents related to an advertiser generated by a search of a nonpublic database; (2) utilize any method to identify one or more syntactic categories, e.g., nouns, in one or more documents associated with an advertiser; and/or (3) extract and/or write to Product Database 02510 the word sequences in one or more syntactic categories, e.g., nouns, appearing in the documents associated with an advertiser, where the methods described herein can utilize any threshold for counting the frequency of the word sequences in a document, e.g., any word appearing more than once in a document or set of documents. For example, Method 35000 can execute the following steps, including, but not limited to: (1) receive from Content Server 02100, e.g., Campbell®, the set of public documents, e.g., the home page and/or any web pages listing the Promoted Objects related to any Advertisement transmitted by Campbell® to any user of Wireless Device 02300 or Wireline Device 02302; (2) identify a syntactic category, e.g., nouns like "soup," "juice," "tomato," and/or "sauce"; and/or (3) extract and/or write to one or more records in Product Database 02510 associated with Campbell® the nouns appearing in the documents.

Existing N-gram language models are typically static. The present application includes a novel method of adapting the N-gram LM Engine 34220 to reflect dynamic conditions. To enable the dynamic adaptation of N-gram LM Engine 34220, Method 35000 can include in Product Database 02510 one or more modules, which can include, but are not limited to: (a) Location 34300A; and/or (b) Time 34300B. In one embodiment, these modules can be a computer program product capable of filtering Product Database 02510 to generate a set of records for which a variable equals a given value. For example, Location 34300A module can be a computer program product capable of filtering Product Database 02510 to generate a set of records for which a variable equals a location which is equal to the User Location. In another embodiment, these modules can be a computer program product capable of generating dynamically a set of $W_{SEQ}$ which can concatenate a word, e.g., a Product Category, and any word sequence identifying an User Location. For example, if Method 35000 identifies the word sequence mapped to User Location as "Paris, France" it can dynamically generate a set of $W_{SEQ}$ concatenating one or more words, e.g., any Product Category, and the word, "Paris." In the present example, Location 34300A module can dynamically generate a set of $W_{SEQ}$ which includes "Paris bank," "Paris restaurant, "Paris hardware," and/or "Paris post office."

The benefits of a Scoring Engine 34400 capable of calculating a word probability which can combine a plurality of models and/or a Word$_H$ Selection Engine 34500 capable of selecting a Proposed Word Sequence from hypothesized word sequences identified from a plurality of models, including, but not limited to, an User-Specific LM Engine 34240; and a N-gram LM Engine 34220, can include, but are not limited to the following.

User-Specific LM Engine 34240 can increase the probability of recognizing out-of-vocabulary (OOV) word sequences, which can result from a variety of factors, including, but not limited to: (1) error in identification by: (a) User Content Exposure 02502 module, e.g., Method 35000 can inaccurately identify the set of Programming and/or Advertisements displayed by Media Devices in the vicinity of Wireless Device 02300 or Wireline Device 02302; (b) User Activity 02506B module, e.g., Method 35000 can inaccurately identify the User Activities; and/or (c) User Demographic 02506A module, e.g., Method 35000 can inaccurately identify the value of a demographic variable for the user of Wireless Device 02300 or Wireline Device 02302; and/or (2) an user of Wireless Device 02300 or Wireline Device 02302 transmitting an User Request unrelated to a Programming and/or Advertisement.

By enabling the Scoring Engine 34400 to calculate a word probability based on combining the User-Specific LM Engine 34240 and the N-gram LM Engine 34220 and/or the Word$_H$ Selection Engine 34500 to select a Proposed Word Sequence from hypothesized word sequences identified from the User-Specific LM Engine 34240 and the N-gram LM Engine 34220, Method 35000 can both: (1) increase the accuracy of recognizing a speech input if the user speech input is related to one or more of the modules in User-Specific LM Engine 34240; and/or (2) decrease the error rate from relying on the G-LM ASR 34200 if the User Request is unrelated to a Programming and/or Advertisement.

3.5.1.6 Generalized Language Model

Method 35000 can utilize a generalized language model (G-LM) to provide robustness against errors in the prior methods disclosed. The application of a G-LM is well-known to a person skilled in the relevant art.

There currently exist methods, e.g., the cache model, which assume that a word sequence occurring recently in a document is more likely to be used than the frequency of the word sequence in the language. While methods like the cache model have proven effective in recognizing certain types of speech, these methods may not be applicable to cases where an user of Wireless Device 02300 or Wireline Device 02302 transmits one or more User Requests infrequently or irregularly.

The present application includes a novel method which can estimate the probability of a word sequence by evaluating its recent frequency of use across a plurality of users of Wireless Device 02300 or Wireline Device 02302. Existing methods for a speaker-dependent system utilizing a cache model evaluates the n most recently used words by a given speaker. The present method can write to a cache the words most recently used by a plurality of users of Wireless Device 02300 or Wireline Device 02302 exposed to a given Programming or Advertisement during a given time period, which is defined as Word(User Request$_i$) where i is the Programming or Advertisement stimulating the User Request. For example, Server 02400 which can receive User Requests from a plurality of users of Wireless Device 02300 or Wireline Device 02302 can write to a cache one or more Word(User Request$_i$). The present method can apply the same formula as an exemplary cache model.

There currently exist methods of creating social communities in which users can comment on a given Programming and/or Advertisement. However, an user of a Wireless Device 02300 or Wireline Device 02302 can find it easier and more natural to speak one or more word sequences, instead of typing text, representing an User Comment related to a given Programming and/or Advertisement.

3.5.2 Application in Special Case

The methods described herein can utilize the systems, methods, and computer program products described in FIG. 34-46 in the special case of a Programming and/or Advertisement displayed on a Media Device while an user of Wireless Device 02300 or Wireline Device 02302 is viewing a Programming, e.g., a game show, a reality program, a talk show, or a sports broadcast.

Wireline Device 02302, which the present system can include since an user of Wireline Device 02302 can also interact with a Media Device in viewing a Programming, e.g., a game show, a reality program, a talk show, or a sports broadcast, and transmitting an User Request in response to a Programming and/or Advertisement displayed.

The number of Advertisements displayed on a Media Device, e.g., Television 02220, to which an user of Wireless Device 02300 or Wireline Device 02302 is exposed can be limited to the Advertisements displayed during the Programming. Particularly if the Programming includes a stimulus inviting the user of Wireless Device 02300 or Wireline Device 02302 to transmit an User Request during the Programming, the number of Promoted Objects to which an User Request can refer can be limited. Limiting the number can reduce the probability of error in recognizing one or more word sequences in an User Request.

The vocabulary of Product Database 02510 can be limited to the Promoted Objects and/or Product Categories promoted during the Program and/or any word sequences related to the Promoted Objects and/or Product Categories.

If an user of Wireless Device 02300 or Wireline Device 02302 transmits responses to a plurality of Event E$_n$s presented by a Programming, the present method can collect a plurality of Target Phonemes associated with the user. Because a phoneme can be associated with different feature vectors from the same speaker depending on a variety of factors like the physical condition of the speaker, the present method can utilize Target Phonemes collected more recently, e.g., during the same Programming, from an user of Wireless Device 02300 or Wireline Device 02302 in recognizing a speech input.

Figure 48:
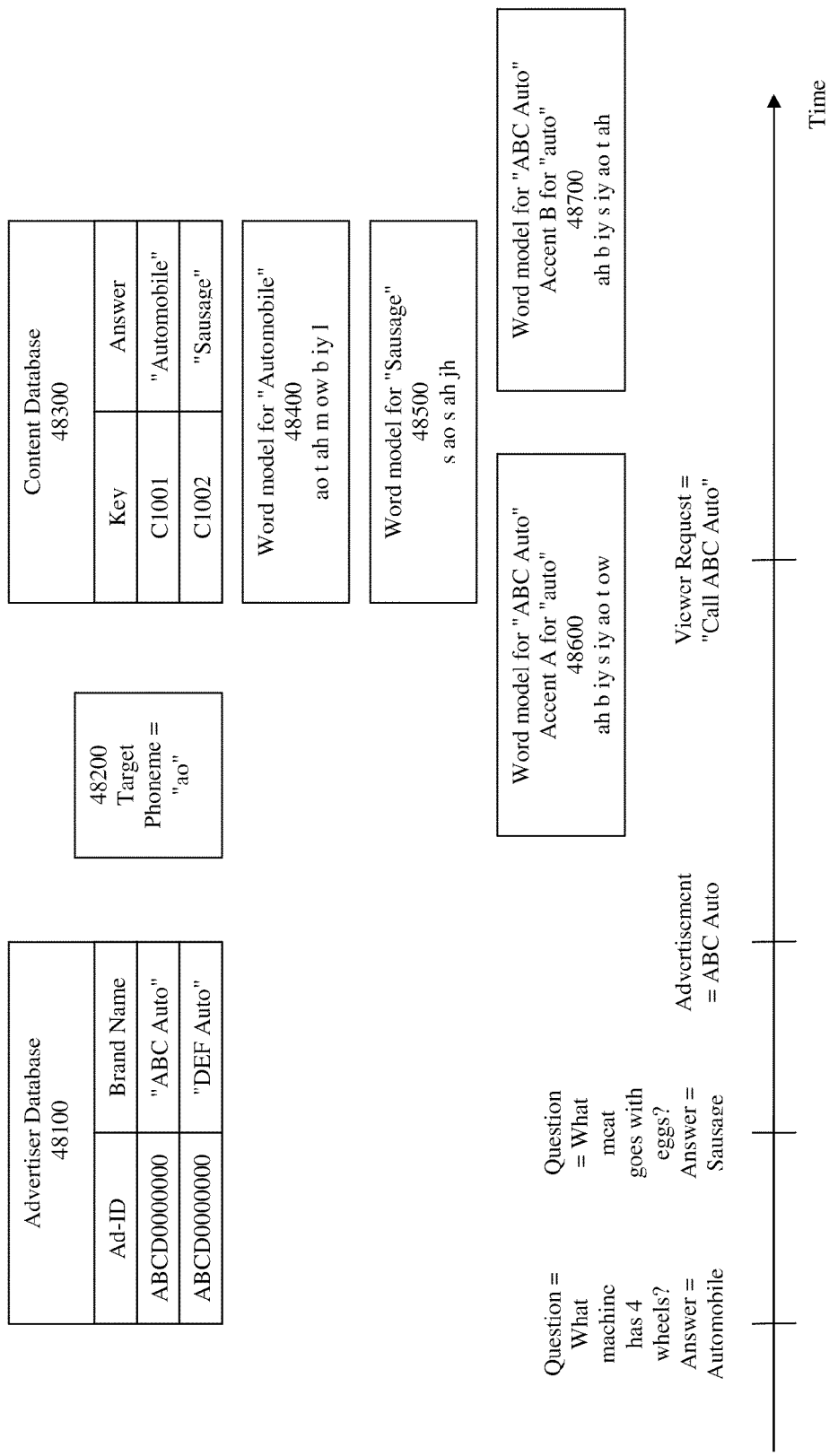
FIG. 48 depicts an exemplary method of generating content whose display can increase the probability of recognizing speech related to one or more advertisements, according to some embodiments.

FIG. 48 depicts a block diagram of an exemplary system enabling the generation of target phonemes to train a speech recognition system and a timeline reflecting an exemplary sequence of steps, according to some embodiments. The present system can implement the entities described herein by utilizing a subset of the following components, or additional, related, alternative, and/or equivalent components. The present system can include, but is not limited to, the following components not disclosed earlier.

Advertiser Database 48100 is a data structure including one or more records containing a key uniquely identifying a Promoted Object and data related to the Promoted Object.

Target Phoneme 48200 is a phoneme which can be one of a set of phonemes constituting a word sequence stored in Database: Advertiser 0810. In FIG. 48, Target Phoneme 48200 is an exemplary phoneme "ao." For example, in Advertiser Database 48100, one exemplary record includes a brand name "ABC Auto." The "ABC Auto" brand name includes the set of phonemes listed in the word model 48600 and word model 48700, each of which includes a phoneme "ao" for the first syllable of "auto."

Target Phonemes 48200 represent a type of unit constituting one or more word sequences an user of Wireless Device 02300 or Wireline Device 02302 can speak when the user wants to take an action related to a Programming or Advertisement ("User Request"). An User Request is any request by an user of Wireless Device 02300 or Wireline Device 02302 related to a Promoted Object or Programming, which can include, but is not limited to: (1) requesting information about a Promoted Object or Programming; (2) contacting Content Server 02100 about a Promoted Object or Programming; (3) requesting a coupon or any other type of economic incentive related to a Promoted Object; and/or (4) purchasing a product. That is, when a Wireless Device 02300 or Wireline Device 02302 user executes an User Request, current speech recognition technology can generate a significant error rate in recognizing words where there is little to no training. Inviting a Wireless Device 02300 or Wireline Device 02302 user to speak word sequences including one or more Target Phonemes 48200 before the user executes an User Request enables the generation of training data without requiring the user to perform the task of speaking word sequences constituting an explicit training session.

The methods disclosed herein can create and process any type of target unit, including, but not limited to, phonemes, syllables, demi-syllables, words, word sequences, fenones, and/or any other unit of sound or speech.

While a phoneme is considered a basic unit of speech, humans typically do not articulate phonemes in isolation. Humans typically articulate one or more phonemes as part of a syllable, which in turn is typically part of a word. The methods described herein can process phonemes to adjust for a variety of effects, e.g., coarticulation. In another embodiment, because of various effects, e.g., coarticulation, being stronger within syllables than across syllables, the methods described herein can select syllables, instead of phonemes, as the target unit of speech to process. In another embodiment, the methods described herein can select words, instead of phonemes or syllables, as the target unit of speech to process.

Content Database 48300 is a data structure including one or more records containing a key uniquely identifying a Target Word Sequence or Potential Word Sequence and data related to a Target Word Sequence or Potential Word Sequence. The methods described herein can limit the Target Word Sequence or Potential Word Sequence to include at least one Target Phoneme. For example, if Advertiser Database 48100 includes a record with a brand name "ABC Auto," one of the Target Phonemes 48200 is "ao" representing the first syllable of "Auto." In the present system, Content Database 48300 can include one or more records containing a Target Word Sequence or Potential Word Sequence which includes at least the Target Phoneme 0820 "ao." In the present example, one Target Word Sequence or Potential Word Sequence including the Target Phoneme 48200 "ao" is "Automobile" and another Target Word or Potential Word including the Target Phoneme 48200 "ao" is "Sausage."

Word Models 48400, 48500, 48600, and 48700 are exemplary models of the word most likely to represent any word sequence spoken by the user of Wireless Device 02300 or Wireline Device 02302. The word model can be generated by any method, e.g., by building a HMM for the word in the target vocabulary. In the present example, Word Model 48400 is the word model for "Automobile," Word Model 48500 is the word model for "Sausage," Word Model 48600 is the word model for "ABC Auto" with one accent for the word "auto," and Word Model 48700 is the word model for "ABC Auto" with another accent for the word "auto."

3.5.3 Acoustic Model

In a typical speech recognition system, the acoustic model can include an HMM for each unit of speech, e.g., a phoneme. The acoustic model statistically estimates the HMMs based on a sufficiently large sample of a given user's speech which should include all phonemes.

The methods described herein can obviate the need for a speech recognition system to require a given user to read a speech sample by generating and/or collecting speech inputs of the user which include verified phonemes.

Figure 49:
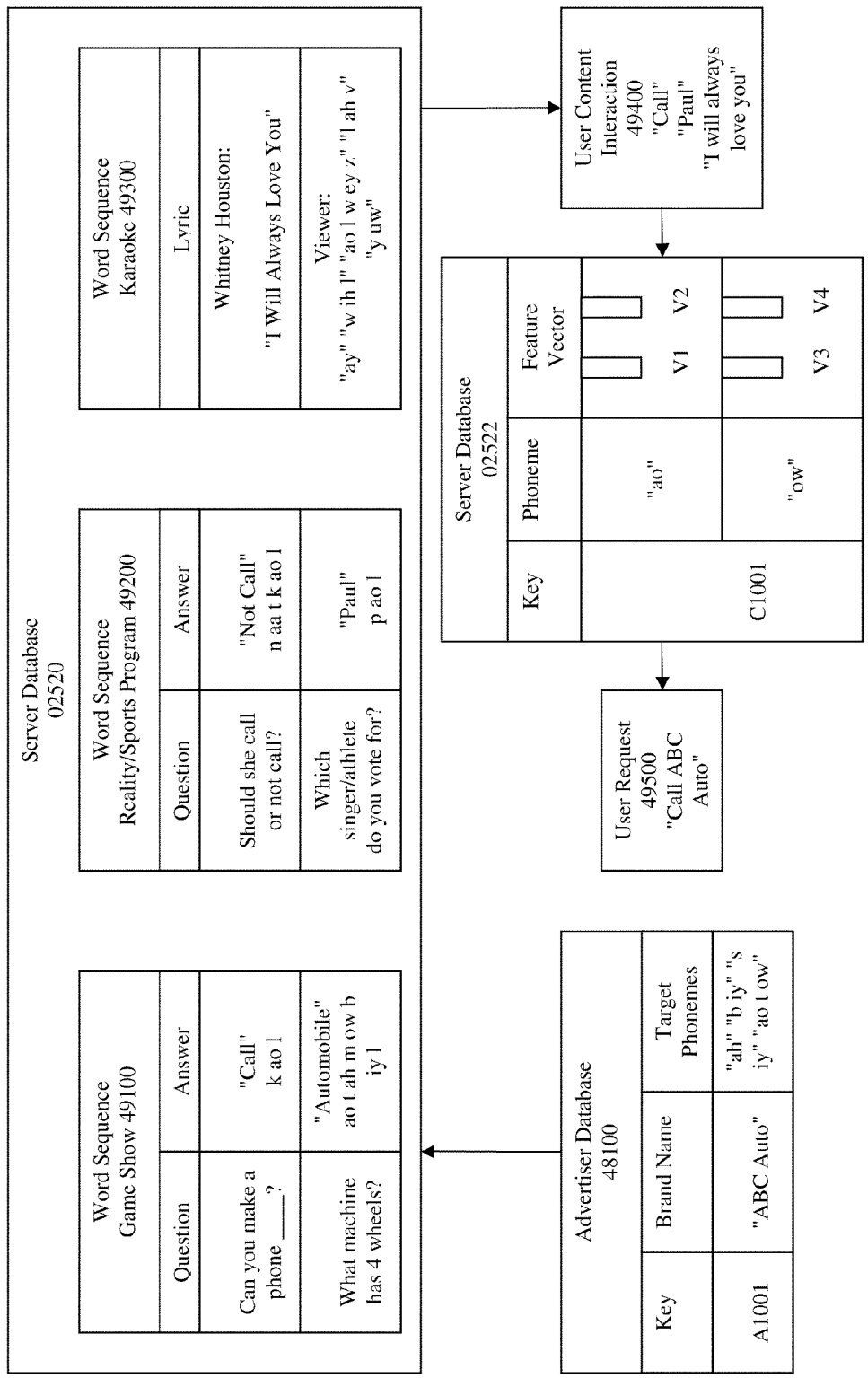
FIG. 49 depicts an exemplary method of generating one or more types of content whose display can increase the probability of recognizing speech related to one or more advertisements, according to some embodiments.

FIG. 49 depicts a diagram of an exemplary system enabling the generation of the production of target phonemes to increase the accuracy of recognizing User Requests, according to some embodiments. The present system can implement the entities described herein by utilizing a subset of the following components, or additional, related, alternative, and/or equivalent components. The present system can include, but is not limited to, the following components not disclosed earlier.

Advertiser Database 49100 is a data structure including one or more records containing a key uniquely identifying a Promoted Object and data related to the Promoted Object. The data can include, but are not limited to: one or more word sequences an user of Wireless Device 02300 or Wireline Device 02302 can use to identify a Promoted Object in an User Request; and/or one or more units of speech constituting a given word sequence. In the present example, the data structure includes one or more Target Phonemes constituting the word sequence identifying the Brand Name "ABC Auto." However, the data structures can support including any type of unit of speech constituting the word sequence identifying a Promoted Object in an User Request.

Server Database 02520 can include, but is not limited to, the following data structures: Word Sequence: Game Show 49100, Word Sequence: Reality/Sports Program 49200, and/or Word Sequence: Karaoke 49300, which are exemplary data structures including one or more records containing candidate word sequences a Programming and/or Advertisement can invite an user of Wireless Device 02300 or Wireline Device 02302 to speak. In the preferred embodiment, the candidate word sequences can include one or more Target Phonemes identified in Advertiser Database 48100. The present application defines a Program Query as any request by a Programmer or Advertiser for an user of Wireless Device 02300 or Wireline Device 02302 to speak one or more word sequences responding to the request.

The methods described herein can utilize any method to adjust the amplitude, frequency, timing, or any other quality of an audio signal transmitted by an user of Wireless Device 02300 or Wireline Device 02302. In one example, the methods described herein can adjust the frequency of a word sequence sung by the user in response to a Programming inviting the user to sing the lyrics of a song to capture one or more feature vectors for use in recognizing future speech inputs by the user. In another example, the methods described herein can utilize methods, e.g., dynamic time warping, to adjust in the time dimension a speech input to find a match between two audio samples. An user of Wireless Device 02300 or Wireline Device 02302 can speak at different speeds. If the methods described herein have prior samples of the user at a given speaking speed, a method like dynamic time warping can adjust non-linearly in the time dimension a speech input to determine any similarity between a speech input and prior samples.

By presenting a question to an user of Wireless Device 02300 or Wireline Device 02302 inviting the speaking of a word sequence including one or more Target Phonemes, the methods described herein can generate training data enabling the more accurate recognition of word sequences in an User Request.

While the present system includes the data structures 49100, 49200, and 49300 and describes them in terms of a specific type of Programming, it can support a data structure including one or more records containing candidate word sequences a Programming and/or Advertisement can invite an user of Wireless Device 02300 or Wireline Device 02302 to speak for any type of Programming.

User Content Interaction 49400 represents one or more word sequences spoken by an user of Wireless Device 02300 or Wireline Device 02302 in response to a question presented by a Programming and/or Advertisement.

Server Database 02522 is a data structure including one or more records containing a key uniquely identifying any word sequence representation and any type of representation of one or more word sequences or any other unit of speech spoken by an user of Wireless Device 02300 or Wireline Device 02302. In the preferred embodiment, the present system can include one or more feature vectors associated with a given phoneme spoken by the Wireless Device 02300 or Wireline Device 02302 user.

Using any methods, a Processor 01040 for Server 02400 can divide an user speech input into time frames and represent the content of the frames as one or more feature vectors. The speech signal can vary for a single user even for the same word sequence because of changes in the user. Thus, the present system can store one or more sets of feature vectors generated for a given phoneme or other unit of speech.

User Request 49500 represents one or more word sequences constituting an User Request, e.g., "Call ABC Auto." Because the methods described herein can encourage the user of Wireless Device 02300 or Wireline Device 02302 to speak one or more word sequences including one or more Target Phonemes, the methods described herein have generated training data which can increase the accuracy of recognizing the word sequences in an User Request.

Server Database 02522 can include any type of representation of one or more word sequences spoken by an user of Wireless Device 02300 or Wireline Device 02302 over any period of time. For example, Server Database 02522 can include word sequences spoken during a current episode of a Programming or one or more prior episodes of the Programming. By including word sequences spoken during different episodes, Server Database 02522 can increase the probability of generating training data which reflects a plurality of feature vectors for a given phoneme and, therefore, increase the accuracy of recognizing the word sequences in an User Request.

Figure 50A:
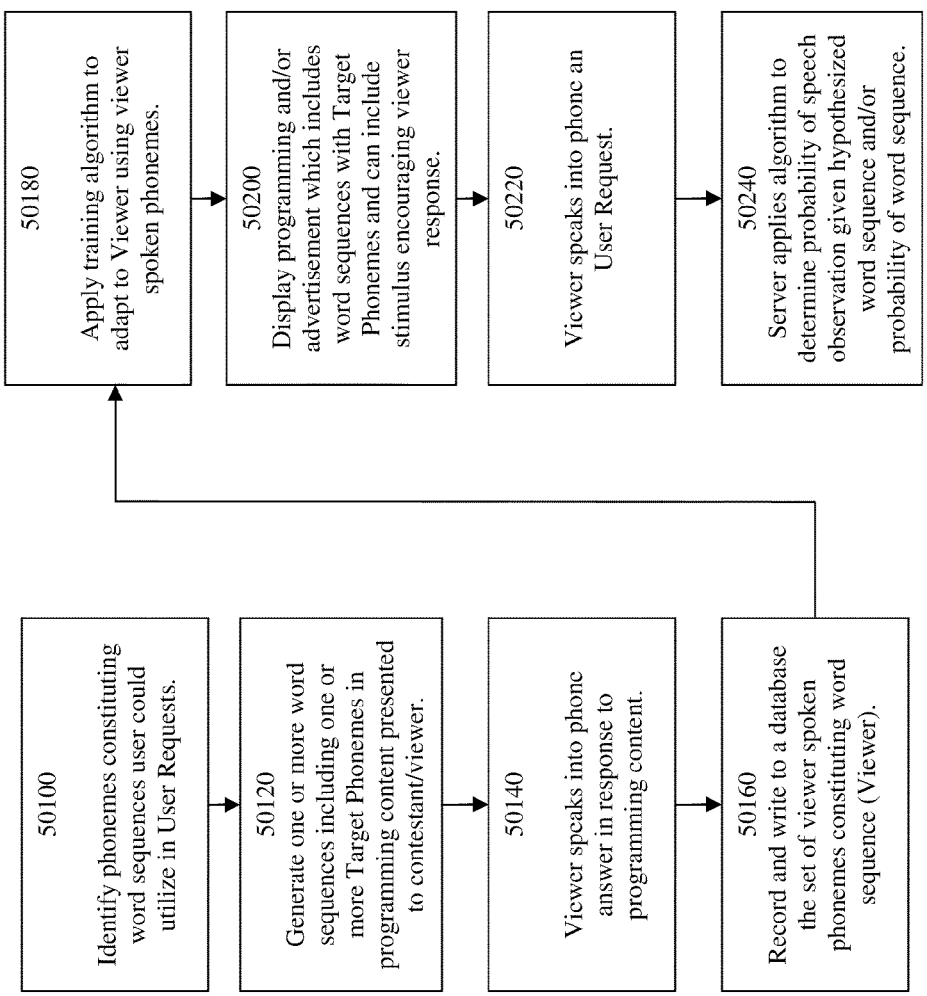
FIG. 50A depicts a flowchart of an exemplary method of generating content whose display can increase the probability of recognizing speech related to one or more advertisements, according to some embodiments.

FIG. 50A depicts a flowchart of an exemplary Method 50000A enabling the generation of target phonemes to train a speech recognition system, according to some embodiments. The flowchart refers to the system and structures depicted in FIG. 48 and FIG. 49. However, the method is not limited to those embodiments. The method can implement the steps described herein by utilizing a subset of the components, or additional, related, alternative, and/or equivalent components depicted in FIG. 48 and FIG. 49. The method can execute a subset of the steps, the steps in different order, and/or other or additional related or equivalent steps.

At 50100, the present method can identify one or more phonemes constituting one or more word sequence an user of Wireless Device 02300 or Wireline Device 02302 can utilize in any User Request. In one embodiment, the present method can build a database of the word sequences an user of Wireless Device 02300 or Wireline Device 02302 are most likely to use in any User Request. In one embodiment, the word sequences can be assigned to two classes. The first class can be a Command, which the present application defines as one or more word sequences signaling to a speech recognition system of the action requested. For example, a Command can include: (1) the word "Call," which could signal to the present system the user's request for instructions for the Wireless Device 02300 or Wireline Device 02302 to originate a phone call to the party represented by one or more word sequences following the Command; (2) the word "Get," which could signal to the present system the user's request for instructions for the Wireless Device 02300 or Wireline Device 02302 to retrieve and/or receive additional information about the Promoted Object in any form, e.g., a web page, an email, a text message, or a video; (3) the word "Buy," which could signal to the present system the user's request for instructions to enable the Wireless Device 02300 or Wireline Device 02302 to purchase the Promoted Object; and/or (4) the word "Save," which could signal to the present system the user's request for instructions for the Wireless Device 02300 or Wireline Device 02302 to retrieve and/or receive any data constituting an economic incentive to purchase the Promoted Object, e.g., an electronic coupon. The second class can be an object, i.e., one or more word sequences signaling to the system of the entity or action, e.g., a Promoted Object, on which the Command can execute. For example, an object can include the word sequence "ABC Auto," which combined with the Command "Call" would signal to the present system of the user's request for instructions for the Wireless Device 02300 or Wireline Device 02302 to originate a phone call to the entity "ABC Auto."

The methods described herein can collect and/or generate candidate word sequences most likely to be used in an User Request through a variety of means, including, but not limited to the following. First, Content Server 02100 can transmit to Server 02400 candidate word sequences representing the Promoted Object, or word sequences they believe a consumer can associate with the Promoted Object. Second, the methods described herein can generate candidate word sequences which users of Wireless Device 02300 or Wireline Device 02302 associate with a given Promoted Object in prior User Requests. Third, the methods described herein can utilize any method to assign one or more word sequences utilized in one or more Programming and/or Advertisement to a category associated with the Promoted Object. These methods can include, but are not limited to: decision tree learning; naïve Bayes text classifer; neural networks; regression methods; and/or support vector machines.

For example, Content Server 02100 can provide a transcript of a Programming and/or Advertisement it can transmit to Television 02220. The methods described herein can utilize any method, e.g., a naïve Bayes text classifer, to assign one or more word sequences in the each transcript to the category of associated with the Promoted Object. In one example, an advertiser, a vendor of soap products, can associate the Promoted Object, e.g., "ABC soap," to the category of "soap." The transcript of the Advertisement can include one or more word sequences, e.g., "clean," "fresh," and "wash" as well as "soap." The naïve Bayes text classifier can associate those word sequences with the Promoted Object, "ABC soap." If an User Request includes a word like "soap" or "wash," the methods described herein can include one or more candidate word sequences classified in the category associated "ABC soap" in a generated vocabulary which can be searched by any language model, e.g., the novel language models disclosed in FIG. 34.

At 50120, the Method 50000 can generate one or more word sequences which include one or more Target Phonemes to present in Programming. That is, when determining what word sequences a Programming should invite an user of Wireless Device 02300 or Wireline Device 02302 to speak in Event $E_n$, a Programmer can include one or more word sequences comprising one or more Target Phonemes. For example, if a Target Phoneme is "ao" which is one phoneme included in a Promoted Object, then Method 0900 can generate one or more word sequences which include the Target Phoneme "ao," e.g., "Automobile" as represented by Word Model 48400 or "Sausage" as represented by Word Model 48500.

At 50140, an user of Wireless Device 02300 or Wireline Device 02302 can speak into his/her device a response to the question presented in a Programming.

At 50160, Server 02400 can record and write to a database the set of word sequences and their associated phonemes spoken by any given user of Wireless Device 02300 or Wireline Device 02302. Method 50000 can utilize any method to determine the probability of the speech observation given a hypothesized word sequence and/or the probability of the word sequence.

At 50180, Method 50000 can utilize the speech inputs and apply training algorithms to build word models in the target vocabulary adapted to a given user of Wireless Device 02300 or Wireline Device 02302.

At 50200, a Media Device 02200 can display Programming and/or Advertisements which include one or more word sequences with one or more Target Phonemes. The Programming and/or Advertisements can include a stimulus encouraging an user of Wireless Device 02300 or Wireline Device 02302 to speak an User Request.

At 50220, an user of Wireless Device 02300 or Wireline Device 02302 can speak into the device an User Request.

At 50240, Server 02400 can apply any method to determine the probability of the speech observation given a hypothesized word sequence and/or the probability of the word sequence.

Figure 50B:
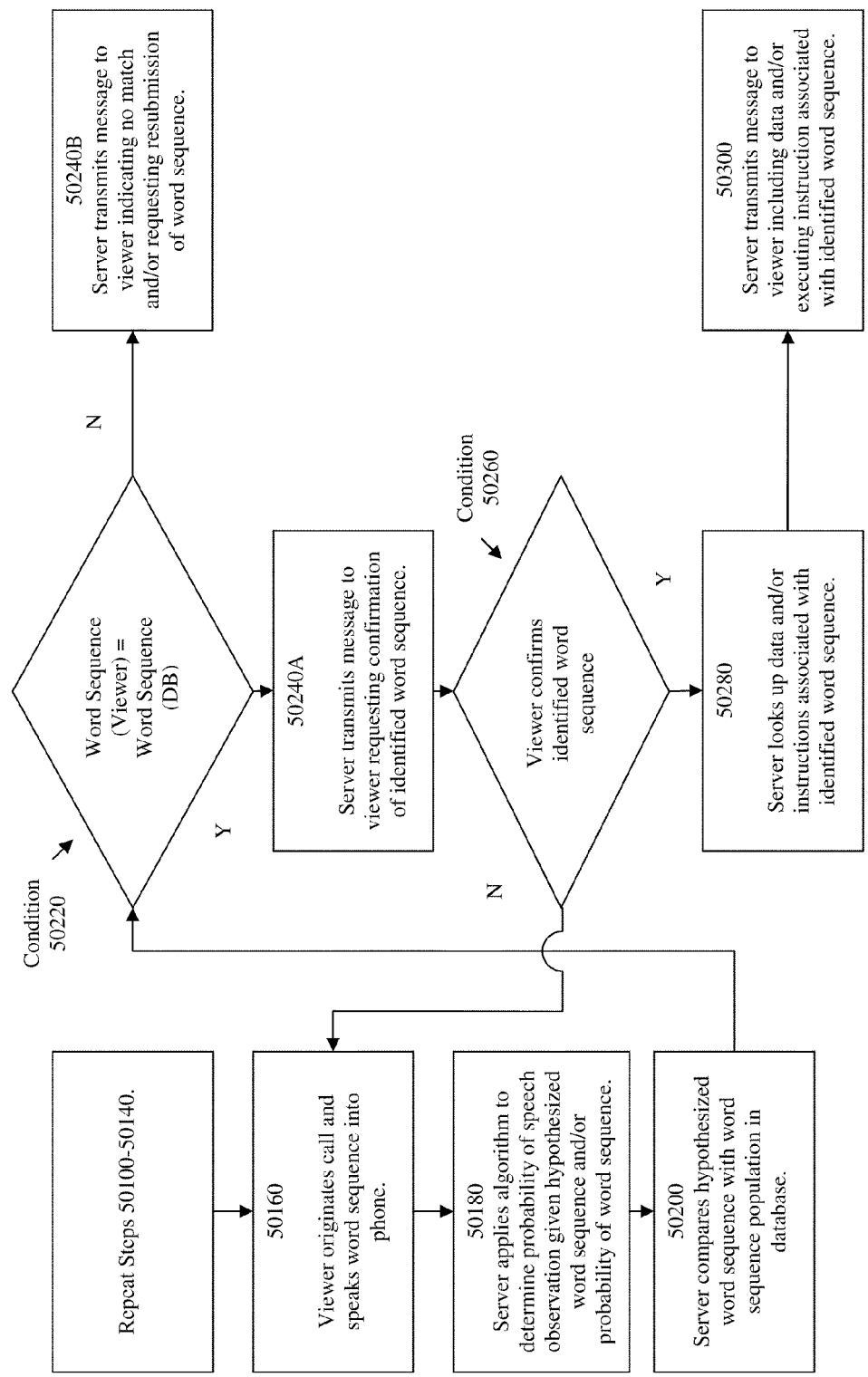
FIG. 50B depicts a flowchart of an exemplary method enabling the recognition of a word sequence inputted by a speaker, according to some embodiments.

FIG. 50B depicts a flowchart of an exemplary method 50000B enabling a Content Server 02100 and/or Server 02400 to recognize accurately one or more words inputted by a viewer, according to some embodiments. The flowchart refers to the system and structures depicted in FIG. 48 and FIG. 49. However, the method is not limited to those embodiments. The method can implement the steps described herein by utilizing a subset of the components, or additional, related, alternative, and/or equivalent components depicted in FIG. 48 and FIG. 49. The method can execute a subset of the steps, the steps in different order, and/or other or additional related or equivalent steps.

The present method can repeat 50100 through 50400 in Method 50000A.

At 50160, Wireless Device 02300 or Wireline Device 02302 can originate a communication to another Data Processing System, e.g., Server 02400, capable of recognizing the input of an user of Wireless Device 02300 or Wireline Device 02302. Wireless Device 02300, Wireline Device 02302, and/or Server 02400 can perform one or more of the functions specified in Condition 0416.

At 50180, Server 02400 can apply any method to determine the probability of the speech observation given a hypothesized word sequence and/or the probability of the word sequence.

At 50200, Server 02400 can compare the hypothesized word sequence with one or more Target Word Sequences in a database. The present application defines a Target Word Sequence as a specific word sequence which Content Server 02100 wants an user of Wireless 02300 or Wireline Device 02302 to speak within some time period in response to a stimulus, e.g., a question presented to a live contestant in a game show or a question presented to viewers in a reality program. For example, for a game show, Server 02400 can compare the hypothesized word sequence with the word sequence representing the answer to the question presented to one or more live contestants in the Programming. In this example, a typical Programmer would like an user of a Wireless Device 02300 or Wireline Device 02302 to speak the Targeted Word Sequence within a specific time period, e.g., before any of the live contestants speaks the Targeted Word Sequence. For a reality program or any other type of program, Server 02400 can compare the hypothesized word sequence with the word sequence representing the answer to the question presented to viewers of the Programming. For a Programming featuring karaoke, Server 02400 can compare the hypothesized word sequence with one or more word sequences constituting the lyrics of the song displayed in the Programming.

In another embodiment, Server 02400 can compare the hypothesized word sequence with one or more Potential Word Sequences in a database. A Potential Word Sequence is a word sequence which an user of Wireless Device 02300 or Wireline Device 02302 can speak within any time period either in response or not in response to a stimulus. That is, the user can speak a Potential Word Sequence which refers to anything related to a Programming or Advertisement, e.g., a product or brand promoted during the Programming or Advertisement. While the Programming or Advertisement may include a stimulus inviting an user of a Wireless Device 02300 or Wireline Device 02302 to speak the name of a product or brand, an user of a Wireless Device 02300 or Wireline Device 02302 can speak the name of a product or brand without the Programming or Advertisement including a stimulus.

For example, after viewing a Promoted Object displayed and/or described in a Programming or Advertisement, an user of a Wireless Device 02300 or Wireline Device 02302 can speak into the device one or more Potential Word Sequences, e.g., "Call [product/brand]," "Get [product/brand]," "Save [product/brand]," or "Buy [product/brand]." In one embodiment, the user of a Wireless Device 02300 or Wireline Device 02302 can speak a Potential Word Sequence related to a product or brand promoted during the time period a Programmer 0220 displays a Programming. For example, during one episode of a game show, the Programmer 0220 can promote n products or brands either during the Programming or in separate Advertisements displayed in the time period of the game show. The user of a Wireless Device 02300 or Wireline Device 02302 can speak a Potential Word Sequence related to any of the n products or brands. In another embodiment, the user of a Wireless Device 02300 or Wireline Device 02302 can speak a Potential Word Sequence related to a product or brand promoted before or after the time period a Programmer 0220 displays a Programming.

At Condition 50220, if the hypothesized word sequence does not equal one or more Target Word Sequences or Potential Word Sequences, then Method 0500 can proceed to 0524B. Server 02400 can transmit to the Wireless Device 02300 or Wireline Device 02302 a message indicating no match or requesting the user of Wireless Device 02300 or Wireline Device 02302 to retransmit a word sequence.

If the hypothesized word sequence does equal one or more Target Word Sequences, then the present method can proceed to 0524A. Server 02400 can transmit to the Wireless Device 02300 or Wireline Device 02302 a message requesting confirmation of the hypothesized word sequence.

At Condition 50260, if the user of Wireless Device 02300 or Wireline Device 02302 confirms the hypothesized word sequence, the present method can proceed to 50280, in which Server 02400 can look up any data or instructions associated with the confirmed word sequence. For example, if the confirmed word sequence is "Call [product/brand]," the present method can utilizing any method originate a communication between the Wireless Device 02300 or Wireline Device 02302 and another Data Processing System, e.g., Content Server 02100 promoting the product or brand related to the confirmed word sequence. At 50300, Server 02400 can transmit to the Wireless Device 02300 or Wireline Device 02302 a message including the data or instructions associated with the confirmed word sequence.

If the user of Wireless Device 02300 or Wireline Device 02302 does not confirm the hypothesized word sequence, the present method can proceed to 0516 and invite the user to speak again one or more Target Word Sequences or Potential Word Sequences.

In one embodiment, the present method can proceed directly from Condition 50220 to 50280 if the probability of the hypothesized word sequence equals or exceeds a predetermined threshold. That is, if the operator of the present system has enough confidence that the hypothesized word sequence is the word sequence inputted by the user of a Wireless Device 02300 or Wireline Device 02302, then Method 50000B can skip one or more steps requesting confirmation of the hypothesized word sequence.

The benefits of Method 50000A and Method 50000B can include, but are not limited to, the following.

First, the methods can increase the accuracy of recognizing a speech input of a given user by collecting Target Phonemes received from the user across a plurality of Programming and/or Advertisements.

Second, the methods can enhance the ability of a speech recognition system to compare and find the closest match of a feature vector representing speech of a given user of Wireless Device 02300 or Wireline Device 02302 and a phoneme. Because the methods collect a speech input of a given user of Wireless Device 02300 or Wireline Device 02302 in response to a request by the Programming to speak a given word sequence, the methods can increase the confidence level that a given feature vector is correctly associated with a given phoneme. Moreover, the methods can include the option of the Programming or Advertisement requesting from the user of Wireless Device 02300 or Wireline Device 02302 a confirmation of the hypothesized word sequence, which can increase further the confidence level.

Figure 53:
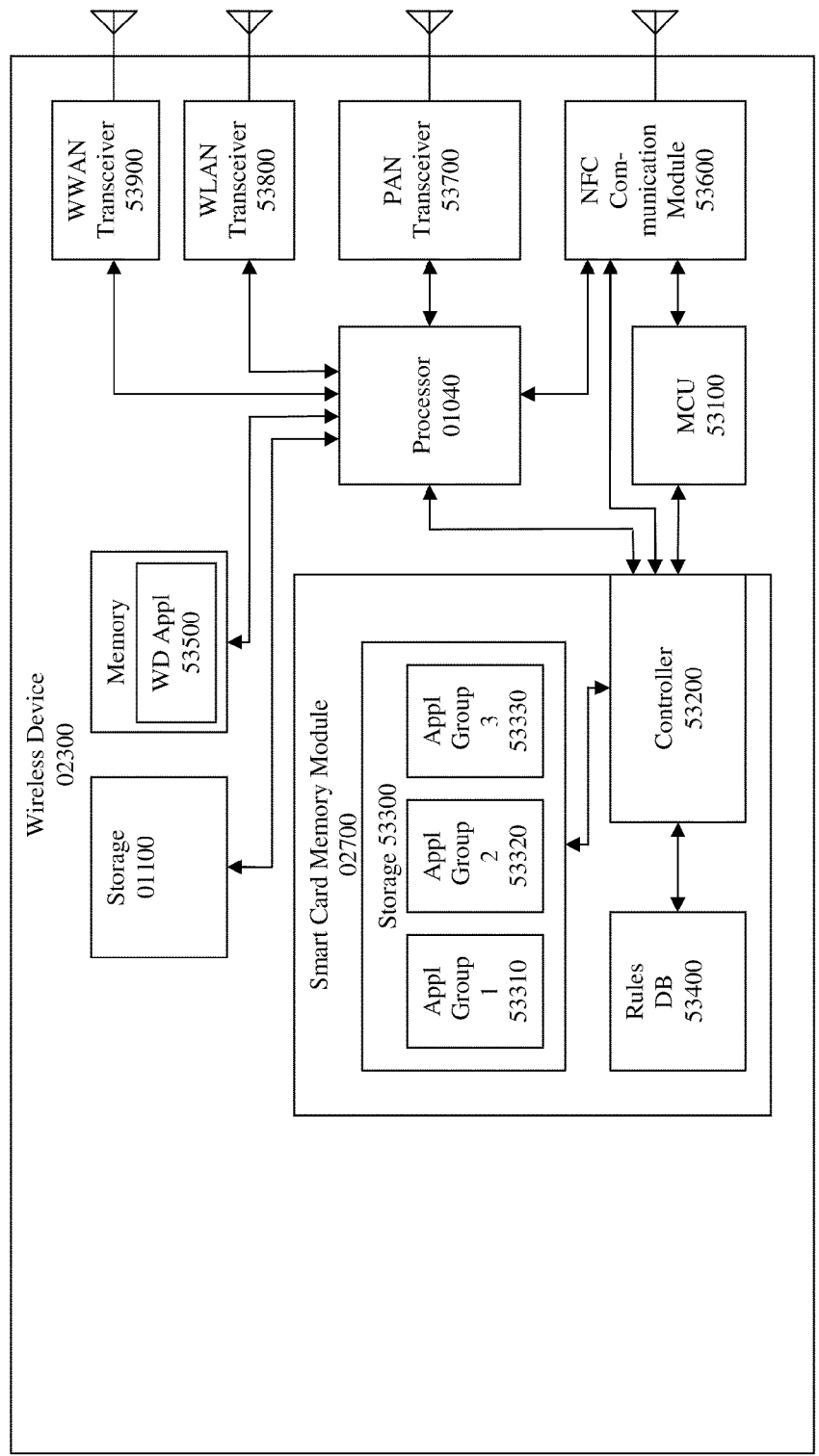
FIG. 53 depicts an exemplary system enabling the processing of data exchanged with one or more devices through one or more communication protocols, according to some embodiments.

3.6 Exchange of Transaction Data within a Wireless Device and Between a Wireless Device and Other Devices FIG. 53 depicts a high-level block diagram of an exemplary system enabling: (1) a wireless device to receive a Purchase Incentive from a server or another device; and (2) a retailer to redeem automatically the Purchase Incentive upon the purchase of the associated product, according to some embodiments. The present system can implement the entities described herein by utilizing a subset of the following components, or additional, related, alternative, and/or equivalent components. The present system can include, but is not limited to, the following components not disclosed earlier.

NFC Module 53600 can enable a Wireless Device 02300 to utilize any contactless standard, e.g., NFC, to read and/or write data from and/or to any other device, which can include, but is not limited to: (1) an external device/tag, e.g., NFC Module 53600; and/or (2) another Wireless Device 02300.

NFC Module 53600 can exchange data with any memory and/or storage in Wireless Device 02300, including, but not limited to: (1) Memory 01060 and/or Storage 01100 through Processor 01040; and/or any memory and/or storage in SCMM 02700.

Microcontroller (MCU) 53100 is a processor which can comprise one or more components, including, but not limited to: arithmetic and logic elements; memory, permanent data storage, peripheral devices, and/or input/output (I/O) interfaces.

SCMM 02700 can include one or more components, including, but not limited to: (1) Controller 53200, which can execute one or more functions of Processor 01040; (2) Storage 53300, which can store one or more Application Groups, e.g., Application Group 1 53310, Application Group 2 53320, and/or Application Group 3 53330; and/or (3) Rules Database 53400, which can be a database storing rules determining how the methods described herein can access applications stored in Storage 53300.

The methods described herein can implement the SCMM 02700 in any mode, including, but not limited to: (1) a module integrated with one or more modules in Wireless Device 02300; (2) a module internal to Wireless Device 02300 but separate from any module in Wireless Device 02300; and/or (3) a module external to Wireless Device 02300, which can exchange data with Wireless Device 02300 through any communications medium, e.g., a short-range wireless protocol.

Figure 10:
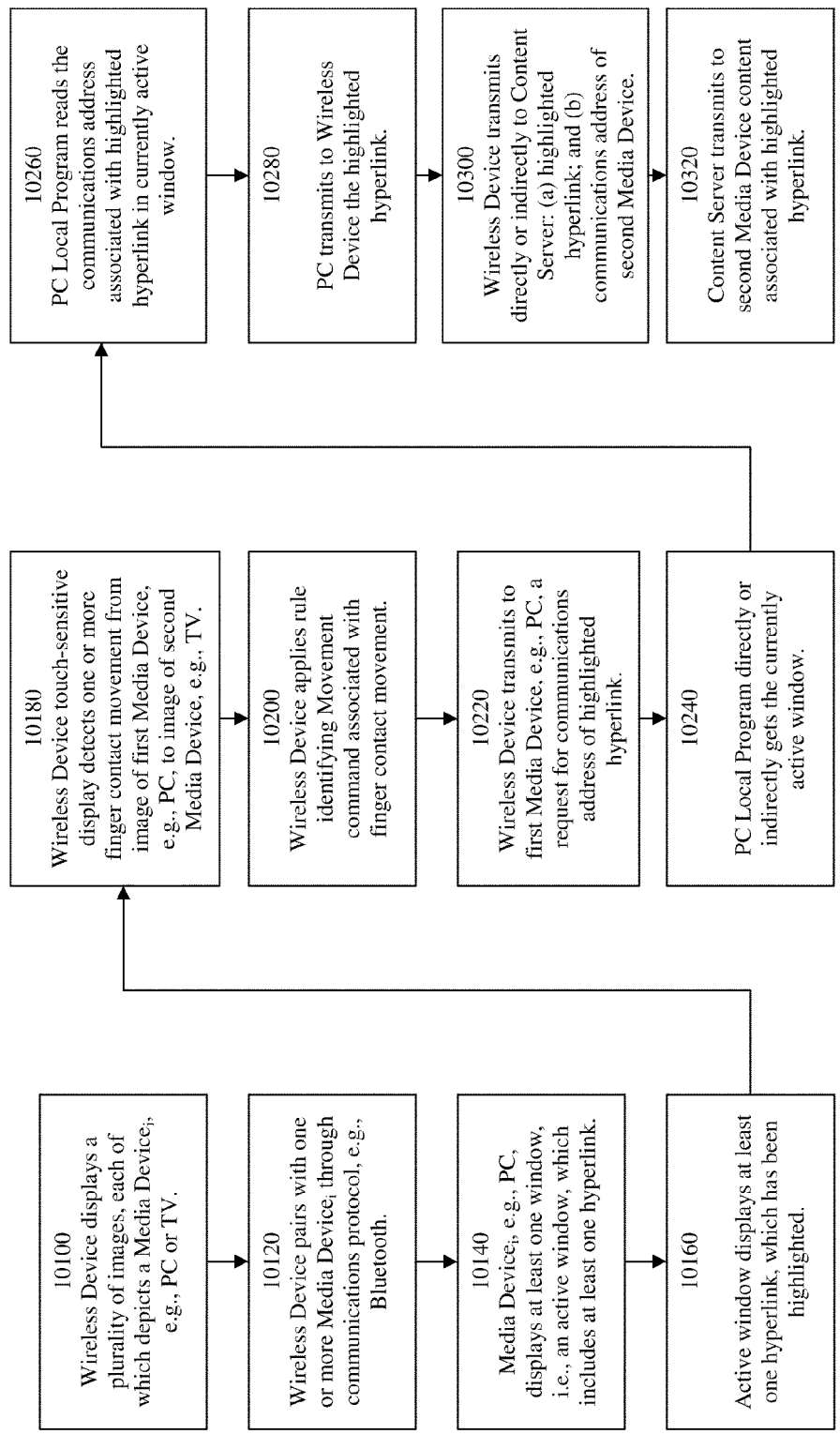
FIG. 10 depicts a flowchart of an exemplary method enabling the transfer of data among a plurality of devices through a command input to another device, e.g., a wireless device, by touch, according to some embodiments.

The methods described herein can support the writing of any instructions and/or data to and/or reading of any instructions and/or data of any Application Group. The methods described herein can enable other Data Processing Systems to execute such read/write operations, where the Data Processing Systems can include, but are not limited to: Server 0230, Personal Computer 02210, WLAN Device 02810, and/or POS Device 02800. Storing Purchase Incentives received by Wireless Device 02300 in one Application Group can facilitate read/write operations by other Data Processing Systems. For example, the methods described herein can ensure that POS Device 02800 reads all valid Purchase Incentives if they are all stored in one Application Group and POS Device 02800 reads the Application Group. In FIG. 10, the method can store one or more Purchase Incentives received by Wireless Device 02300 in PI Folder 1090, which can be an Application Group.

The methods described herein can implement SCMM 02700 in software, firmware, and/or hardware utilizing any method apparent to a person skilled in the relevant art. Wireless Device 02300 can install SCMM 02700 and/or any applications stored in Storage 53300 at any time, which can include: (1) before or at the time the user receives the Wireless Device 02300, e.g., at the manufacturing facility or by the service provider; and/or (2) after the user receives the Wireless Device 02300, e.g., by downloading through a wired and/or wireless communication.

Figure 54:
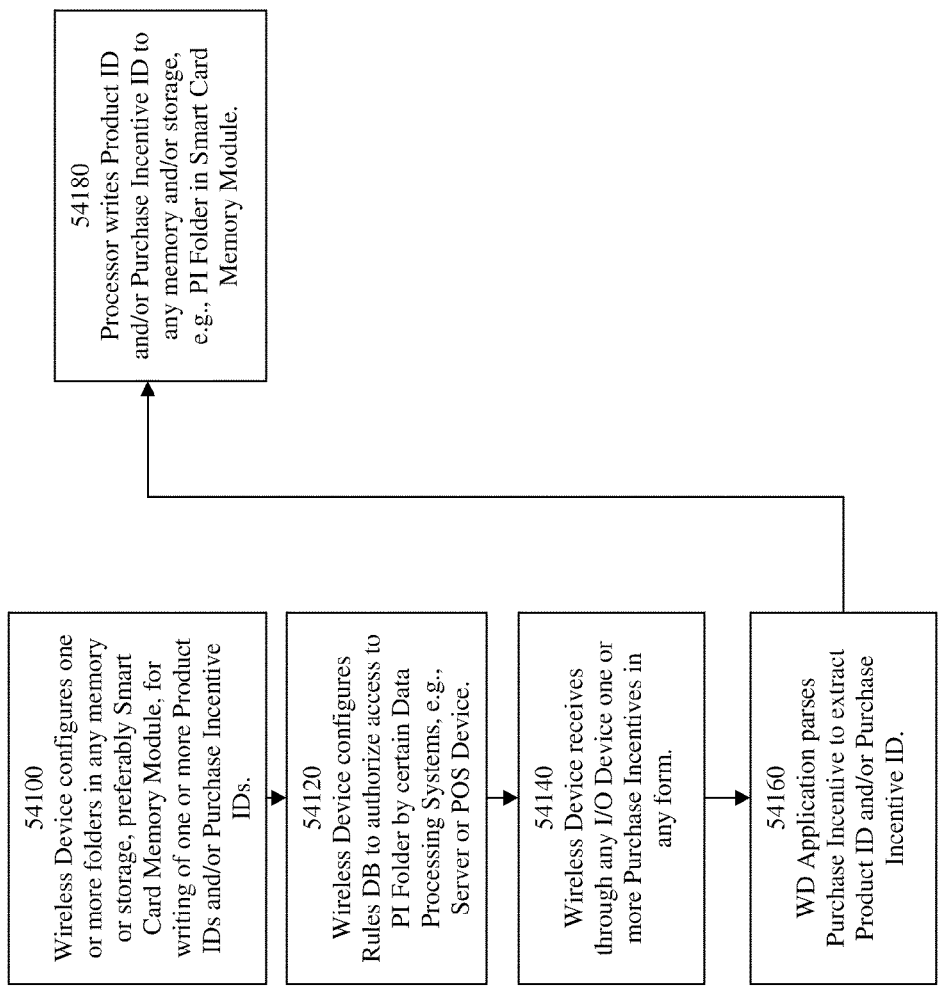
FIG. 54 depicts a flowchart of an exemplary method enabling the writing, storing, processing, and/or reading of purchase incentives in a memory module, according to some embodiments.

FIG. 54 depicts a flowchart of an exemplary method enabling: (1) the reception of a Purchase Incentive from a server or another device; (2) the storage of the Purchase Incentive; (3) the processing of the Purchase Incentive; and/or (4) the transmission of the Purchase Incentive to another device, according to some embodiments. The flowchart refers to the system and structures depicted in FIG. 53. However, the method is not limited to those embodiments. The method can implement the flowchart by utilizing a subset of the components, or additional, related, alternative, and/or equivalent components depicted in FIG. 53. The method can execute a subset of the steps, the steps in different order, and/or other or additional related or equivalent steps.

3.7 Exchange of Data Between a Wireless Device and Other Devices at a Retailer

Figure 55:
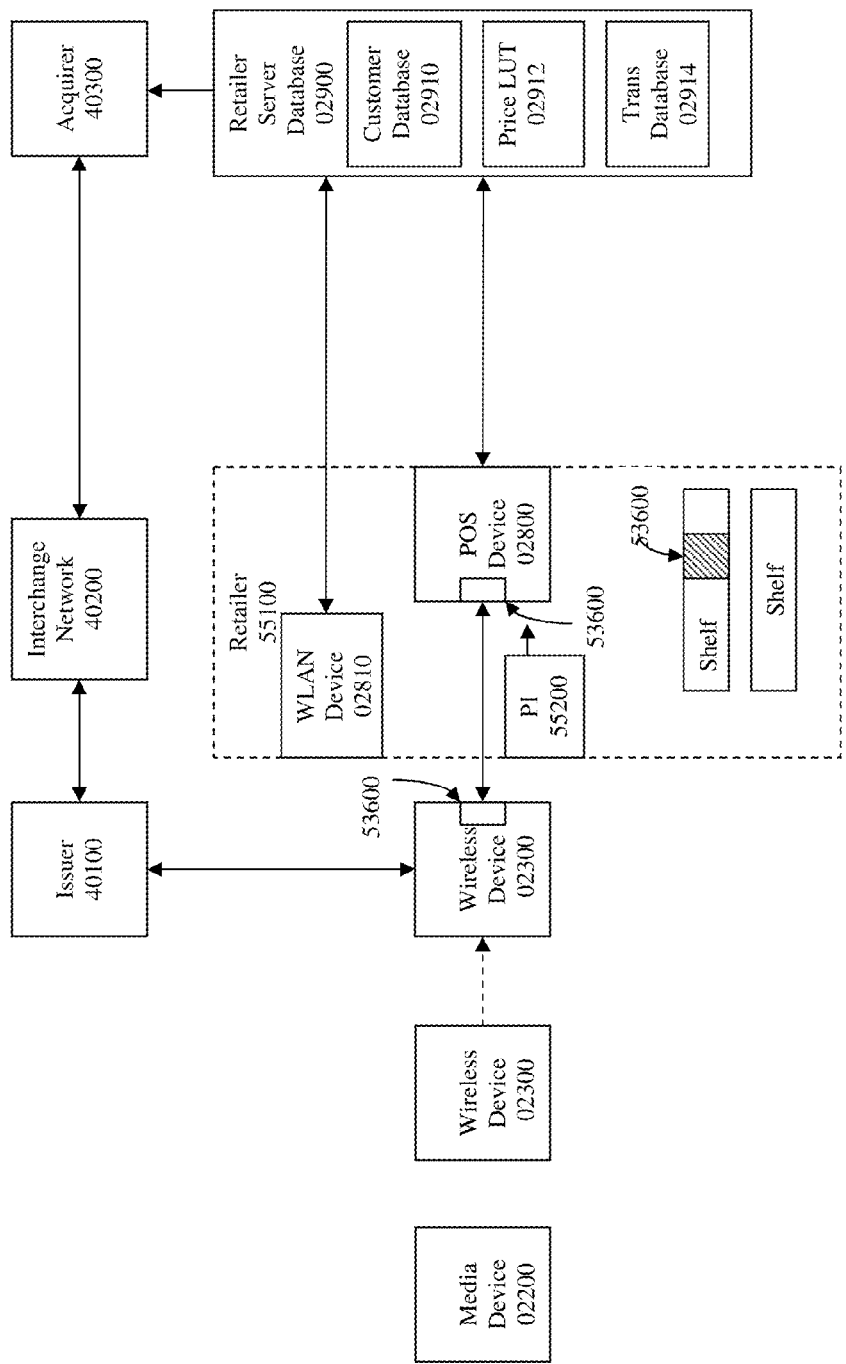
FIG. 55 depicts an exemplary system enabling the automatic redemption of one or more purchase incentives upon the purchase of the associated product, according to some embodiments.
Figure 56A:
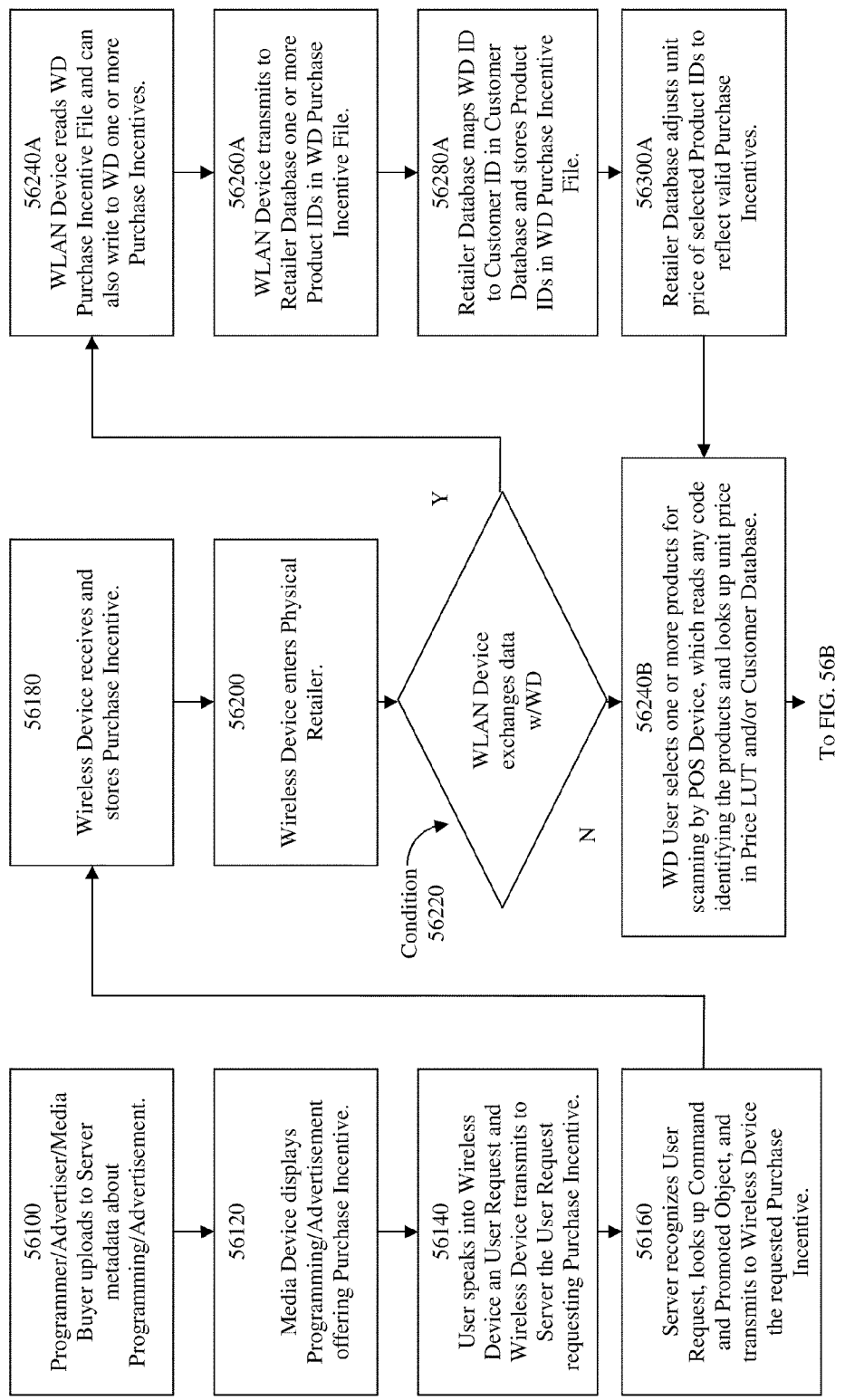
FIGS. 56A and 56B depict a flowchart of an exemplary method enabling the automatic redemption of one or more purchase incentives upon the purchase of the associated product, according to some embodiments.
Figure 56B:
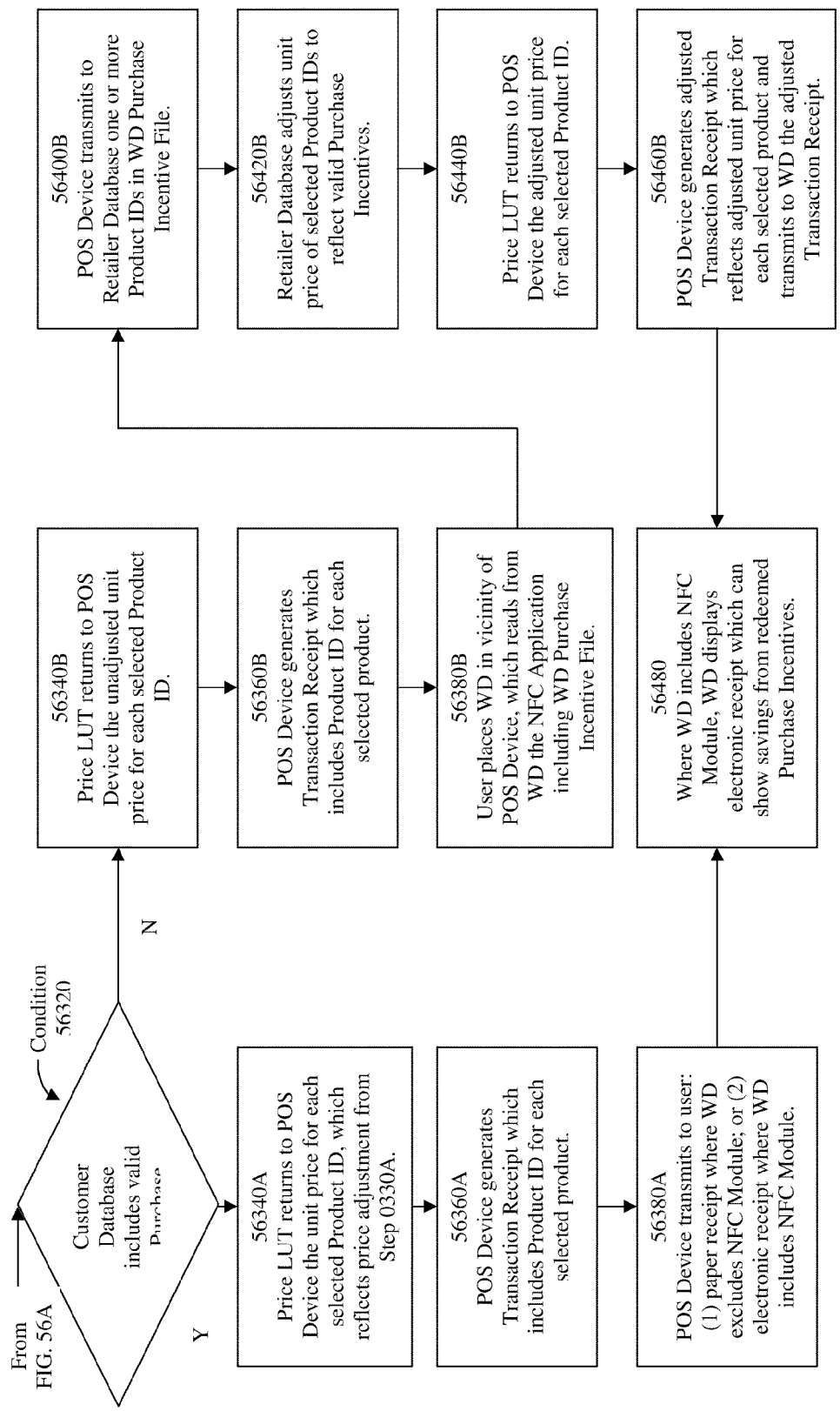
Figure 57:
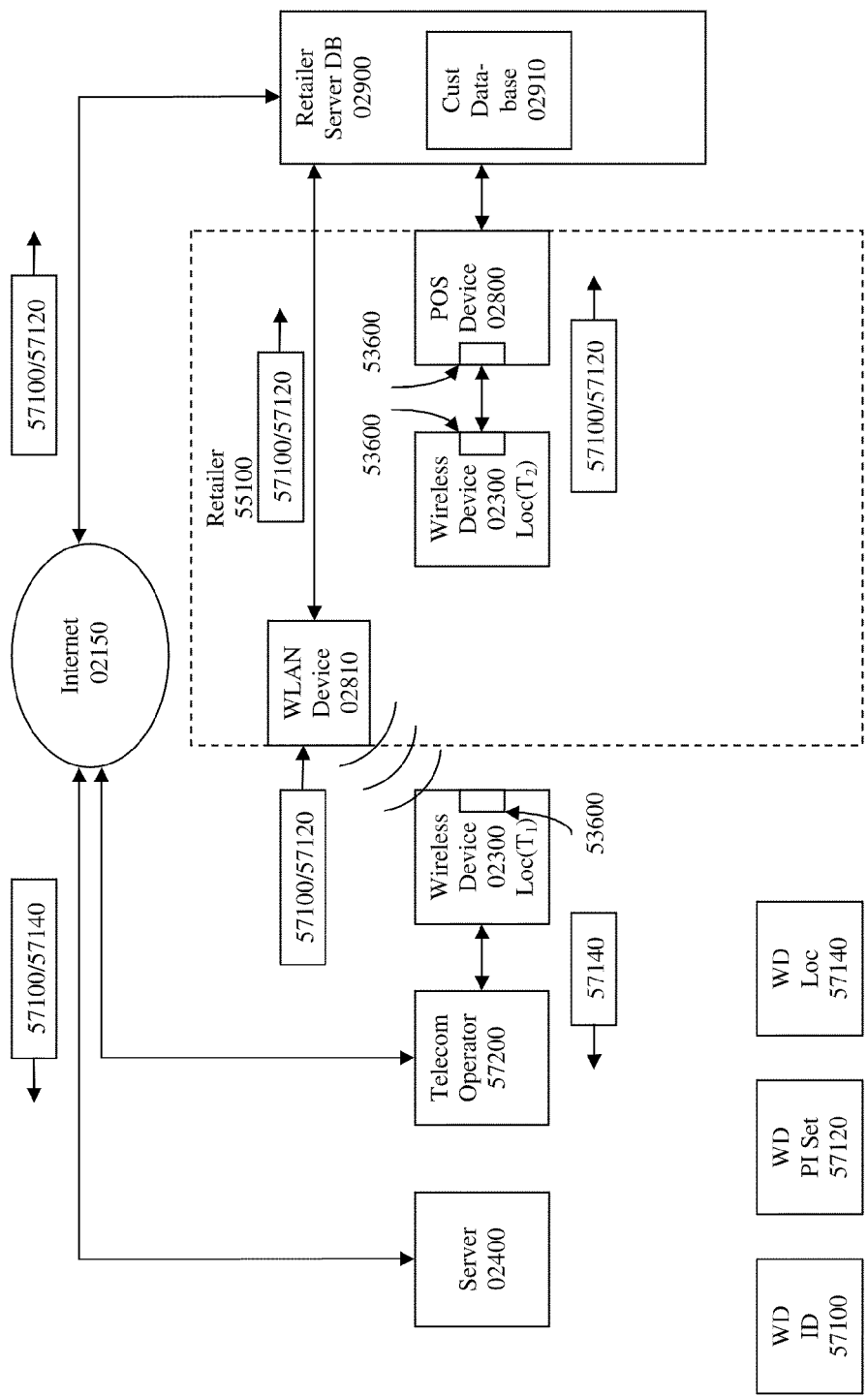
FIG. 57 depicts an exemplary system enabling: (1) the identification of a wireless device near an entrance to a physical retailer; (2) the transmission of one or more purchase incentives to a retailer database; and/or (3) the redemption of the purchase incentives by the retailer, according to some embodiments.
Figure 58A:
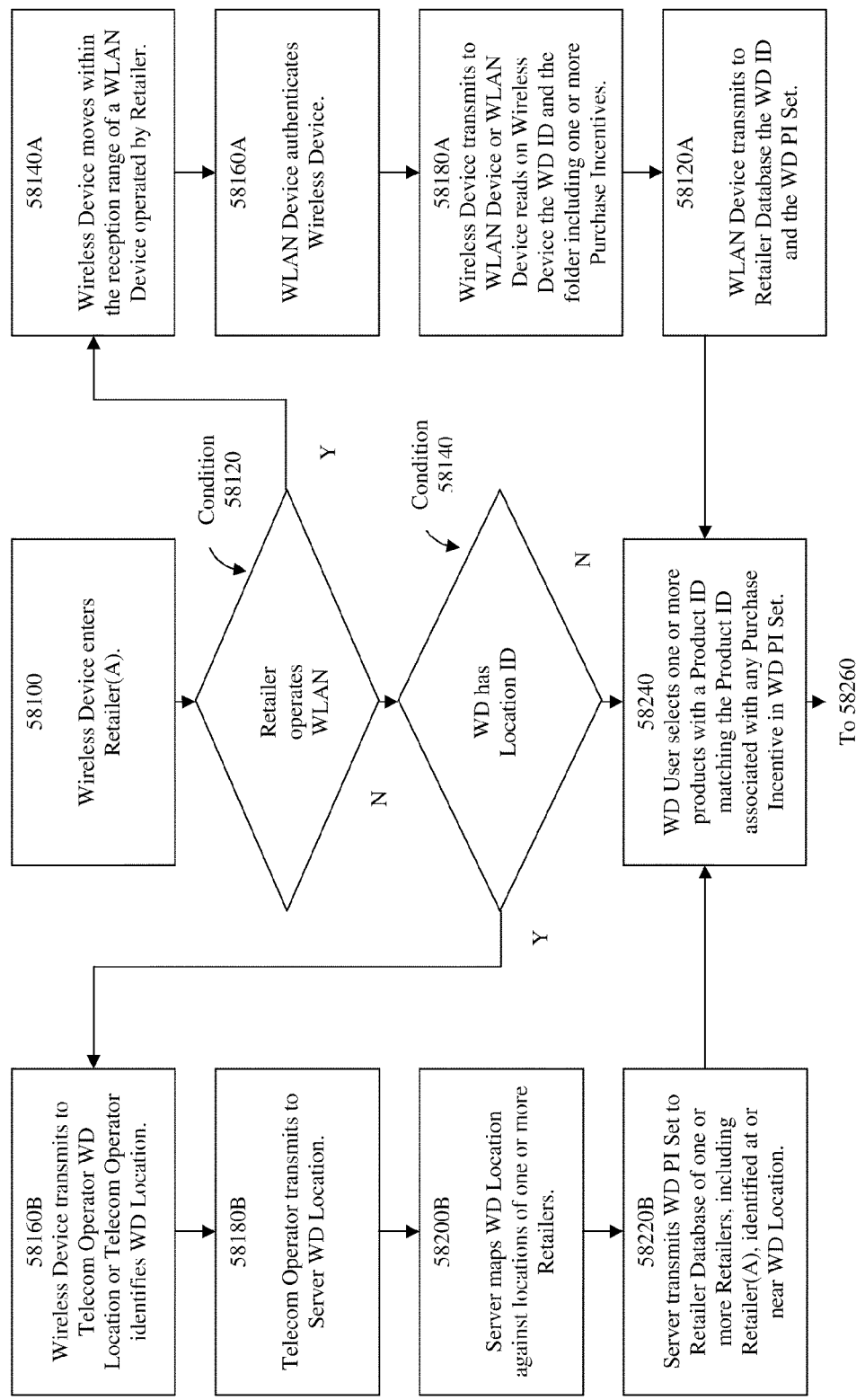
FIGS. 58A, 58B, and 58C depict a flowchart of an exemplary method enabling: (1) the identification of a wireless device near an entrance to a physical retailer; (2) the transmission of one or more purchase incentives to a retailer database; and/or (3) the redemption of the purchase incentives by the retailer, according to some embodiments.
Figure 58B:
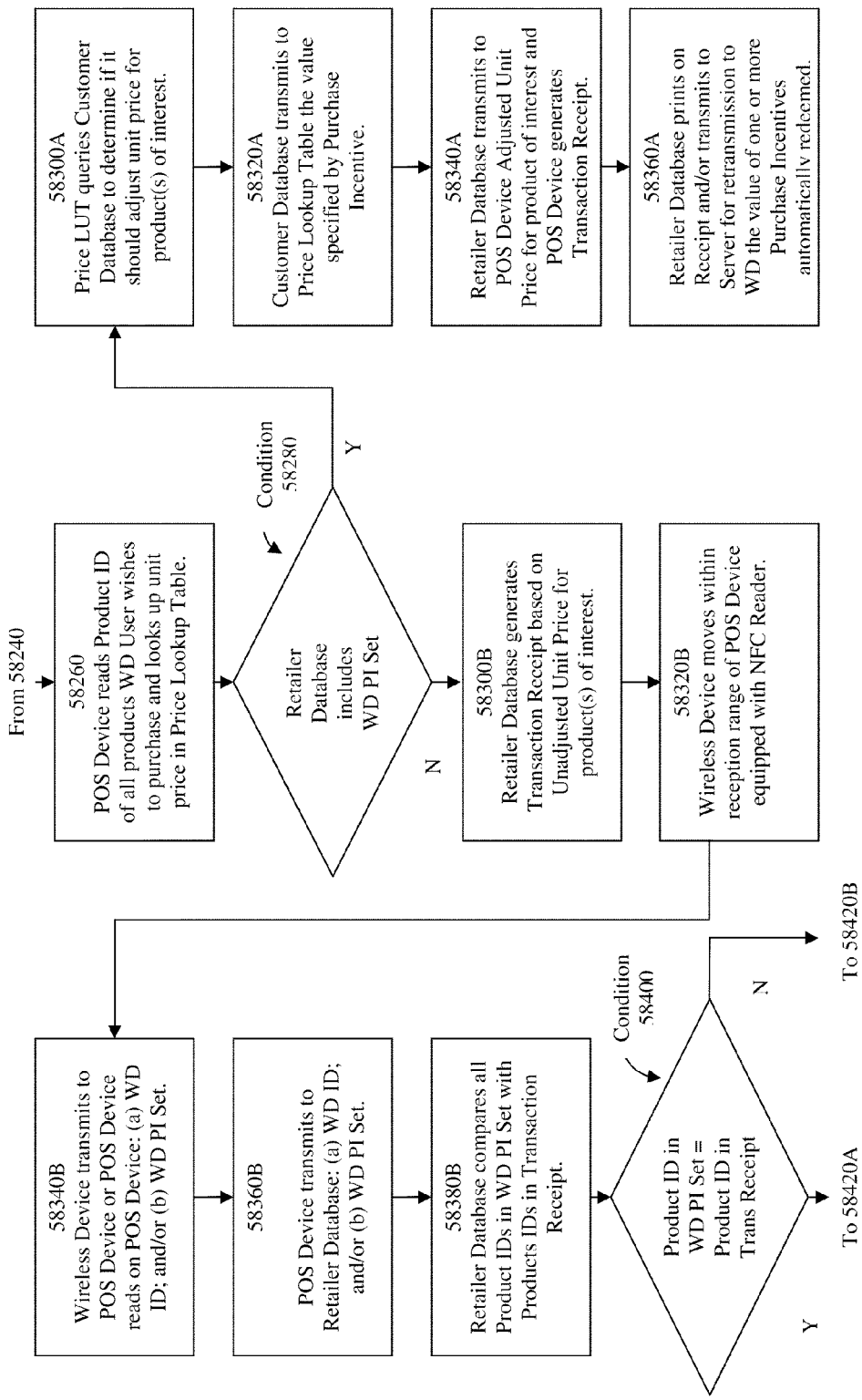
Figure 58C:
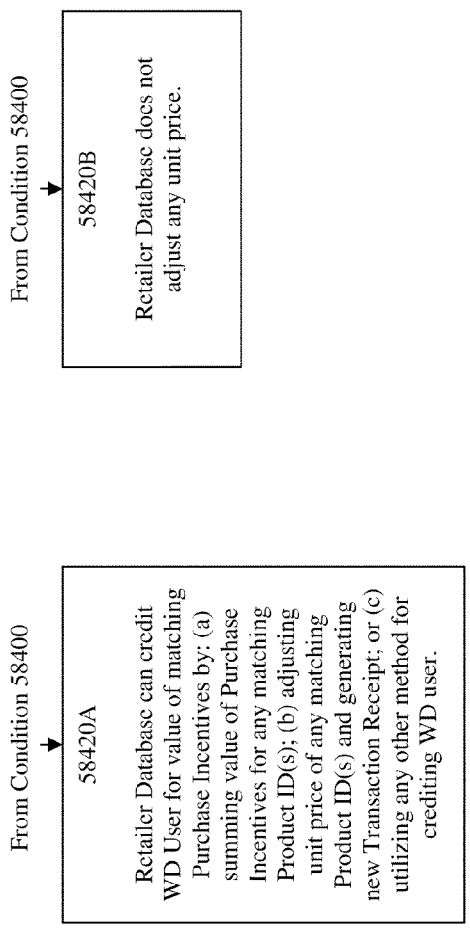
Figure 59:
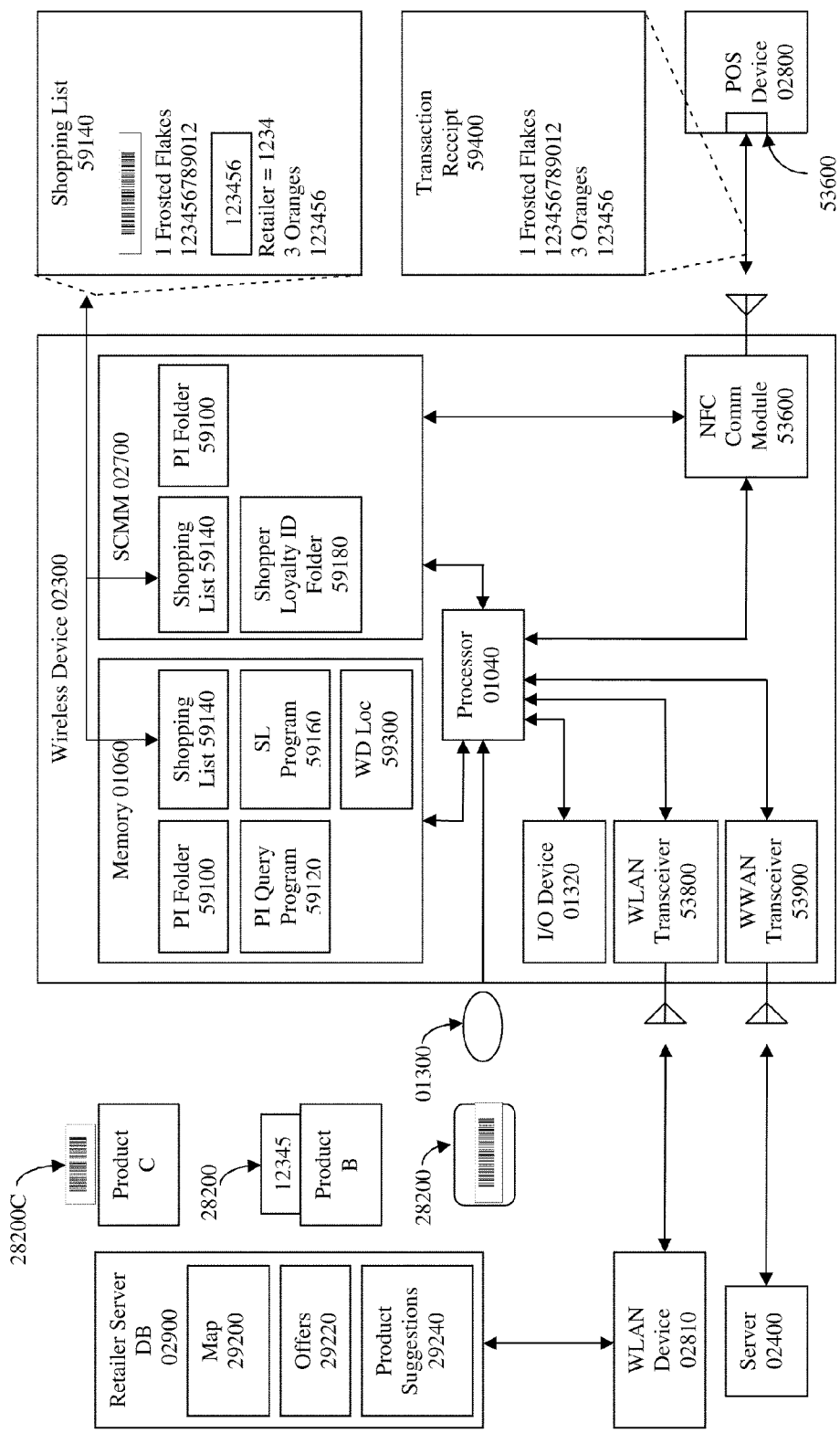
FIG. 59 depicts an exemplary system enabling: (1) the automatic generation and updating of a shopping list; (2) the retrieving of any purchase incentives associated with any product in the shopping list; and/or (3) the exchange of data related to the shopping list with a retailer, according to some embodiments.
Figure 60:
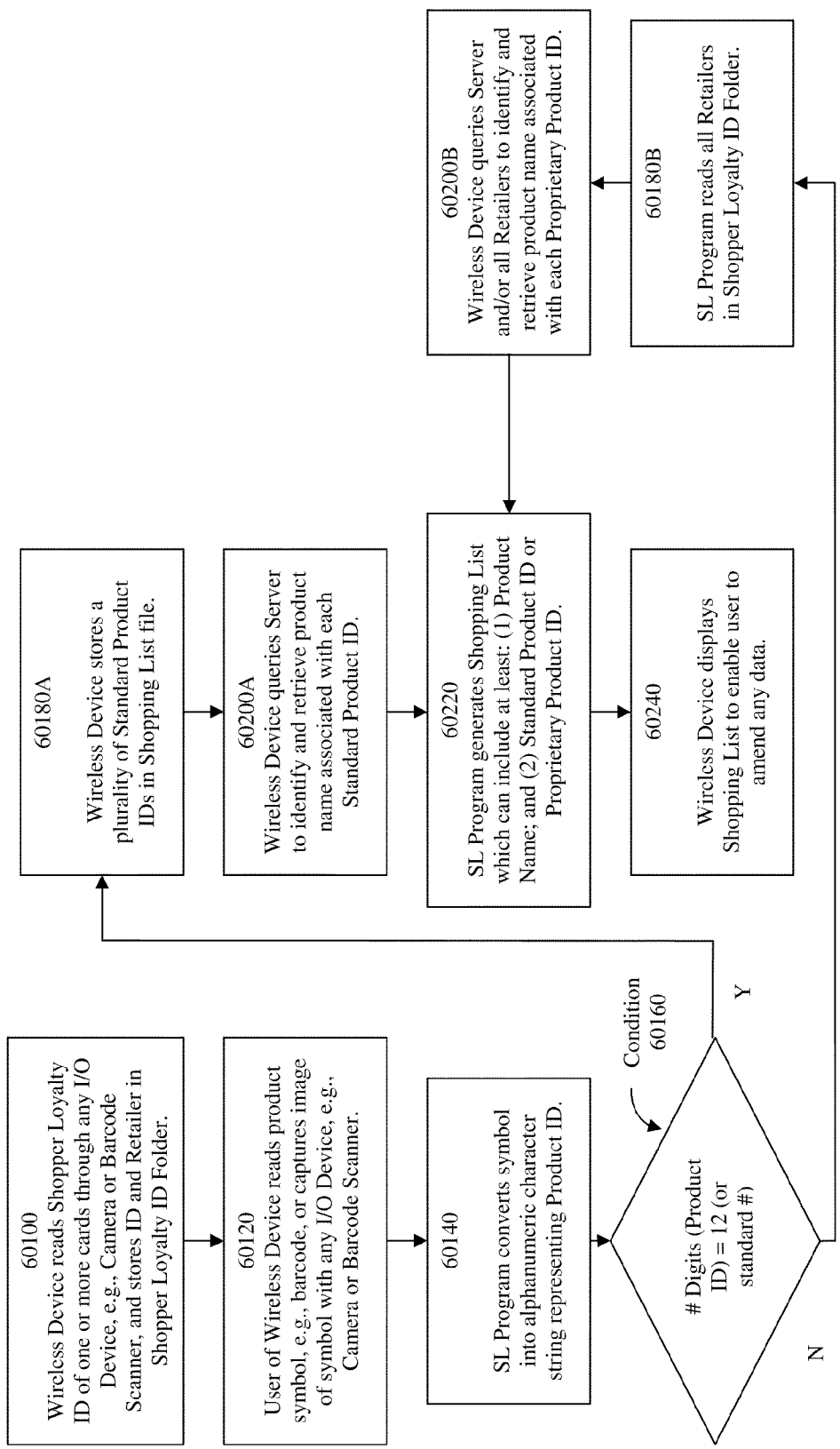
FIG. 60 depicts a flowchart of an exemplary method enabling the automatic generation and updating of a shopping list, according to some embodiments.
Figure 61:
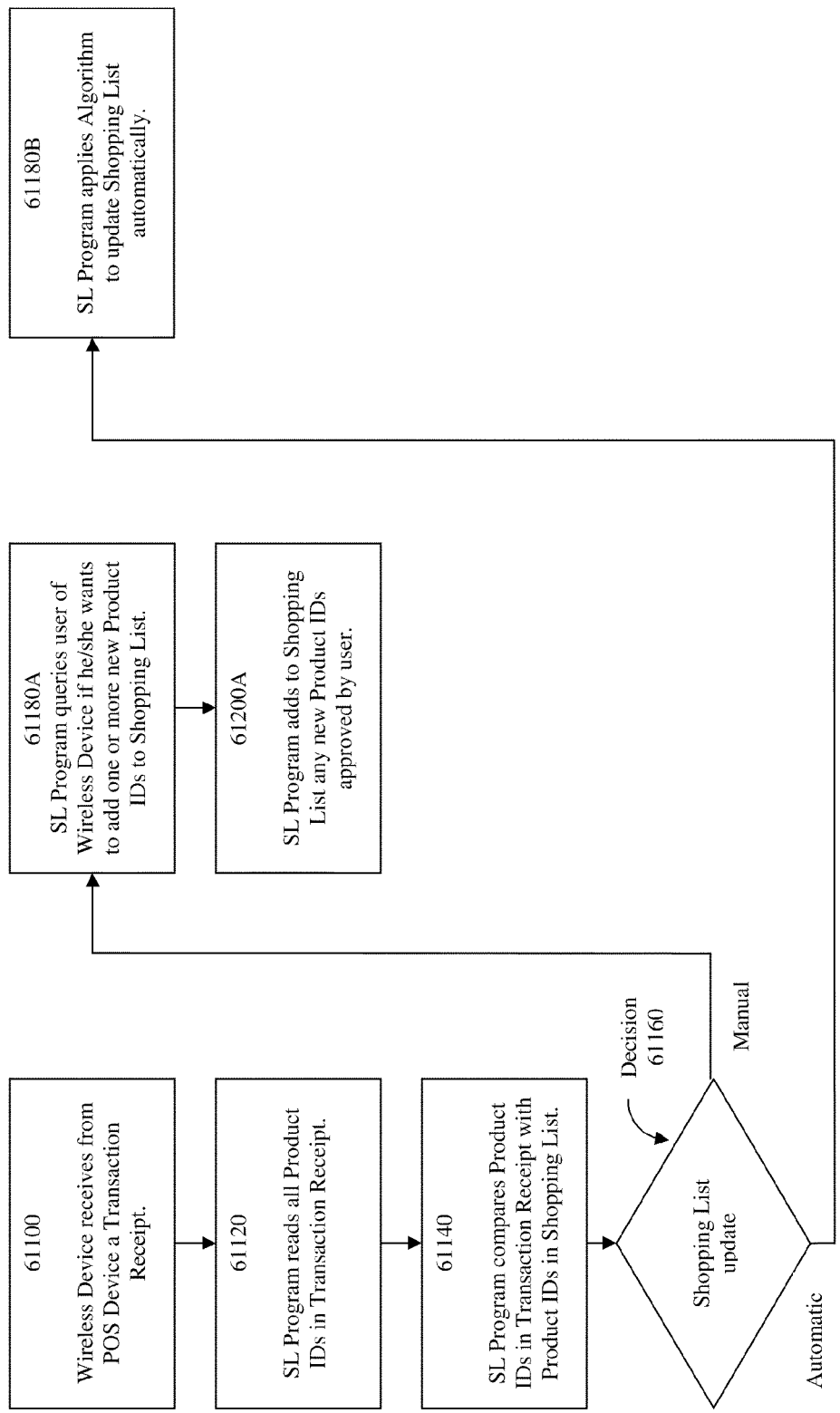
FIG. 61 depicts a flowchart of an exemplary method enabling the updating of a shopping list, according to some embodiments.
Figure 62:
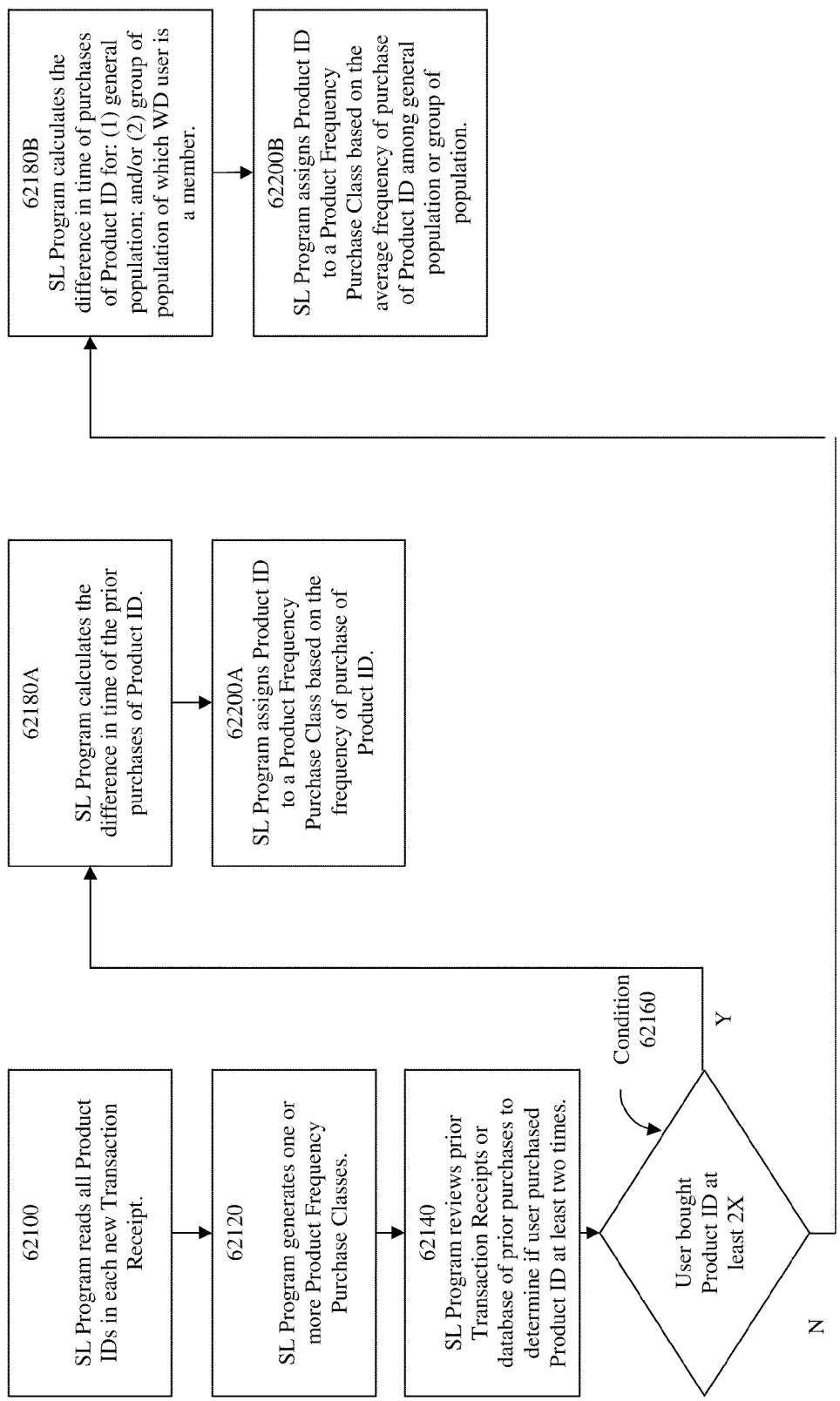
FIG. 62 depicts a flowchart of an exemplary algorithm updating automatically a shopping list, according to some embodiments.
Figure 63:
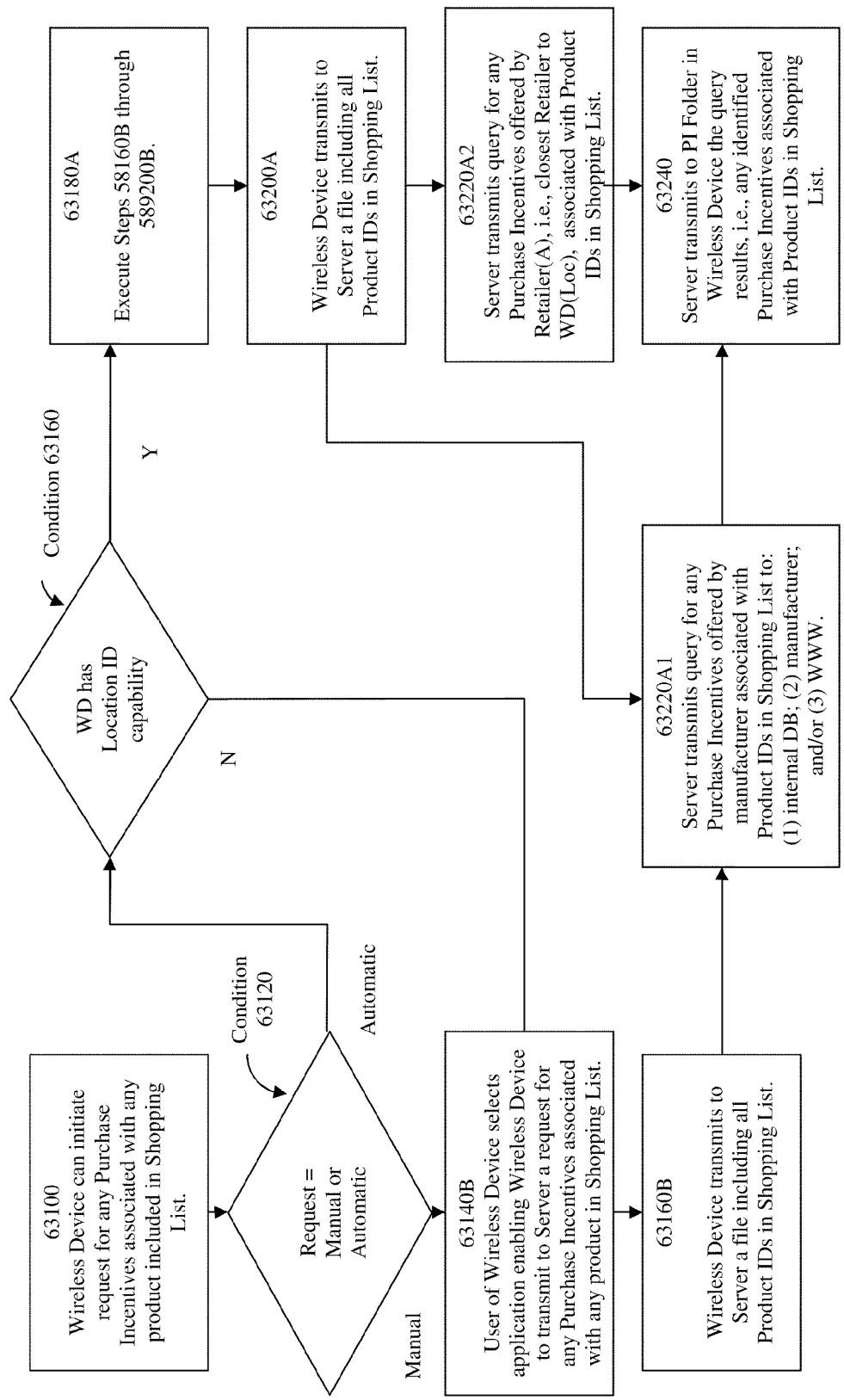
FIG. 63 depicts a flowchart of an exemplary method enabling the retrieving of any purchase incentives associated with any product in a shopping list, according to some embodiments.
Figure 64:
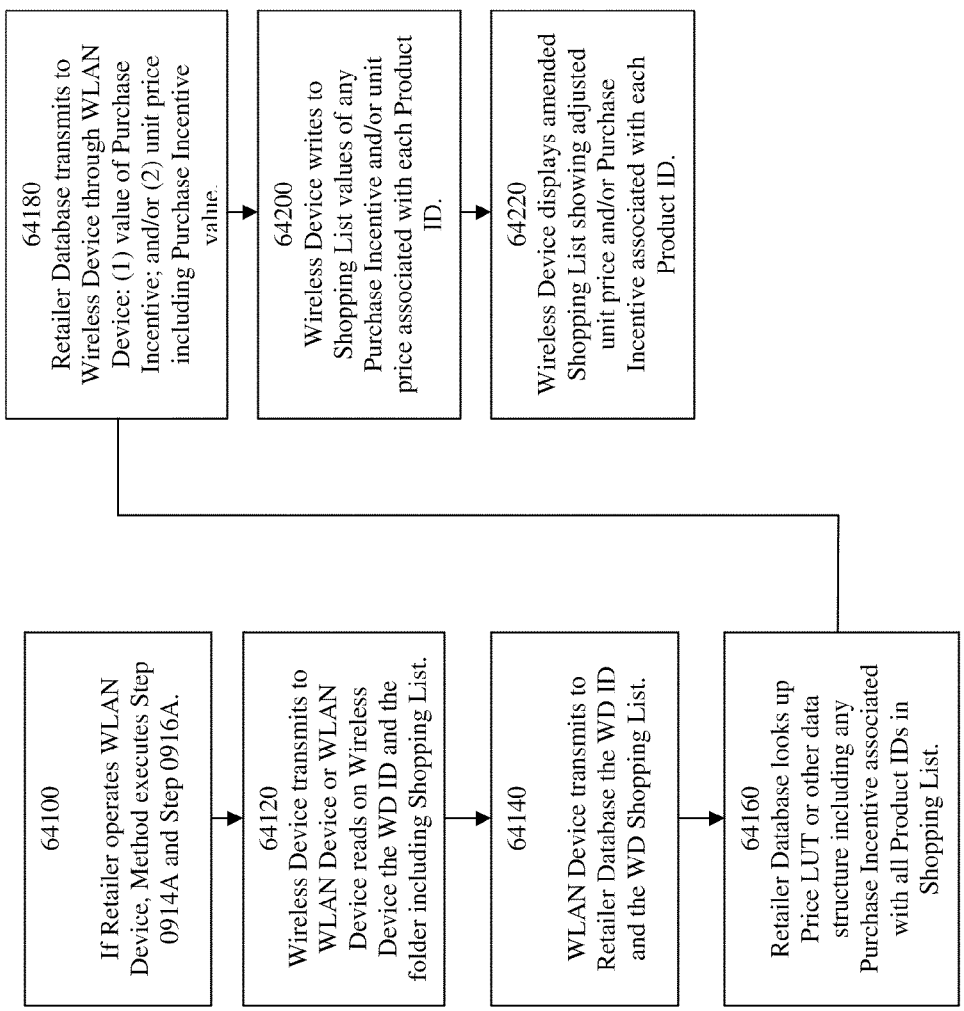
FIG. 64 depicts a flowchart of an exemplary method enabling the exchange of data related to a shopping list with a retailer, according to some embodiments.
Figure 65A:
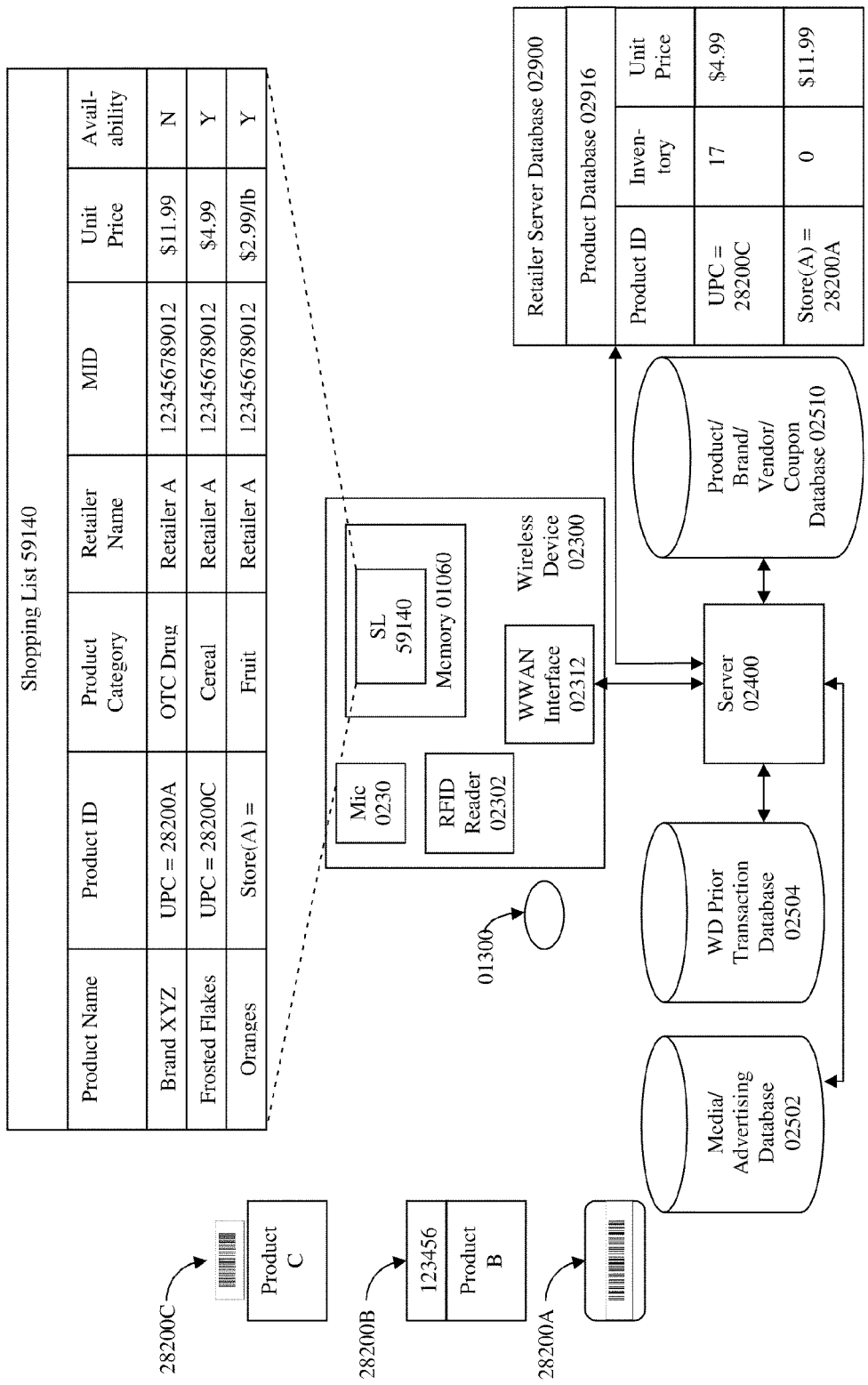
FIG. 65A depicts an exemplary system enabling the creation and management of a shopping list through one or more input methods, e.g., speech, according to some embodiments.
Figure 65B:
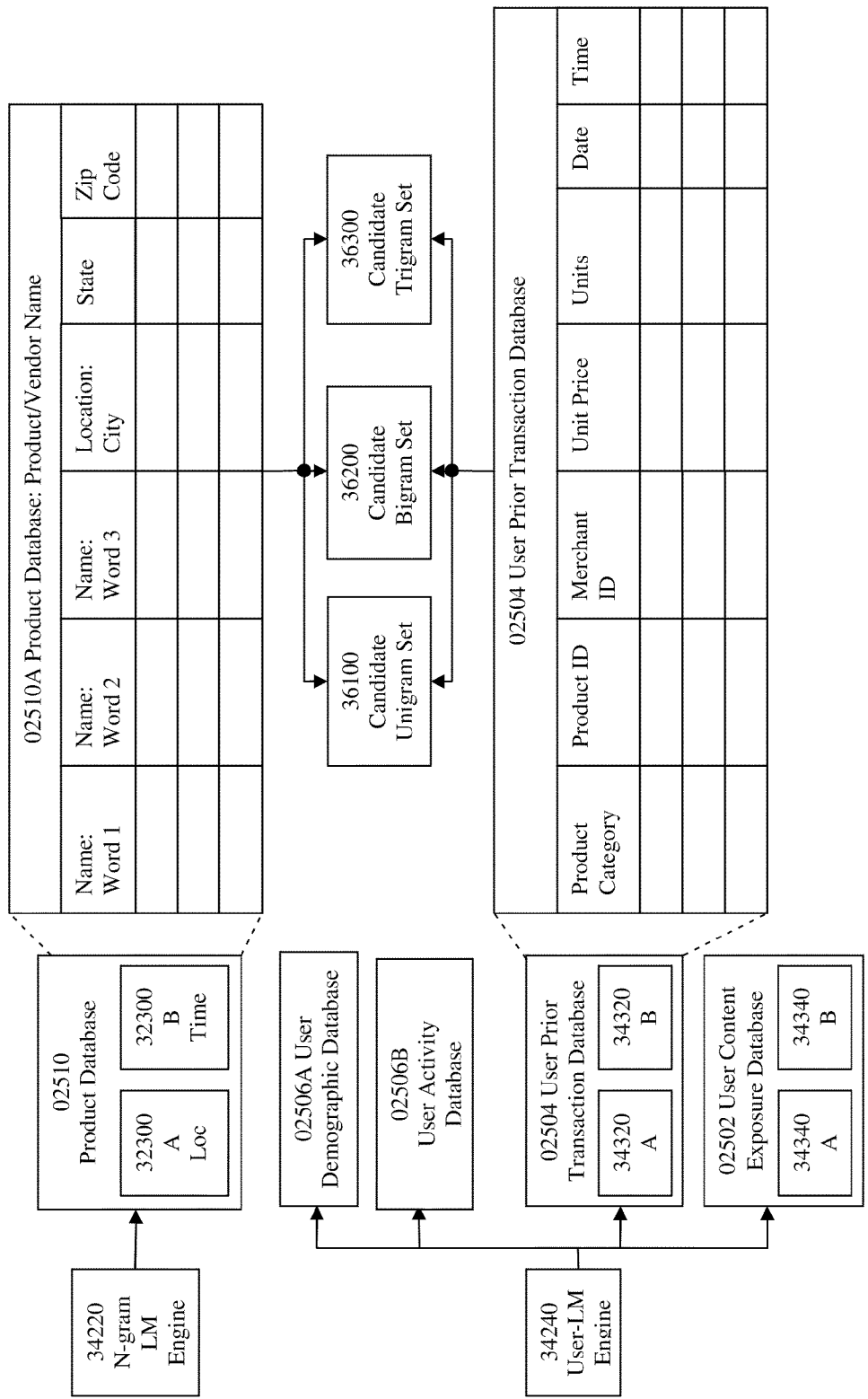
FIG. 65B depicts an exemplary method generating a vocabulary of candidate word sequences related to a potential shopping list, according to some embodiments.
Figure 66A:
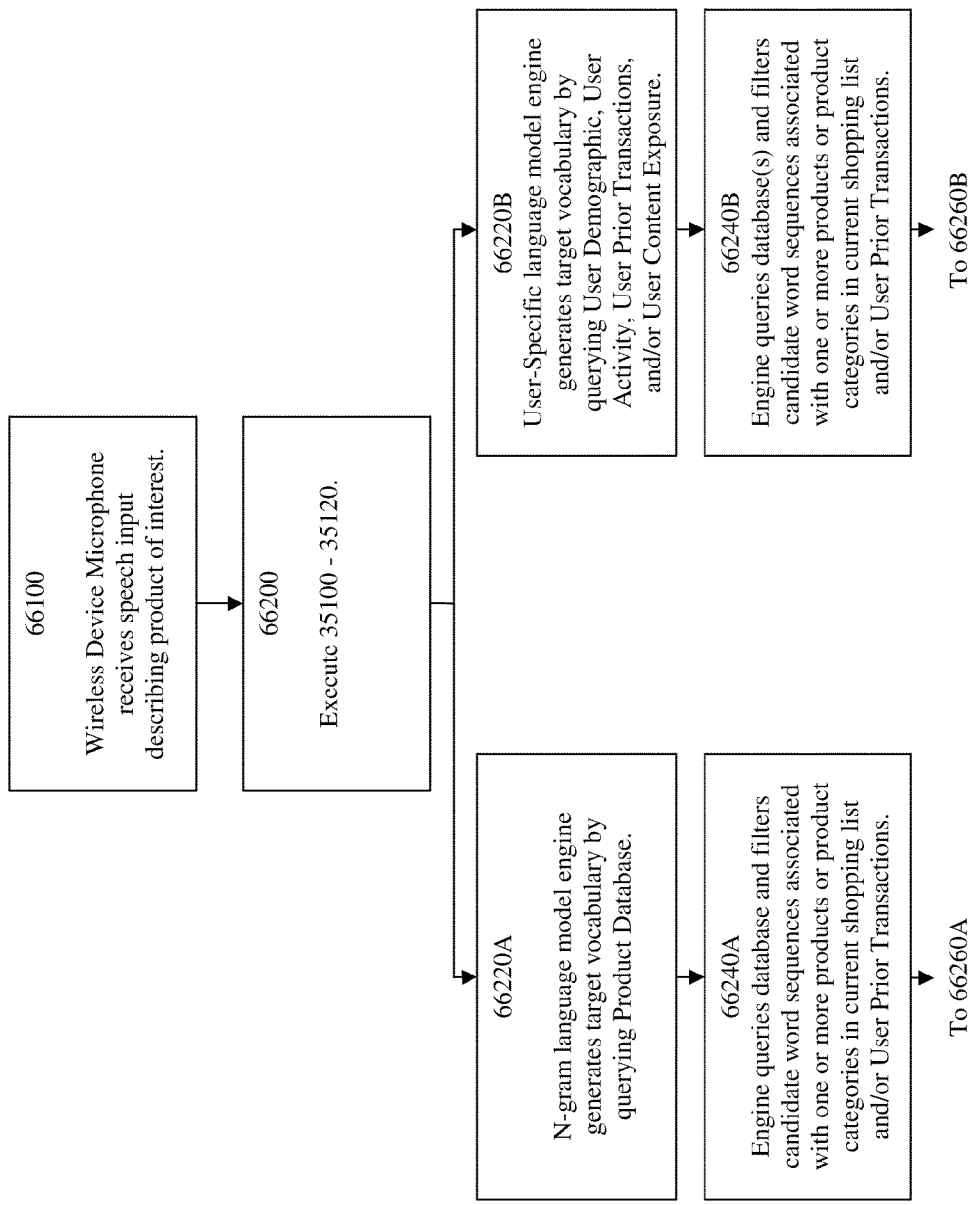
FIG. 66 depicts a flowchart of an exemplary method enabling the creation and management of a shopping list through one or more input methods, e.g., speech, according to some embodiments.
Figure 66B:
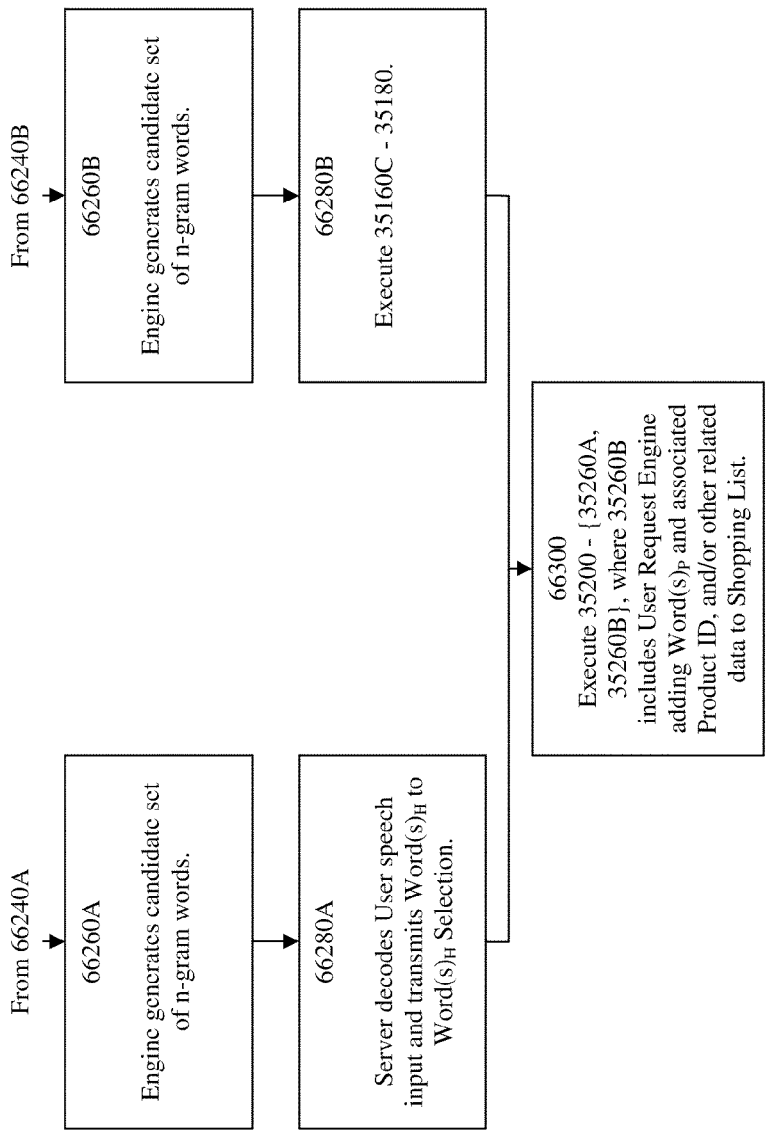

FIG. 55 depicts an exemplary system enabling the automatic redemption of one or more purchase incentives upon the purchase of the associated product, according to some embodiments.

FIG. 55 depicts a block diagram of an exemplary system enabling: (1) the identification of a wireless device near an entrance to a physical retailer; (2) the transmission of one or more Purchase Incentives to a retailer database; and/or (3) the redemption of the Purchase Incentives by the retailer, according to some embodiments. The present system can implement the entities described herein by utilizing a subset of the following components, or additional, related, alternative, and/or equivalent components. The present system can include, but is not limited to, the following components not disclosed earlier.

WD ID 0810 is any data which can uniquely identify a customer in Retailer Database 0288. The data can include, but are not limited to: (1) a Shopper Loyalty ID; (2) a Payment Method ID, which can be any code uniquely identifying an user of a method of paying for a good or service, which can include, but is not limited to: any data utilized by a credit card vendor, e.g., Issuer 0294; any data utilized by a debit card vendor, e.g., Issuer 0294; any data utilized by a charge card vendor, e.g., Issuer 0294; and/or any data utilized by any other type of vendor which can pay for the purchase of one or more products on behalf of a customer of Retailer 0280; (3) one or more phone numbers utilized by the user of Wireless Device 02300; and/or (4) the name and/or address of the user of Wireless Device 02300.

FIG. 9A, FIG. 9B, and FIG. 9C depict a flowchart of an exemplary Method 0900 enabling: (1) the identification of a wireless device near an entrance to a physical retailer; (2) the transmission of one or more Purchase Incentives to a retailer database; and/or (3) the redemption of the Purchase Incentives by the retailer, according to some embodiments. The flowchart refers to the system and structures depicted in FIG. 8. However, the method is not limited to those embodiments. The method can implement the flowchart by utilizing a subset of the components, or additional, related, alternative, and/or equivalent components depicted in FIG. 8. The method can execute a subset of the steps, the steps in different order, and/or other or additional related or equivalent steps.

At Condition 0914, Method 0900 determines if Wireless Device 02300 has the capability to identify the Wireless Device 02300 Location, which is defined as the geographical location of the Wireless Device 02300.

Method 0900 can support any method of identifying the current location of Wireless Device 02300, including, but not limited to: (1) any method of identifying the Wireless Device 02300 Location utilizing any system, method, apparatus, and/or computer program product apparent to a person skilled in the relevant art residing on Wireless Device 02300, e.g., a method based on Global Positioning System (GPS); (2) any method of identifying the Wireless Device 02300 Location utilizing any system, method, apparatus, and/or computer program product apparent to a person skilled in the relevant art residing on one or more Data Processing Systems not residing on Wireless Device 02300, e.g., a method based on data generated, received, and/or collected by Telecom Operator 0214; and/or (3) any method of identifying the Wireless Device 02300 Location utilizing any combination of systems, methods, apparatuses, and/or computer program products apparent to a person skilled in the relevant art residing on both Wireless Device 02300 and one or more other Data Processing Systems.

At 0916A, Method 0900 can utilize any method apparent to a person skilled in the relevant art enabling a WLAN Device 02810 to authenticate one or more Wireless Devices 0210, including, but not limited to: a SIM-based authentication method. Method 0900 can utilize any protocol apparent to a person skilled in the relevant art enabling a WLAN Device 02810 to authenticate one or more Wireless Devices 0210, including, but not limited to: Remote Authentication Dial In User Service (RADIUS) protocol.

At 0918A, Method 0900 can enable the transfer of one or more files and/or folders from Wireless Device 02300 to WLAN Device 02810. Method 0900 can utilize any method to execute the transfer, including, but not limited to: (1) Wireless Device 02300 can transmit to WLAN Device 02810 the WD ID 0810 and/or the WD PI Set 0820; and/or (2) WLAN Device 02810 can read on Wireless Device 02300 the WD ID 0810 and/or the WD PI Set 0820.

At 0934B, Method 0900 can enable the transfer of one or more files and/or folders from Wireless Device 02300 to POS Device 02800. Method 0900 can utilize any method to execute the transfer, including, but not limited to: (1) Wireless Device 02300 can transmit to POS Device 02800 the WD ID 0810 and/or the WD PI Set 0820; and/or (2) POS Device 02800 can read on Wireless Device 02300 the WD ID 0810 and/or the WD PI Set 0820.

A typical SCMM 02700 can utilize any method to restrict the access of another Data Processing System to data stored in SCMM 02700. Rules Database 0480 can include rules governing which Application Group or which application within an Application Group can be accessed. For example, Rules Database 0480 can include rules which are determined at setup or changed dynamically by the user of Wireless Device 02300 to restrict access of a NFC Device 0287 attached to or integrated with POS Device 02800 to any Application Group or any specific application within an Application Group.

3.8 Generation and Updating of Shopping List

FIG. 15 depicts a block diagram of an exemplary system enabling: (1) the automatic generation and updating of a shopping list; (2) the retrieving of any Purchase Incentives associated with any product in the shopping list; and/or (3) the exchange of data related to the shopping list with a retailer, according to some embodiments. The present system can implement the entities described herein by utilizing a subset of the following components, or additional, related, alternative, and/or equivalent components. The present system can include, but is not limited to, the following components not disclosed earlier.

Figure 16:
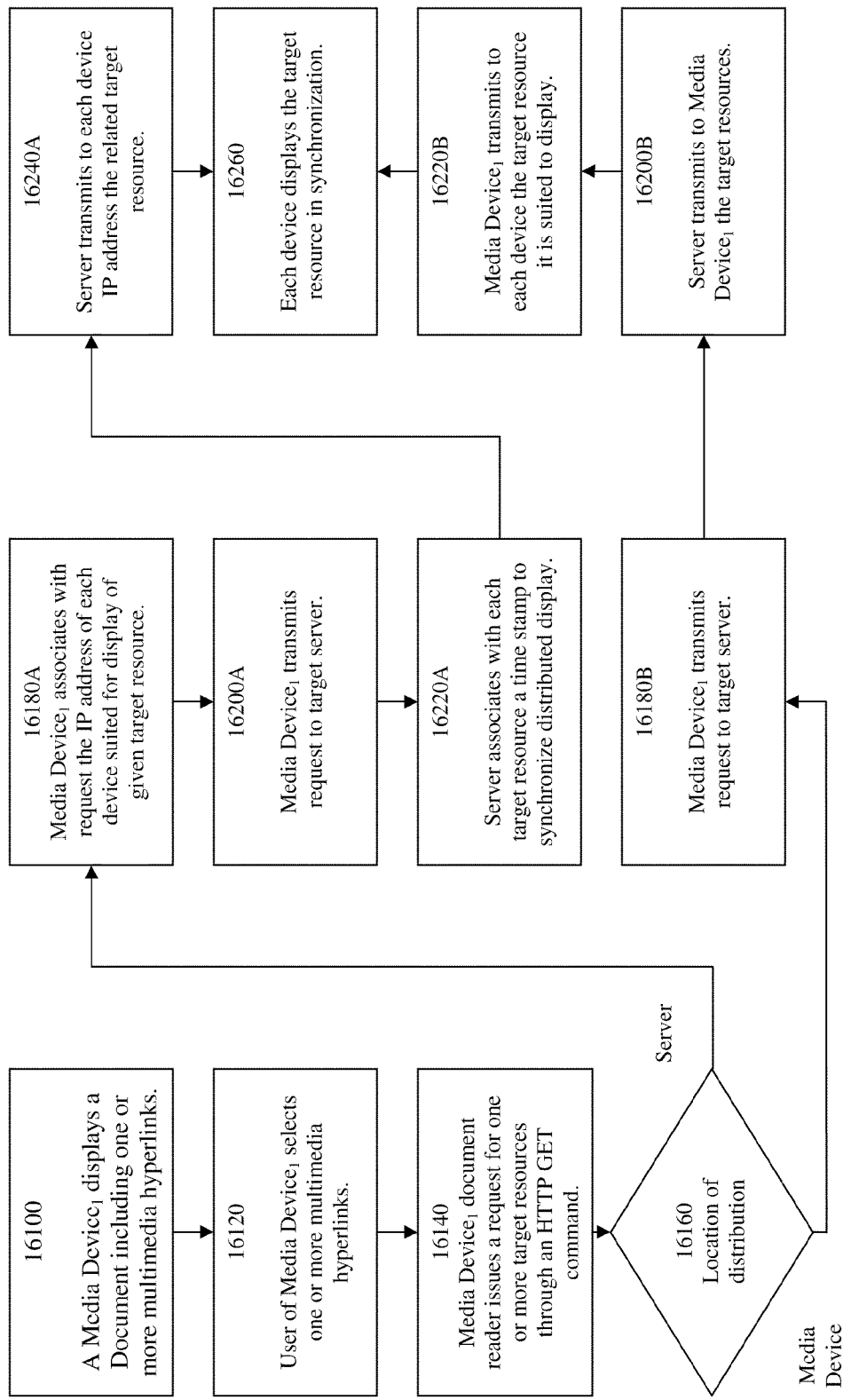
FIG. 16 depicts a flowchart of an exemplary method enabling the display of a plurality of related data on a plurality of devices, according to some embodiments.

FIG. 16 depicts a flowchart of an exemplary sequence of steps, Method 1600, enabling the automatic generation and updating of a shopping list, according to some embodiments. The flowchart refers to the system and structures depicted in FIG. 15. However, the method is not limited to those embodiments. The method can implement the flowchart by utilizing a subset of the components, or additional, related, alternative, and/or equivalent components depicted in FIG. 15. The method can execute a subset of the steps, the steps in different order, and/or other or additional related or equivalent steps.

Figure 17:
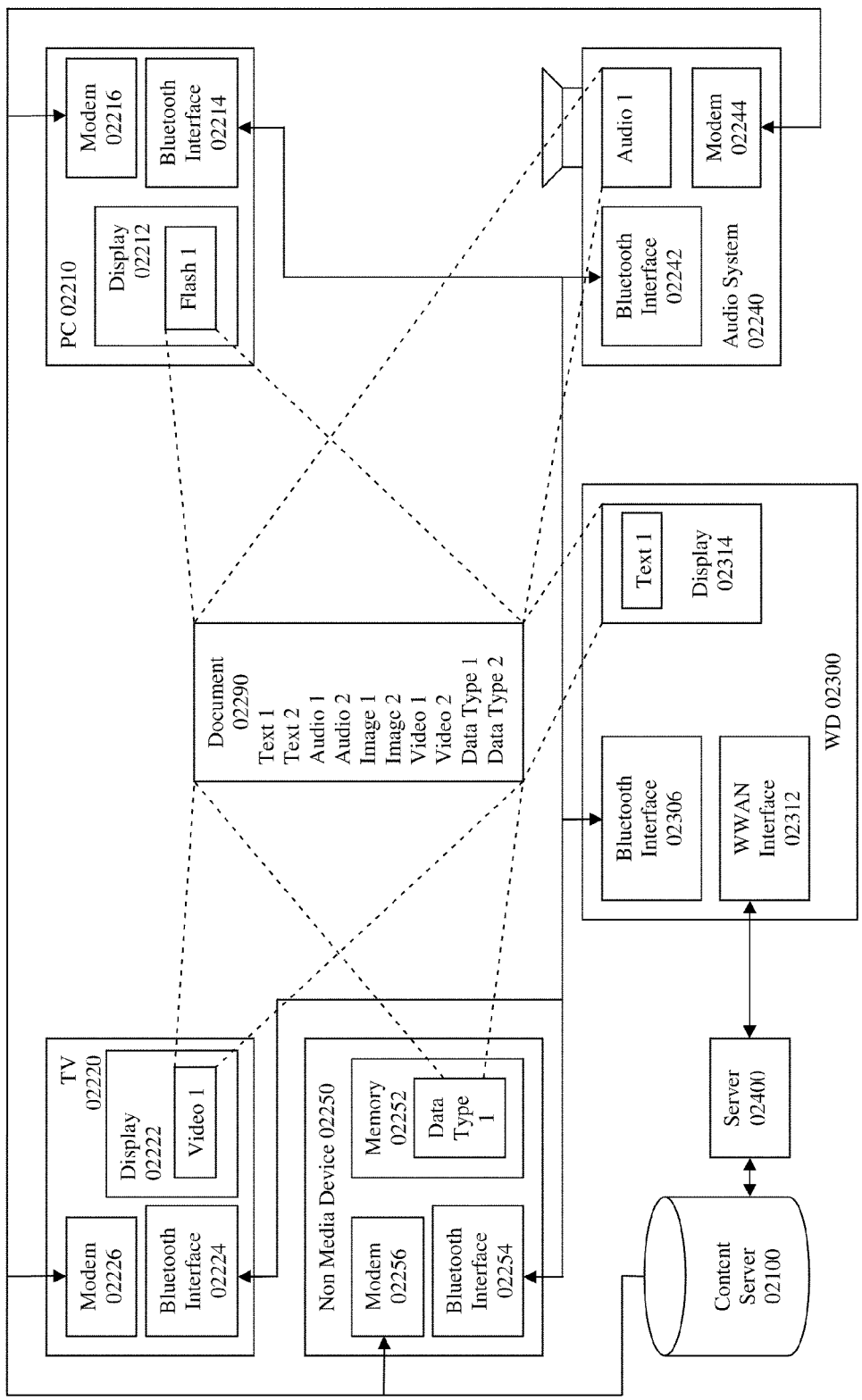
FIG. 17 depicts an exemplary system displaying a plurality of related data on a plurality of devices, according to some embodiments.

FIG. 17 depicts a flowchart of an exemplary Method 1700 enabling the updating of a shopping list, according to some embodiments. The flowchart refers to the system and structures depicted in FIG. 15. However, the method is not limited to those embodiments. The method can implement the flowchart by utilizing a subset of the components, or additional, related, alternative, and/or equivalent components depicted in FIG. 15. The method can execute a subset of the steps, the steps in different order, and/or other or additional related or equivalent steps.

FIG. 18 depicts a flowchart of an exemplary Method 1800 to update automatically a shopping list, according to some embodiments. The flowchart refers to the system and structures depicted in FIG. 15. However, the method is not limited to those embodiments. The method can implement the flowchart by utilizing a subset of the components, or additional, related, alternative, and/or equivalent components depicted in FIG. 15. The method can execute a subset of the steps, the steps in different order, and/or other or additional related or equivalent steps.

At 1810, SL Program 1540 can read the Product ID of each product purchased in any new Transaction Receipt 59400.

At 1812, the present method can utilize any set of data to generate a Product Frequency Purchase Class, which is defined as a category of products which an user of Wireless Device is likely to purchase on a given visit to a Retailer 0280.

The set of data used to generate a Product Frequency Purchase Class can include, but is not limited to: (1) data representing the frequency of purchase of a given Product ID among a general population; (2) data representing the frequency of purchase of a given Product ID among a group of members of the general population, e.g., males 18-34; and/or (3) data representing the frequency of purchase of a given Product ID by the user of a Wireless Device 02300. For example, Method 1800 can generate one Product Frequency Purchase Class to include those products which the user of Wireless Device 02300 purchases about once a week, another Product Frequency Purchase Class to include those products which the user purchases about once a month, and another Product Frequency Purchase Class to include those products which the user purchases less frequently than once a month.

The methods described herein can enable the user of Wireless Device 02300 to amend the Product Frequency Purchase Classes to reflect the frequency of purchases for the given user.

At 1814, SL Program 1540 can review: (1) any prior stored Transaction Receipts 59400 for the Product ID; and/or (2) any database including data on prior purchases by the user of Wireless Device 02300 of the Product ID. The database can be stored in Wireless Device 02300 or outside of Wireless Device 02300. The database can include any data on the prior purchases by the user of Wireless Device 02300, which can be collected from any source, including, but not limited to: (1) Transaction Receipt 59400 received from POS Device 02800; (2) Transaction Receipt 59400 or any data structure read from Retailer Database 0288; and/or (3) any database stored at Issuer 0294.

At Condition 1816, Method 1800 can determine if the user of Wireless Device 02300 previously purchased the Product ID at least two times.

At 1818A, SL Program 1540 can calculate the difference in time of the prior purchases of Product ID. If the user purchased Product ID more than two times, Method 1800 can utilize any method to generate an average frequency of purchase of the Product ID.

At 1820A, SL Program 1340 can assign Product ID to a Product Frequency Purchase Class based on the frequency of purchase of Product ID by the user of Wireless Device 02300. For example, if the user of Wireless Device 02300 purchases a given Product ID at a frequency which is closer to the Product Frequency Purchase Class=1/week than the Product Frequency Purchase Class=1/month, then SL Program 1340 can assign Product ID to the former Product Frequency Purchase Class.

At 1818B, SL Program 1340 can calculate the difference in time of the purchases of Product ID for any group representative of the user of Wireless Device 02300, which can include, but is not limited to: (1) the general population; and/or (2) a group of members of the general population of which the user of Wireless Device 02300 is a member, e.g., males 18-34.

At 1820B, SL Program 1340 can assign Product ID to a Product Frequency Purchase Class based on the frequency of purchase of Product ID by any group representative of the user of Wireless Device 02300.

FIG. 19 depicts a flowchart of an exemplary Method 1900 enabling the retrieving of any Purchase Incentives associated with any product in the shopping list, according to some embodiments. The flowchart refers to the system and structures depicted in FIG. 15. However, the method is not limited to those embodiments. The method can implement the flowchart by utilizing a subset of the components, or additional, related, alternative, and/or equivalent components depicted in FIG. 15. The method can execute a subset of the steps, the steps in different order, and/or other or additional related or equivalent steps.

FIG. 20 depicts a flowchart of an exemplary Method 2000 enabling the exchange of data related to the shopping list with a retailer, according to some embodiments. The flowchart refers to the system and structures depicted in FIG. 15. However, the method is not limited to those embodiments. The method can implement the flowchart by utilizing a subset of the components, or additional, related, alternative, and/or equivalent components depicted in FIG. 15. The method can execute a subset of the steps, the steps in different order, and/or other or additional related or equivalent steps.

4. Conclusion

While the present application has described various embodiments, it should be understood that they have been presented by way of example only, and not limitation. It will be apparent to a person skilled in the relevant art that various changes in form and detail can be made therein without departing from the spirit and scope of the invention. Thus, the breadth and scope of the disclosure should not be limited by any of the above-described exemplary embodiments, but should be defined only in accordance with the following claims and their equivalents.

The present application includes headings herein for reference and to aid in locating certain sections. The present application does not intend these headings to limit the scope of the concepts described therein. The present application may apply the concepts in other sections throughout the entire specification.

While the present application describes how to format data, assign names to variables, and assign names to values that are written in the English language, the data, variables, and values can be written in alternative languages. The present application can modify the systems, methods, apparatuses, and/or computer program products to operate with data, variables, and values in languages different from English.

While the present application discloses how to recognize one or more word sequences spoken in the English language, it is not limited to that embodiment. The disclosed systems, methods, apparatuses, and computer program products can recognize one or more word sequences spoken in any language.

The present application provides the previous description of the disclosed embodiments to enable a person skilled in the relevant art to make and use the invention. Various modifications to these embodiments will be readily apparent to a person skilled in the relevant art. The present application may apply the generic principles defined herein to other embodiments without departing from the spirit or scope of the invention. Thus, the present application does not intend to limit the embodiments shown herein, but accords the widest scope consistent with the principles and novel features disclosed herein.

Reference to "invention" herein refers to one or more embodiments. The phrase "present invention" is not intended to limit the scope of the claims to the description following the phrase.

What is claimed is:

1. A system, comprising:
    a user context language model engine including,
        logic to cause a processor to associate one or more key words with each of one or more types of user context information,
        logic to cause the processor to identify user context information associated with each of one or more users, and
        logic to cause the processor to generate a user context vocabulary of words, for each of the one or more users, from the key words associated with the corresponding user context information;
    a product language model engine including,
        logic to cause the processor to associate one or more key words with each of one or more product categories, and
        logic to cause the processor to generate a product vocabulary of words from the key words corresponding to the product categories;
    an acoustic model engine to convert user input speech to a first set of one or more words; and
    a word selection engine to select a second set of one or more words from one or more of a corresponding one of the user context vocabulary of words and the product vocabulary of words that correlate to the first set of one or more words.

2. The system of claim 1, wherein the user context language model engine further includes:
    logic to cause the processor to associate the one or more key words with each of one or more types of products/services;
    logic to cause the processor to identify user prior transaction information associated with products/services for each of the one or more users; and
    logic to cause the processor to generate a user prior transaction vocabulary of words, for each of the one or more users, from the key words associated with the corresponding user prior transaction information.

3. The system of claim 2, wherein the logic to identify user prior transaction information includes:
    logic to cause the processor to retrieve transaction information from one or more of a bank database, a merchant database, a credit card processor database, a check processor database, and a user computer.

4. The system of claim 2, wherein the logic to identify user prior transaction information includes:
    logic to cause the processor to retrieve transaction information from a user wireless device storing transaction information.

5. The system of claim 2, wherein the logic to identify user prior transaction information includes:
    logic to cause the processor to retrieve transaction information from a user wireless device receiving the information in one or more transactions executed over a near-field communications protocol.

6. The system of claim 1, wherein the logic to generate the product vocabulary includes:
    logic to cause the processor to dynamically filter one or more of the products/services and corresponding key words in response to the user input speech, and to generate the product vocabulary from filtered results.

7. The system of claim 1, wherein the logic to generate a user context vocabulary of words, for each of one or more users, includes one or more of:
    logic to cause the processor to generate a user demographic vocabulary of words, for each of the one or more users;
    logic to cause the processor to generate a user activity vocabulary of words, for each of the one or more users;
    logic to cause the processor to generate a user prior transaction vocabulary of words, for each of the one or more users; and
    logic to cause the processor to generate a user content exposure vocabulary of words, for each of the one or more users.

8. The system of claim 7, further including:
    a scoring engine to assign scores to the user context vocabulary of words;
    wherein the word selection engine includes logic to cause the processor to select the second set of one or more words at least partially in response to the scores.

9. The system of claim 1, further including:
    a population language model engine including:
        logic to cause the processor to associate one or more key words with each of one or more type features in response to input from a population of users; and
        logic to cause the processor to generate a population vocabulary of words from the key words corresponding to the features;
    a scoring engine to assign scores to the user context vocabulary of words and the population vocabulary of words;
    wherein the word selection engine includes logic to cause the processor to select the second set of one or more words from one or more of the user context vocabulary of words, the product vocabulary of words, and the population vocabulary of words, at least partially in response to the scores.

10. The system of claim 1, further including:
    a background audio language model engine including:
        logic to cause the processor to associate one or more key words with each of one or more media content identifications,
        logic to cause the processor to identify the media content indications from audio accompanying the user input speech, and
        logic to cause the processor to generate media content vocabularies of words from the key words of identified media content identifications; and
    a scoring engine to assign scores to the user context vocabulary of words and the media content vocabulary of words;
    wherein the word selection engine includes logic to cause the processor to select the second set of one of more words from one or more of the user context vocabulary of words, the product vocabulary of words, and the media content vocabulary of words, at least partially in response to the scores.

11. The system of claim 1, further including:
    shopping list logic to cause the processor to populate a shopping list in response to the second set of one or more words.

12. The system of claim 1, further including:
  logic to cause the processor to identify a data object and a destination device at least partially in response to the second set of one or more words; and
  transmit logic to transmit the data object to the destination device.

13. The system of claim 12, wherein the data object includes a merchandise coupon, and wherein the transmit logic includes:
  logic to cause the processor to transmit the merchandise coupon to one or more of a user telephone, a user computer, and a television system.

14. The system of claim 1, further including:
  logic to cause the processor to identify a data object and a destination device in response to at least a subset of the second set of one or more words, an indication of a user motion, and an indication of a user location.

15. A method implemented in a suitably configured computer system, comprising:
  associating, at a computer system, one or more key words with each of one or more types of user context information;
  identifying, at the computer system, user context information associated with each of one or more users;
  generating, at the computer system, a user context vocabulary of words, for each of the one or more users, from the key words associated with the corresponding user context information;
  associating, at the computer system, one or more key words with each of one or more product categories;
  generating, at the computer system, a product vocabulary of words from the key words corresponding to the product categories;
  converting, at the computer system, user input speech to a first set of one or more words; and
  selecting, at the computer system, a second set of one or more words from one or more of a corresponding one of the user context vocabulary of words and the product vocabulary of words that correlate to the first set of one or more words.

16. The method of claim 15, further comprising:
  associating, at the computer system, the one or more key words with each of one or more types of products/services;
  identifying, at the computer system, user prior transaction information associated with products/services for each of the one or more users; and
  generating, at the computer system, a user prior transaction vocabulary of words, for each of the one or more users, from the key words associated with the corresponding user prior transaction information.

17. The method of claim 15, further comprising:
  retrieving, at the computer system, transaction information from a user wireless device component storing transaction information.

18. The method of claim 15, further comprising:
  retrieving, at the computer system, transaction information from a user wireless device receiving the information in one or more transactions executed over a near-field communications protocol.

19. A computer program product comprising a computer readable medium having computer program product logic stored thereon, including:
  logic to cause a processor to associate one or more key words with each of one or more types of user context information;
  logic to cause a processor to identify user context information associated with each of one or more users;
  logic to cause a processor to generate a user context vocabulary of words, for each of the one or more users, from the key words associated with the corresponding user context information;
  logic to cause a processor to associate one or more key words with each of a plurality of product categories;
  logic to cause a processor to generate a product vocabulary of words from the key words corresponding to the product categories;
  logic to cause a processor to convert user input speech to a first set of one or more words; and
  logic to cause a processor to select a second set of one or more words from one or more of a corresponding one of the user context vocabulary of words and the product vocabulary of words that correlate to the first set of one or more words.

* * * * *